(12) United States Patent
Tsuchida et al.

(10) Patent No.: US 11,889,944 B2
(45) Date of Patent: Feb. 6, 2024

(54) COFFEE MACHINE

(71) Applicant: DAITO GIKEN, INC., Tokyo (JP)

(72) Inventors: Junya Tsuchida, Tokyo (JP); Takayuki Wakabayashi, Tokyo (JP)

(73) Assignee: DAITO GIKEN, INC., Tokyo (JP)

( * ) Notice: Subject to any disclaimer, the term of this patent is extended or adjusted under 35 U.S.C. 154(b) by 0 days.

(21) Appl. No.: 18/026,869

(22) PCT Filed: Mar. 23, 2022

(86) PCT No.: PCT/JP2022/013458
§ 371 (c)(1),
(2) Date: Mar. 17, 2023

(87) PCT Pub. No.: WO2022/202906
PCT Pub. Date: Sep. 29, 2022

(65) Prior Publication Data
US 2023/0270280 A1    Aug. 31, 2023

(30) Foreign Application Priority Data

Nov. 16, 2021    (JP) .................................. 2021-186504

(51) Int. Cl.
A47J 31/42    (2006.01)
A47J 42/52    (2006.01)
A47J 42/18    (2006.01)

(52) U.S. Cl.
CPC .............. *A47J 31/42* (2013.01); *A47J 42/18* (2013.01); *A47J 42/52* (2013.01)

(58) Field of Classification Search
CPC .. A47J 31/42; A47J 42/18; A47J 42/38; A47J 42/52
See application file for complete search history.

(56) References Cited

U.S. PATENT DOCUMENTS 5,845,561 A    12/1998  Chigira et al.
2004/0081438 A1*  4/2004  Hahn ...................... H02P 6/28
388/804

(Continued)

FOREIGN PATENT DOCUMENTS

JP    H08-52081 A    2/1996
JP    H09-282552 A    10/1997
(Continued)

OTHER PUBLICATIONS

Jun. 7, 2022 International Search Report issued in International Patent Application No. PCT/JP2022/013458.

(Continued)

*Primary Examiner* — Reginald Alexander
(74) *Attorney, Agent, or Firm* — Oliff PLC

(57) ABSTRACT

A coffee machine including a grinder configured to grind coffee beans, and a coffee machine devised to be able to bring an air volume for separating waste such as chaff as close as possible to a target air volume. A first grinder configured to grind coffee beans; a fan configured to generate a wind pressure by rotating to separate waste from the ground beans ground by the first grinder; a fan motor configured to cause the fan to rotate; and a control unit configured to control rotation of the fan motor according to a set value, and the control unit acquires information (the number of rotation pulses) related to a rotation speed of the actually rotating fan motor, corrects the set value based on the acquired information, and controls the rotation of the fan motor according to the corrected set value.

4 Claims, 87 Drawing Sheets

(56) References Cited

U.S. PATENT DOCUMENTS

| | | | | |
|---|---|---|---|---|
| 2009/0189559 A1* | 7/2009 | Li | ..................... | A47J 43/0705 |
| | | | | 318/434 |
| 2017/0167744 A1* | 6/2017 | Arensmeier | ............. | F24F 11/30 |
| 2017/0282275 A1* | 10/2017 | Nikou | ..................... | B23K 9/16 |
| 2019/0038066 A1* | 2/2019 | Kihara | ..................... | A47J 31/32 |
| 2020/0163487 A1 | 5/2020 | Kihara et al. | | |

FOREIGN PATENT DOCUMENTS

| | | |
|---|---|---|
| JP | 2002-165477 A | 6/2002 |
| JP | 2019-30431 A | 2/2019 |
| KR | 10-2014-0107850 A | 9/2014 |

OTHER PUBLICATIONS

May 31, 2022 Notification of Reasons for Refusal issued in Japanese Patent Application No. 2021-186504.
Jul. 28, 2022 Written Amendment issued in Japanese Patent Application No. 2021-186504.
Jul. 28, 2022 Written Opinion issued in Japanese Patent Application No. 2021-186504.
Oct. 25, 2022 Decision to Grant a Patent issued in Japanese Patent Application No. 2021-186504.

* cited by examiner

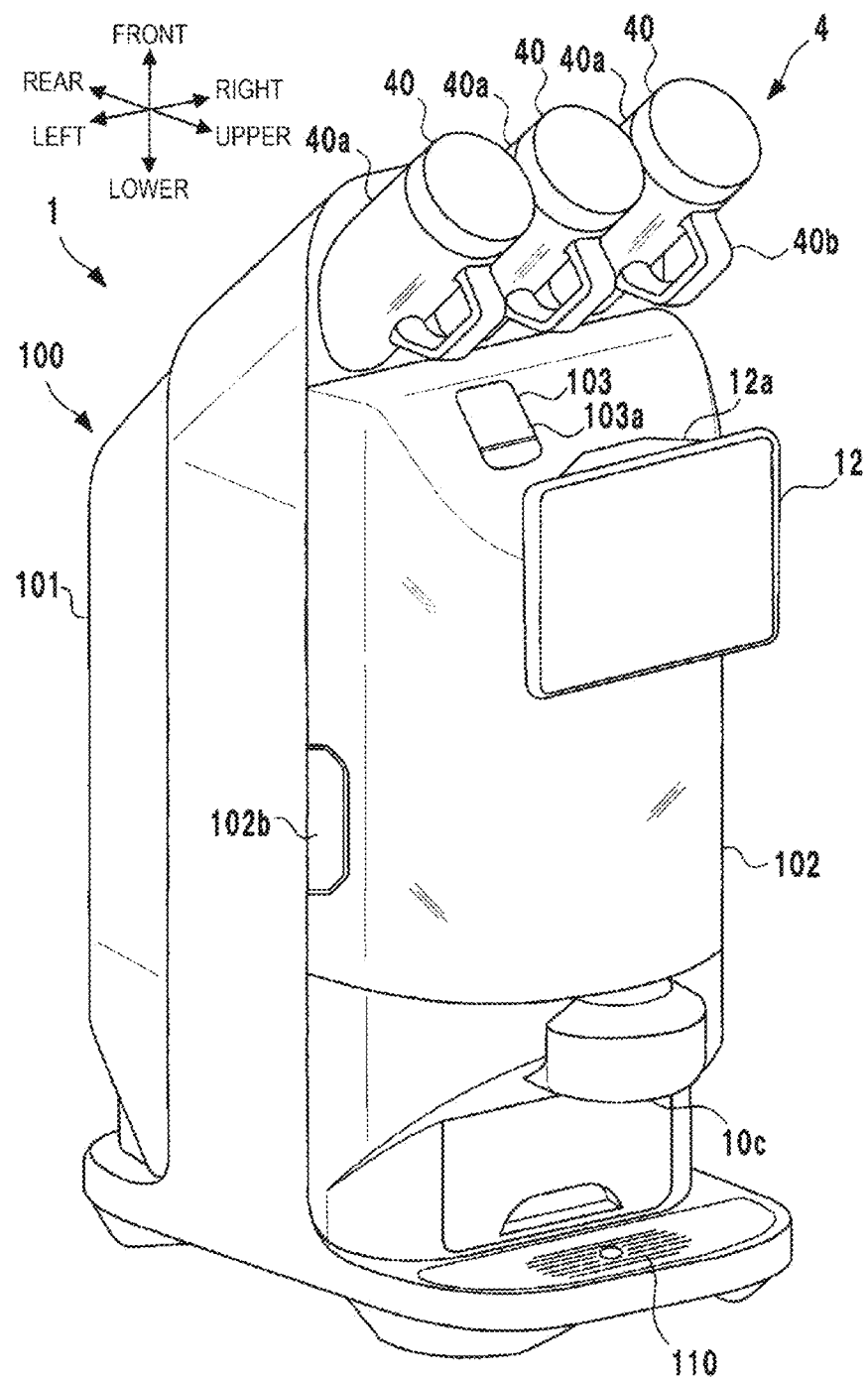
[Figure 1]

[Figure 2]
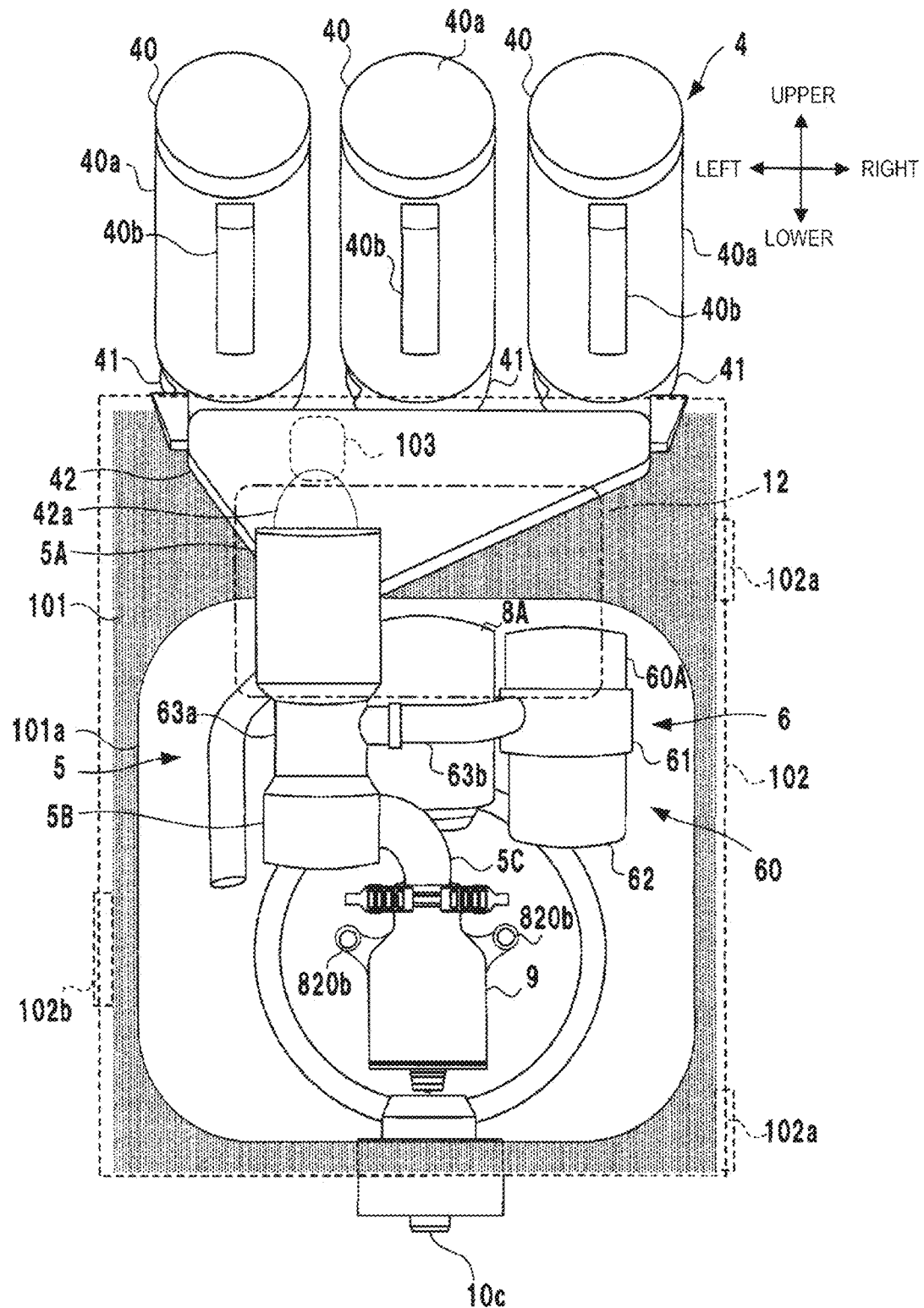

[Figure 3]
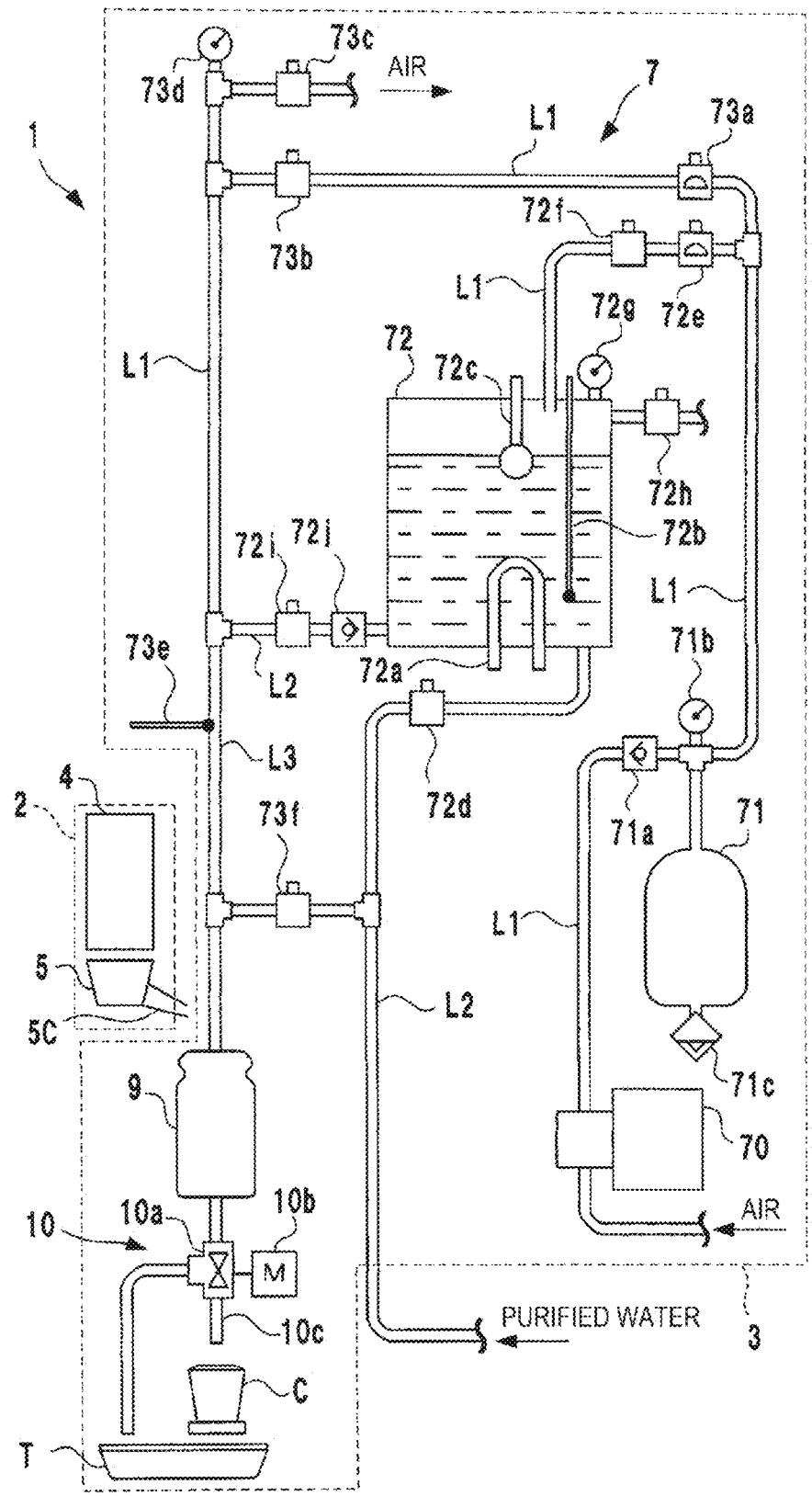

[Figure 4]
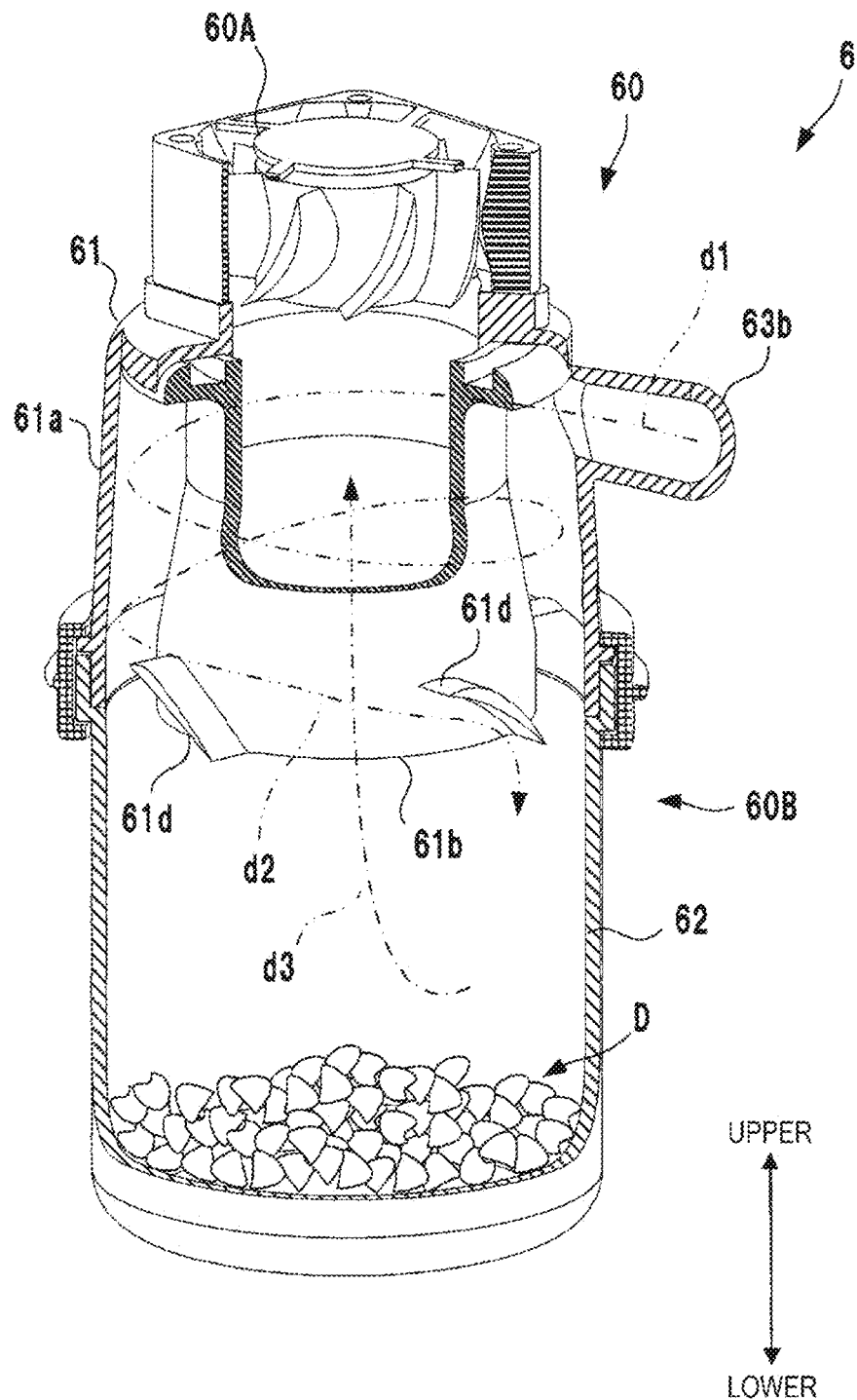

[Figure 5]
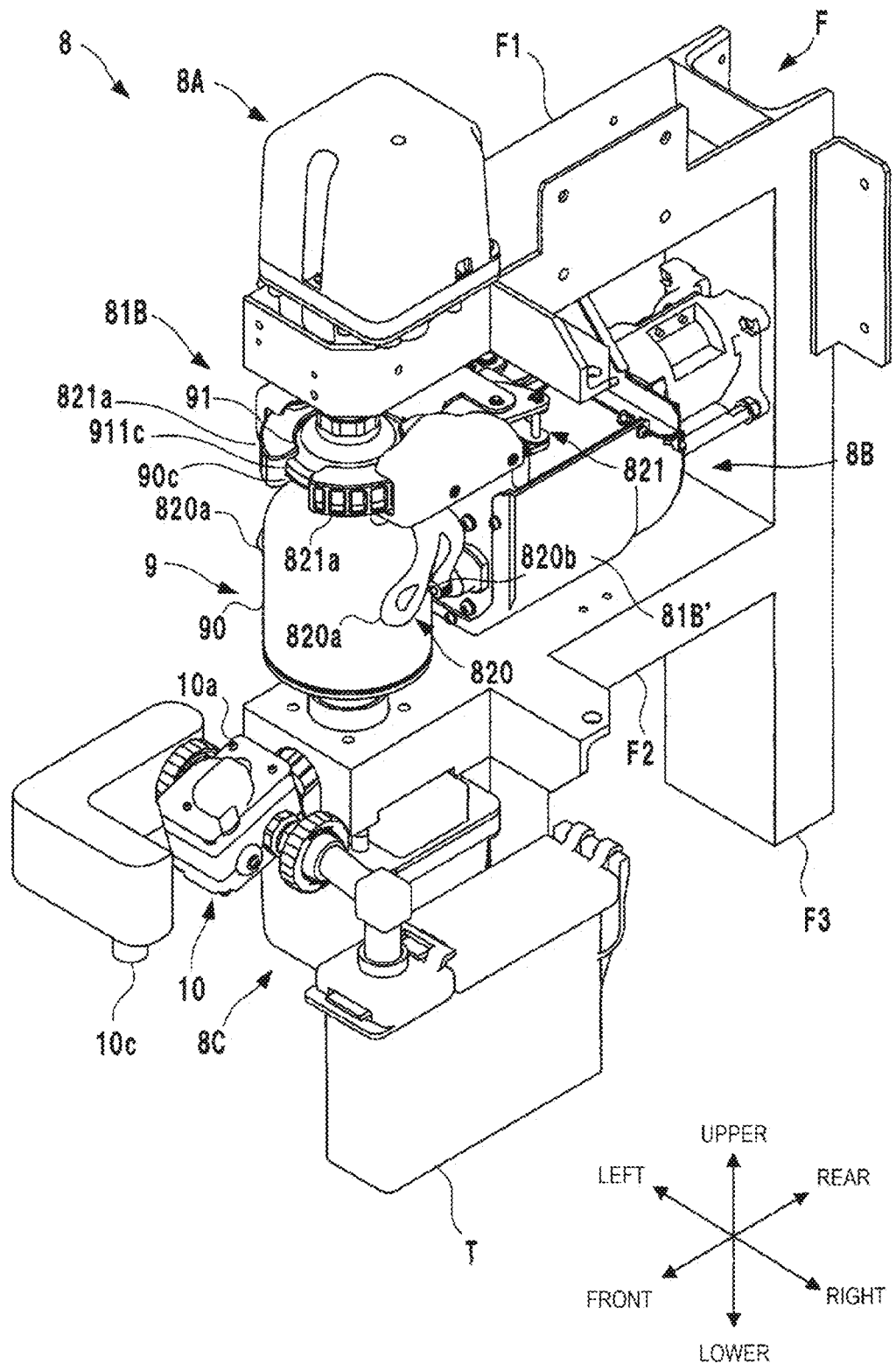

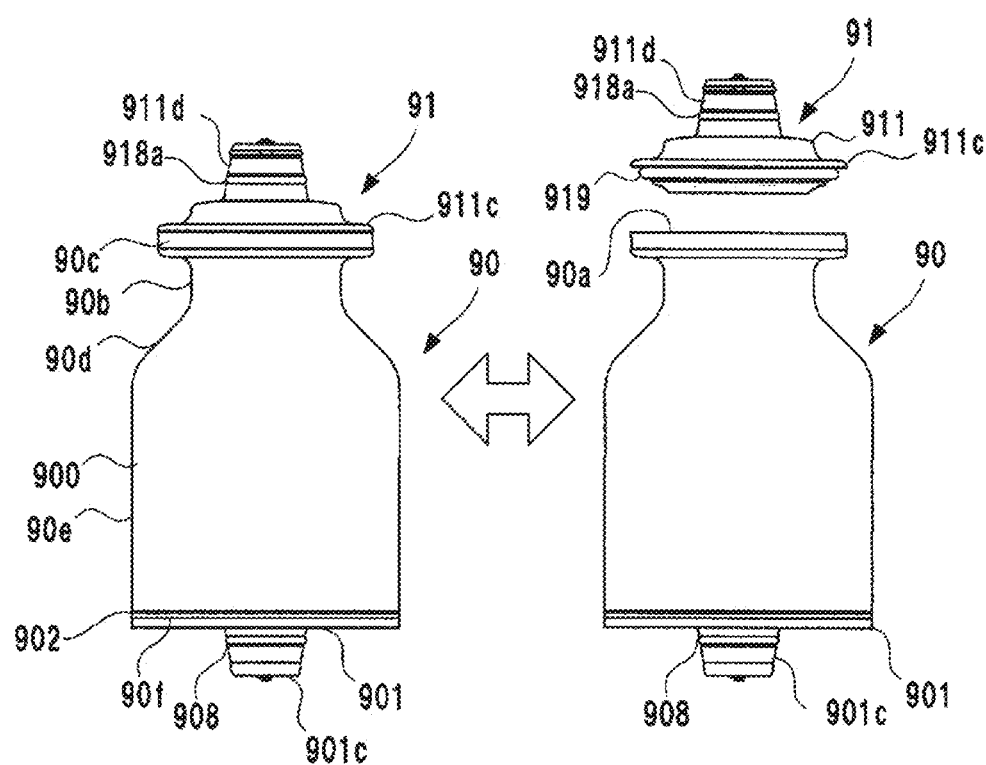
[Figure 6]

[Figure 7]
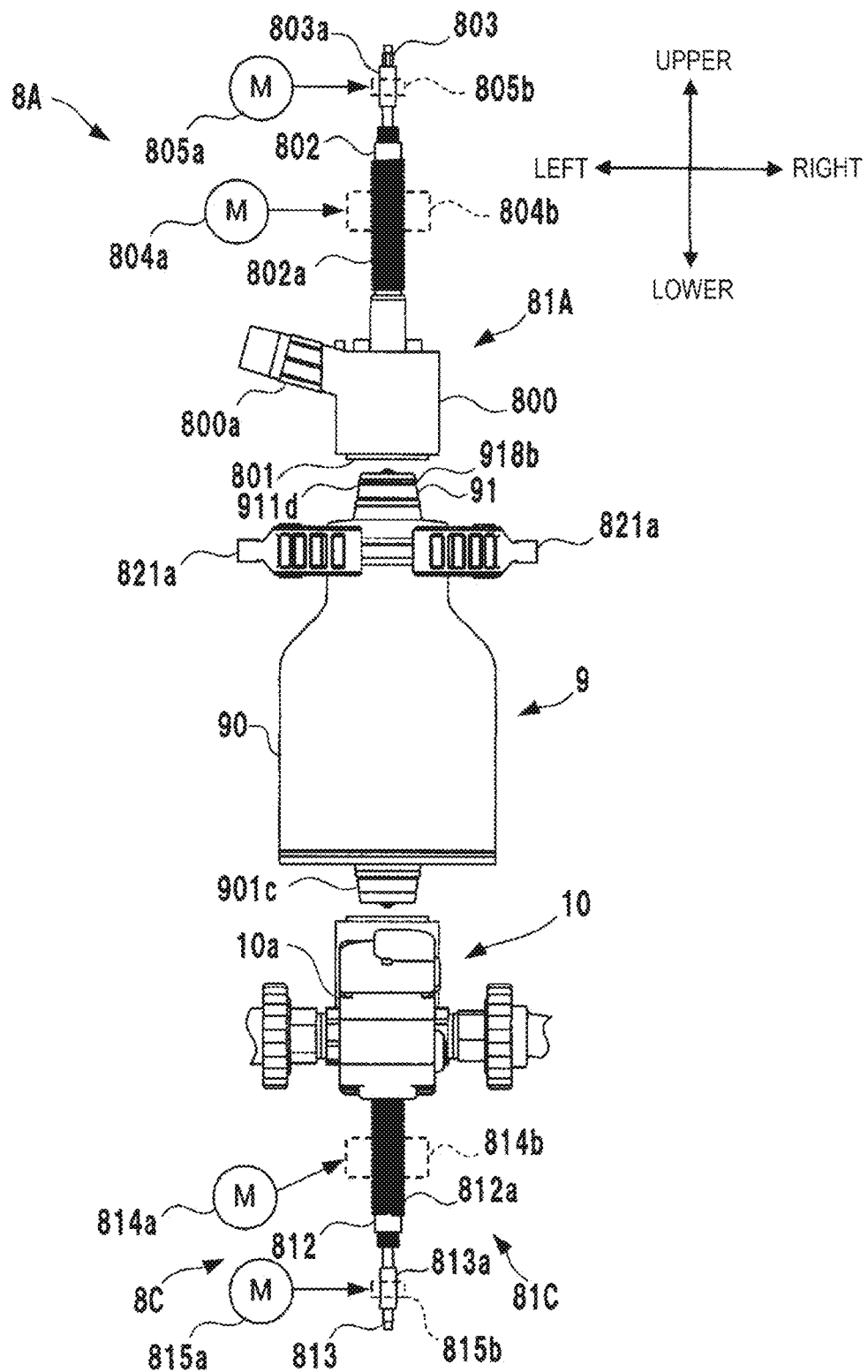

[Figure 8]
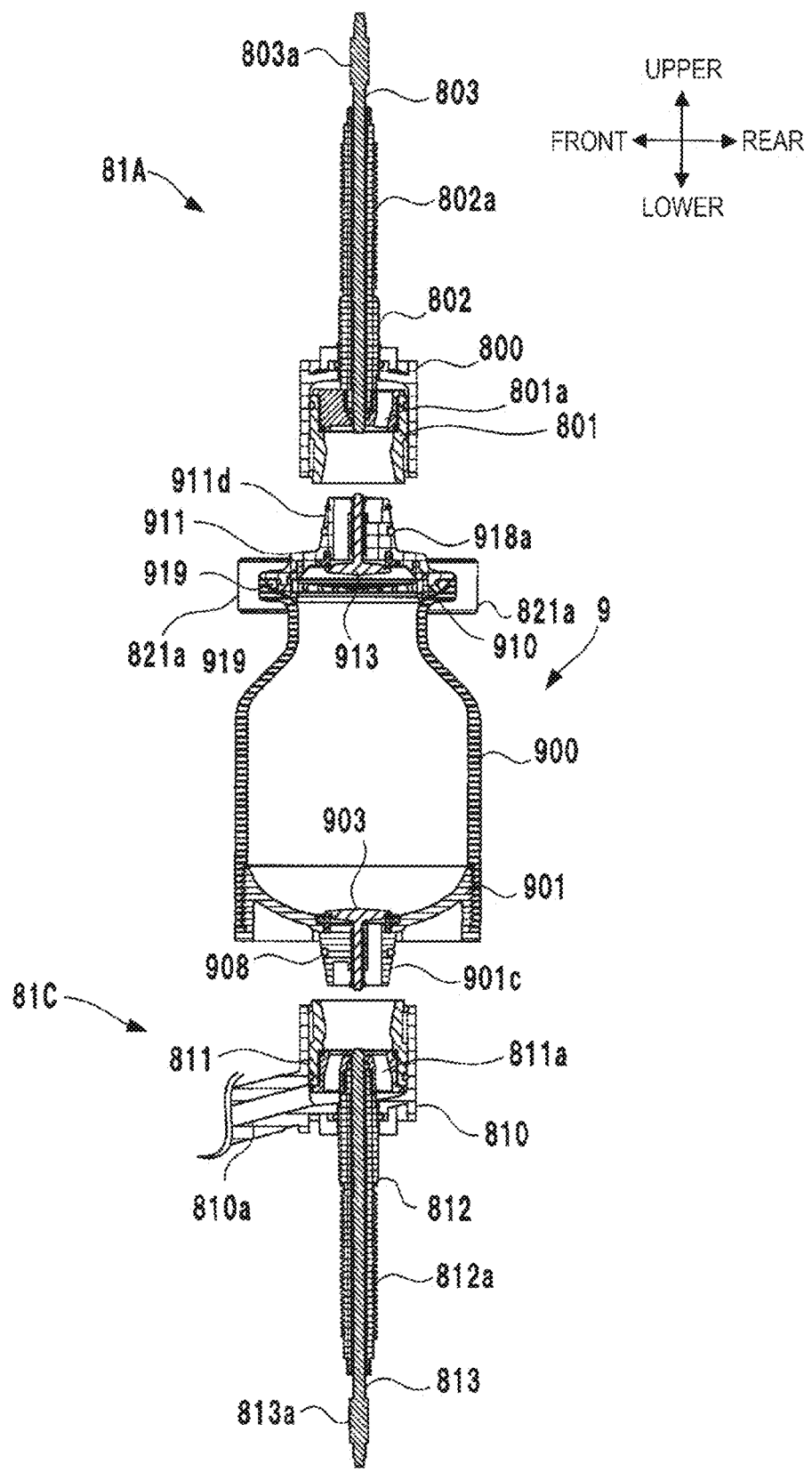

[Figure 9]
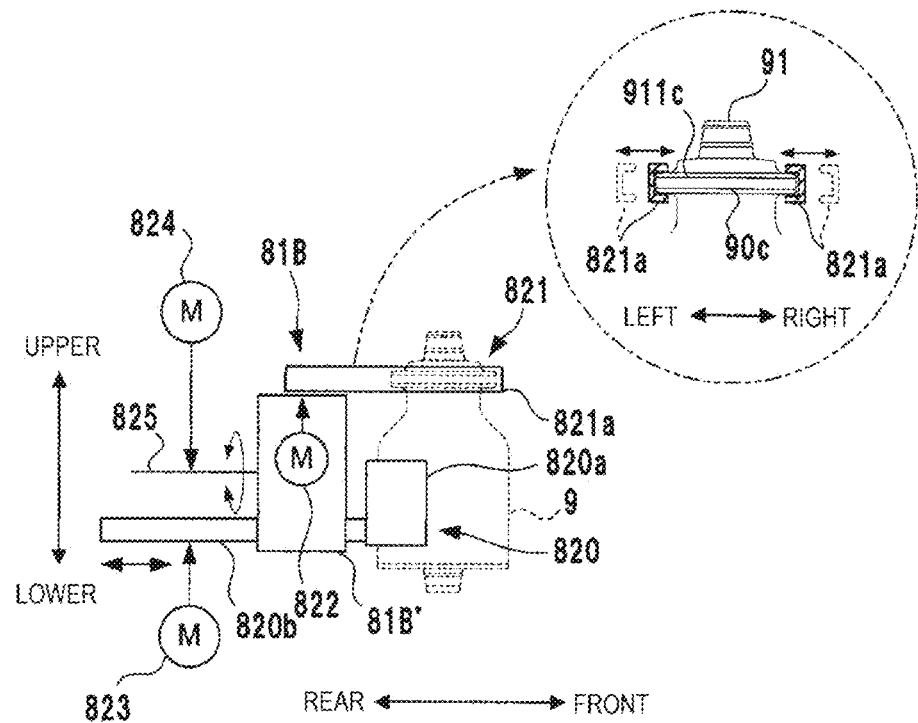
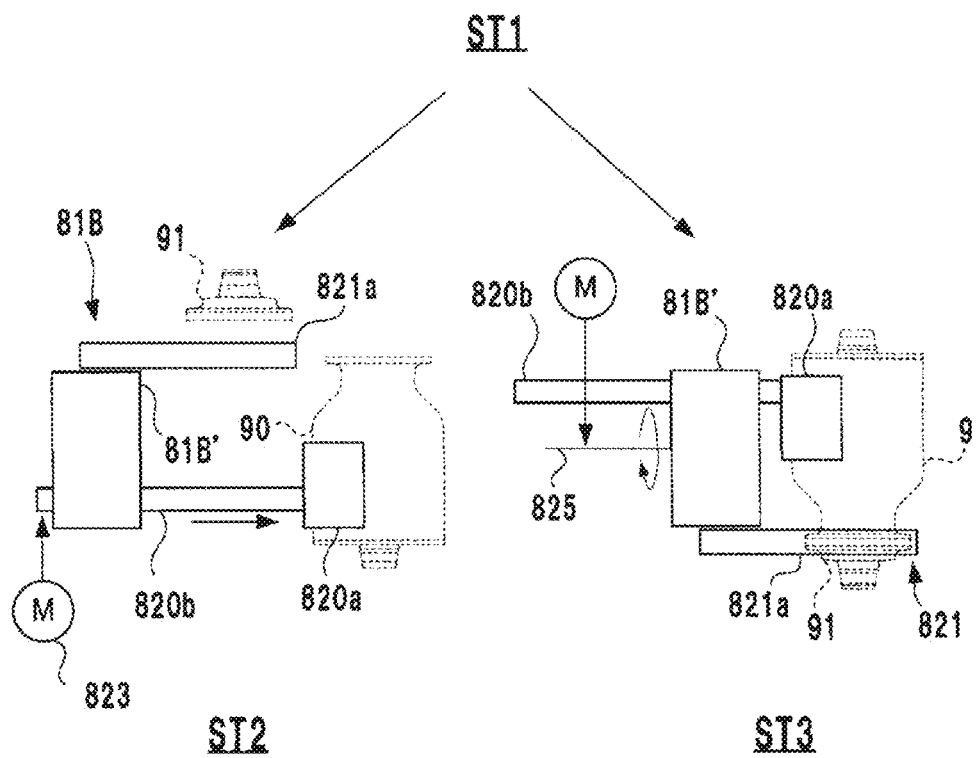

[Figure 10]
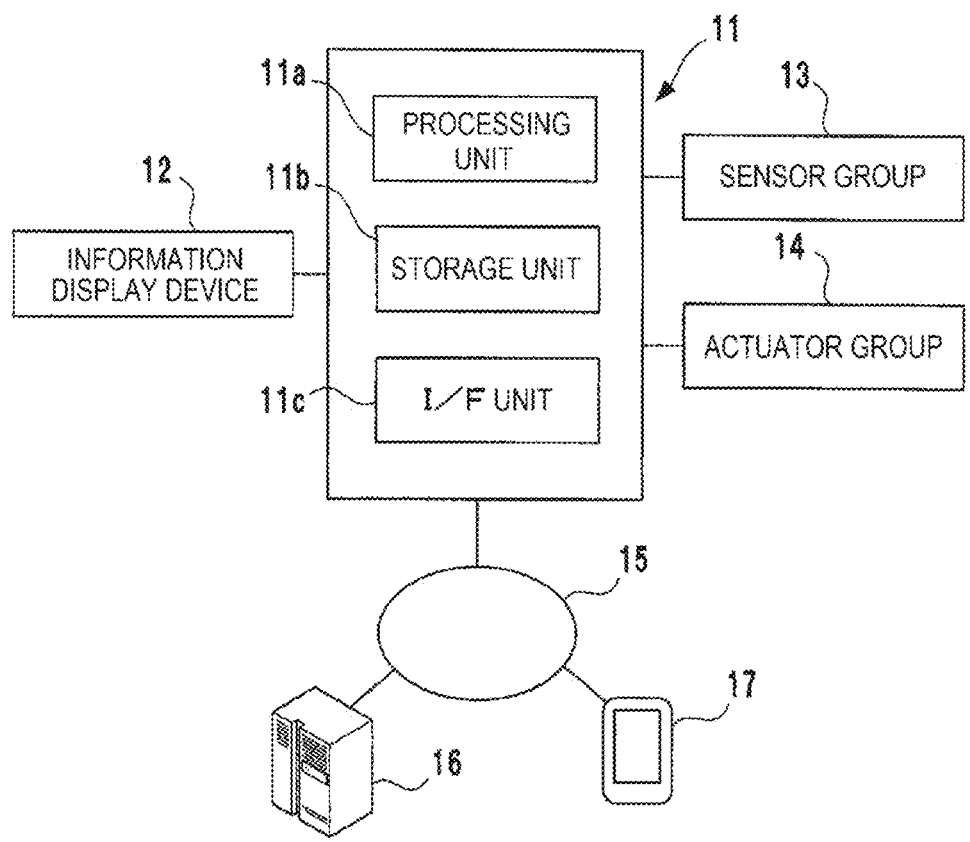

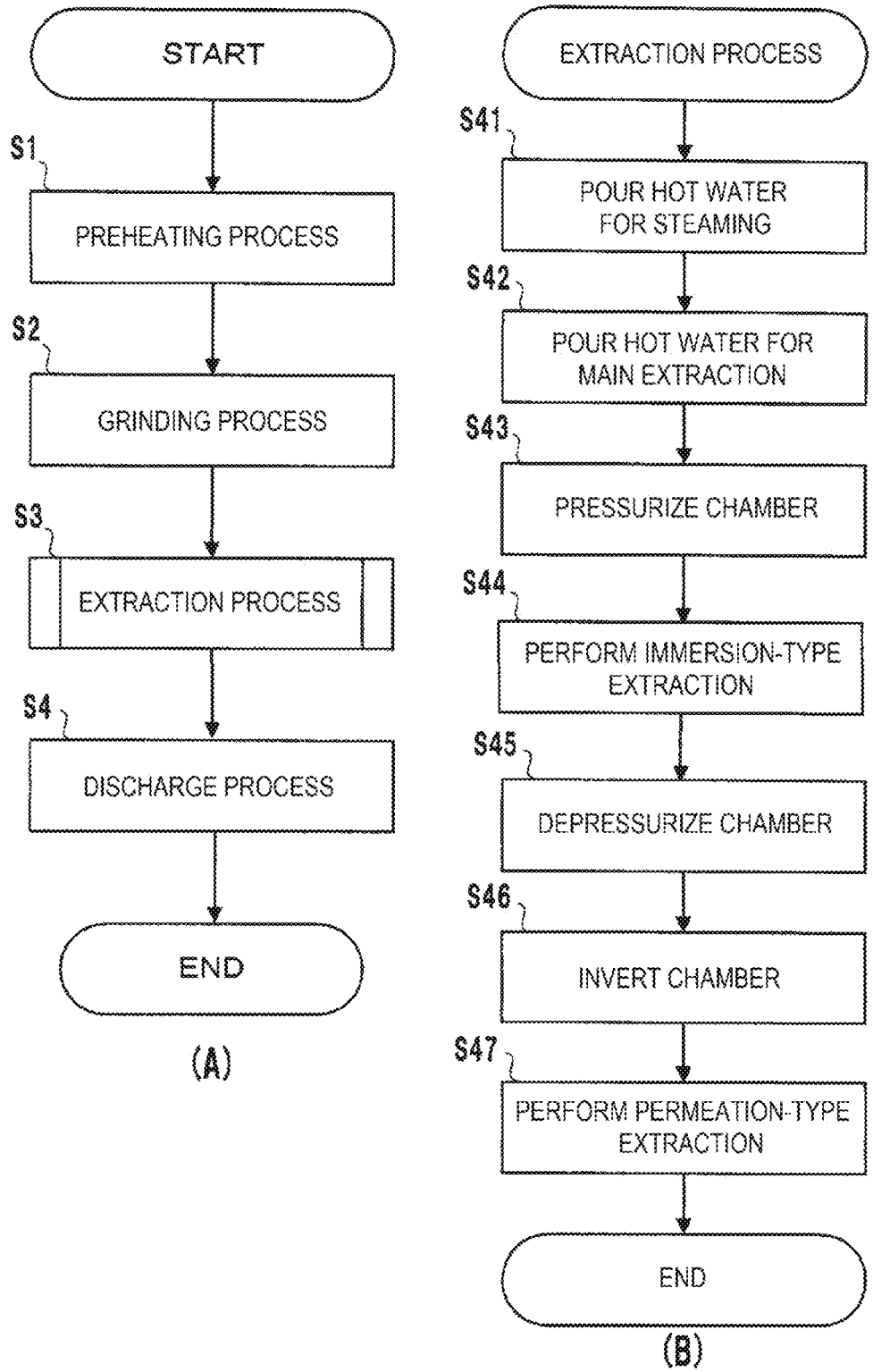
[Figure 11]

[Figure 12]
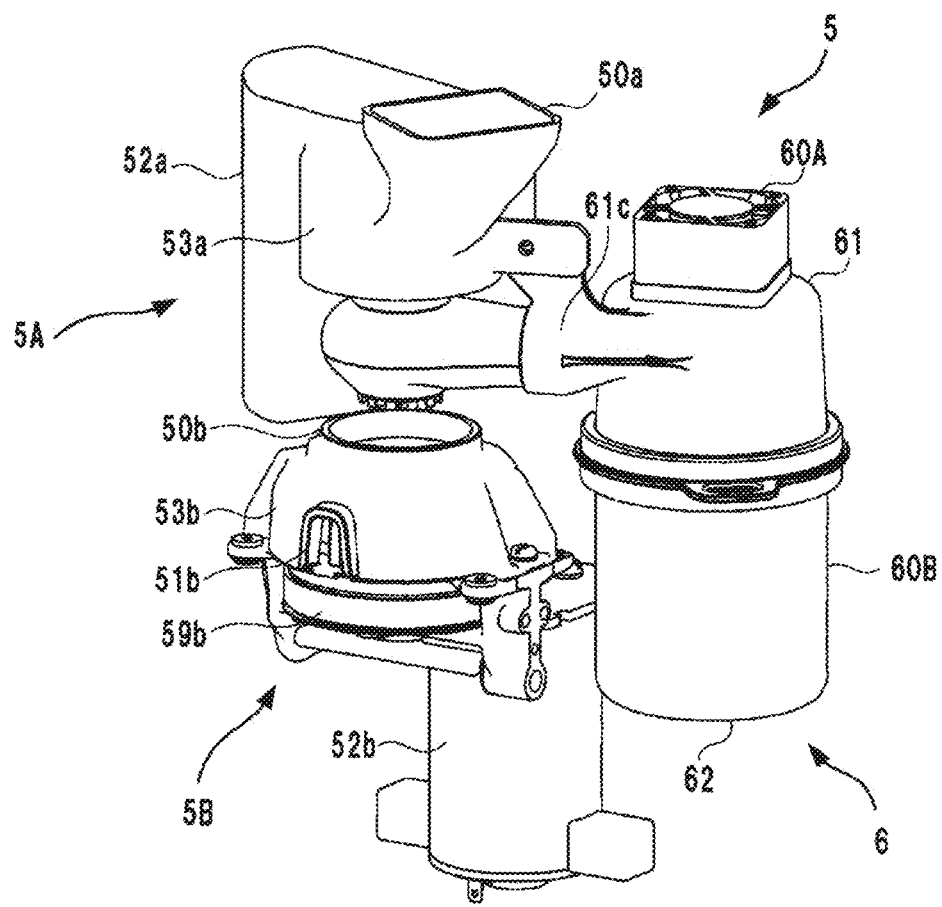

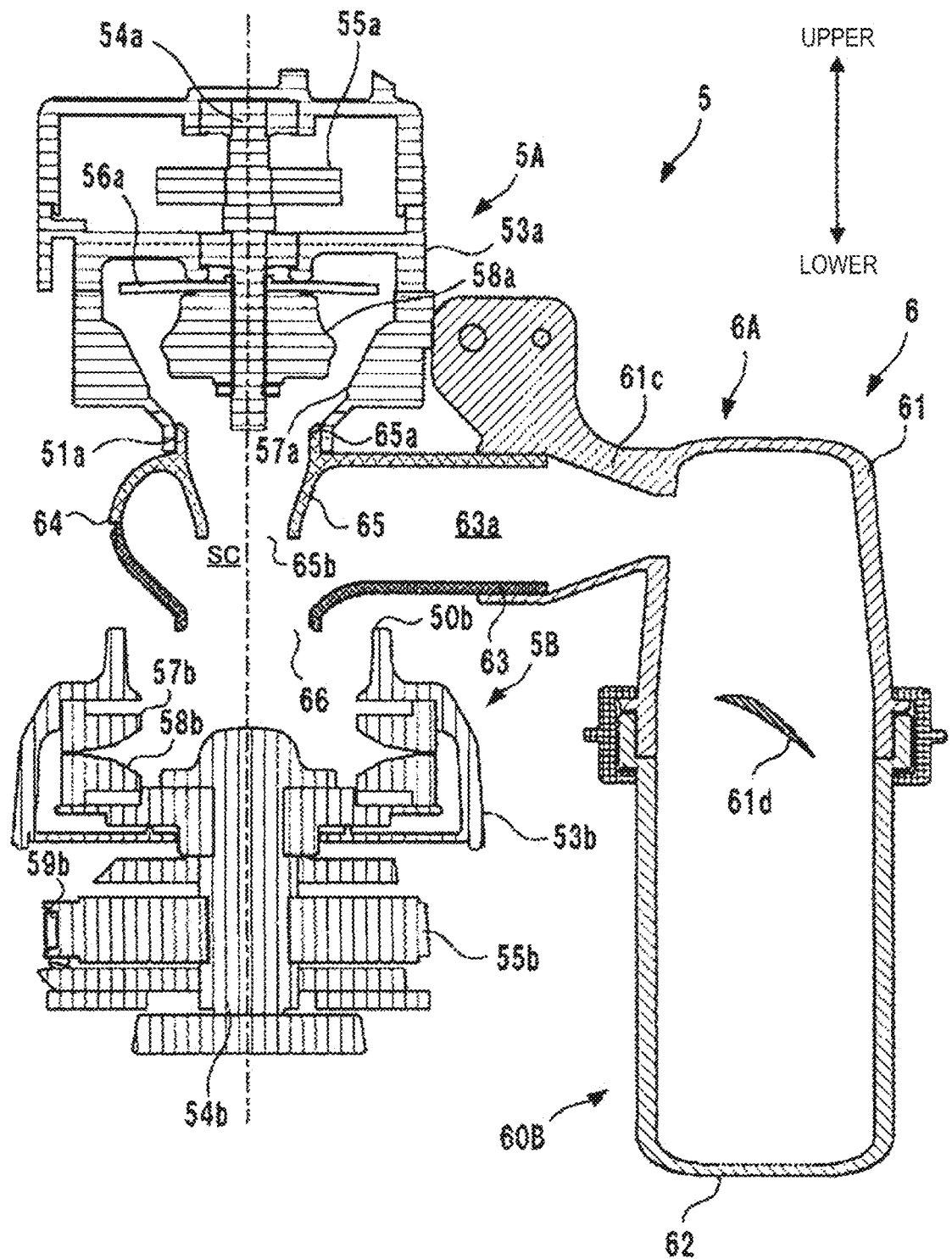
[Figure 13]

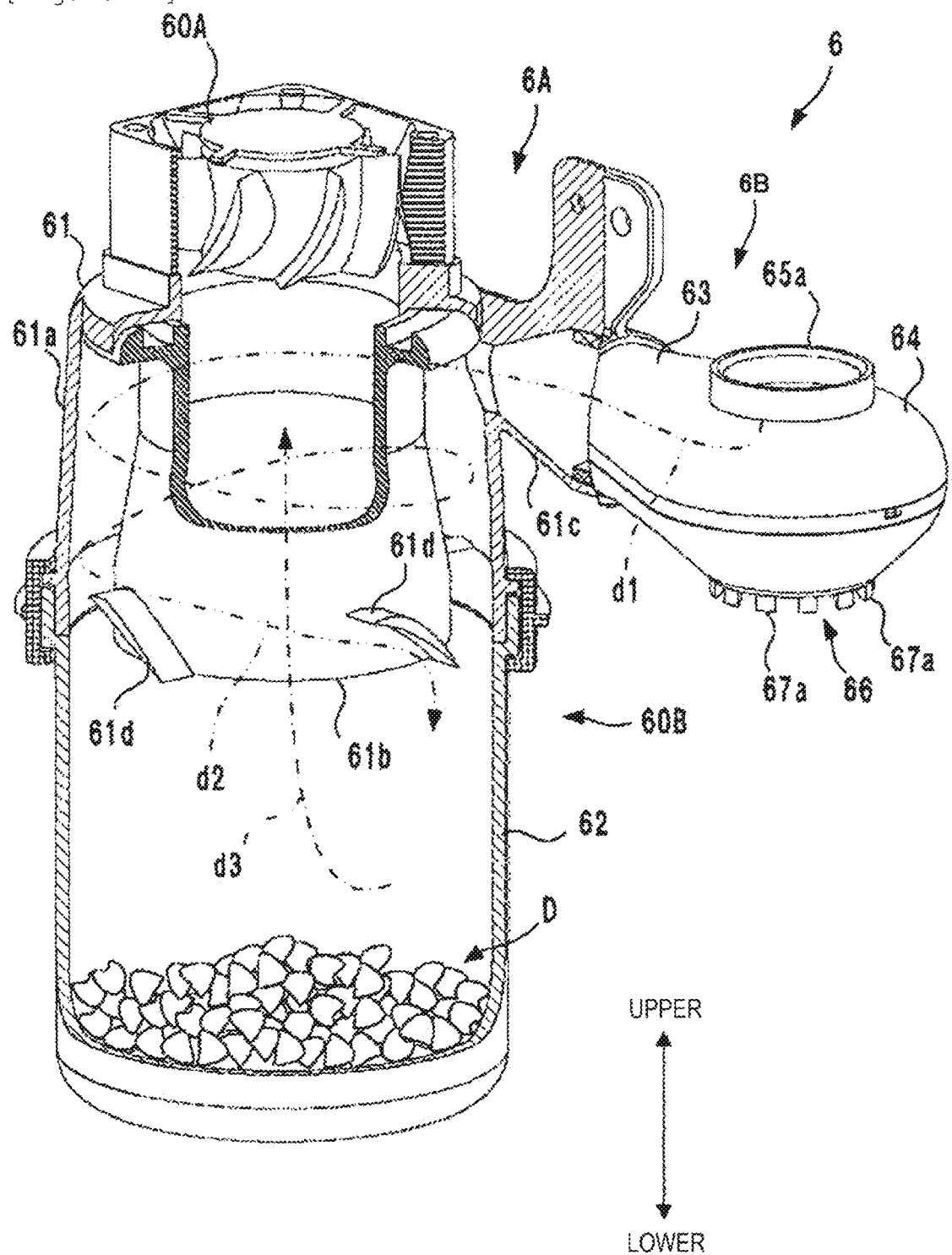
[Figure 14]

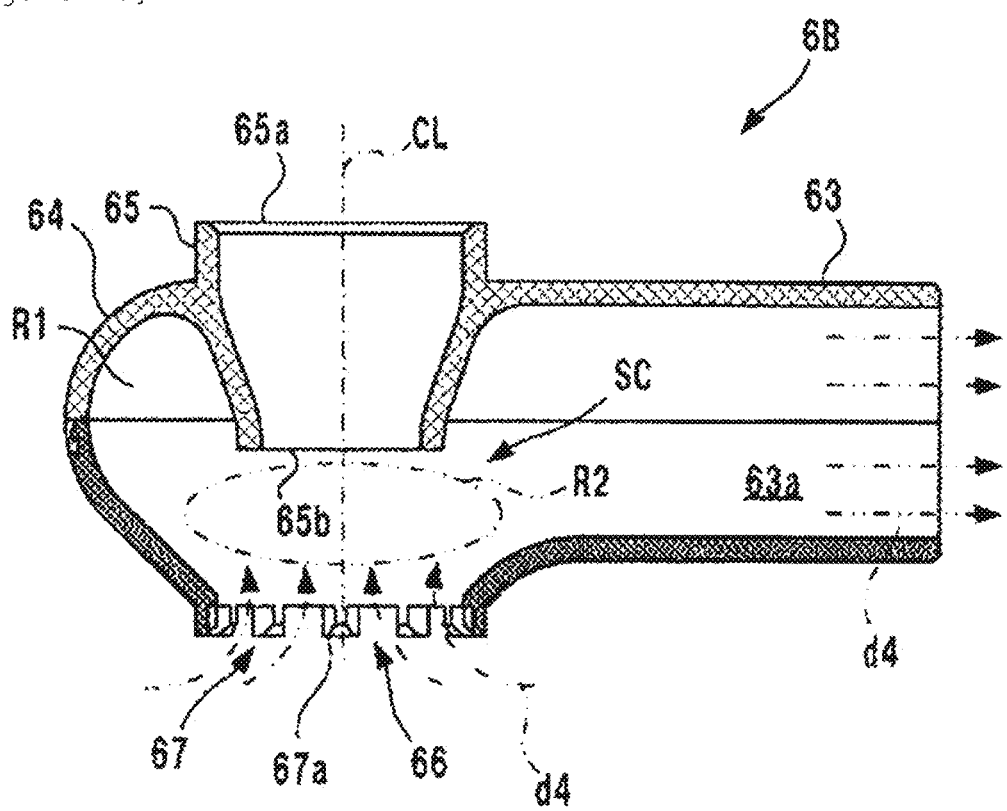
[Figure 15]

[Figure 16]
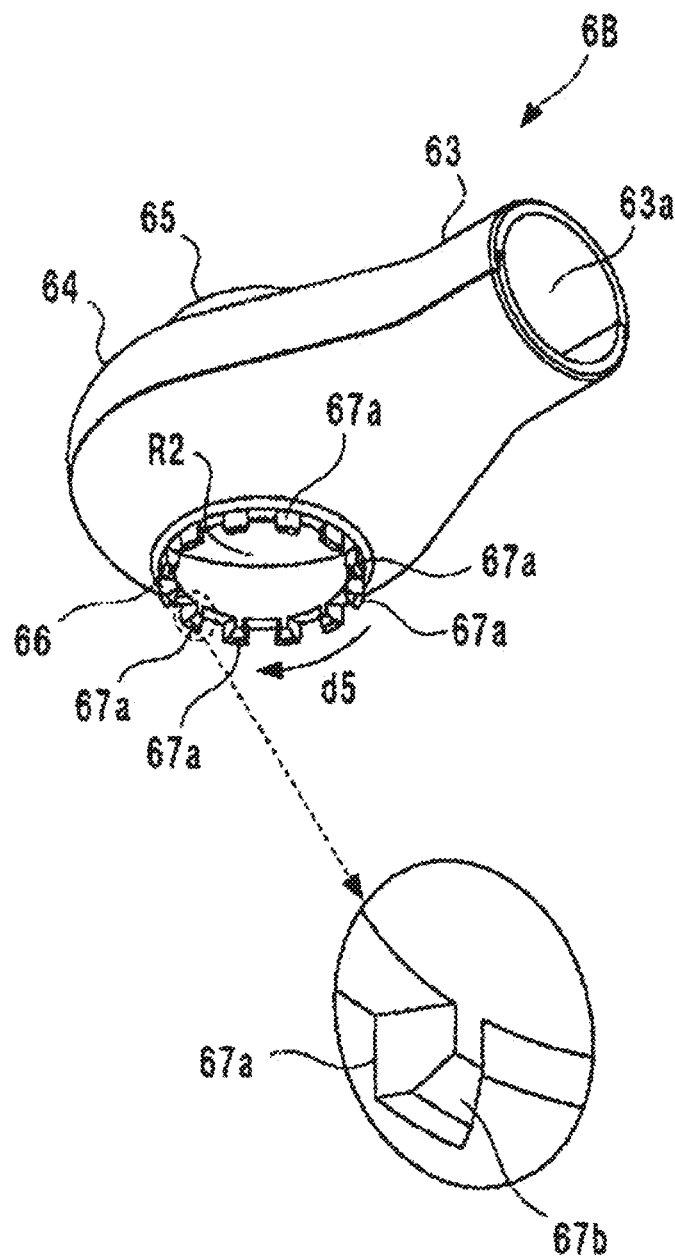

[Figure 17]
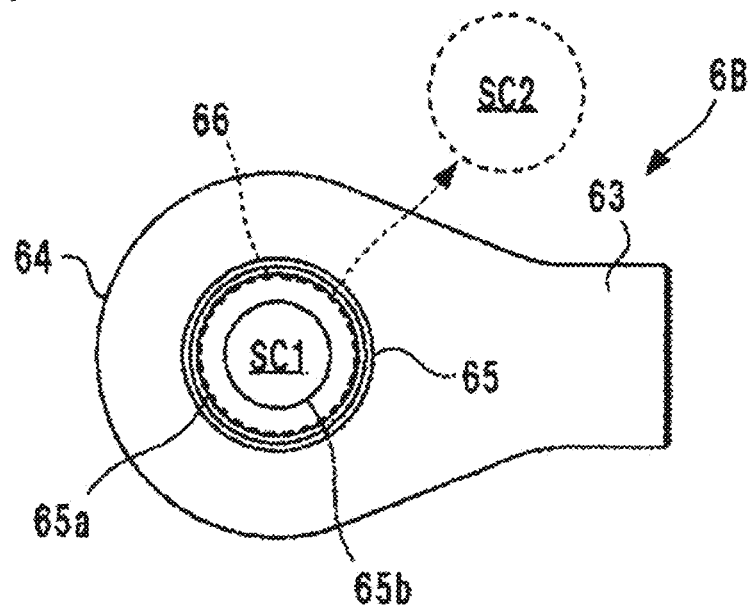

[Figure 18]
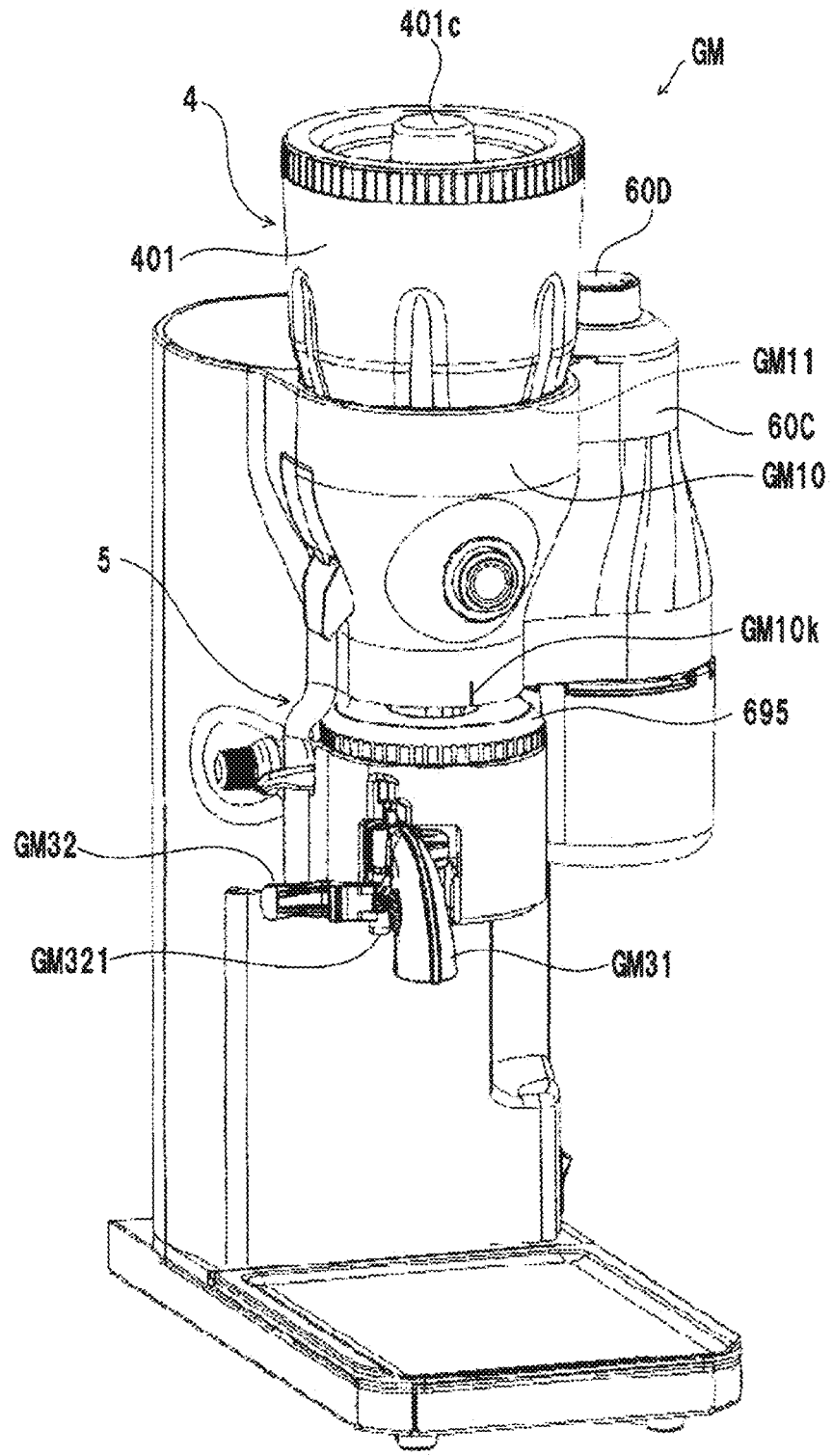

[Figure 19]
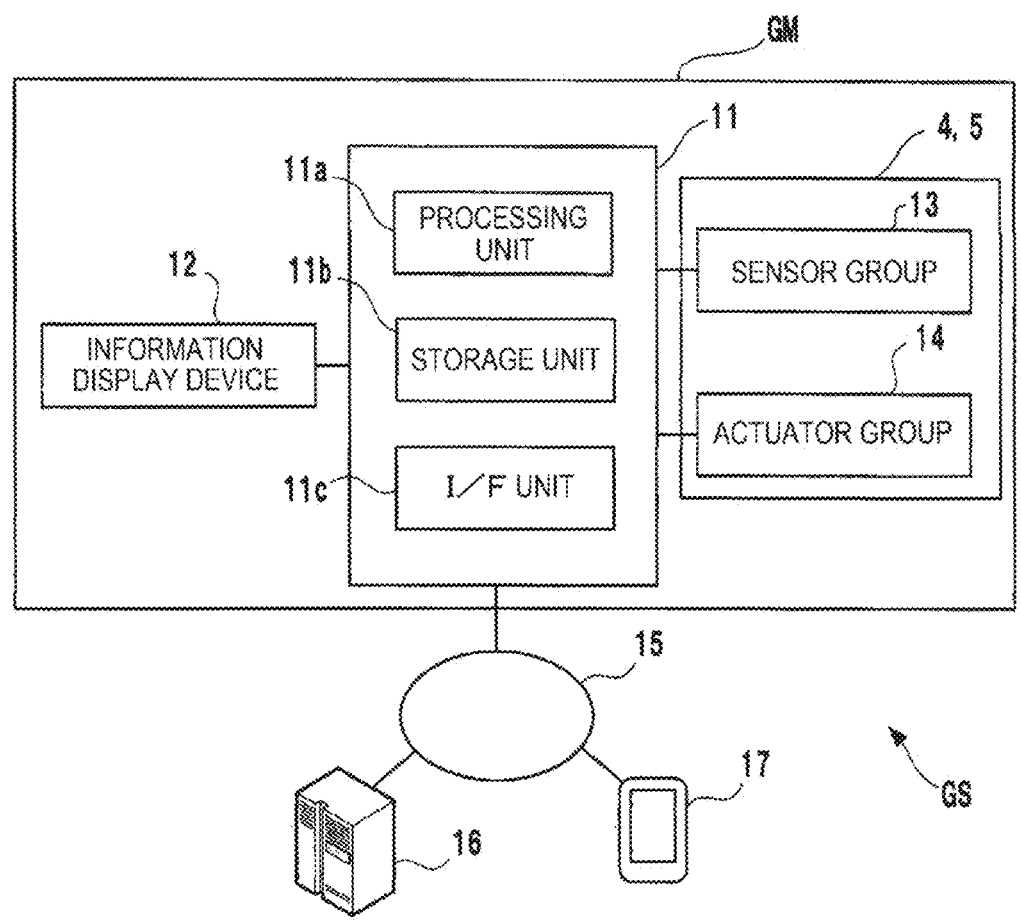

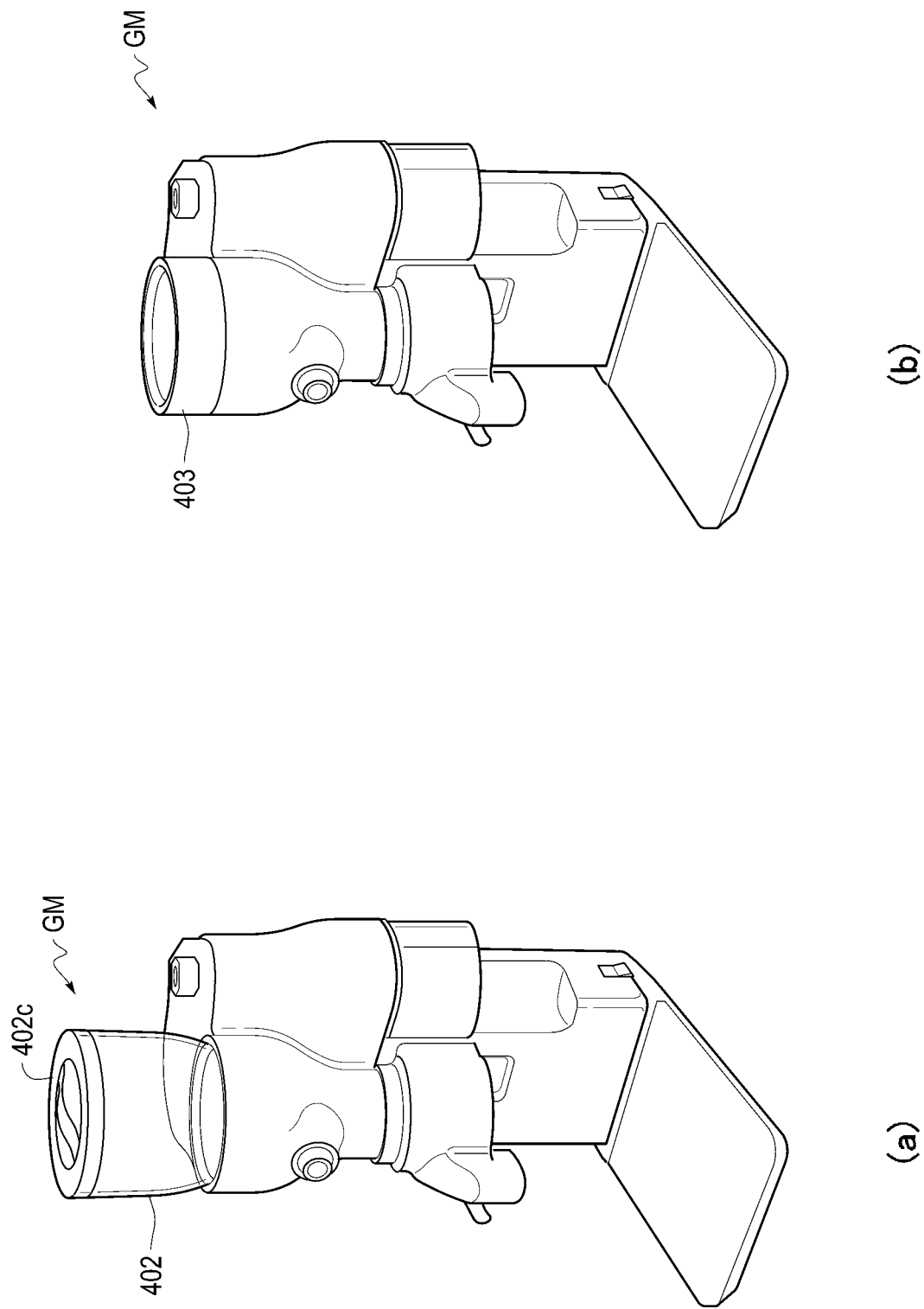
[Figure 20]

[Figure 21]
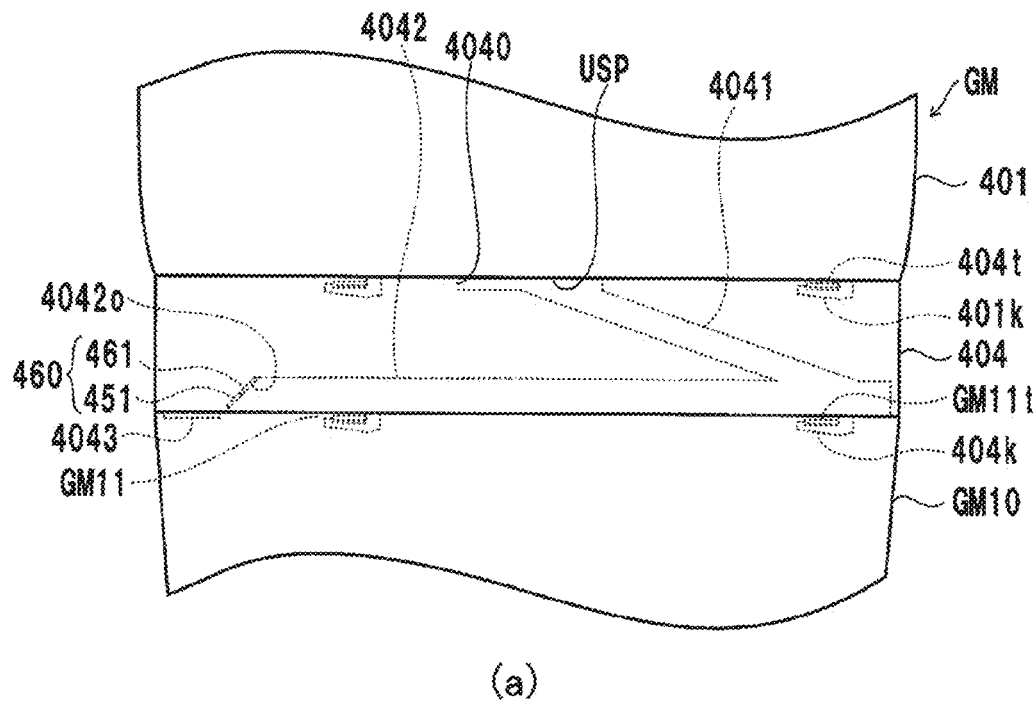
(a)
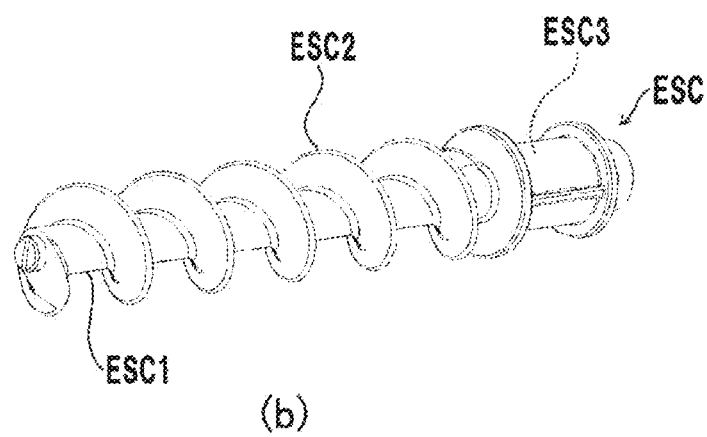
(b)

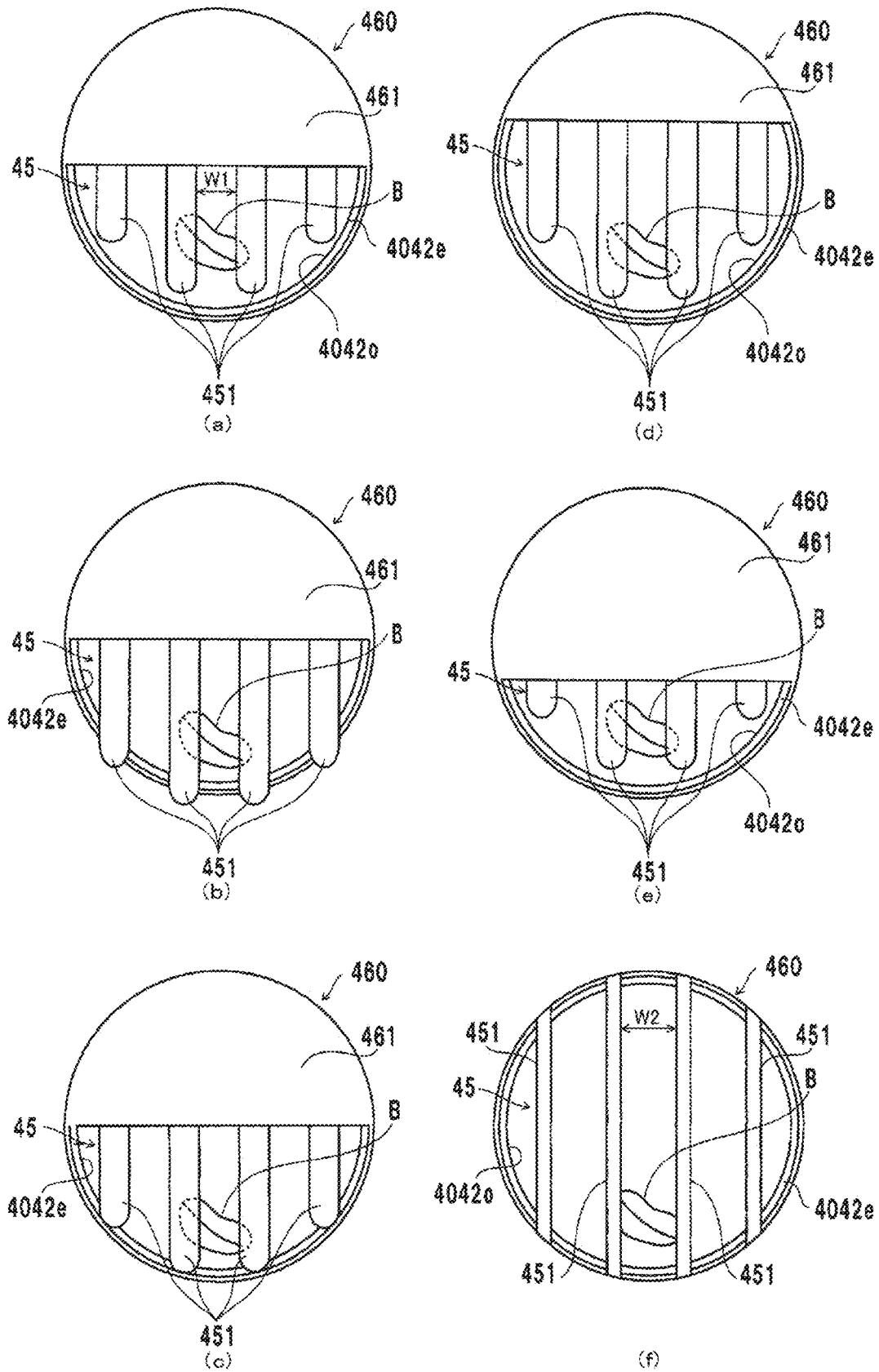
[Figure 22]

[Figure 23]
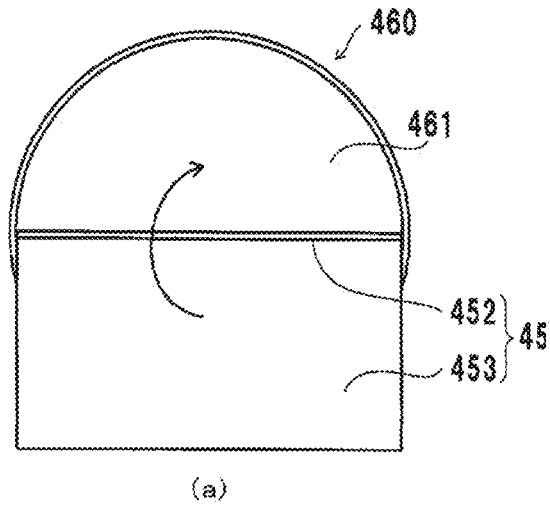
(a)
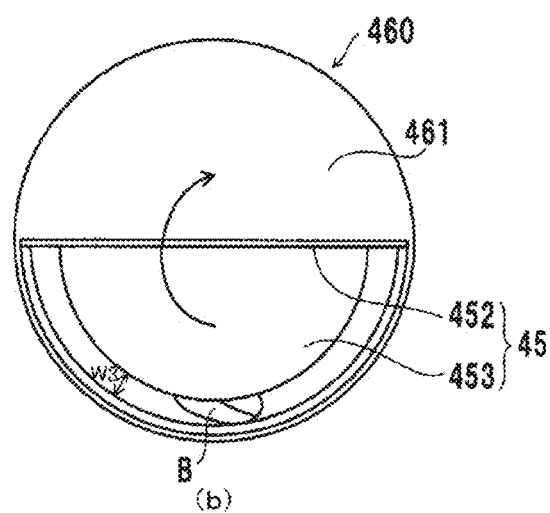
(b)
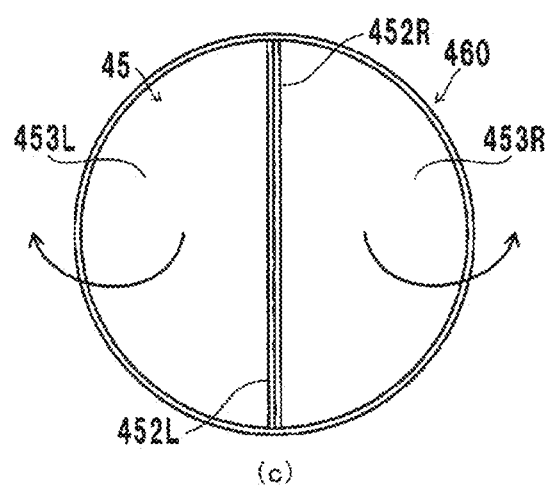
(c)

[Figure 24]
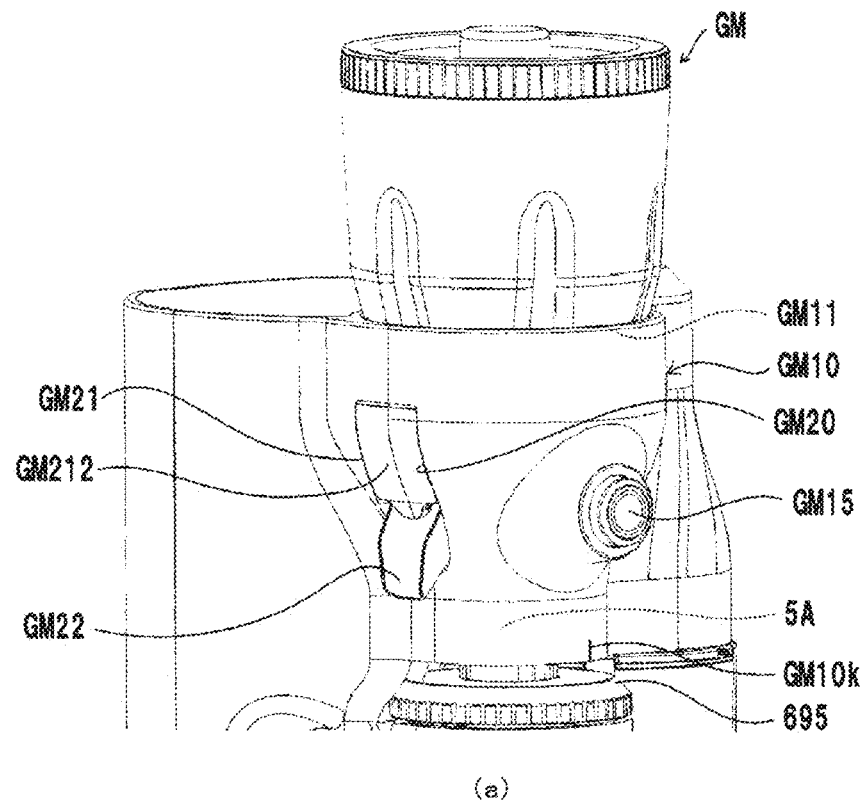
(a)
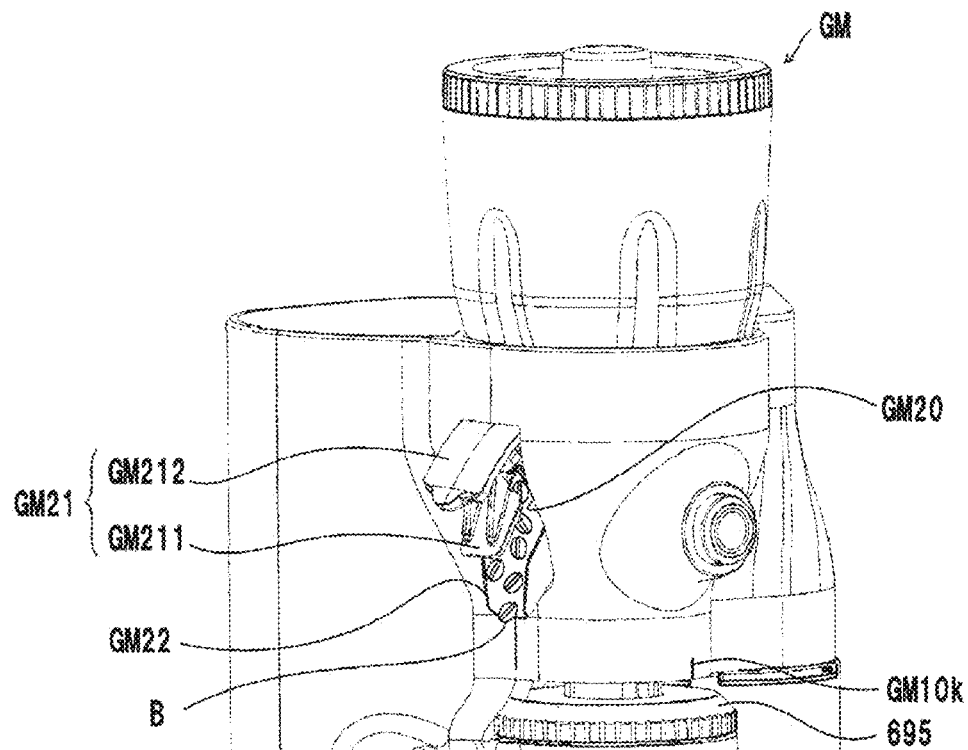
(b)

[Figure 25]
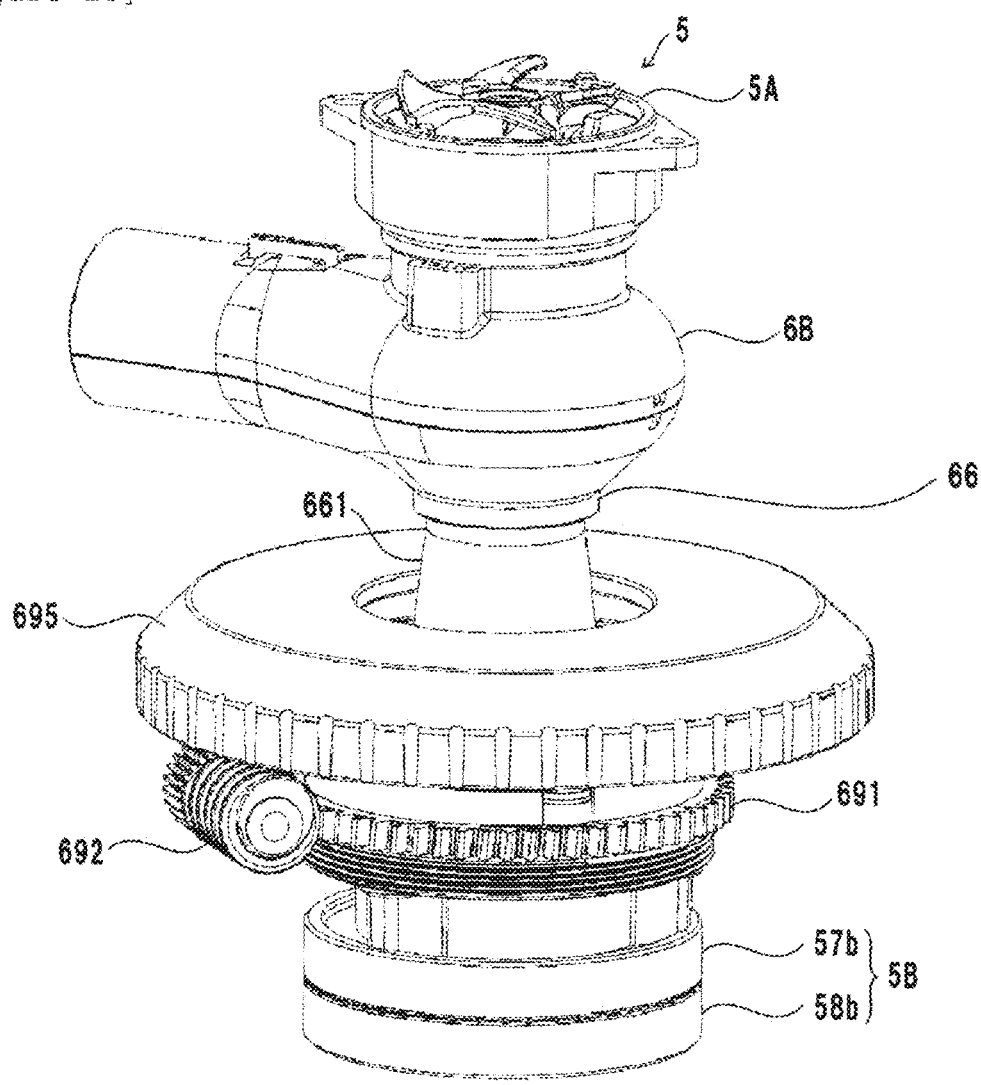

[Figure 26]
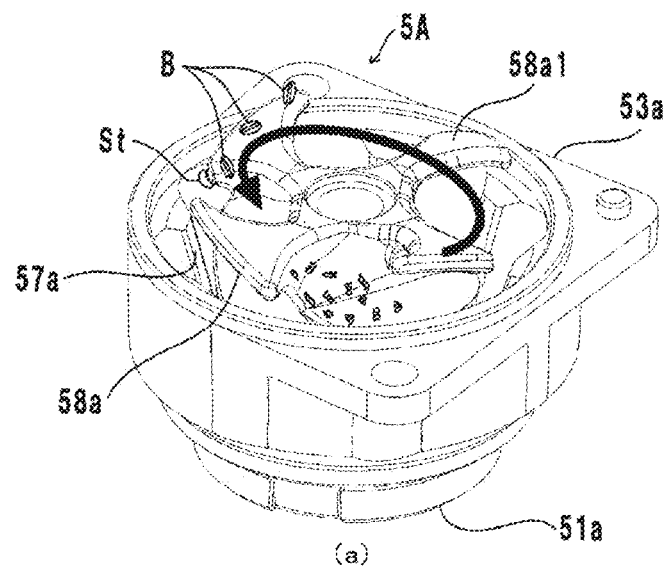
(a)
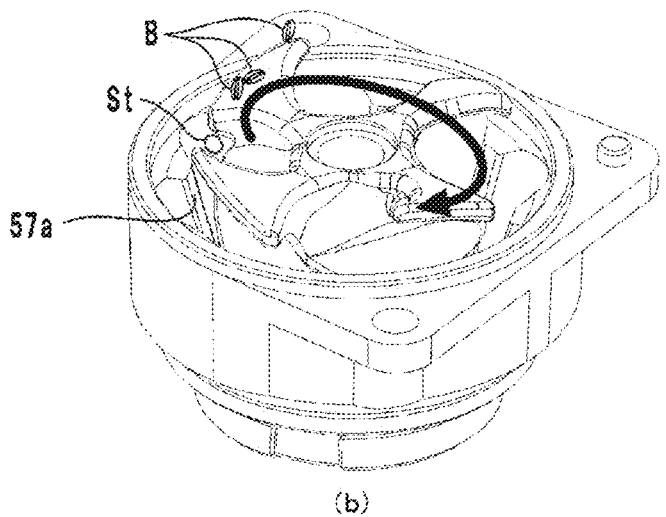
(b)
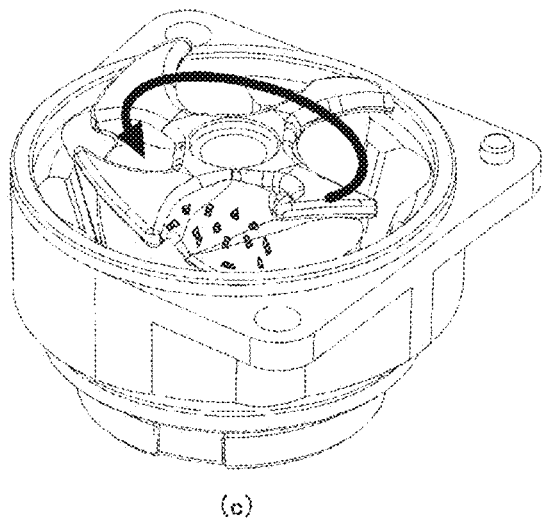
(c)

[Figure 27]
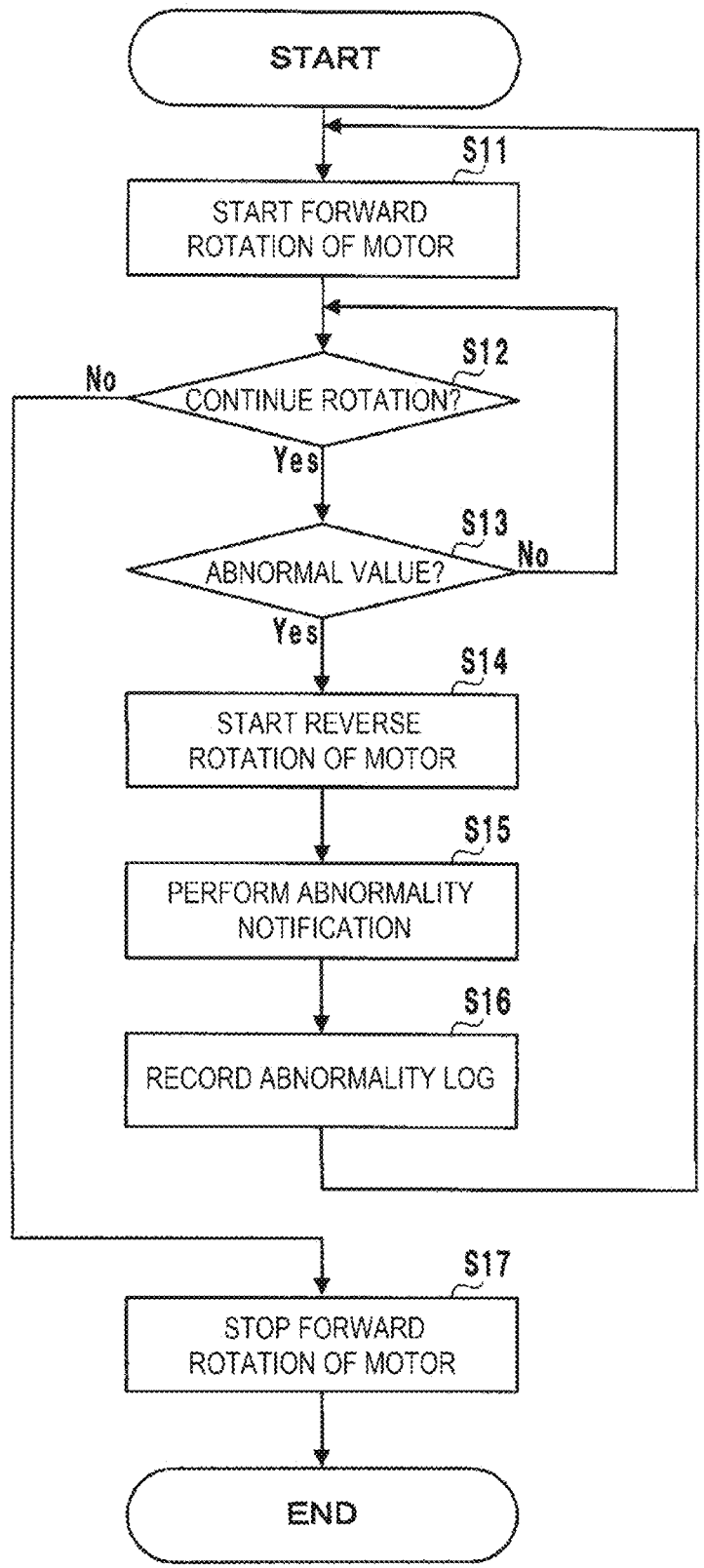

[Figure 28]
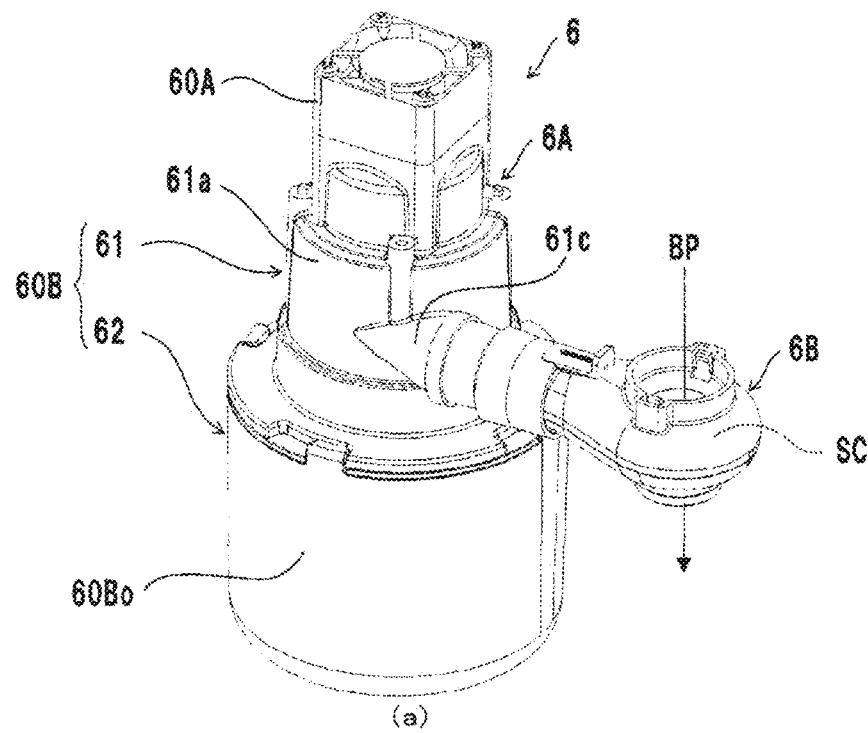
(a)
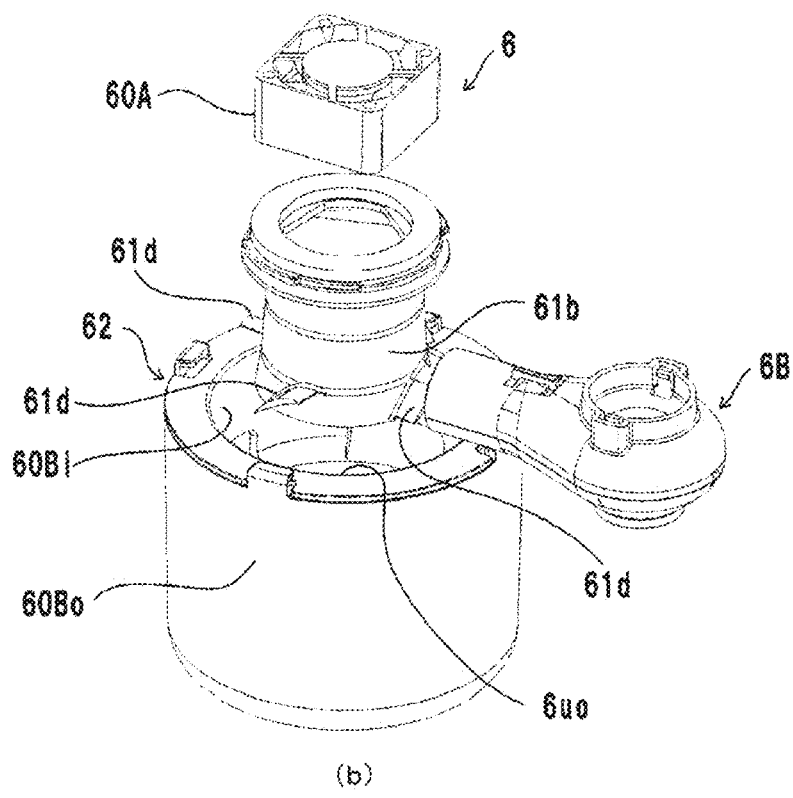
(b)

[Figure 29]
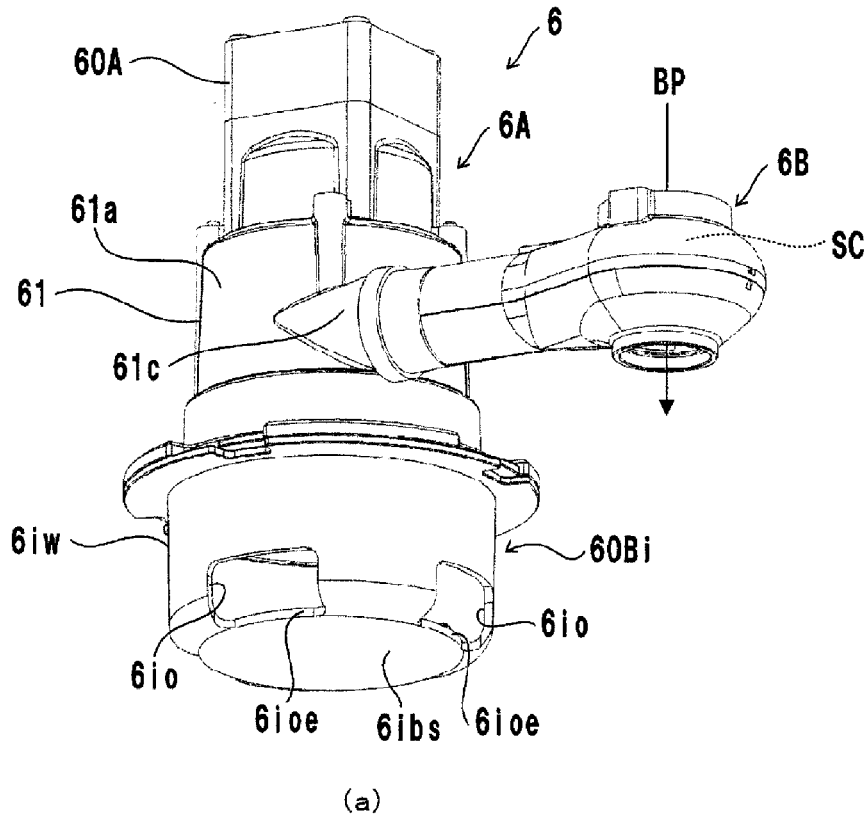
(a)
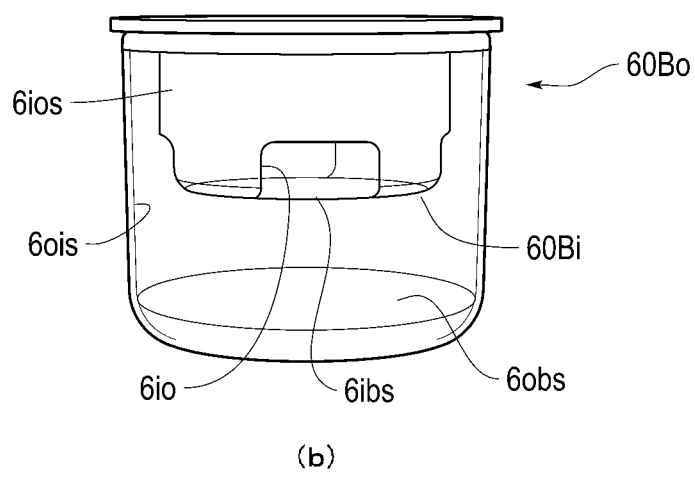
(b)

[Figure 30]
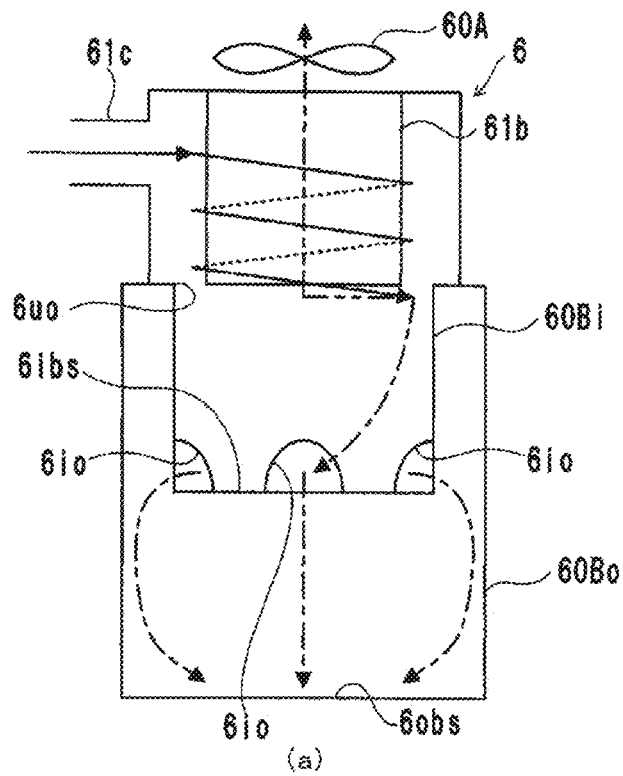
(a)
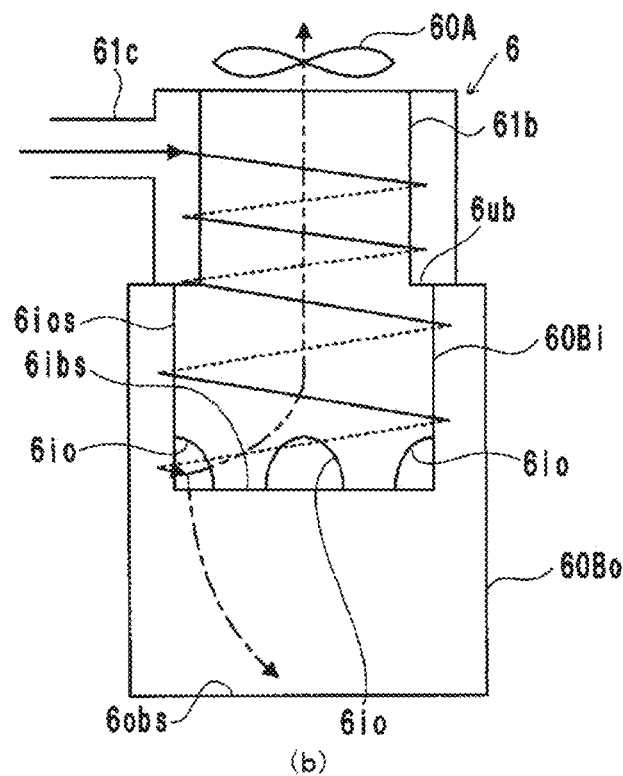
(b)

[Figure 31]
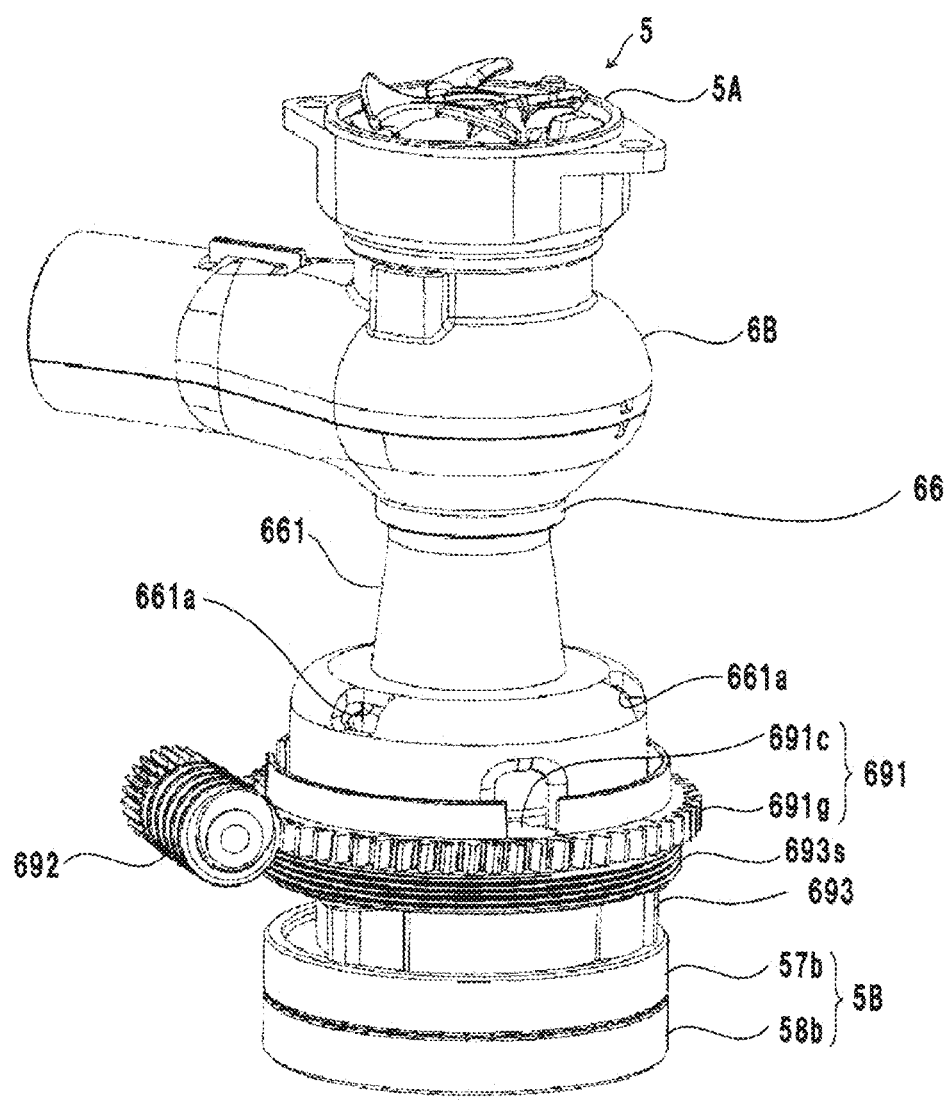

[Figure 32]
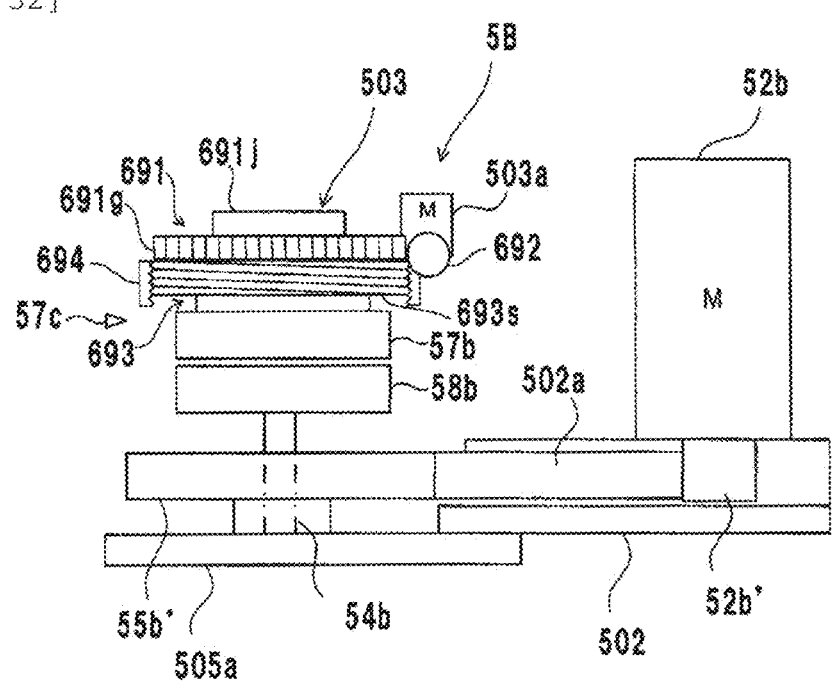

[Figure 33]
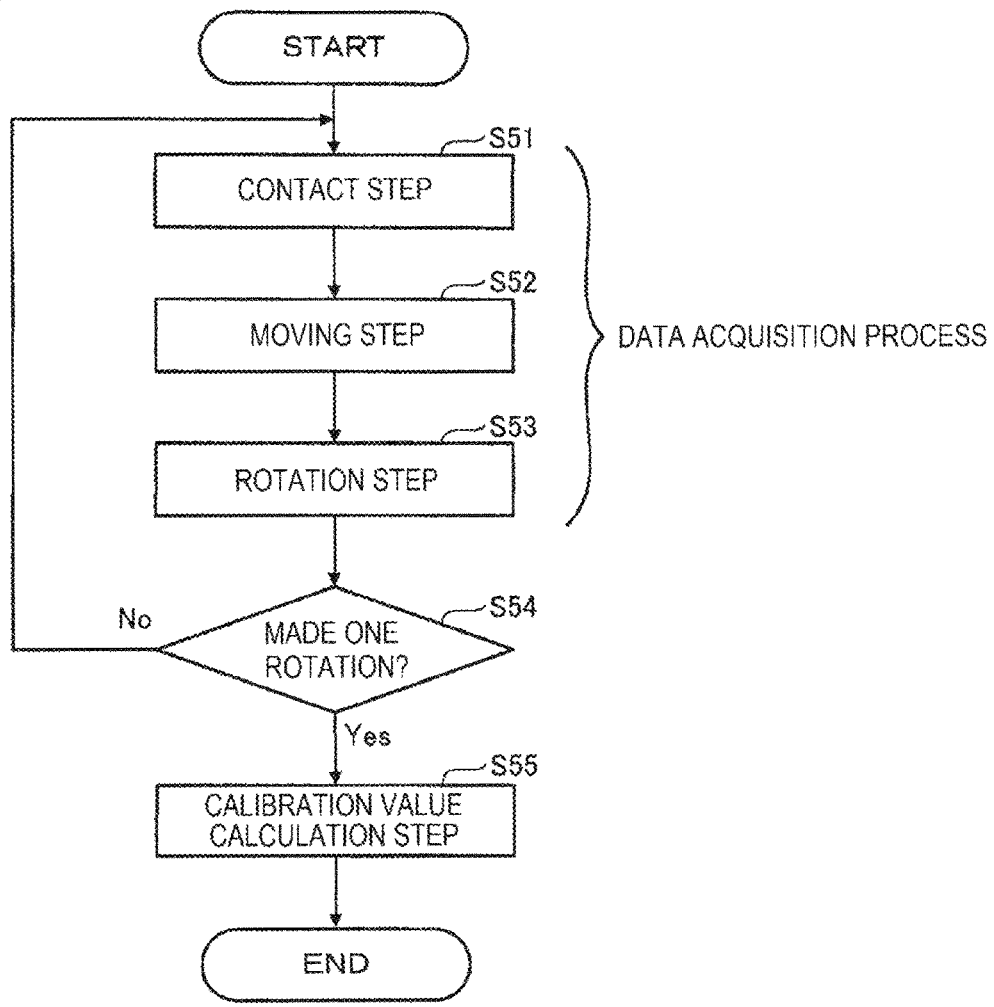

[Figure 34]
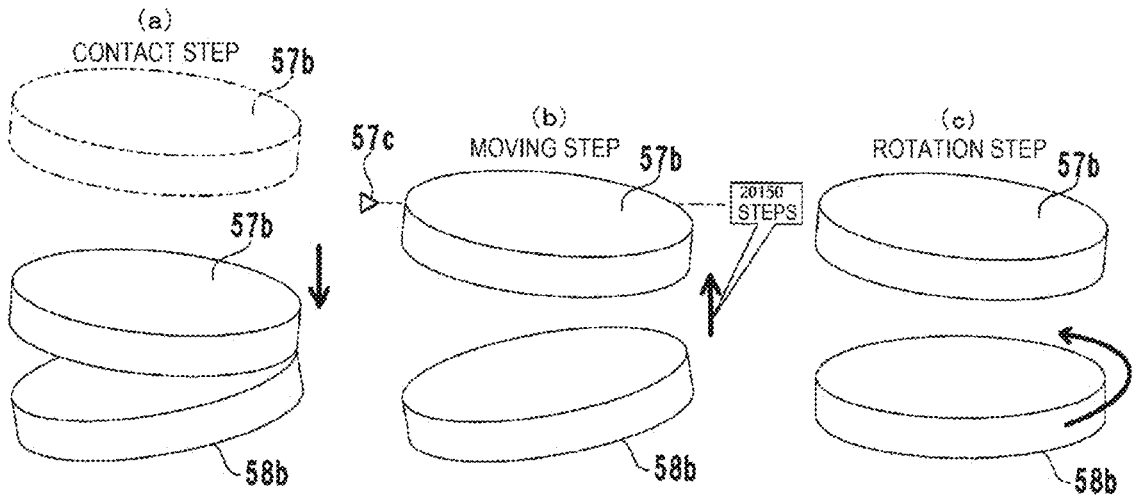
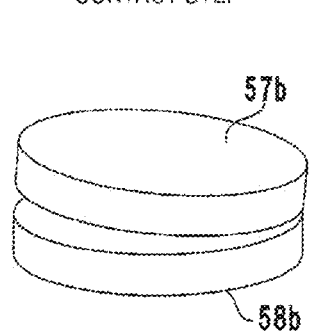
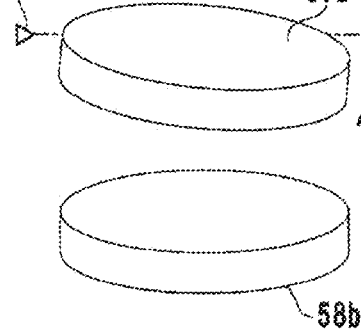
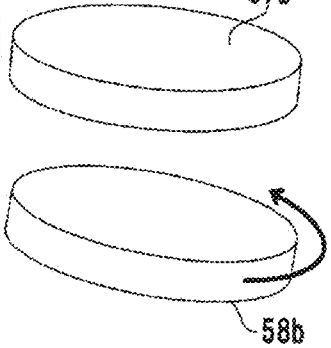
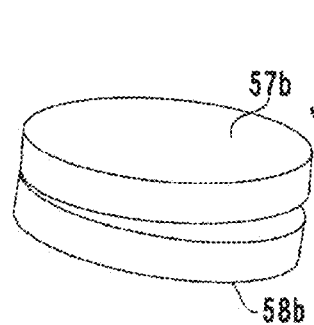
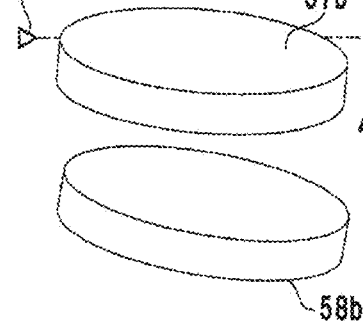
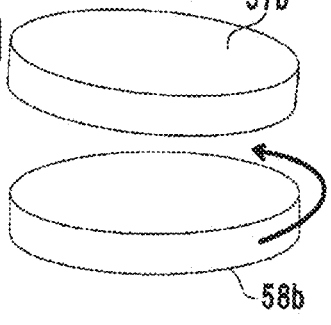

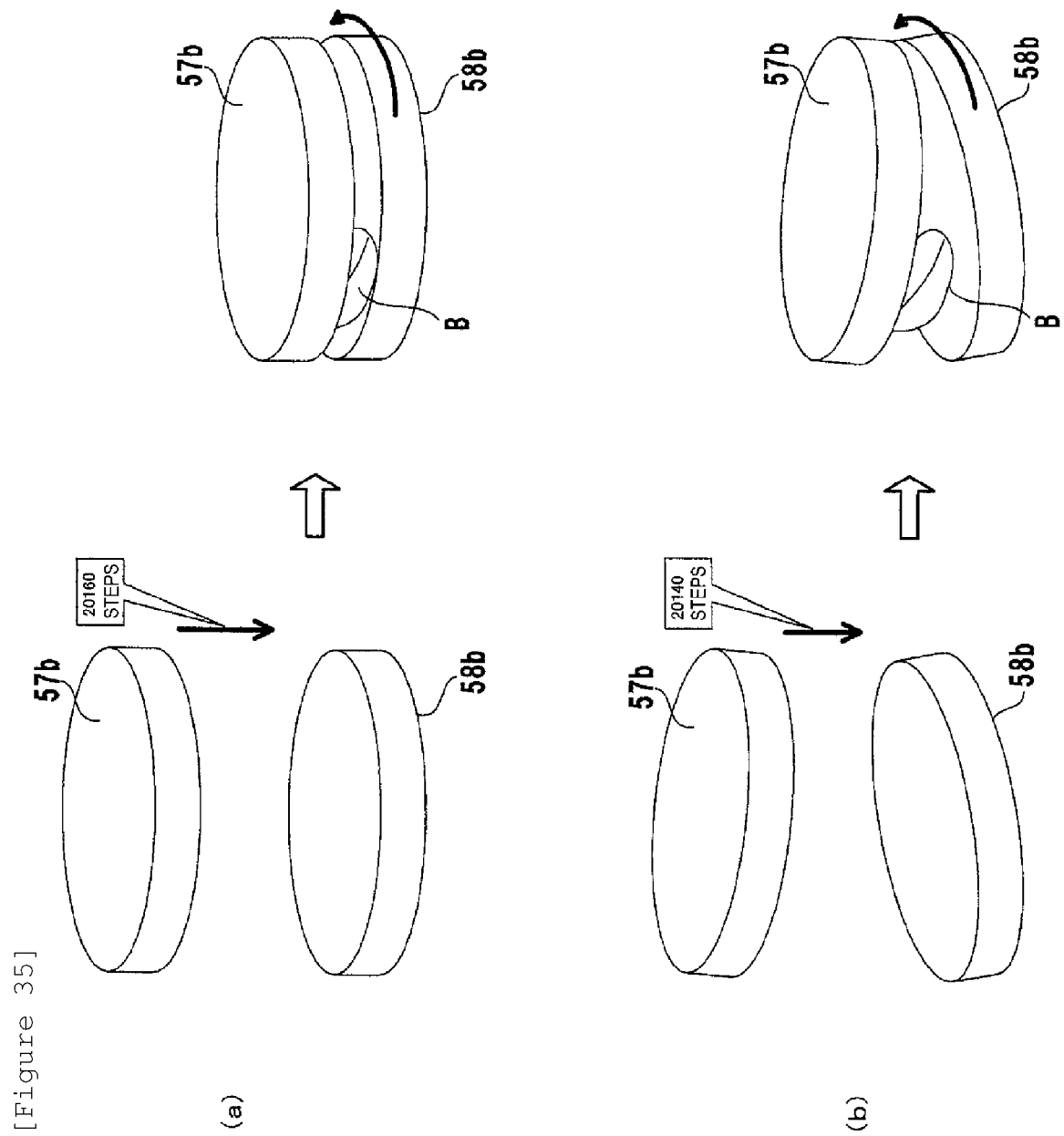
[Figure 35]

[Figure 36]
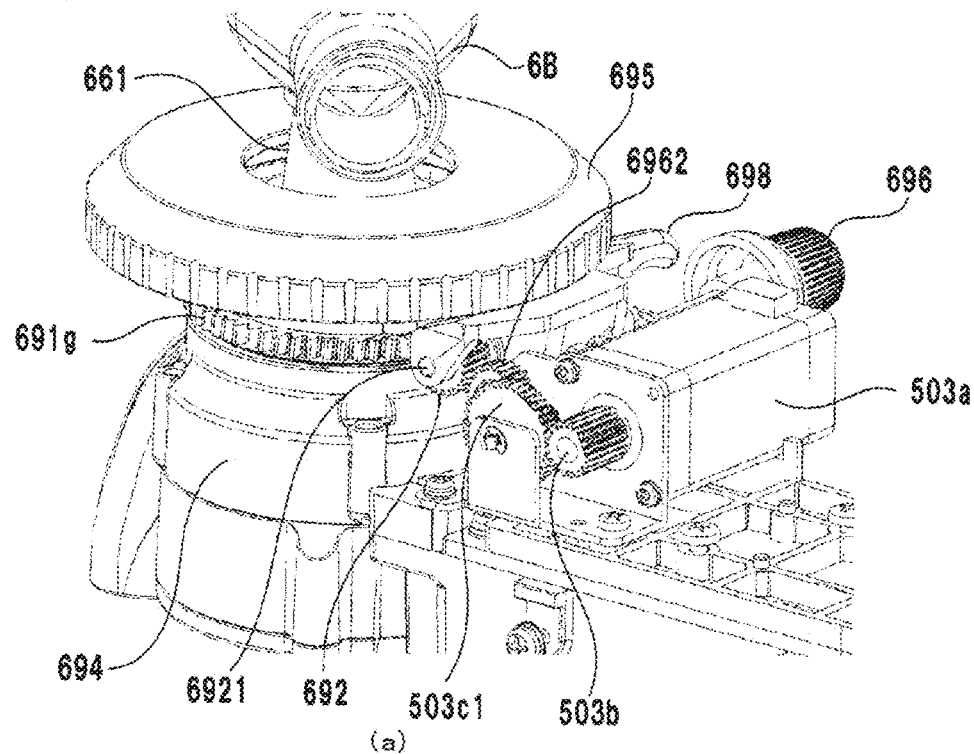
(a)
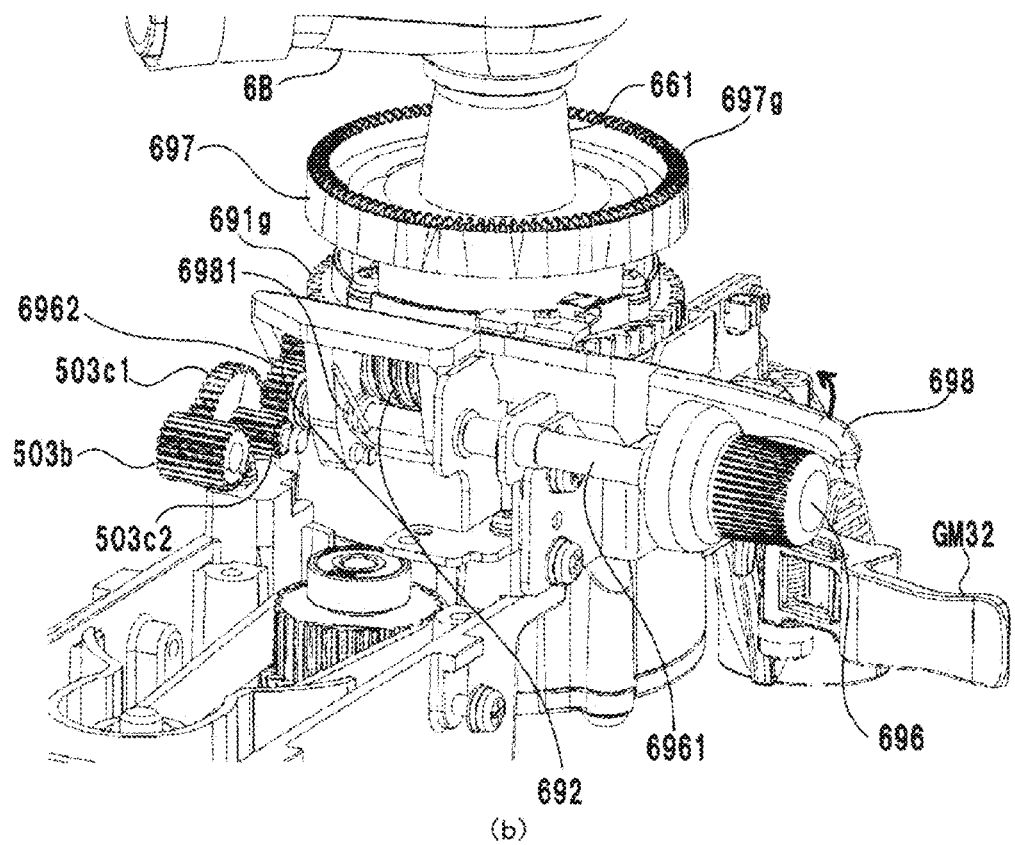
(b)

[Figure 37]
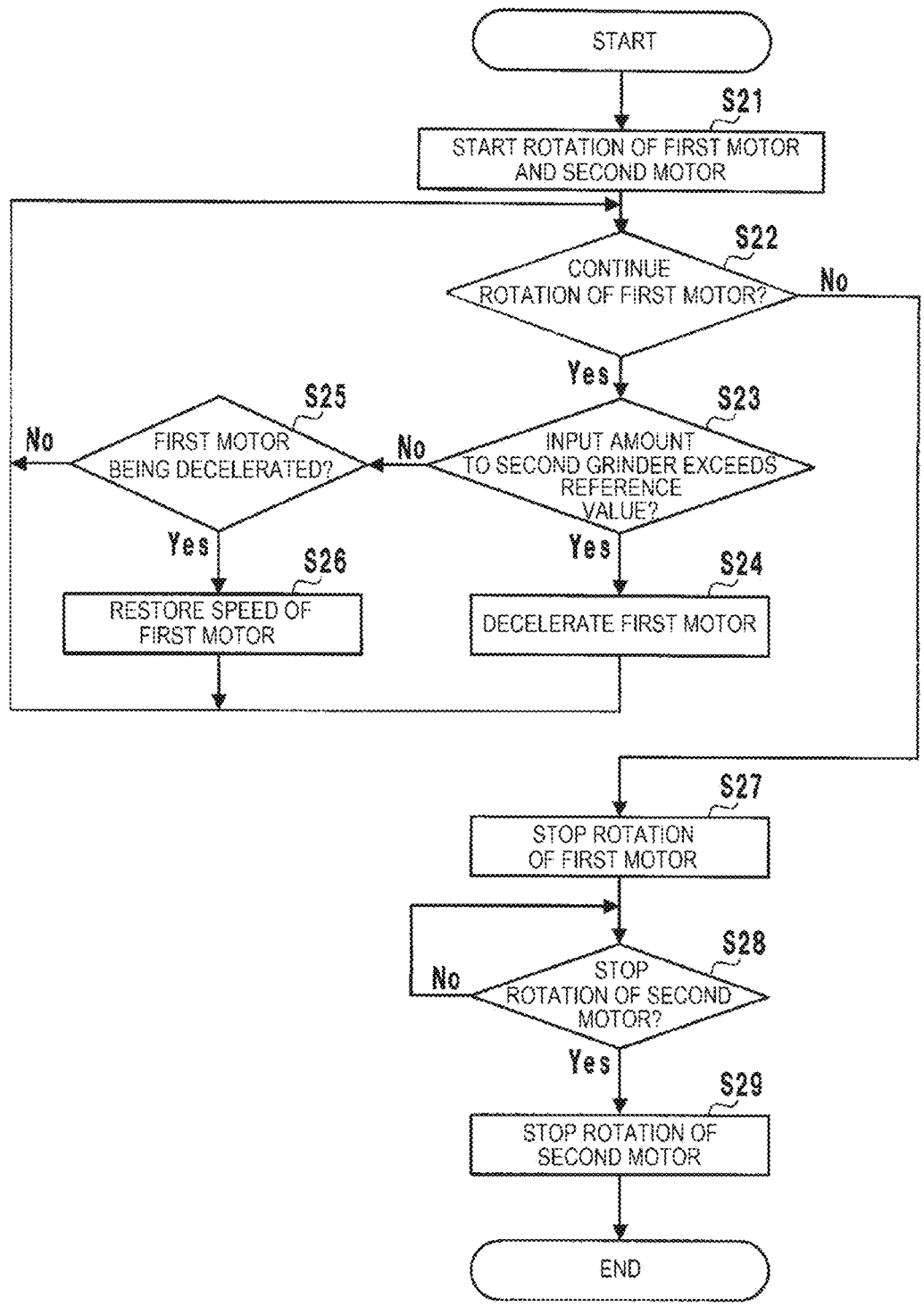

[Figure 38]
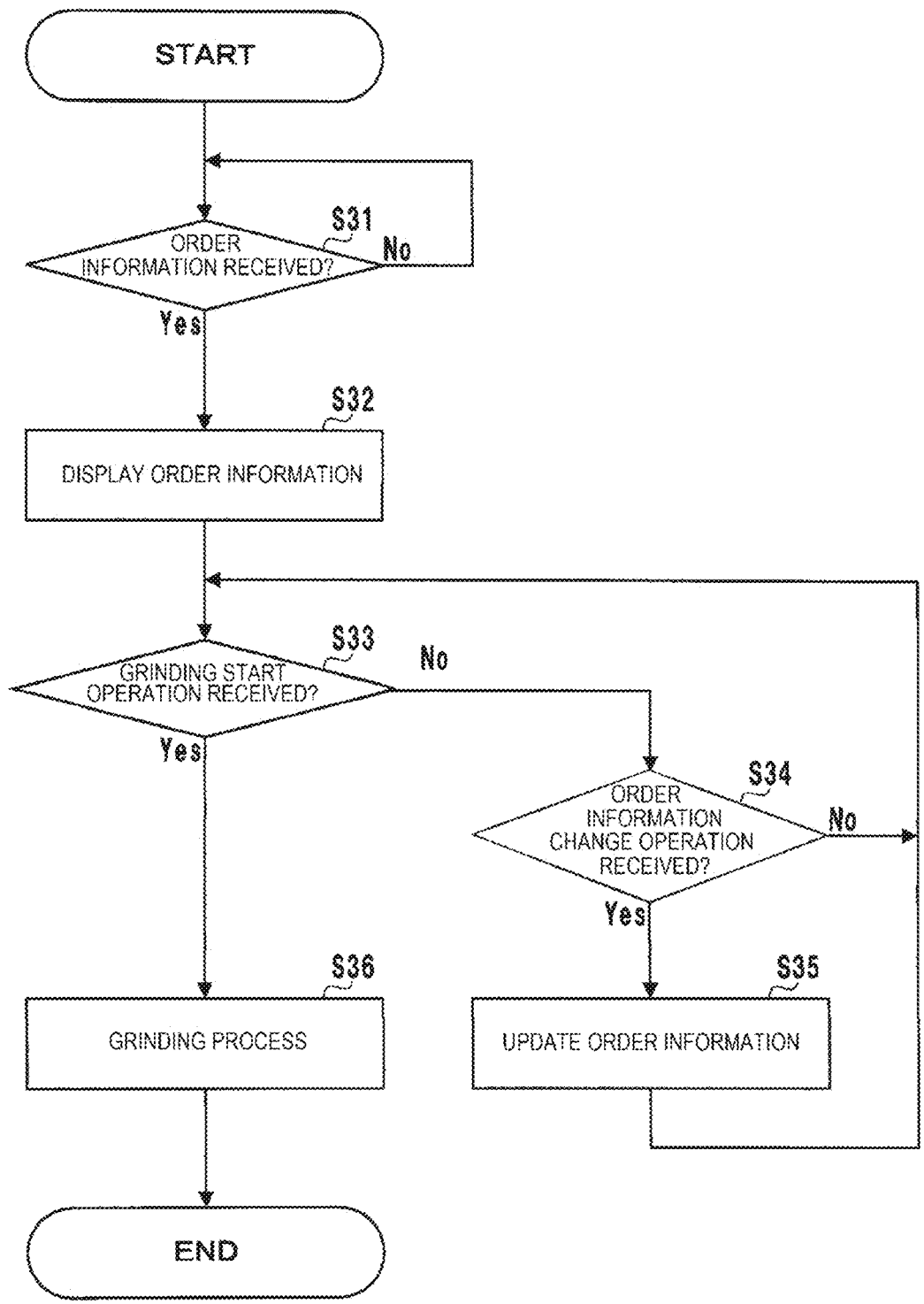

[Figure 39]
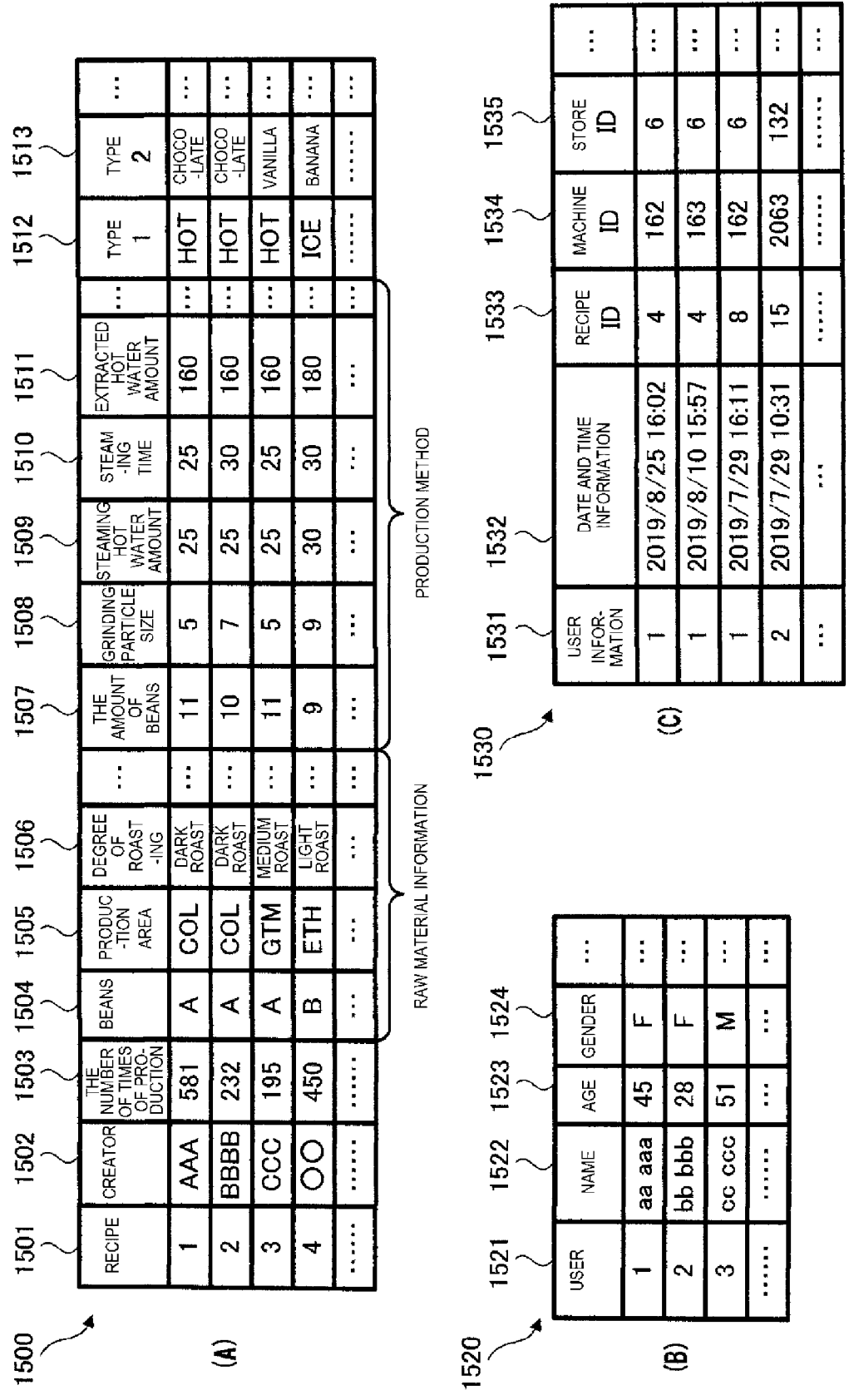

[Figure 40]
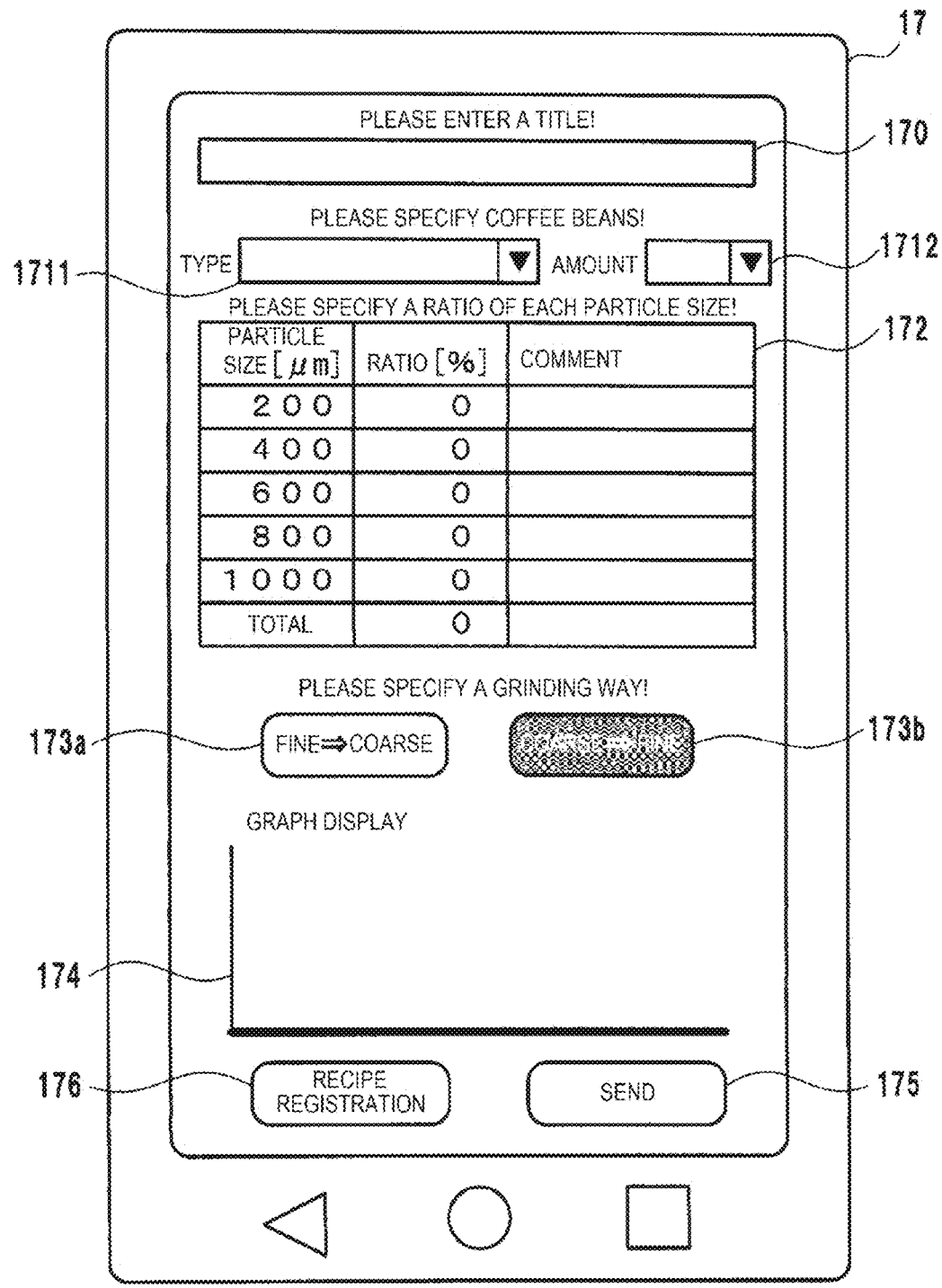

[Figure 41]

| PARTICLE SIZE [μm] | RATIO [%] | COMMENT |
|---|---|---|
| 200 | 40 | THE TASTE IS WEAK AT 400 Ml |
| 400 | 0 | |
| 600 | 0 | |
| 800 | 60 | MINIMAL UNPLEASANT TASTE IN TASTING! |
| 1000 | 0 | |
| TOTAL | 100 | THE OPINION OF Mr./Ms. B IS CONSIDERED. |

PLEASE INPUT A TITLE!
GEISHA FOR FRENCH PRESS

PLEASE SPECIFY COFFEE BEANS!
TYPE: COPEY GEISHA EXTREMELY DARK ROAST    AMOUNT: 60

PLEASE SPECIFY A RATIO OF EACH PARTICLE SIZE!

PLEASE SPECIFY A GRINDING WAY!
FINE ⇒ COARSE        COARSE ⇒ FINE

GRAPH DISPLAY

RECIPE REGISTRATION        SEND

[Figure 42]
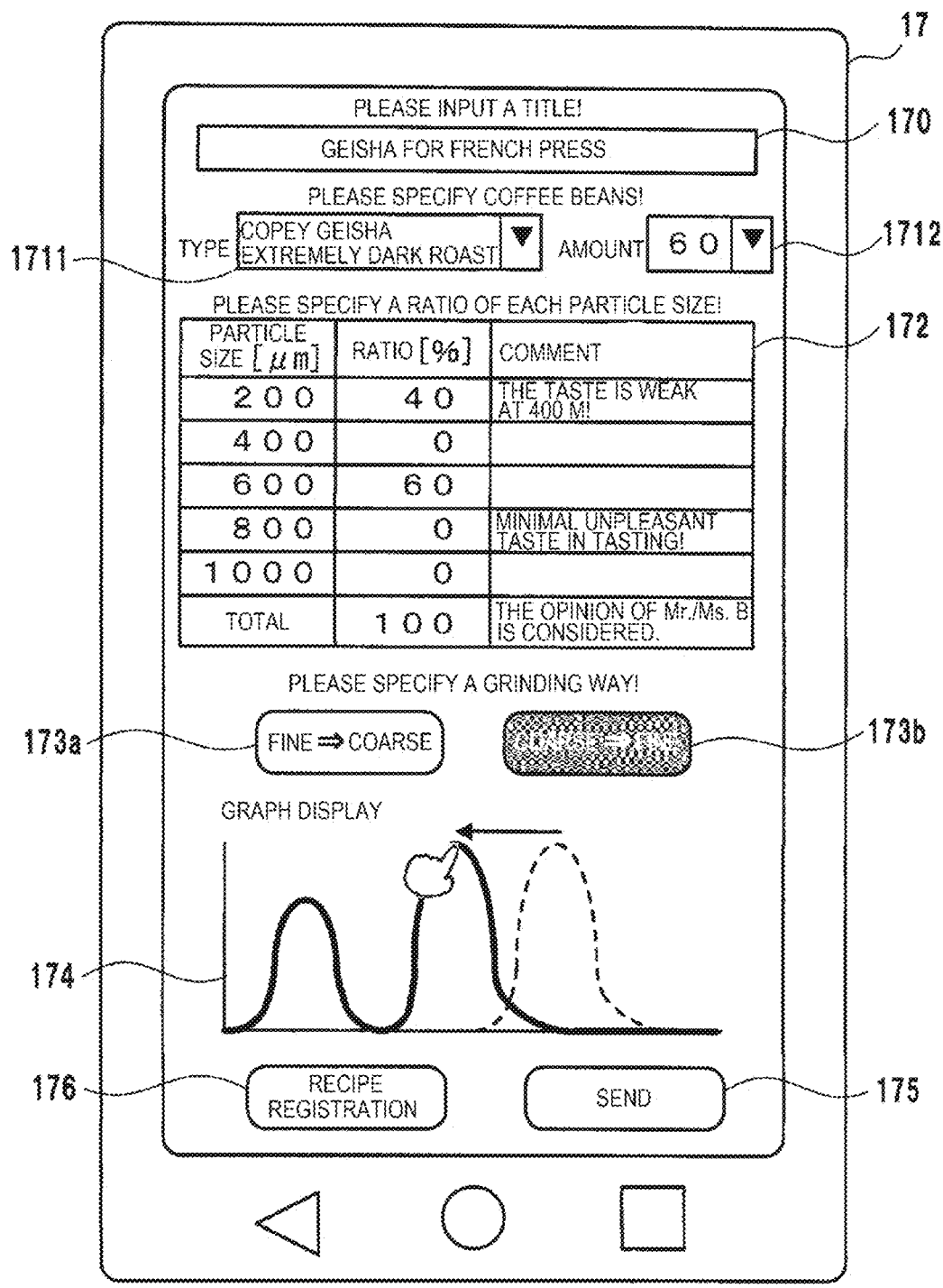

GRIND INFORMATION RECEIVED!
GEISHA FOR FRENCH PRESS

| PARTICLE SIZE [μm] | RATIO [%] | COMMENT |
|---|---|---|
| 200 | 40 | THE TASTE IS WEAK AT 400 μl |
| 600 | 60 | |
| 800 | 0 | MINIMAL UNPLEASANT TASTE IN TASTING! |
| TOTAL | 100 | THE OPINION OF Mr./Ms. B IS CONSIDERED. |

FINE ⇒ COARSE

TYPE OF BEANS
COPEY GEISHA EXTREMELY DARK ROAST
THE AMOUNT OF BEANS [g]
60
RECIPE REGISTRATION
START GRINDING (B)

GRIND INFORMATION RECEIVED!
GEISHA FOR FRENCH PRESS

| PARTICLE SIZE [μm] | RATIO [%] | COMMENT |
|---|---|---|
| 200 | 45 | THE TASTE IS WEAK AT 400 μl |
| 600 | 55 | LOW HUMIDITY TO RATIO INCREASE |
| 800 | 0 | MINIMAL UNPLEASANT TASTE IN TASTING! |
| TOTAL | 100 | THE OPINION OF Mr./Ms. B IS CONSIDERED. |

FINE ⇒ COARSE

TYPE OF BEANS
COPEY GEISHA EXTREMELY DARK ROAST
THE AMOUNT OF BEANS [g]
60
RECIPE REGISTRATION
START GRINDING

[Figure 44]
| PARTICLE SIZE [μm] | RATIO [%] |
|---|---|
| 200 | 45 |
| 600 | 55 |
(A)
| GAP [μm] | TIME [SECONDS] |
|---|---|
| 50 | 0.3 |
| 100 | 0.9 |
| 150 | 2.4 |
| 200 | 7.5 |
| 250 | 2.7 |
| 300 | 0.9 |
| 350 | 0.3 |
| 400 | 0.0 |
| 450 | 0.3 |
| 500 | 0.9 |
| 550 | 2.4 |
| 600 | 9.3 |
| 650 | 1.8 |
| 700 | 0.3 |
| 750 | 0.0 |
| 800 | 0.0 |
| 850 | 0.0 |
| 900 | 0.0 |
| 950 | 0.0 |
| 1000 | 0.0 |
(B)
| GAP [μm] | TIME [SECONDS] |
|---|---|
| 50 | 0.0 |
| 100 | 0.0 |
| 150 | 0.0 |
| 200 | 13.5 |
| 250 | 0.0 |
| 300 | 0.0 |
| 350 | 0.0 |
| 400 | 0.0 |
| 450 | 0.0 |
| 500 | 0.0 |
| 550 | 0.0 |
| 600 | 16.5 |
| 650 | 0.0 |
| 700 | 0.0 |
| 750 | 0.0 |
| 800 | 0.0 |
| 850 | 0.0 |
| 900 | 0.0 |
| 950 | 0.0 |
| 1000 | 0.0 |
(C)
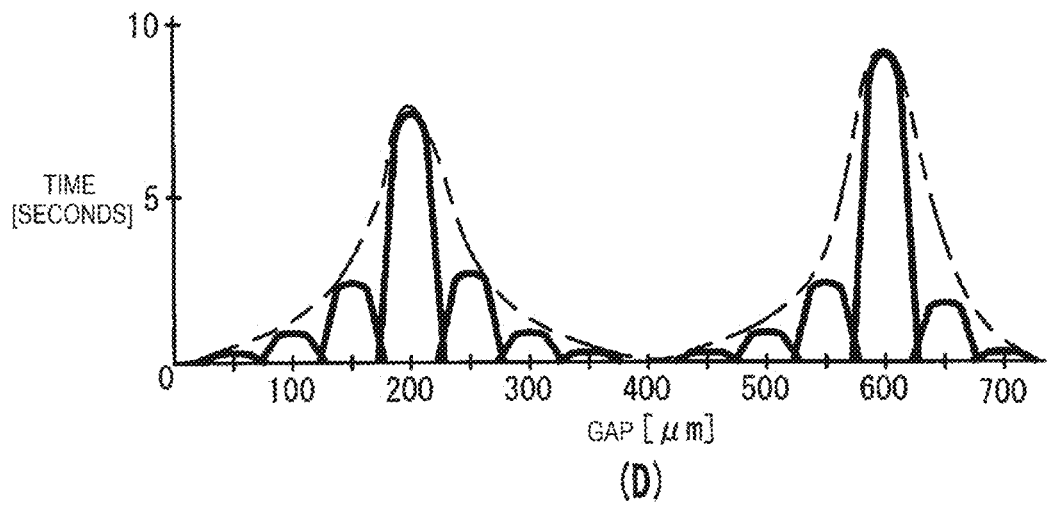
(D)

[Figure 45]
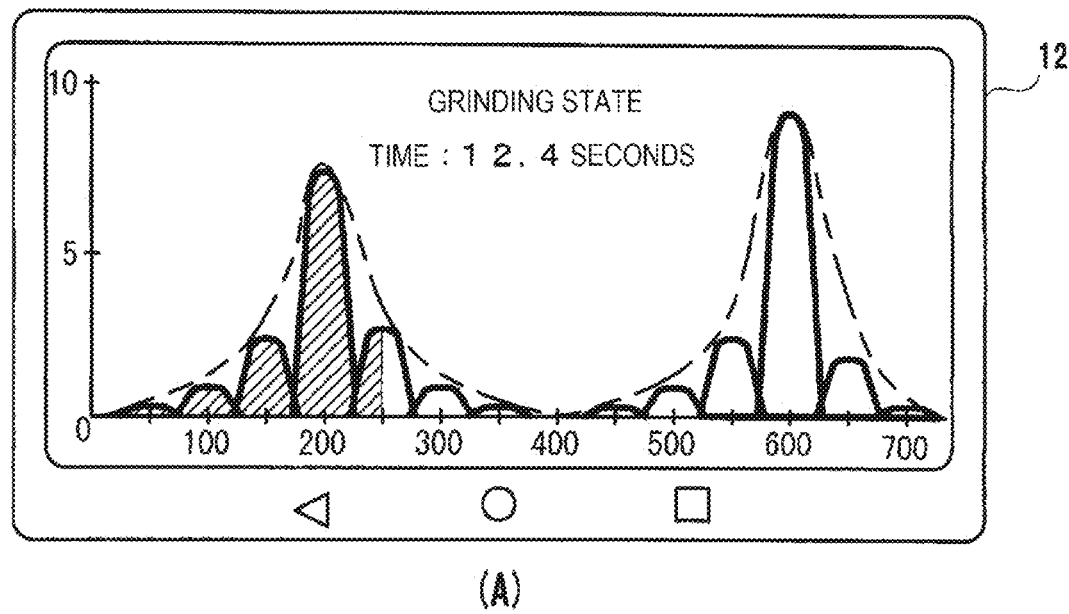
(A)
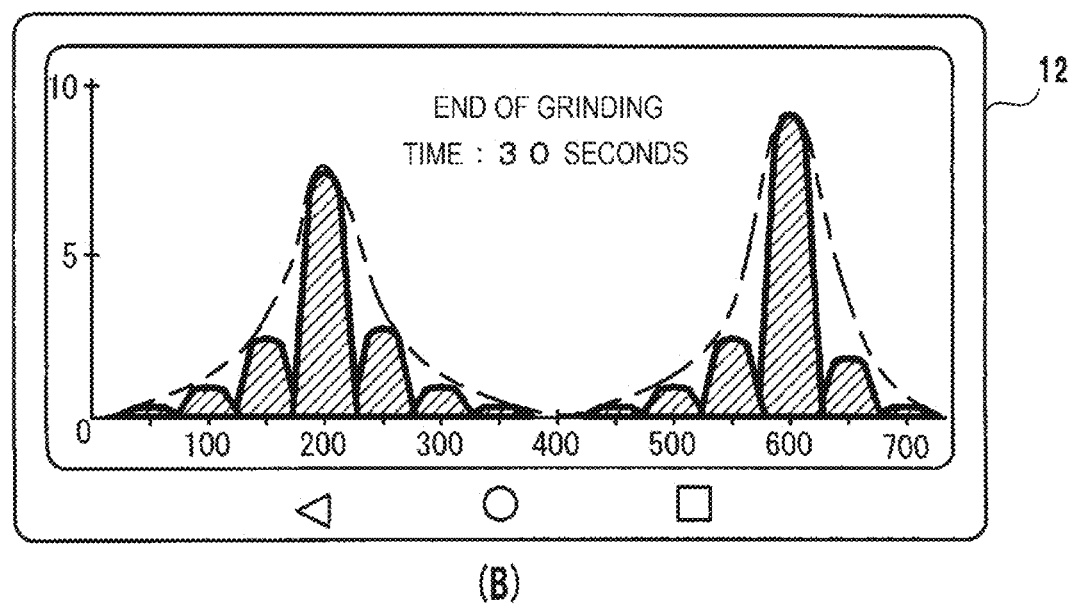
(B)

[Figure 46]
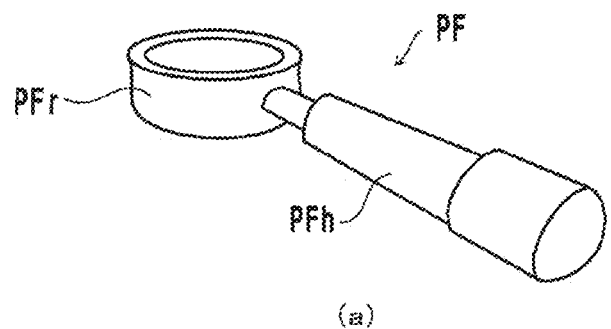
(a)
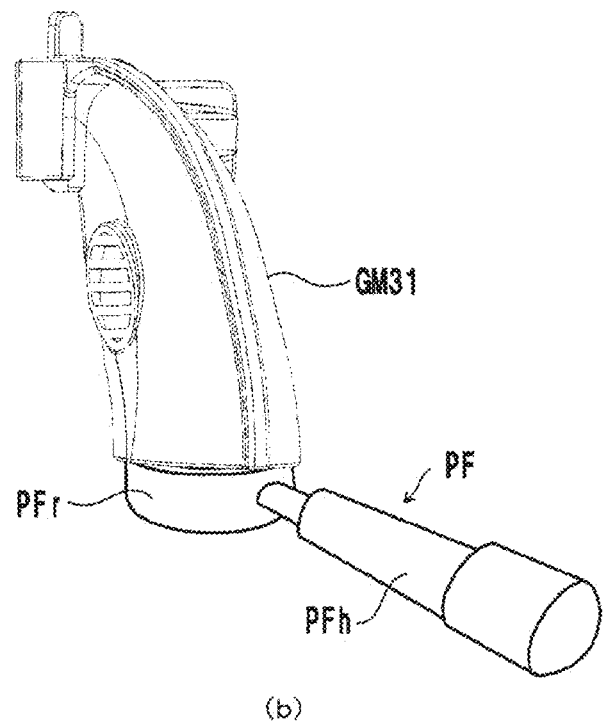
(b)
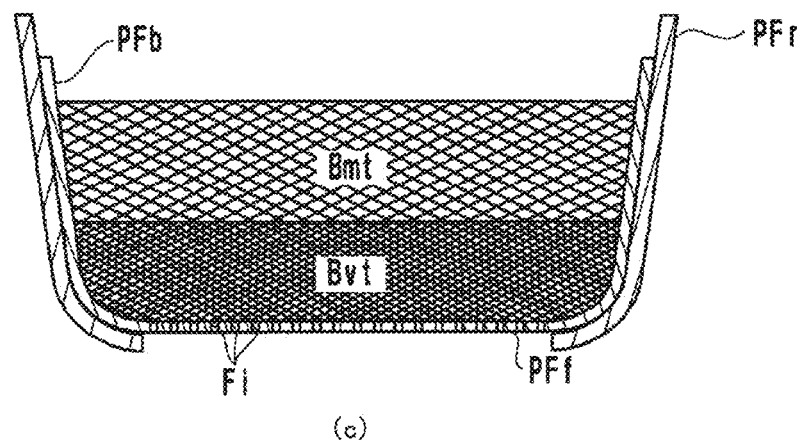
(c)

[Figure 47]
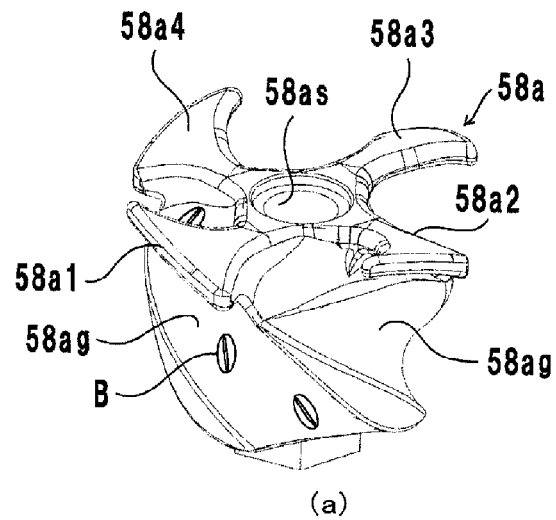
(a)
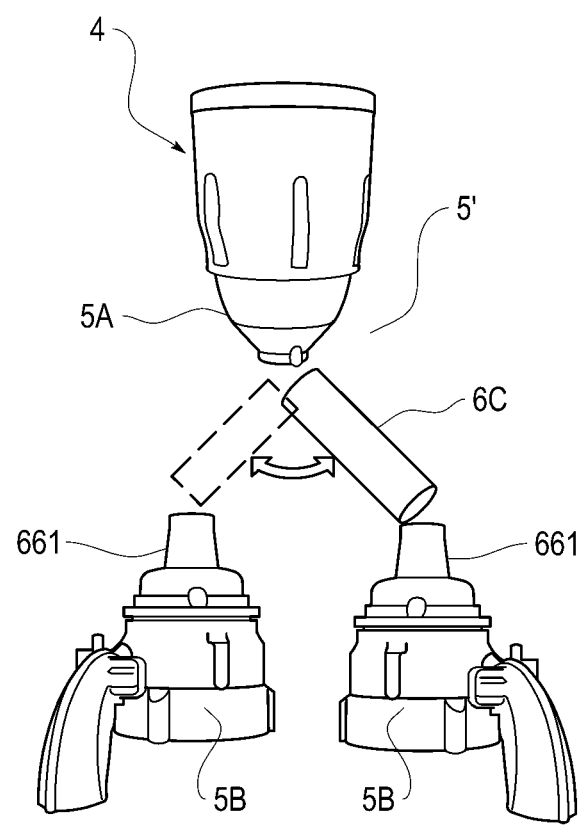
(b)

[Figure 48]
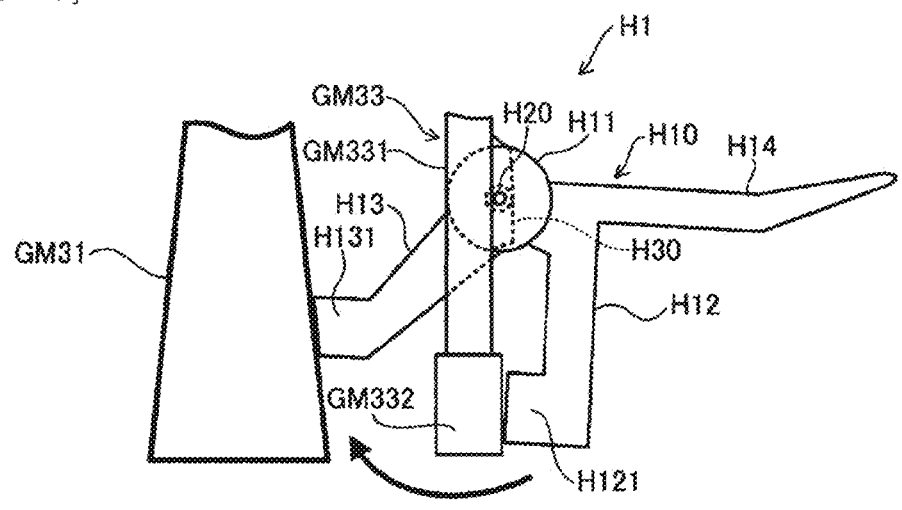
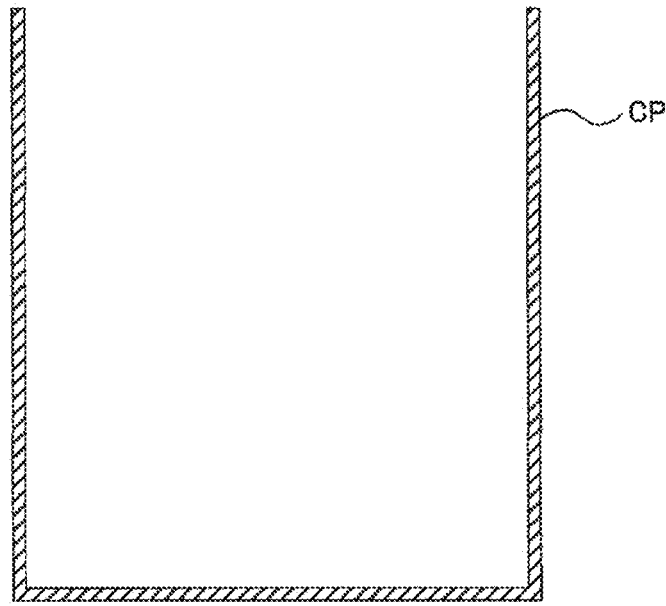

[Figure 49]
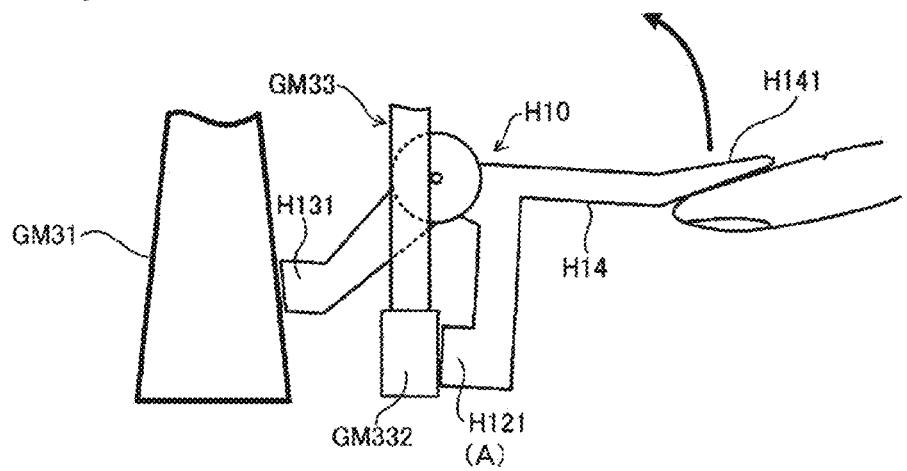
(A)
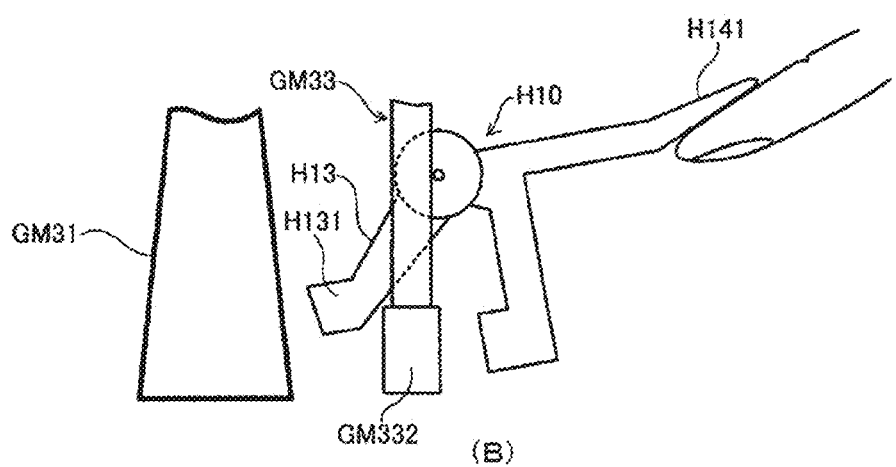
(B)
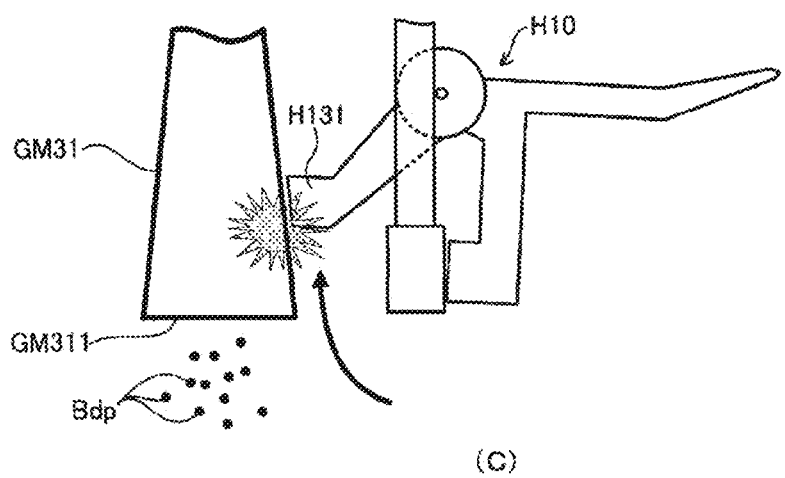
(C)

[Figure 50]
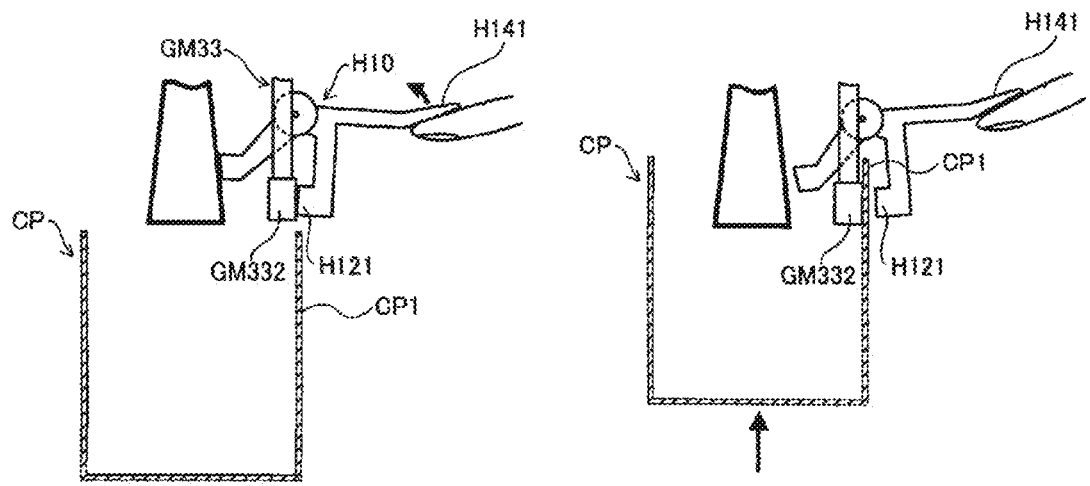
(A)  (B)
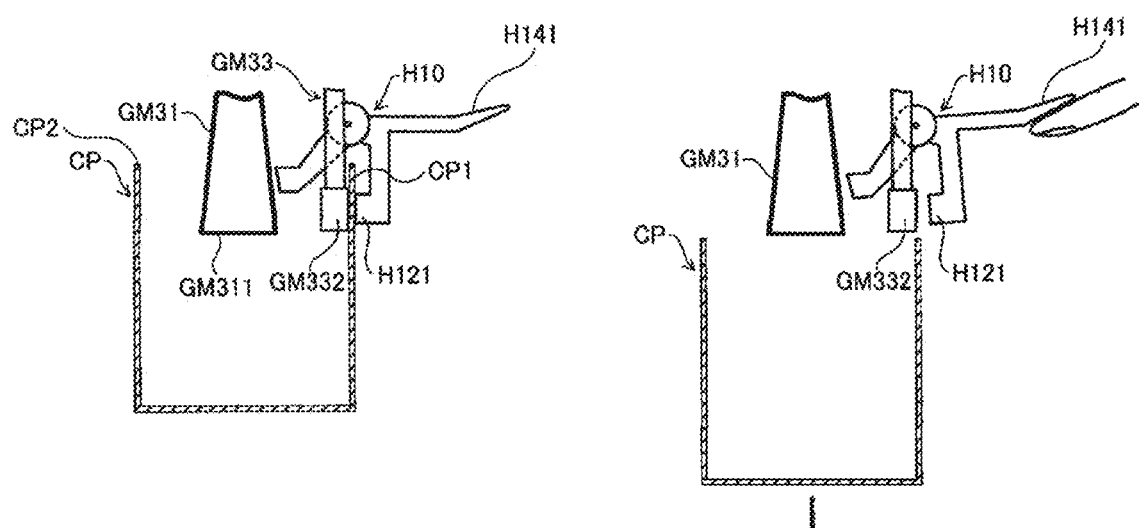
(C)  (D)

[Figure 51]
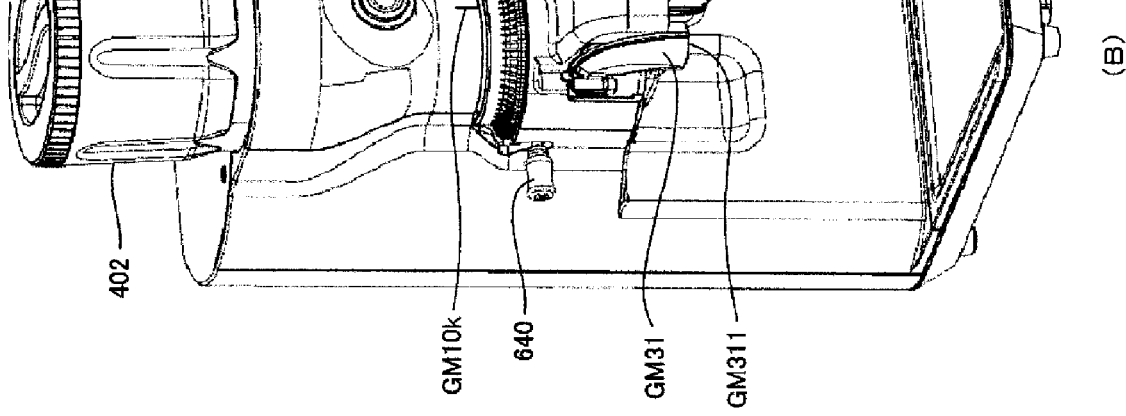
(B)
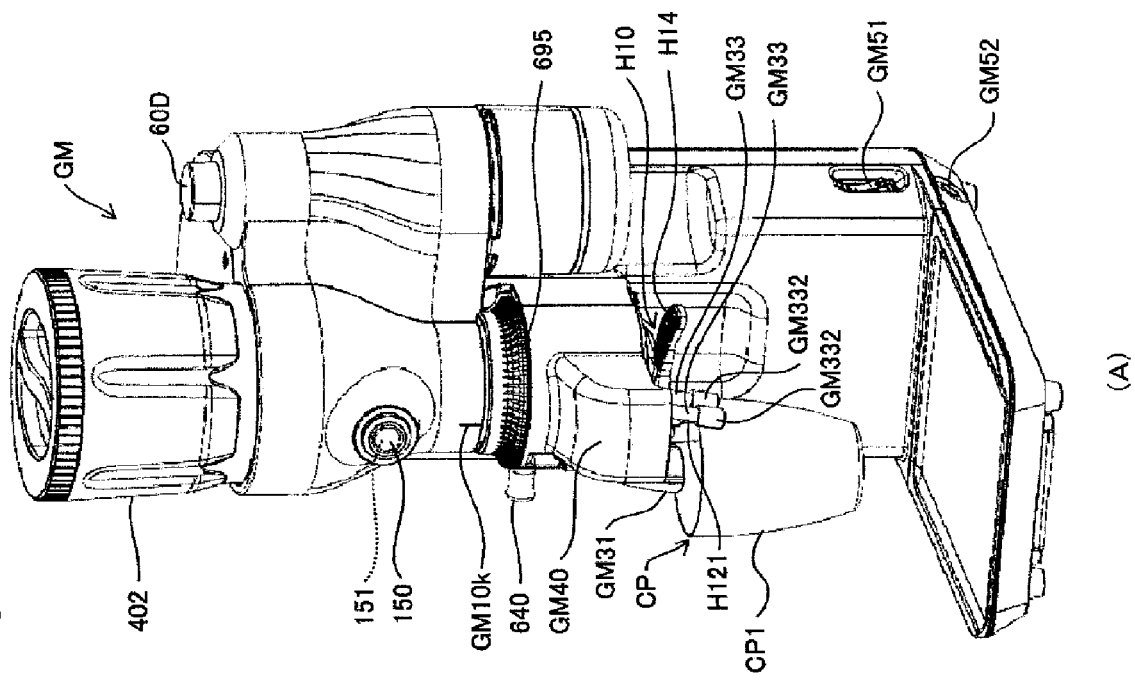
(A)

[Figure 52]
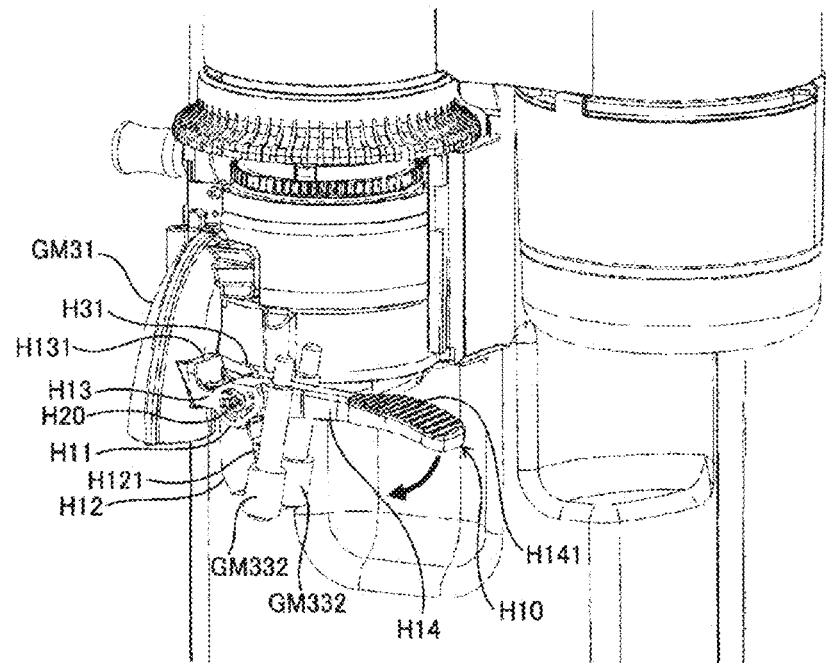
(A)
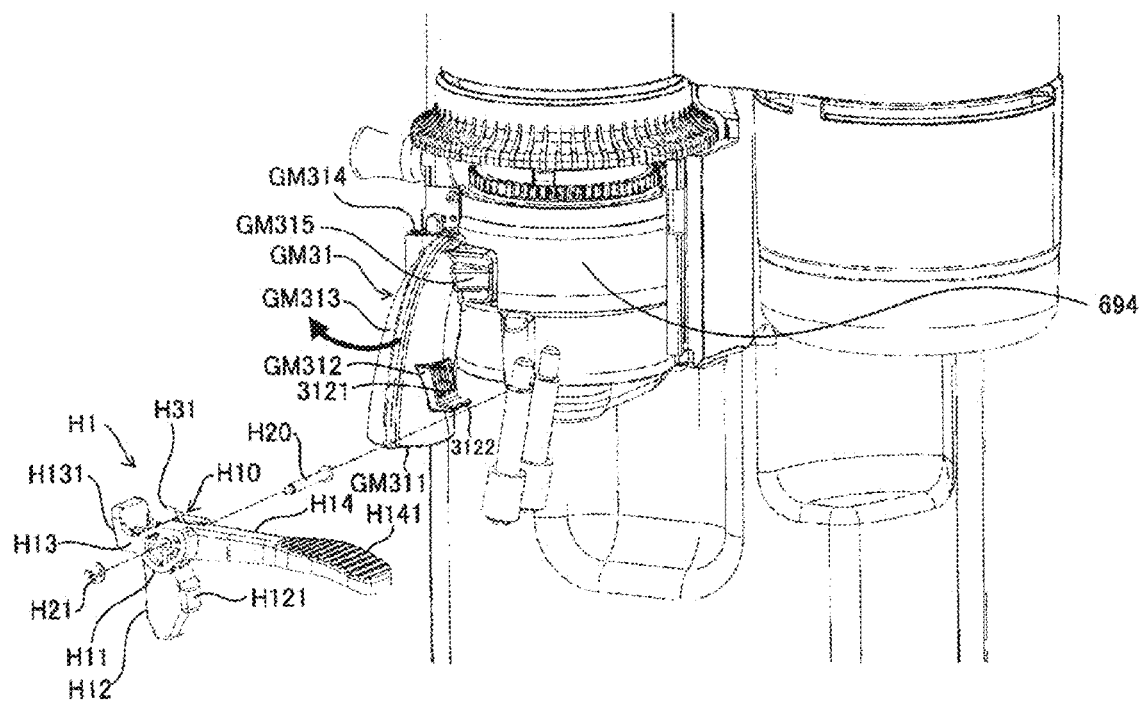
(B)

[Figure 53]
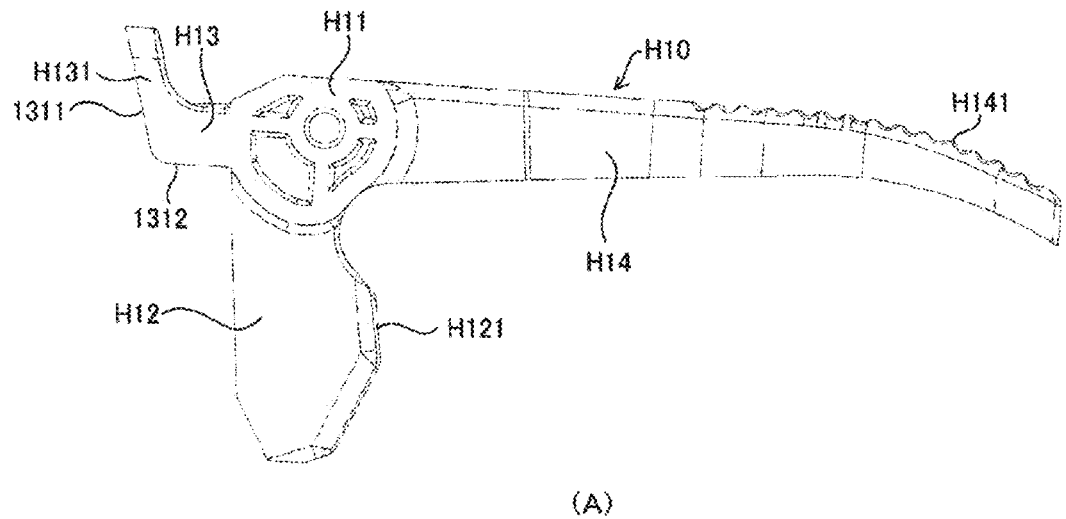
(A)
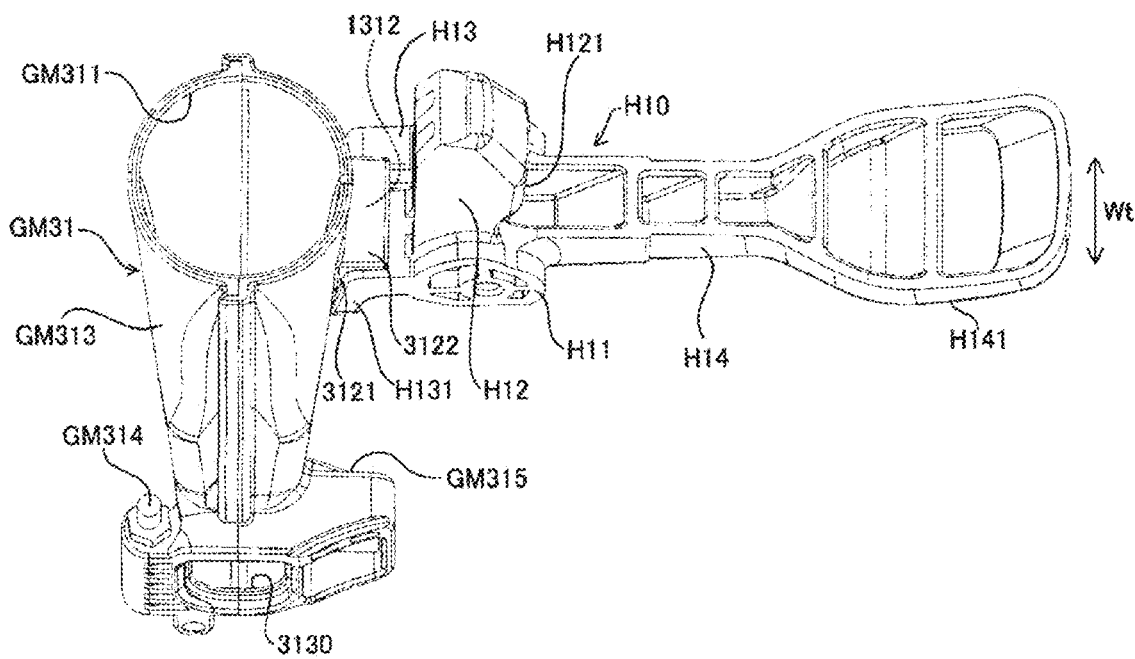
(B)

[Figure 54]
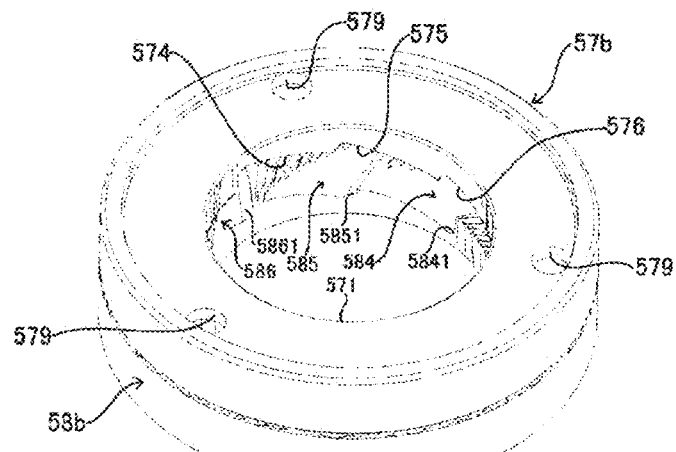
(A)
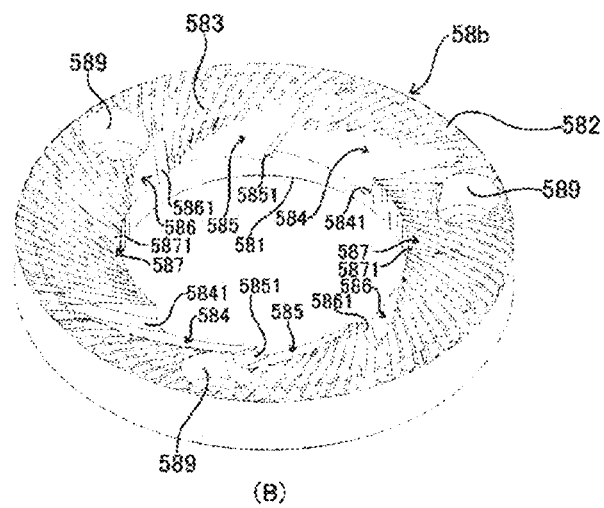
(B)
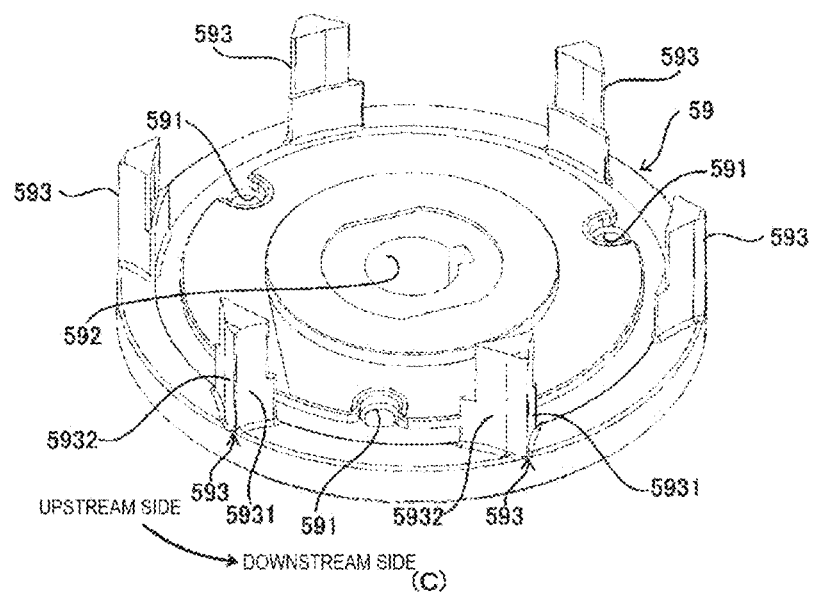
(C)

[Figure 55]
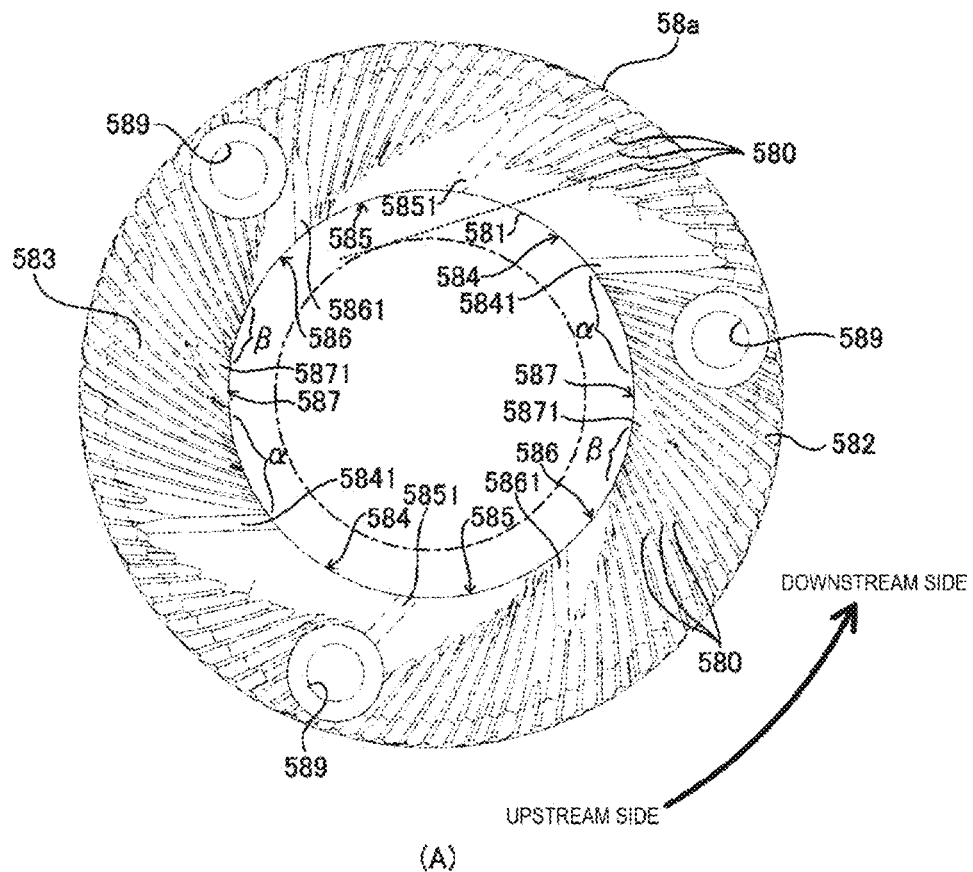
(A)
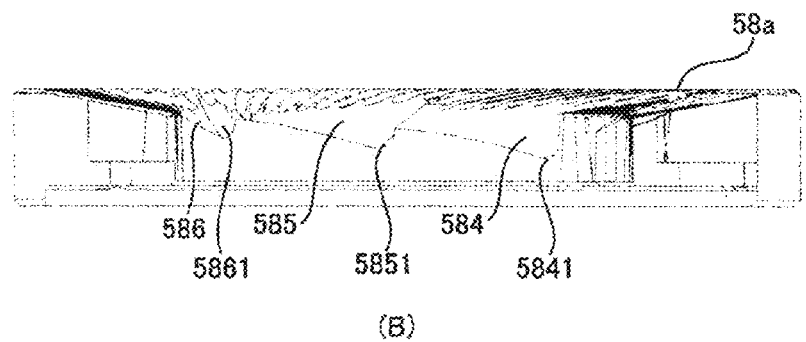
(B)
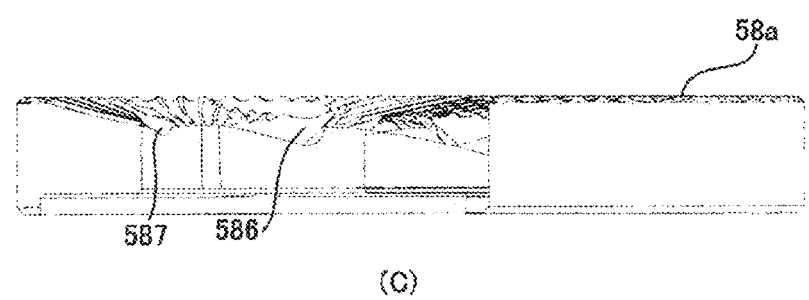
(C)

[Figure 56]
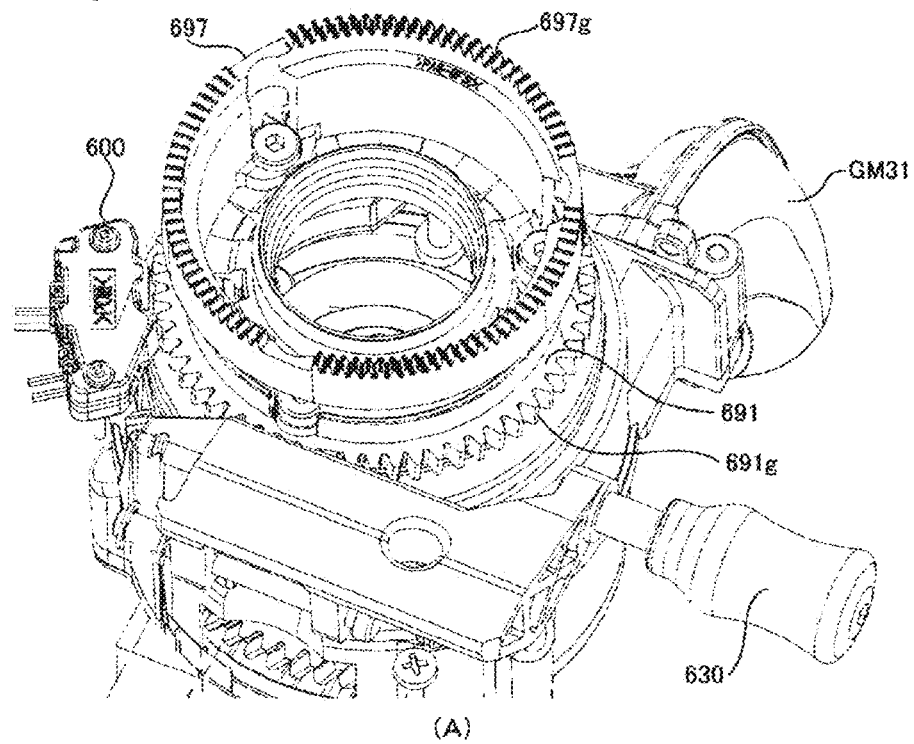
(A)
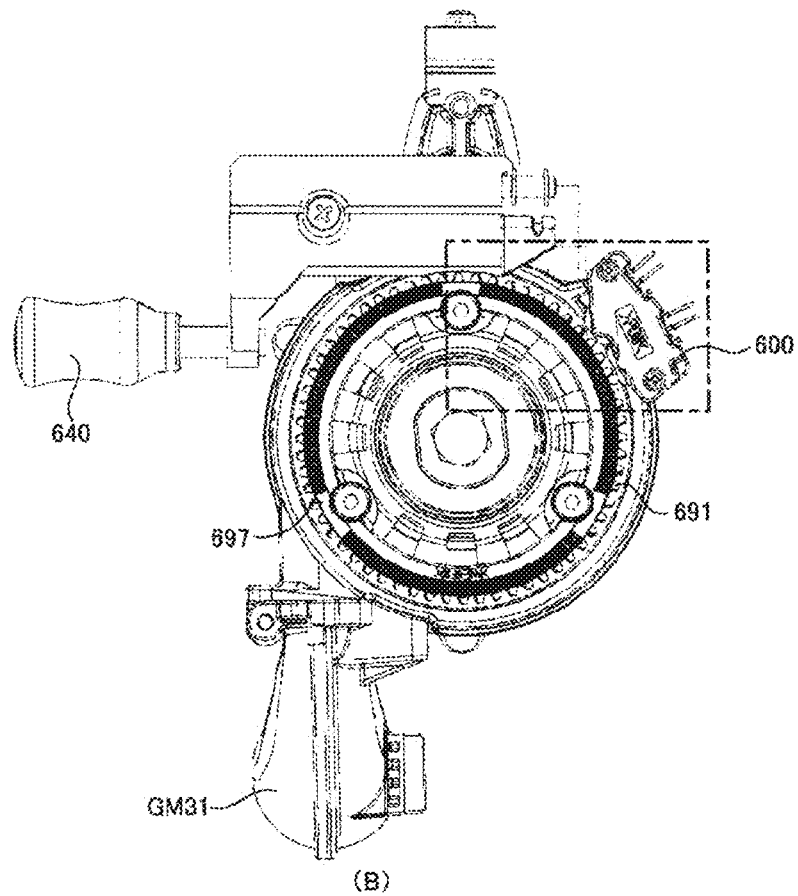
(B)

[Figure 57]
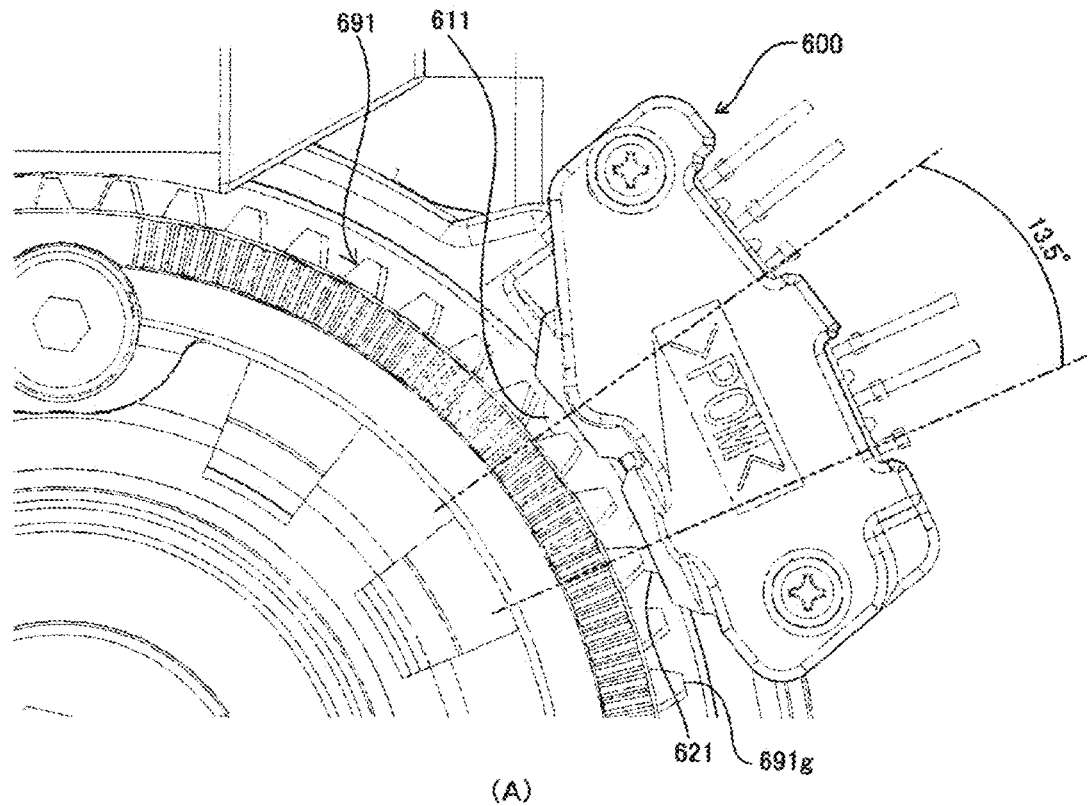
(A)
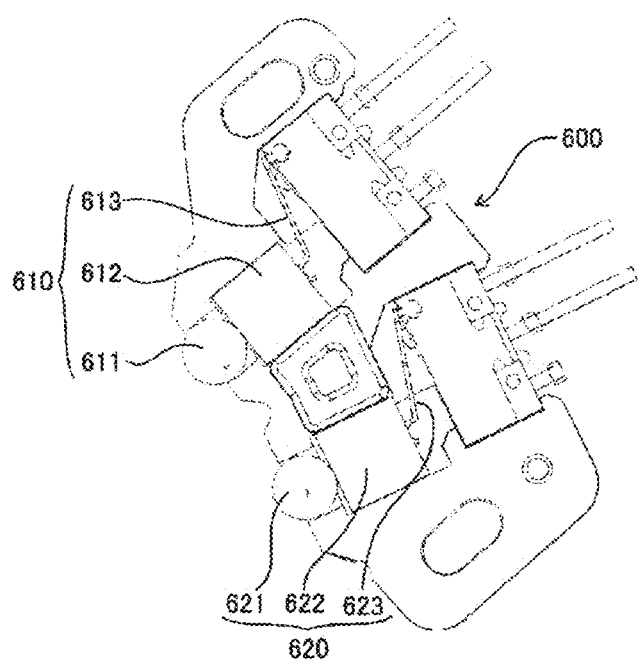
(B)

[Figure 58]
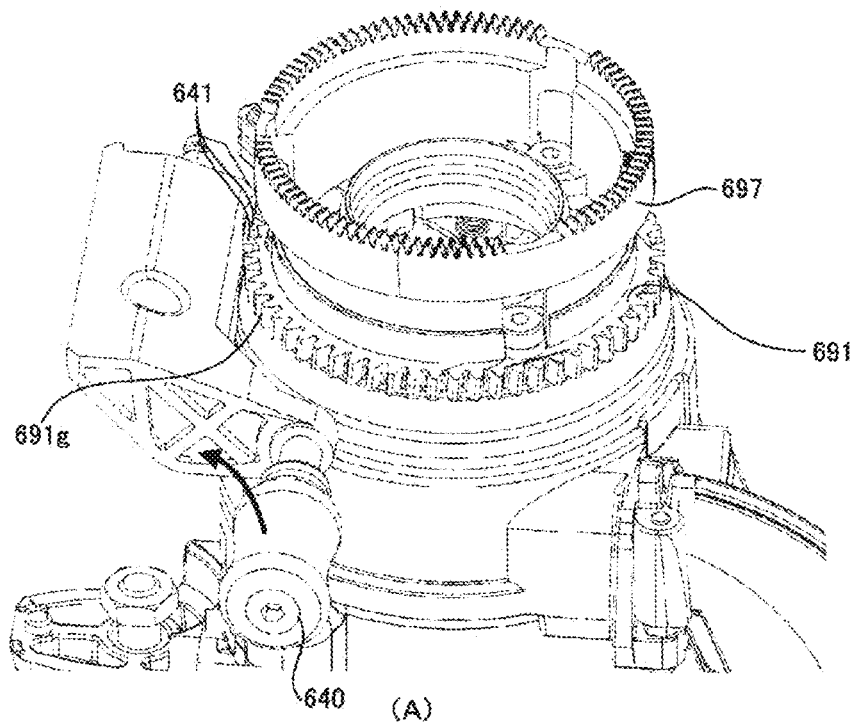
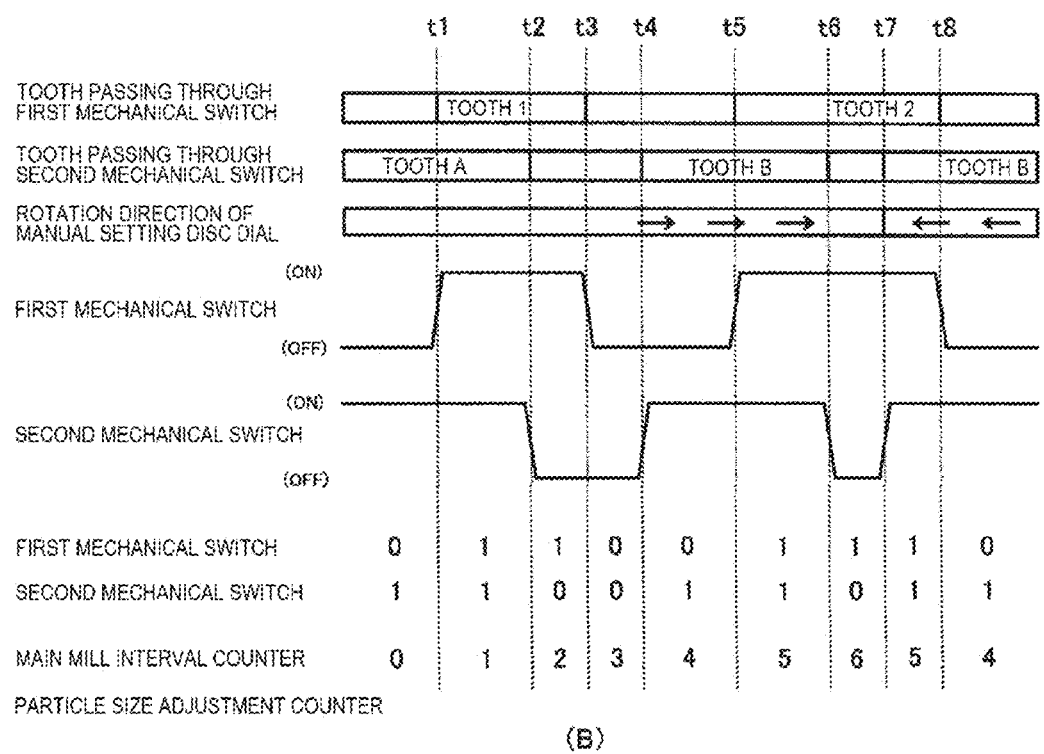

[Figure 59]

| COUNTER | MAIN MILL INTERVAL (μm) IN MACHINE HANDLING | MAIN MILL INTERVAL (μm) IN CALCULATION | MAIN MILL INTERVAL (μm) IN DATA HANDLING |
|---|---|---|---|
| 1 | 4 | 4.166666667 | 0 |
| 2 | 8 | 8.333333333 | 10 |
| 3 | 12 | 12.5 | 10 |
| 4 | 16 | 16.66666667 | 20 |
| 5 | 20 | 20.83333333 | 20 |
| 6 | 24 | 25 | 30 |
| 7 | 28 | 29.16666667 | 30 |
| 8 | 32 | 33.33333333 | 30 |
| 9 | 36 | 37.5 | 40 |
| 10 | 40 | 41.66666667 | 40 |
| 11 | 44 | 45.83333333 | 50 |
| 12 | 48 | 50 | 50 |
| 13 | 52 | 54.16666667 | 50 |
| 14 | 56 | 58.33333333 | 60 |
| 15 | 60 | 62.5 | 60 |
| 16 | 64 | 66.66666667 | 70 |
| 17 | 68 | 70.83333333 | 70 |
| 18 | 72 | 75 | 80 |
| 19 | 76 | 79.16666667 | 80 |
| 20 | 80 | 83.33333333 | 80 |
| 21 | 84 | 87.5 | 90 |
| 22 | 88 | 91.66666667 | 90 |
| 23 | 92 | 95.83333333 | 100 |
| 24 | 96 | 100 | 100 |
| 25 | 100 | 104.1666667 | 100 |
| 26 | 104 | 108.3333333 | 110 |
| 27 | 108 | 112.5 | 110 |
| 28 | 112 | 116.6666667 | 120 |
| 29 | 116 | 120.8333333 | 120 |
| 30 | 120 | 125 | 130 |
| 31 | 124 | 129.1666667 | 130 |
| 32 | 128 | 133.3333333 | 130 |
| 33 | 132 | 137.5 | 140 |
| 34 | 136 | 141.6666667 | 140 |
|  |  | 145.8333333 |  |

[Figure 60]

| NUMBER OF PULSES | PWM VALUE |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |
| 12 | 0 |
| 13 | 0 |
| 14 | 0 |
| 15 | 0 |
| 16 | 0 |
| 17 | 0 |
| 18 | 0 |
| 19 | 0 |
| 20 | 0 |
| 21 | 0 |
| 22 | 0 |
| 23 | 0 |
| 24 | 0 |
| 25 | 0 |
| 26 | 0 |
| 27 | 0 |
| 28 | 0 |
| 29 | 0 |
| 30 | 0 |
| 31 | 0 |
| 32 | 0 |
| 33 | 0 |
| 34 | 0 |
| 35 | 0 |
| 36 | 0 |
| 37 | 0 |
| 38 | 0 |
| 39 | 0 |
| 40 | 0 |
| 41 | 0 |
| 42 | 0 |
| 43 | 0 |
| 44 | 0 |
| 45 | 0 |
| 46 | 0 |
| 47 | 0 |
| 48 | 0 |
| 49 | 0 |
| 50 | 0 |
| 51 | 0 |
| 52 | 0 |

| NUMBER OF PULSES | PWM VALUE |   |
|---|---|---|
| 53 | 0 | |
| 54 | 0 | |
| 55 | 0 | |
| 56 | 0 | |
| 57 | 0 | |
| 58 | 0 | |
| 59 | 0 | |
| 60 | 0 | |
| 61 | 0 | |
| 62 | 0 | |
| 63 | 0 | |
| 64 | 0 | |
| 65 | 0 | |
| 66 | 0 | |
| 67 | 0 | |
| 68 | 0 | |
| 69 | 1 | |
| 70 | 1 | |
| 71 | 1 | |
| 72 | 1 | |
| 73 | 1 | |
| 74 | 2 | |
| 75 | 2 | |
| 76 | 2 | |
| 77 | 2 | |
| 78 | 2 | |
| 79 | 3 | ← PWM VALUE CORRESPONDING TO ACQUIRED VALUE 1 |
| 80 | 3 | |
| 81 | 3 | |
| 82 | 3 | |
| 83 | 3 | |
| 84 | 4 | |
| 85 | 4 | |
| 86 | 4 | |
| 87 | 4 | |
| 88 | 5 | |
| 89 | 5 | |
| 90 | 5 | |
| 91 | 5 | |
| 92 | 6 | |
| 93 | 6 | |
| 94 | 6 | |
| 95 | 7 | |
| 96 | 7 | |
| 97 | 7 | |
| 98 | 8 | ← PWM VALUE CORRESPONDING TO ACQUIRED VALUE 2 |
| 99 | 8 | |
| 100 | 8 | |
| 101 | 9 | |
| 102 | 9 | |
| 103 | 9 | |
| 104 | 10 | |
| 105 | 10 | |

[Figure 61]

| NUMBER OF PULSES | PWM VALUE | NUMBER OF PULSES | PWM VALUE | NUMBER OF PULSES | PWM VALUE |
|---|---|---|---|---|---|
| 106 | 10 | 159 | 35 | 212 | 61 |
| 107 | 11 | 160 | 36 | 213 | 62 |
| 108 | 11 | 161 | 36 | 214 | 62 |
| 109 | 12 | 162 | 36 | 215 | 63 |
| 110 | 12 | 163 | 37 | 216 | 63 |
| 111 | 12 | 164 | 37 | 217 | 64 |
| 112 | 13 | 165 | 38 | 218 | 65 |
| 113 | 13 | 166 | 38 | 219 | 65 |
| 114 | 14 | 167 | 39 | 220 | 66 |
| 115 | 14 | 168 | 39 | 221 | 66 |
| 116 | 15 | 169 | 40 | 222 | 67 |
| 117 | 15 | 170 | 40 | 223 | 68 |
| 118 | 16 | 171 | 40 | 224 | 68 |
| 119 | 16 | 172 | 41 | 225 | 69 |
| 120 | 17 | 173 | 41 | 226 | 69 |
| 121 | 17 | 174 | 42 | 227 | 70 |
| 122 | 18 | 175 | 42 | 228 | 70 |
| 123 | 18 | 176 | 43 | 229 | 71 |
| 124 | 19 | 177 | 43 | 230 | 71 |
| 125 | 19 | 178 | 44 | 231 | 72 |
| 126 | 20 | 179 | 44 | 232 | 73 |
| 127 | 20 | 180 | 45 | 233 | 73 |
| 128 | 21 | 181 | 45 | 234 | 74 |
| 129 | 21 | 182 | 45 | 235 | 74 |
| 130 | 22 | 183 | 46 | 236 | 75 |
| 131 | 22 | 184 | 46 | 237 | 75 |
| 132 | 23 | 185 | 47 | 238 | 76 |
| 133 | 23 | 186 | 47 | 239 | 76 |
| 134 | 24 | 187 | 48 | 240 | 77 |
| 135 | 24 | 188 | 48 | 241 | 77 |
| 136 | 25 | 189 | 49 | 242 | 78 |
| 137 | 25 | 190 | 49 | 243 | 78 |
| 138 | 26 | 191 | 50 | 244 | 79 |
| 139 | 26 | 192 | 50 | 245 | 79 |
| 140 | 27 | 193 | 51 | 246 | 80 |
| 141 | 27 | 194 | 51 | 247 | 80 |
| 142 | 27 | 195 | 52 | 248 | 81 |
| 143 | 28 | 196 | 52 | 249 | 81 |
| 144 | 28 | 197 | 53 | 250 | 82 |
| 145 | 29 | 198 | 53 | 251 | 82 |
| 146 | 29 | 199 | 54 | 252 | 83 |
| 147 | 30 | 200 | 54 | 253 | 83 |
| 148 | 30 | 201 | 55 | 254 | 84 |
| 149 | 31 | 202 | 56 | 255 | 84 |
| 150 | 31 | 203 | 57 | | |
| 151 | 32 | 204 | 57 | | |
| 152 | 32 | 205 | 57 | | |
| 153 | 32 | 206 | 58 | | |
| 154 | 33 | 207 | 58 | | |
| 155 | 33 | 208 | 59 | | |
| 156 | 34 | 209 | 59 | | |
| 157 | 34 | 210 | 60 | | |
| 158 | 35 | 211 | 61 | | |

[Figure 62]

| SET VALUE | PWM VALUE (%) | CORRECTION NECESSARY CONDITION | CORRECTION CONTENT |
|---|---|---|---|
| SETTING 1 | 0 | — | — |
| SETTING 2 | 5 | WHEN OUTSIDE PERMISSIBLE RANGE OF 82 ≤ ACQUIRED VALUE ≤ 94 | [CORRECTION FORMULA] CORRECTED PWM VALUE = CURRENT PWM VALUE + (PWM VALUE CORRESPONDING TO SET VALUE − PWM VALUE CORRESPONDING TO ACQUIRED VALUE) |
| SETTING 3 | 10 | WHEN OUTSIDE PERMISSIBLE RANGE OF 100 ≤ ACQUIRED VALUE ≤ 108 | |
| SETTING 4 | 30 | WHEN OUTSIDE PERMISSIBLE RANGE OF 143 ≤ ACQUIRED VALUE ≤ 151 | |
| SETTING 5 | 60 | WHEN OUTSIDE PERMISSIBLE RANGE OF 206 ≤ ACQUIRED VALUE ≤ 214 | |

[Figure 63]
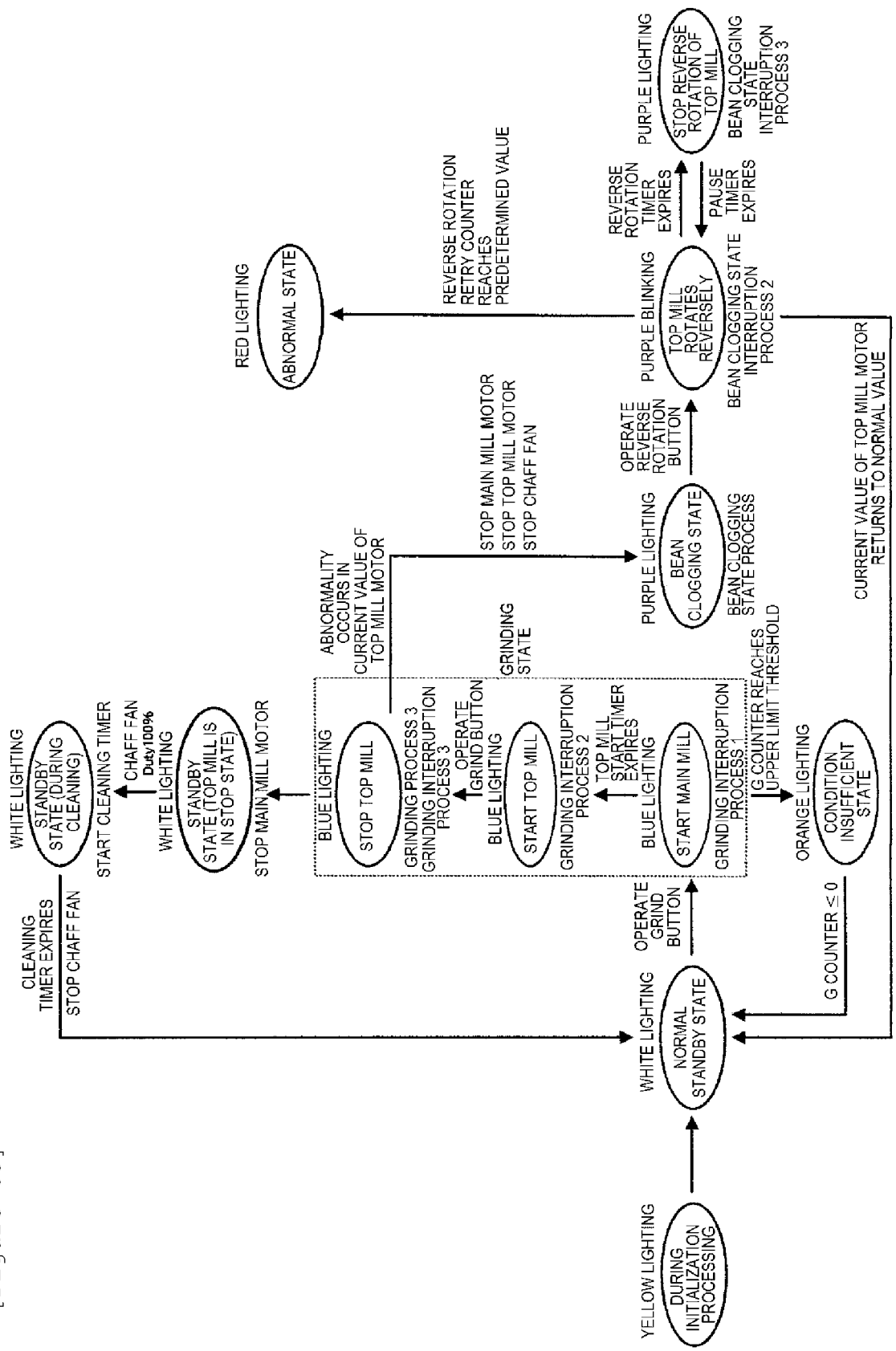

[Figure 64]
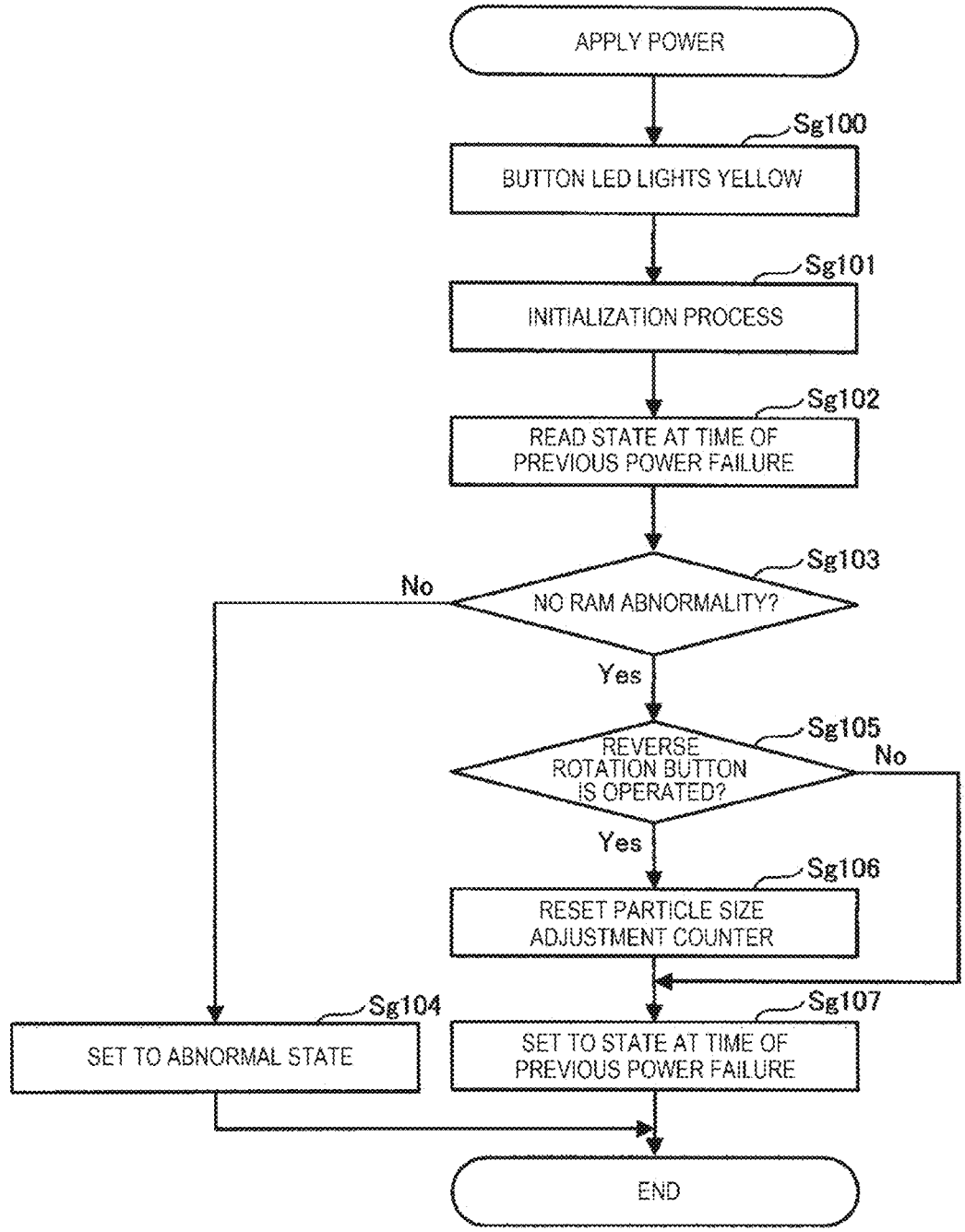

[Figure 65]
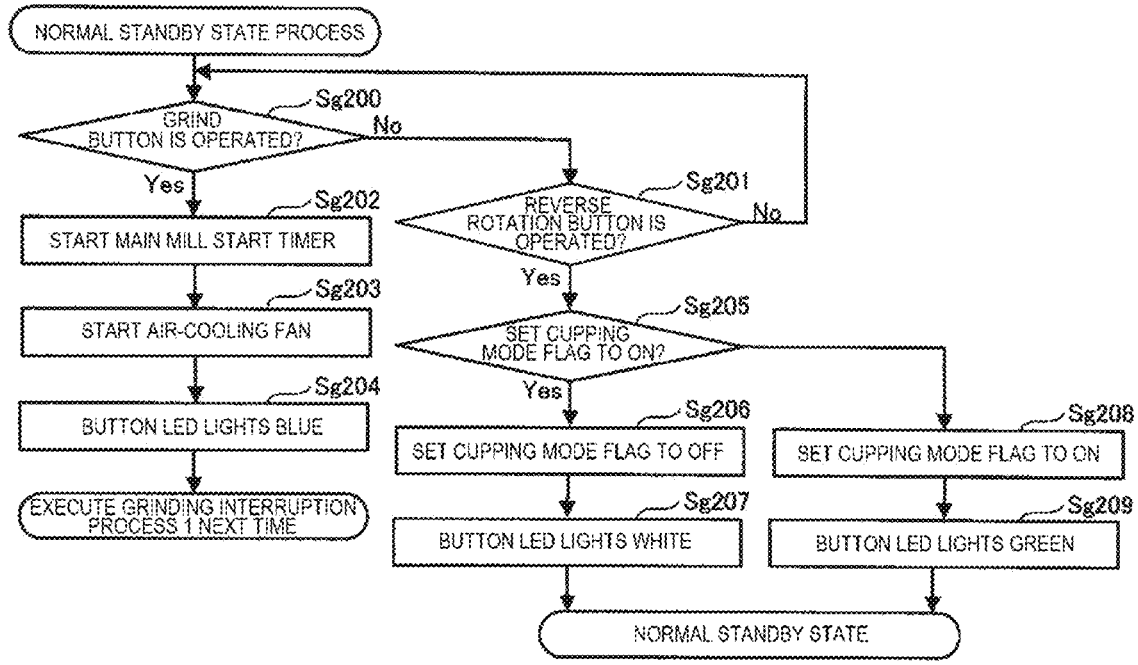
(A)
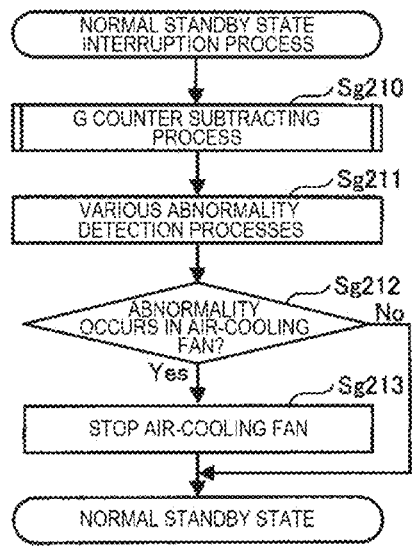
(B)

[Figure 66]
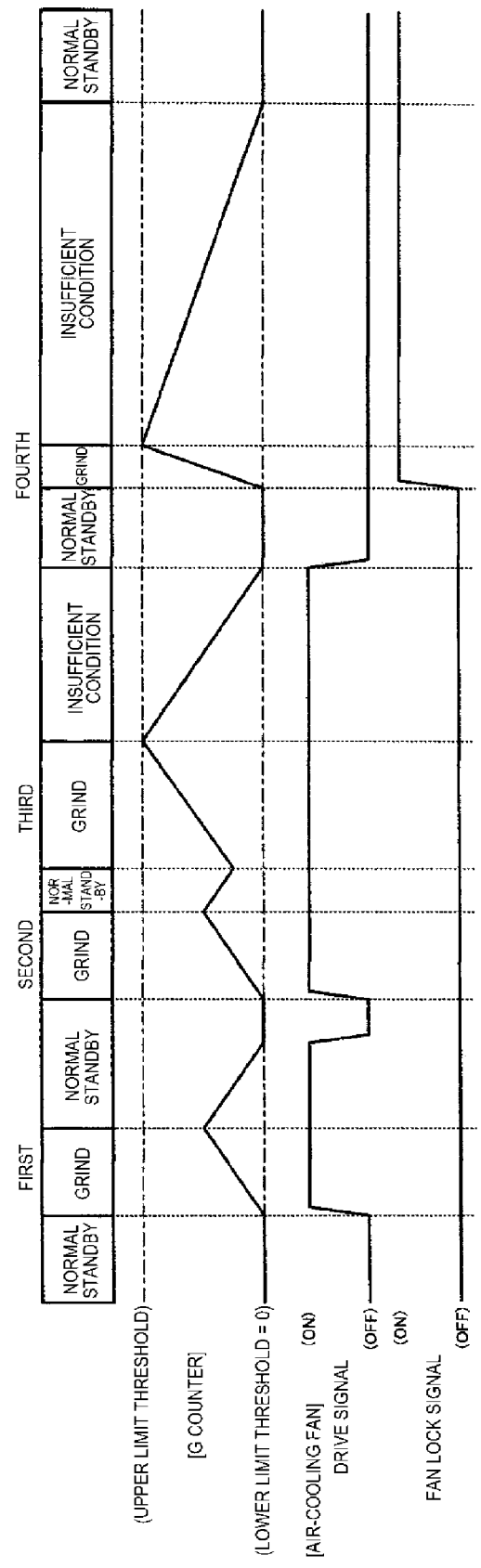

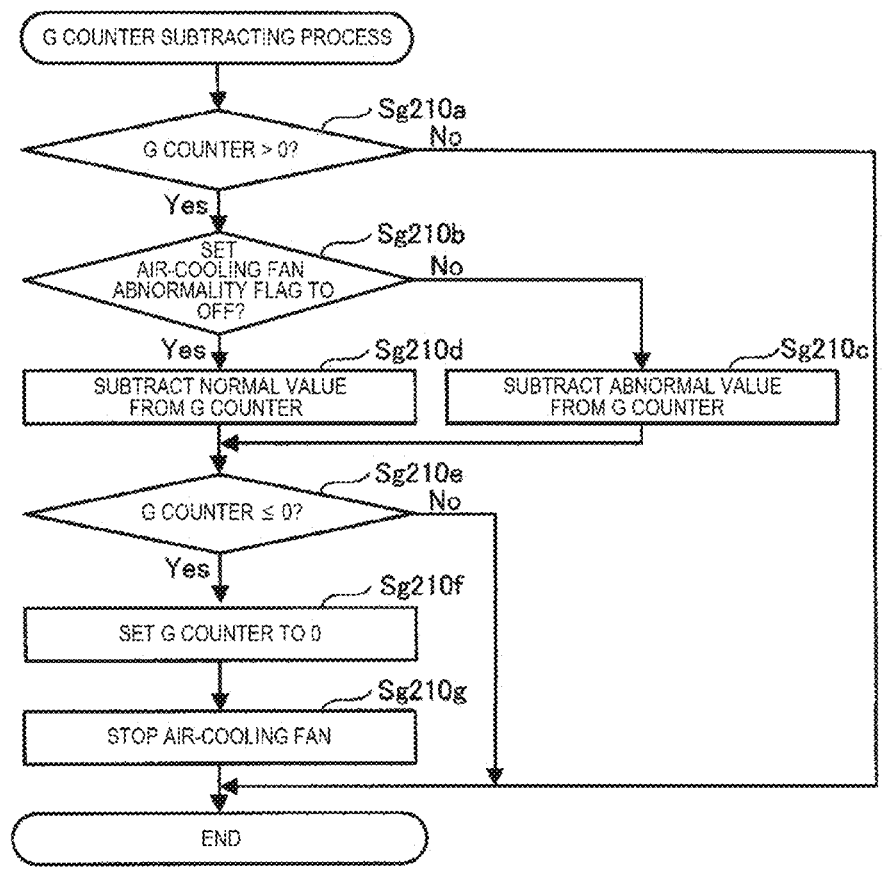
[Figure 67]

[Figure 68]
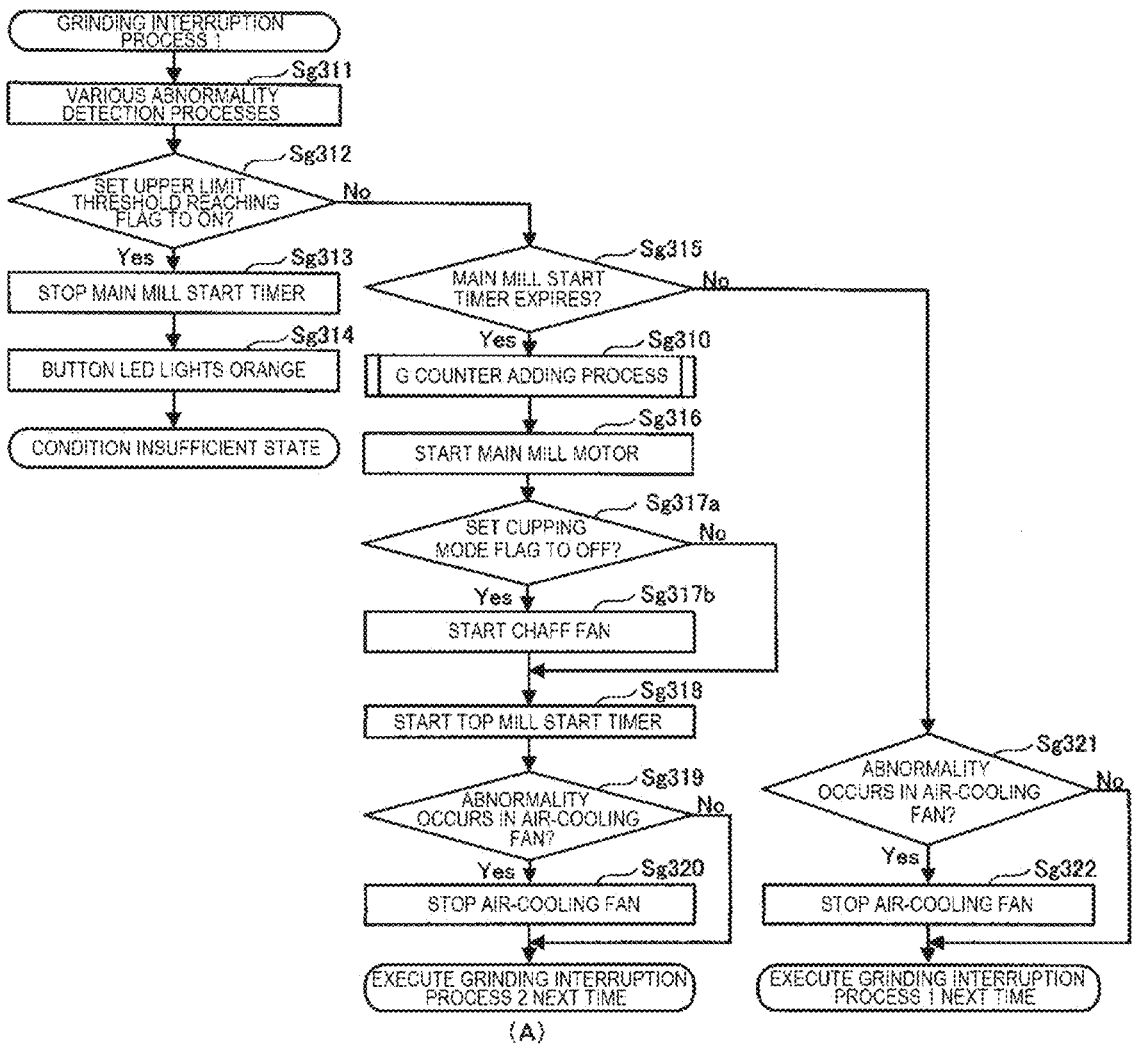
(A)
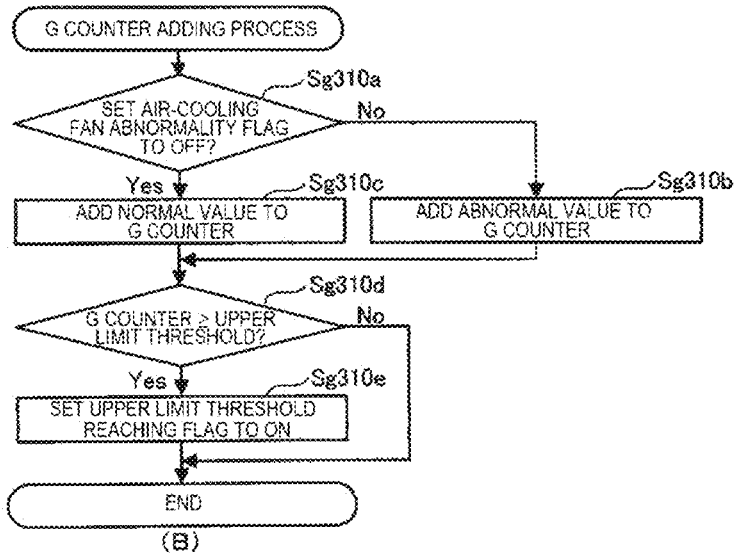
(B)

[Figure 69]
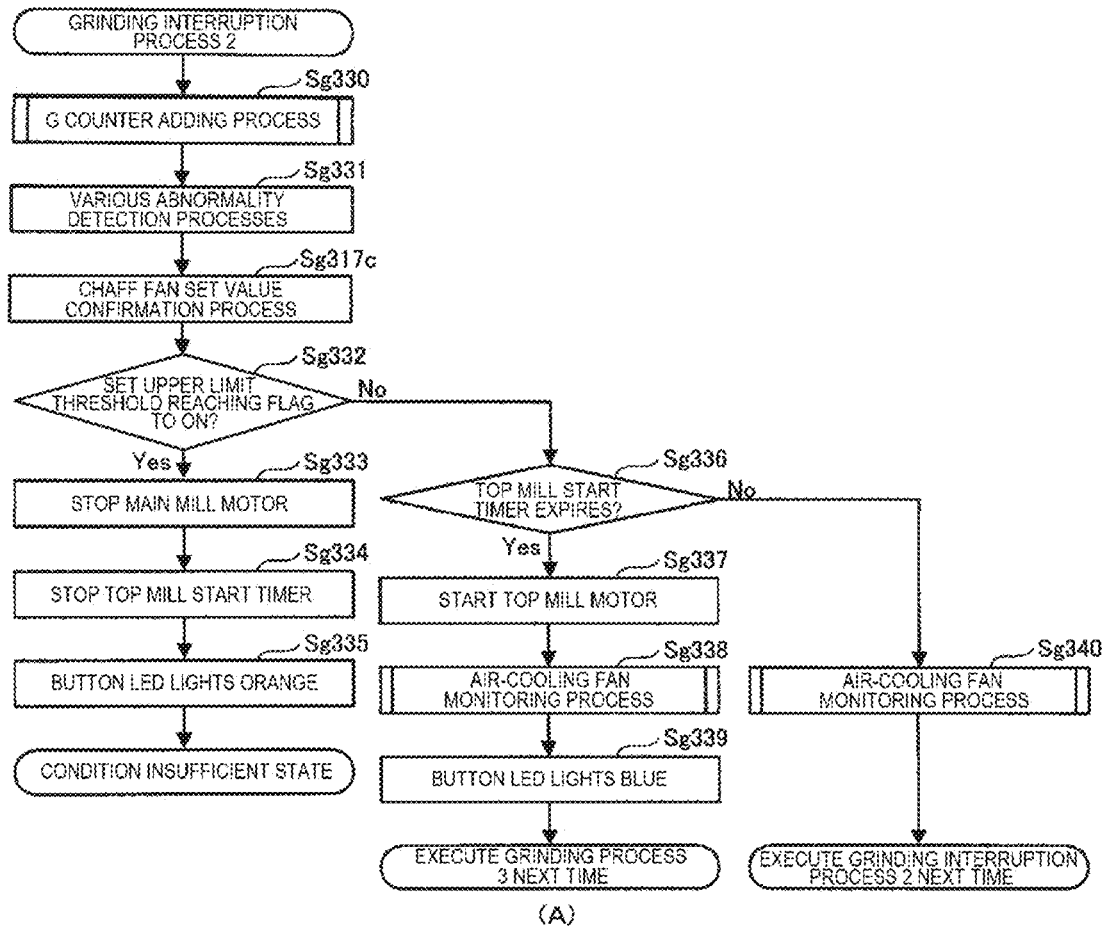
(A)
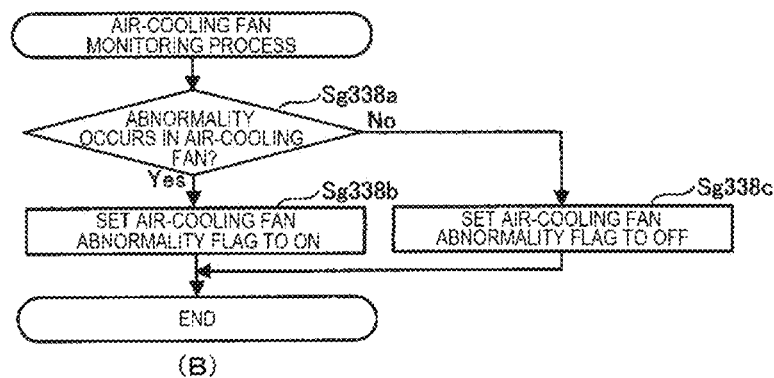
(B)

[Figure 70]
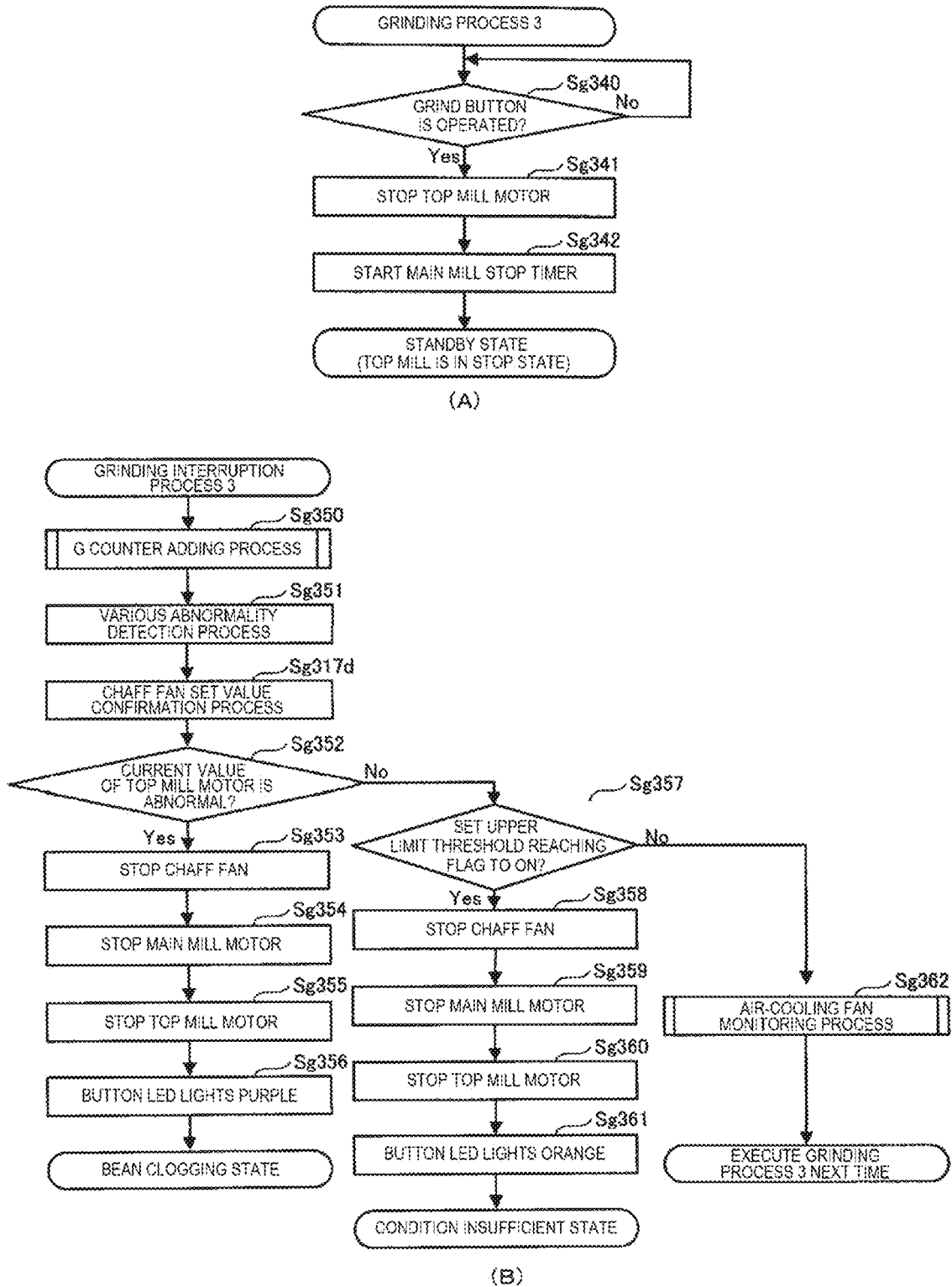

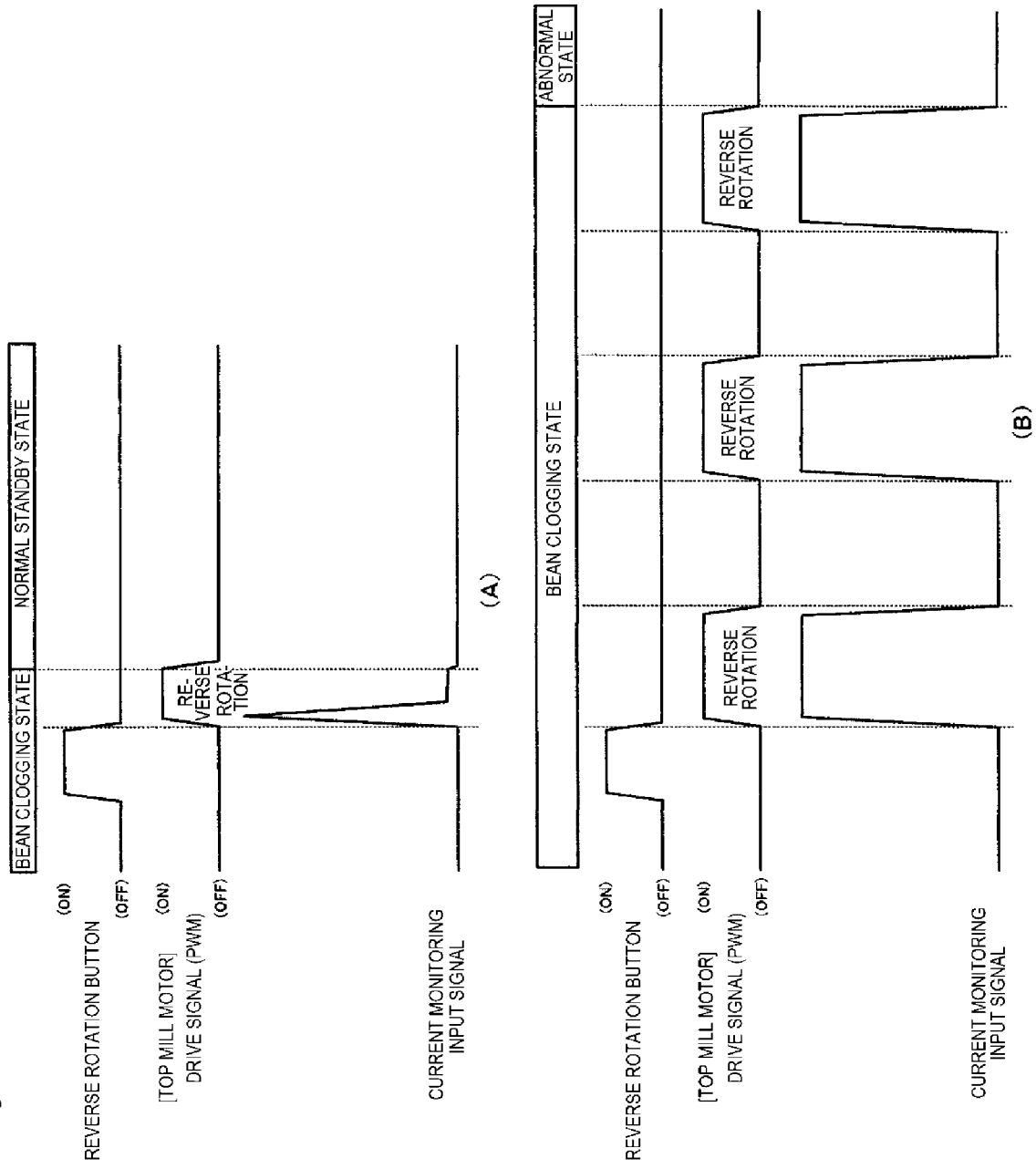
[Figure 71]

[Figure 72]
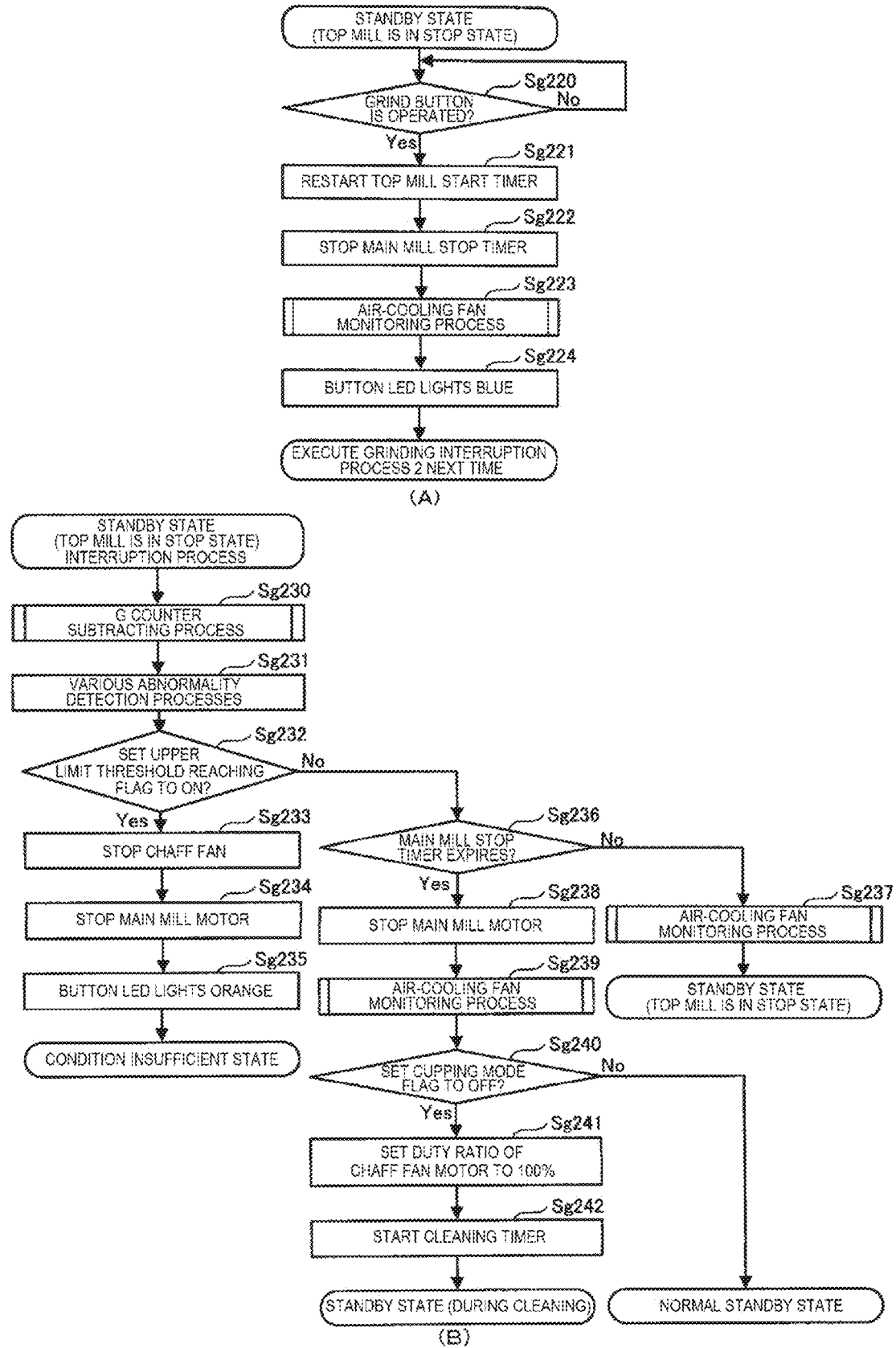

[Figure 73]
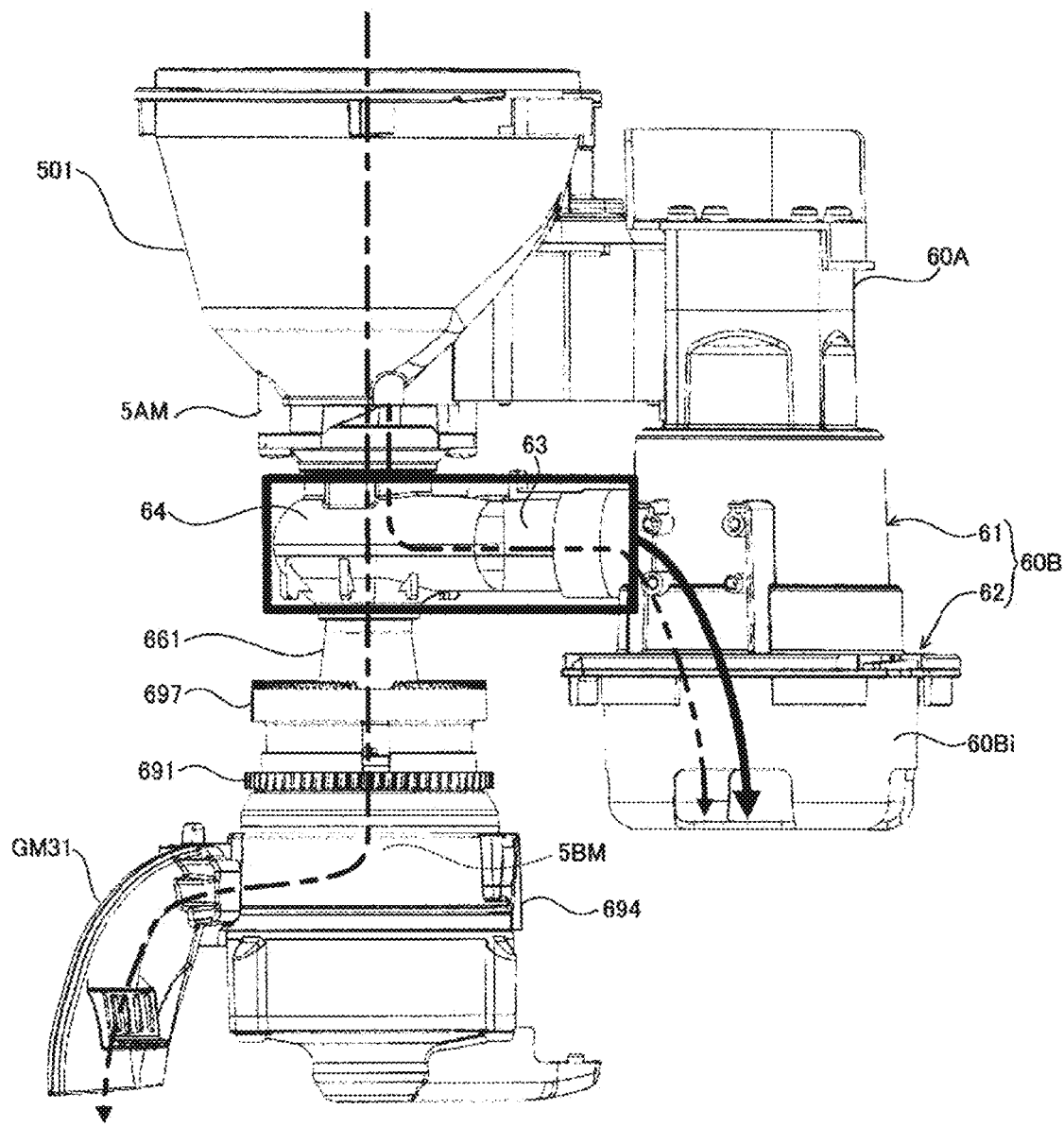

[Figure 74]
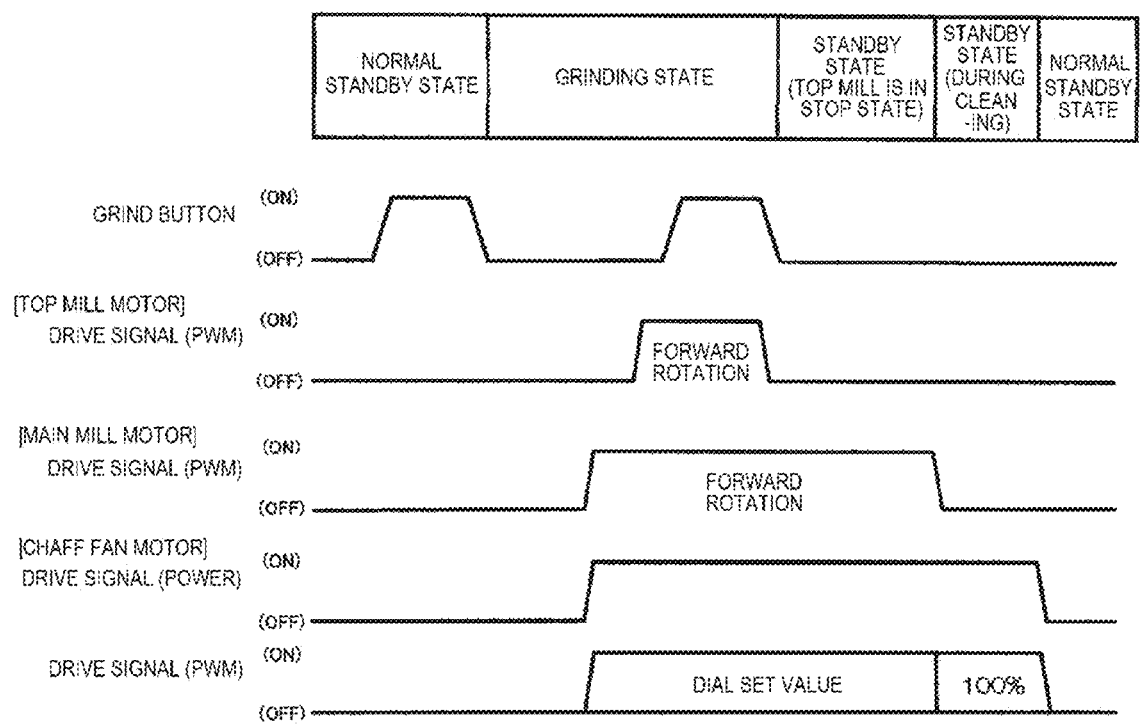

[Figure 75]
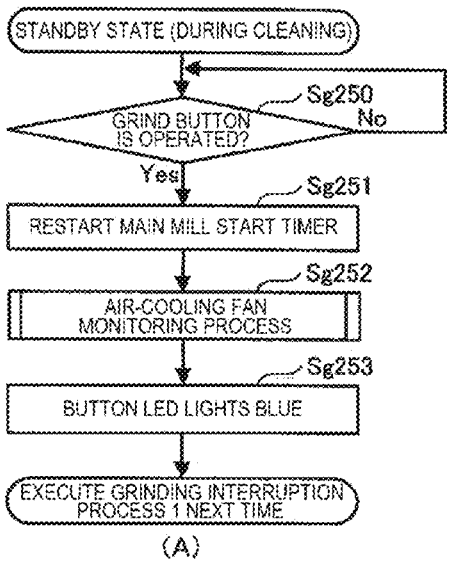
(A)
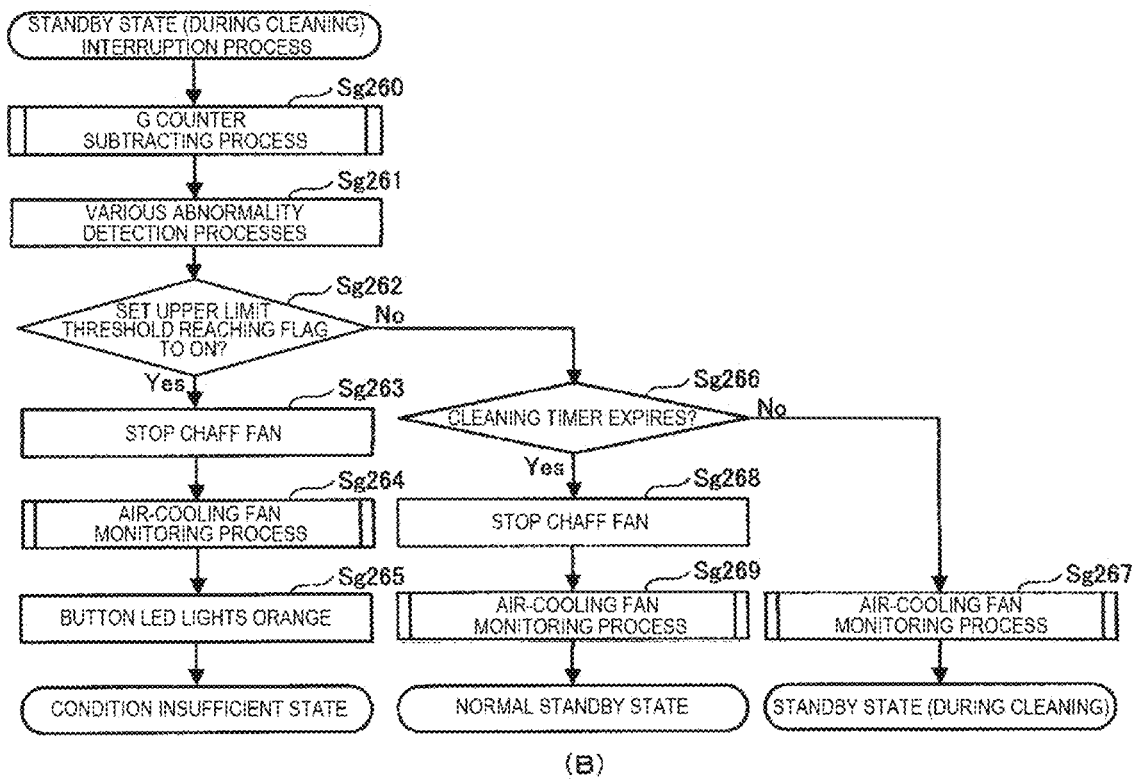
(B)

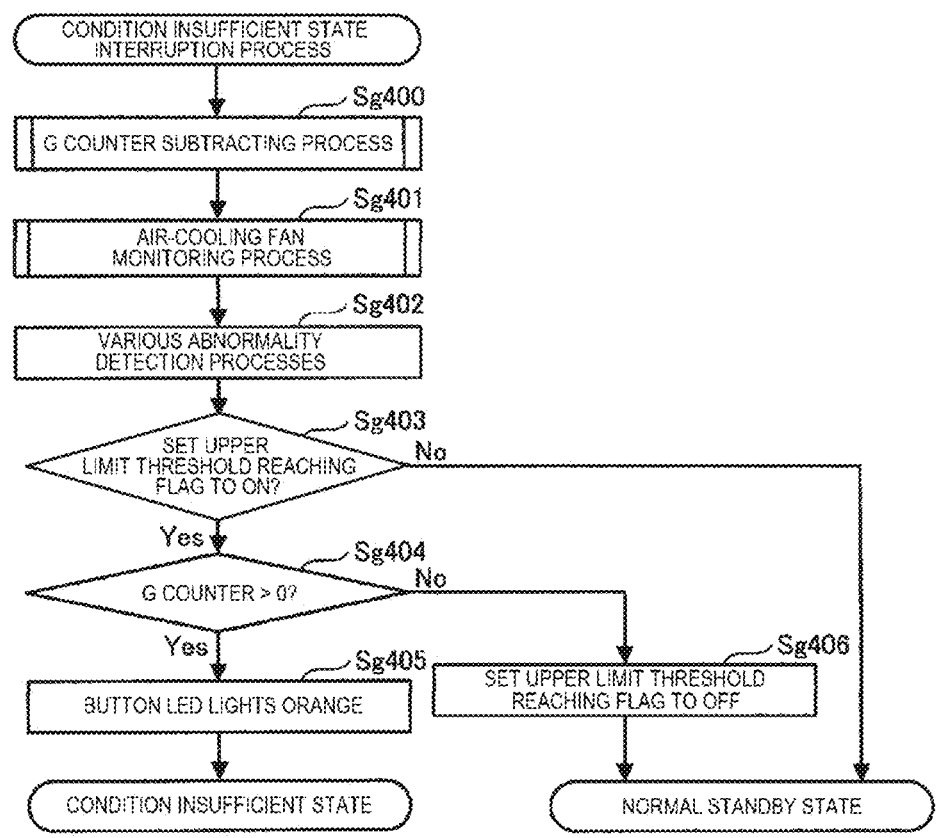
[Figure 76]

[Figure 77]
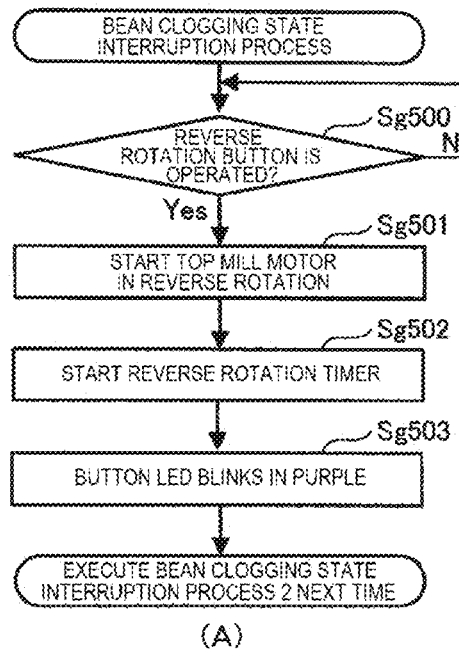
(A)
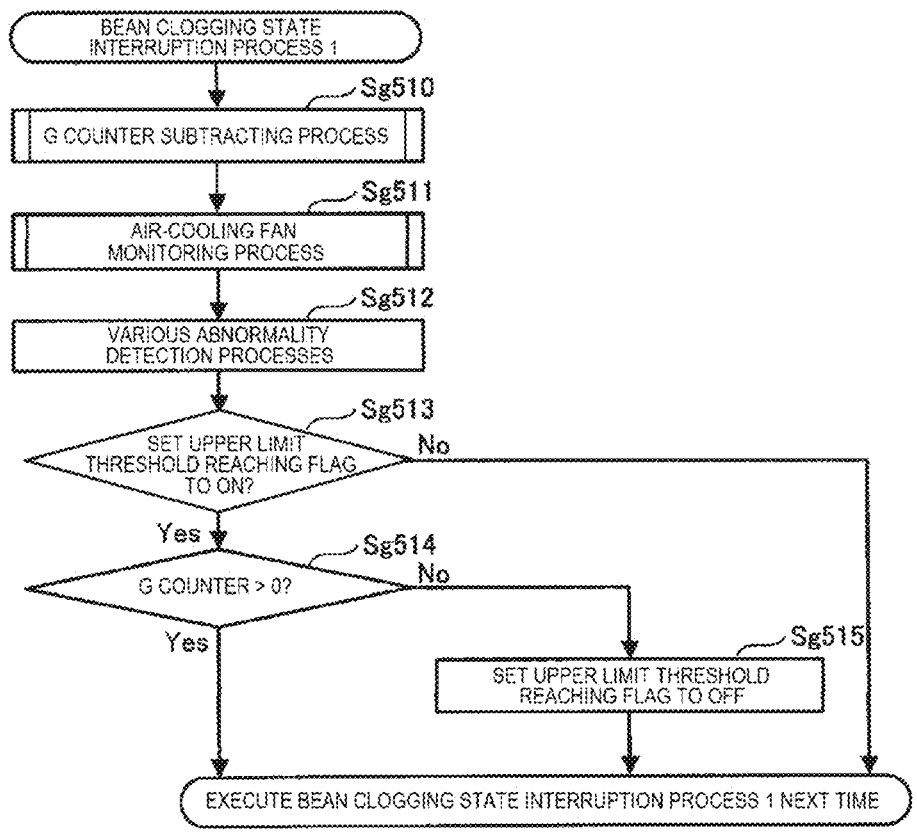
(B)

[Figure 78]
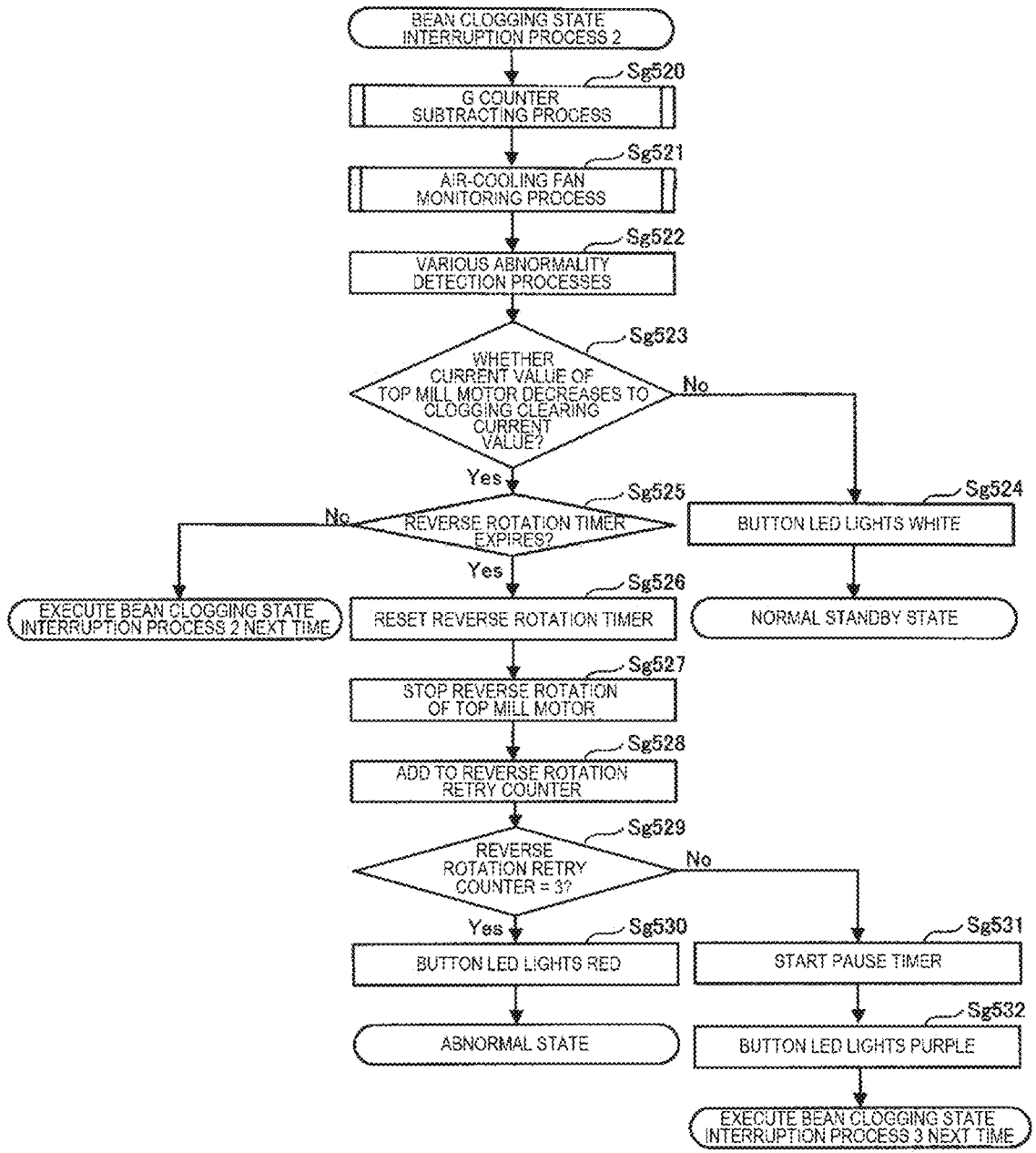

[Figure 79]
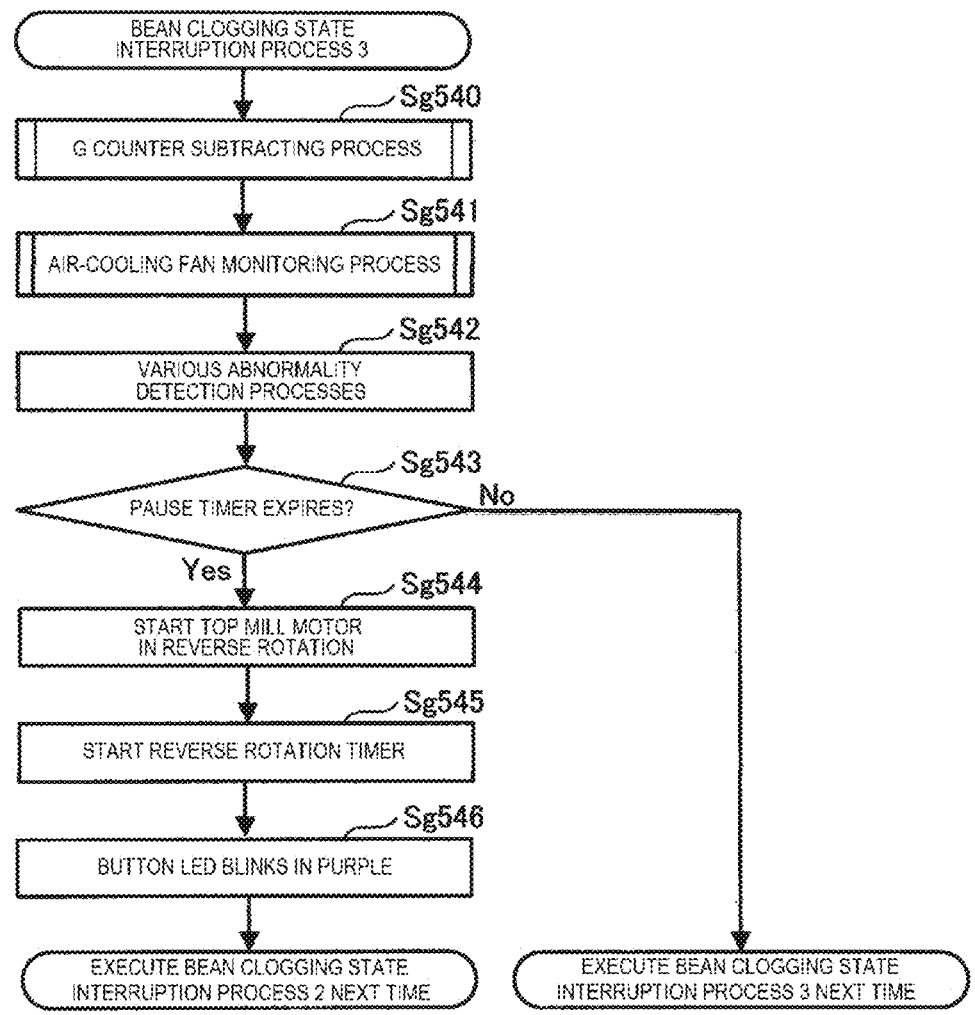

[Figure 80]
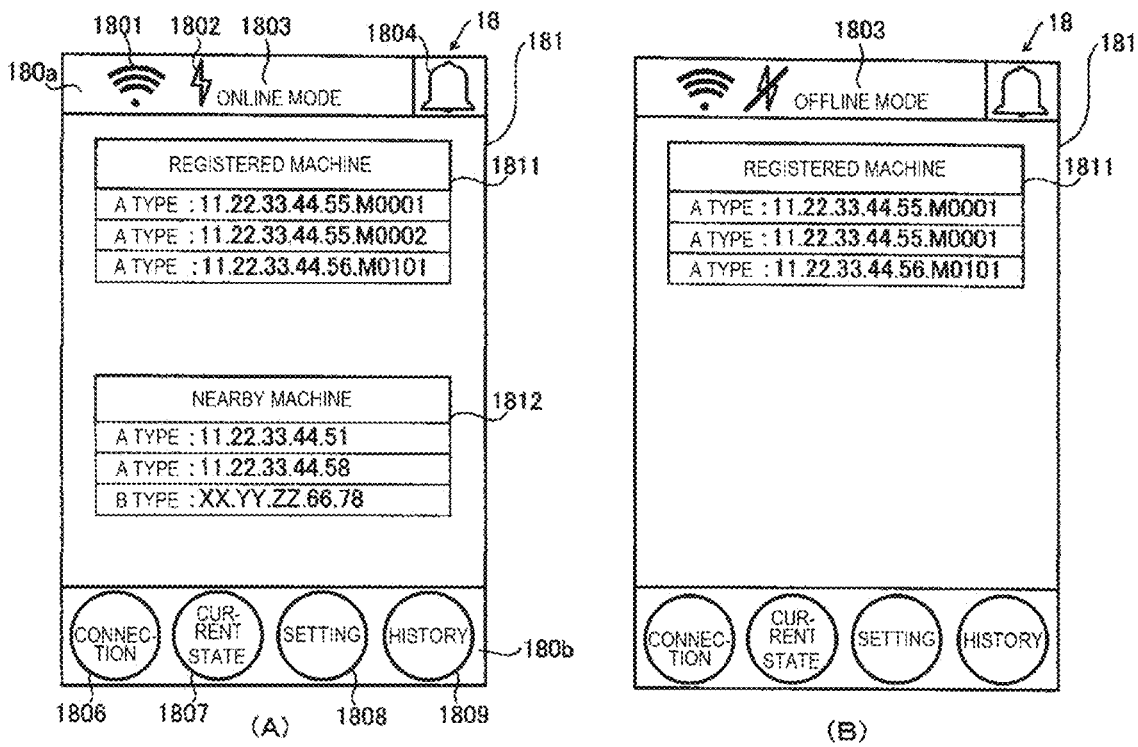
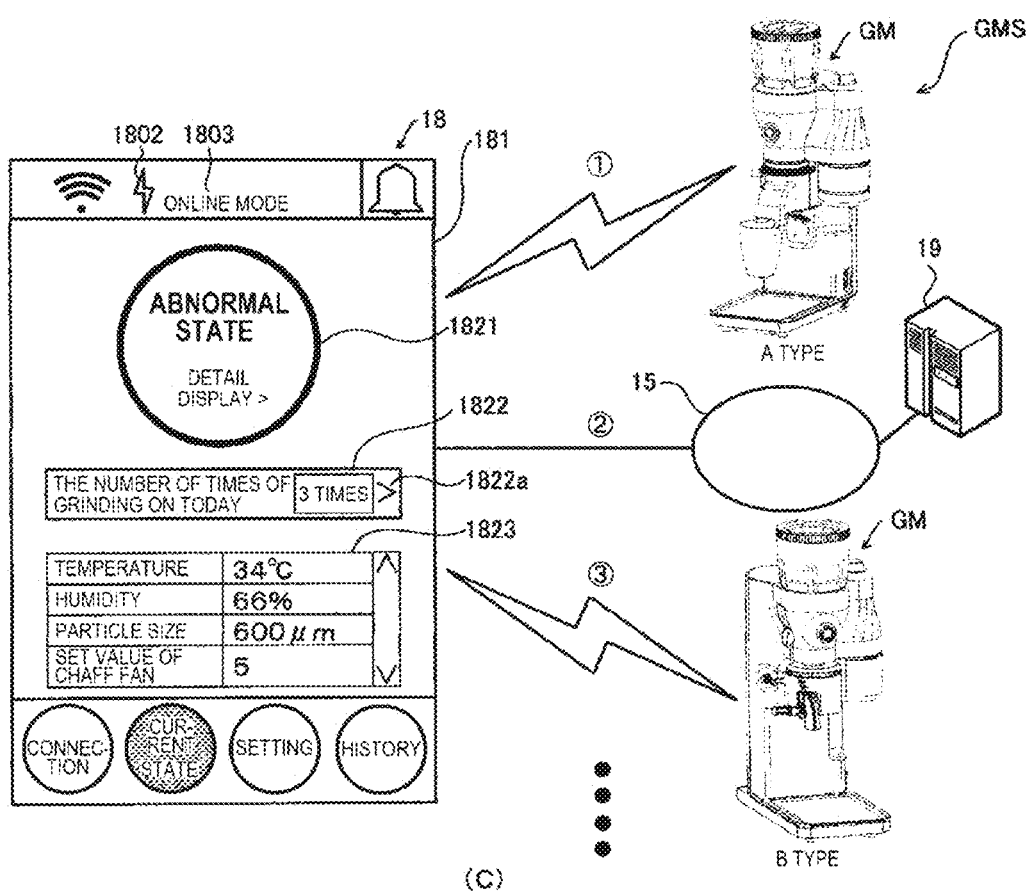

[Figure 81]
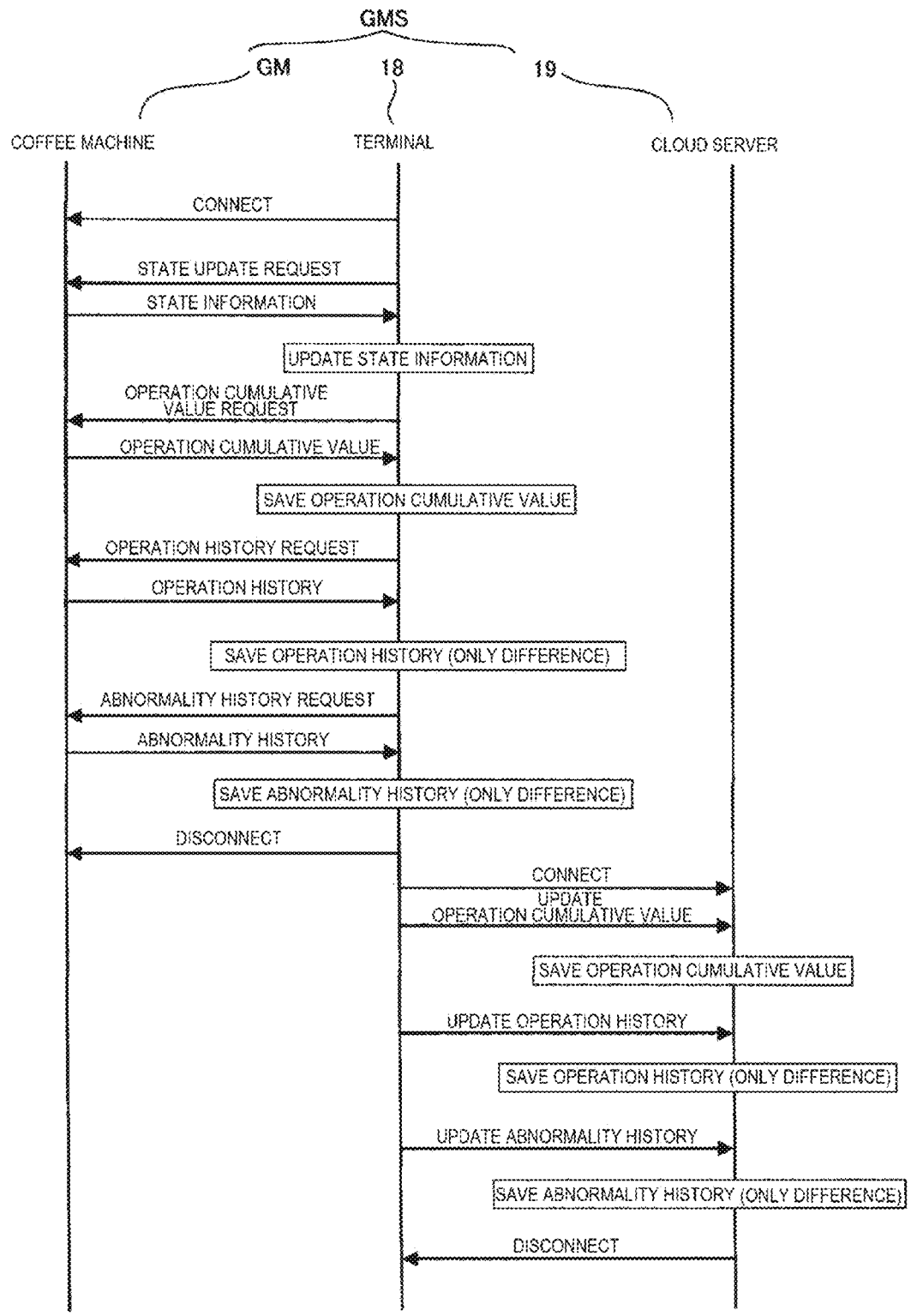

[Figure 82]
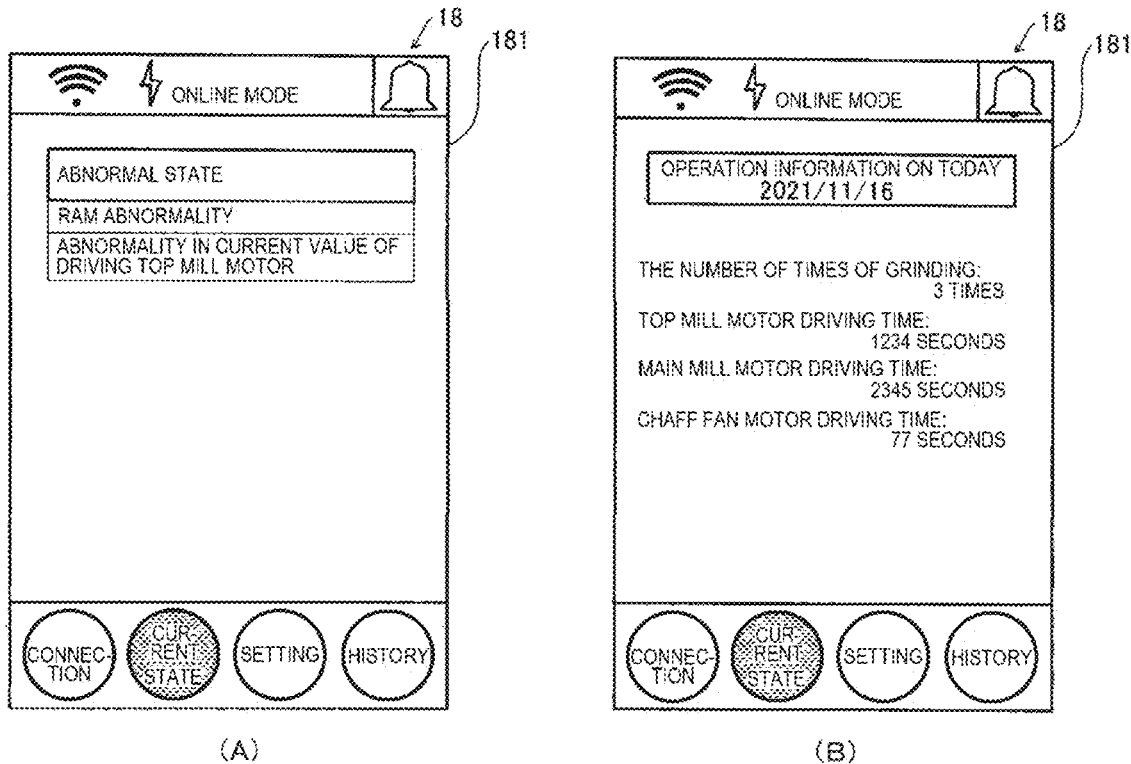
(A)  (B)
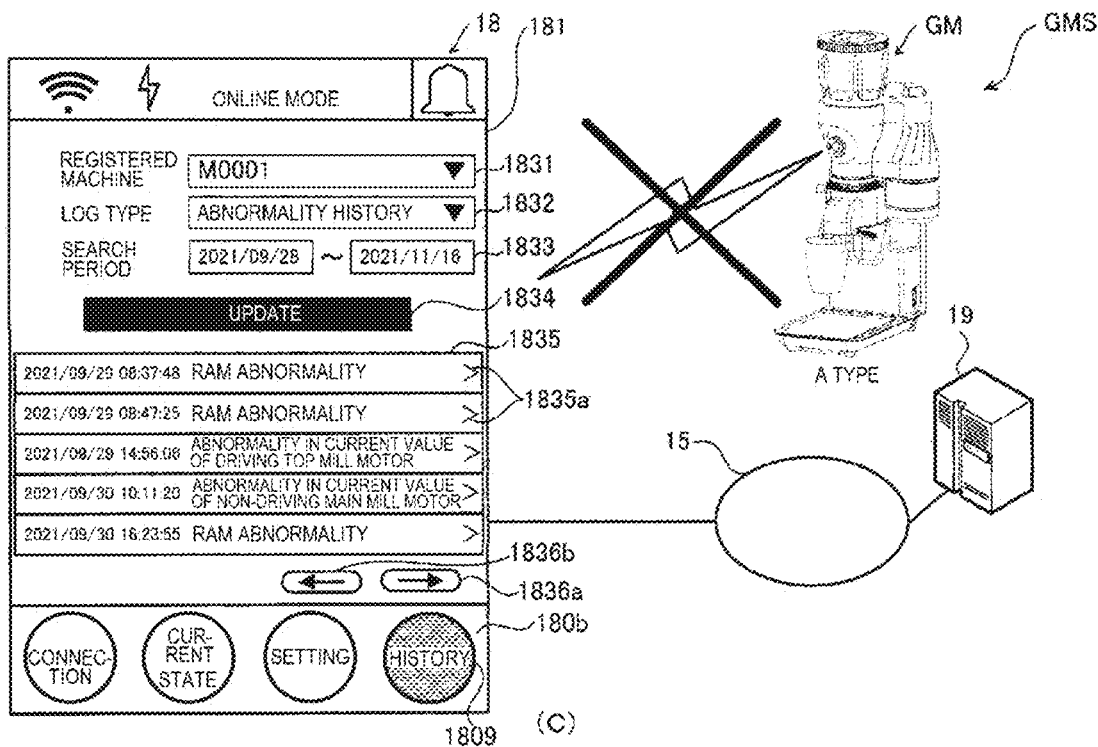
(C)

[Figure 83]
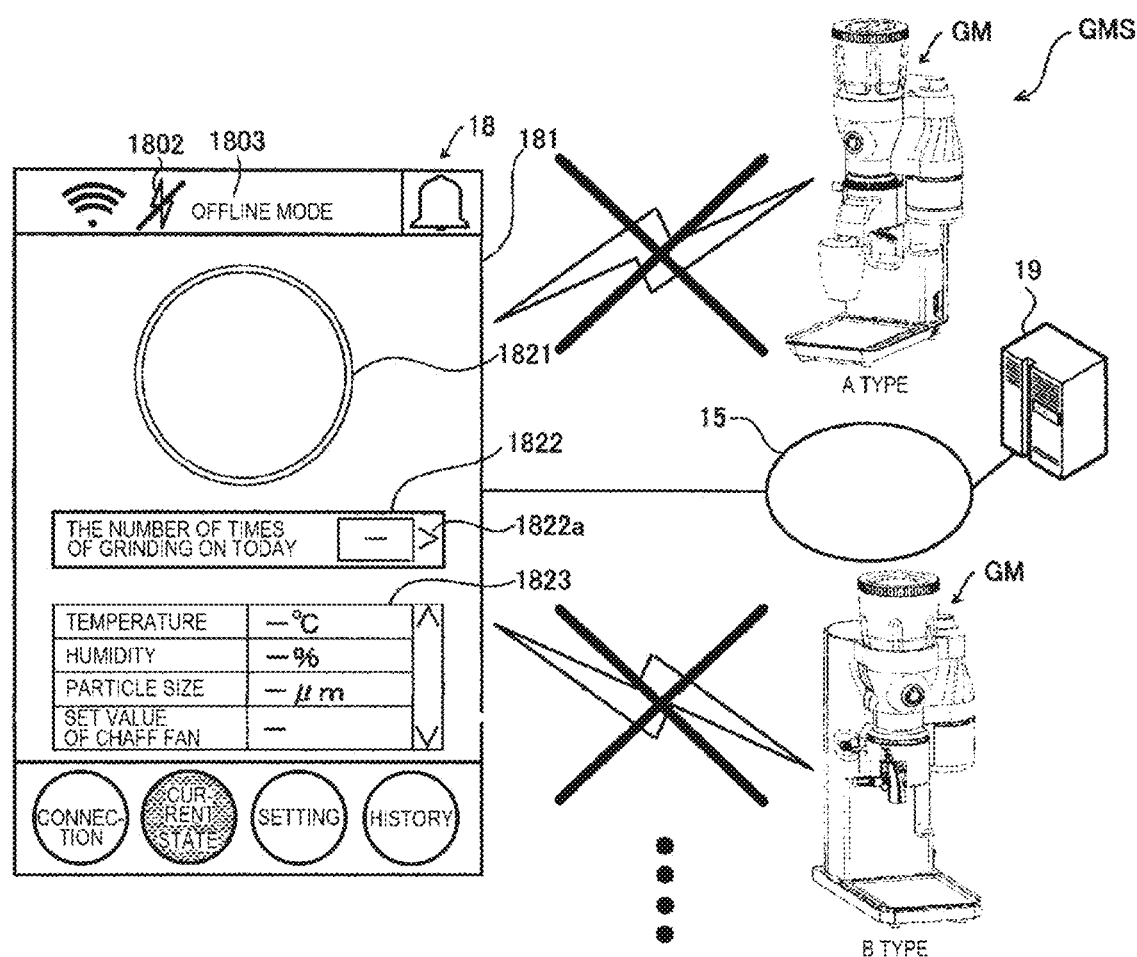

[Figure 84]
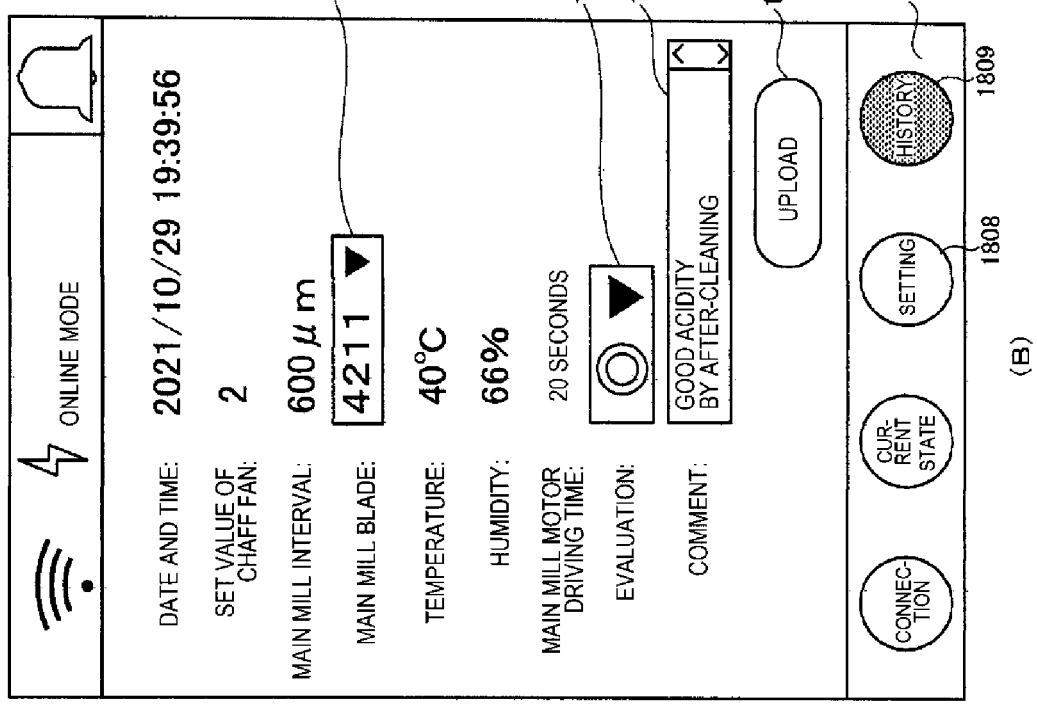
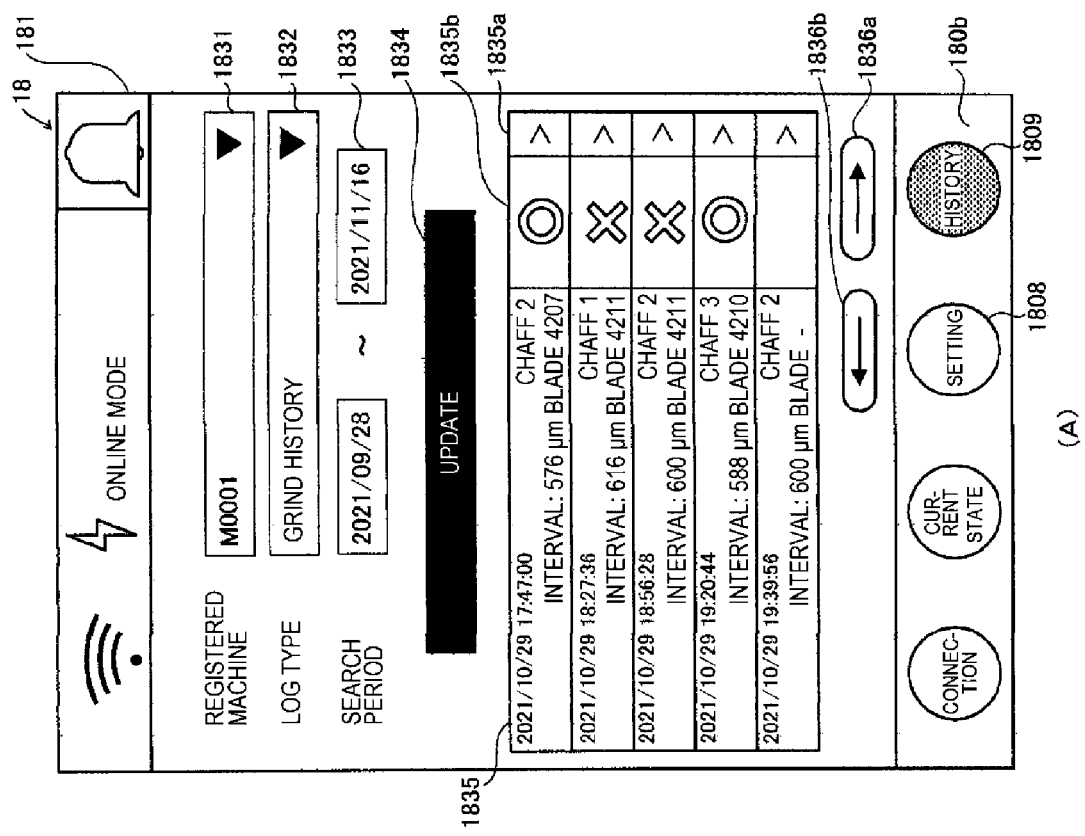
(A)
(B)

[Figure 85]

| | | TIMING | NOTIFICATION CONTENT |
|---|---|---|---|
| 1 | MAIN BODY CLEANING | EVERY TIME GRINDING IS PERFORMED FOR ○ TIMES (FOR EXAMPLE, 10 TIMES) | PLEASE CLEAN MAIN BODY |
| 2 | LOGIN | SOMEONE CONNECTS TO MACHINE FROM TERMINAL | Mr./Ms. A CONNECTS TO ○○○○○ |
| 3 | ABNORMALITY | WHEN ABNORMALITY OCCURS | ○○ ABNORMALITY OCCURS |
| 4 | BEAN CLOGGING | TIMING AT WHICH BEAN CLOGGING IS DETERMINED (WHEN CURRENT VALUE OF TOP MILL IS ABNORMAL) | BEAN CLOGGING OCCURS |
| 5 | MAIN MILL INTERVAL | SETTING OF MAIN MILL INTERVAL IS CHANGED | SETTING OF INTERVAL IS CHANGED 2-2 → 3-4 |
| 6 | SET VALUE OF CHAFF FAN | SET VALUE OF CHAFF FAN IS CHANGED | SET VALUE OF CHAFF FAN IS CHANGED 1 → 3 |
| 7 | BLADE EXCHANGING | BLADE IS EXCHANGED | BLADE IS EXCHANGED PLEASE ADJUST ORIGIN |
| 8 | ORIGIN ADJUSTMENT | ORIGIN ADJUSTMENT OF BLADE IS PERFORMED | ORIGIN ADJUSTMENT IS PERFORMED |
| 9 | BLADE REPLACEMENT | WHEN EXCHANGING OF BLADE IS NECESSARY ACCORDING TO CUMULATIVE VALUE | IT IS TIME TO EXCHANGE BLADE PLEASE CONTACT MAINTENANCE SUPPORT |
| 10 | OVERHAUL | WHEN MAINTENANCE OF ENTIRE MACHINE IS NECESSARY ACCORDING TO CUMULATIVE VALUE | MAINTENANCE IS NECESSARY PLEASE CONTACT MAINTENANCE SUPPORT |
| 11 | CHAFF FAN MOTOR EXCHANGING | WHEN MOTOR IS NECESSARY TO BE EXCHANGED ACCORDING TO CUMULATIVE VALUE | IT IS TIME TO EXCHANGE CHAFF FAN MOTOR PLEASE CONTACT MAINTENANCE SUPPORT |

(A)

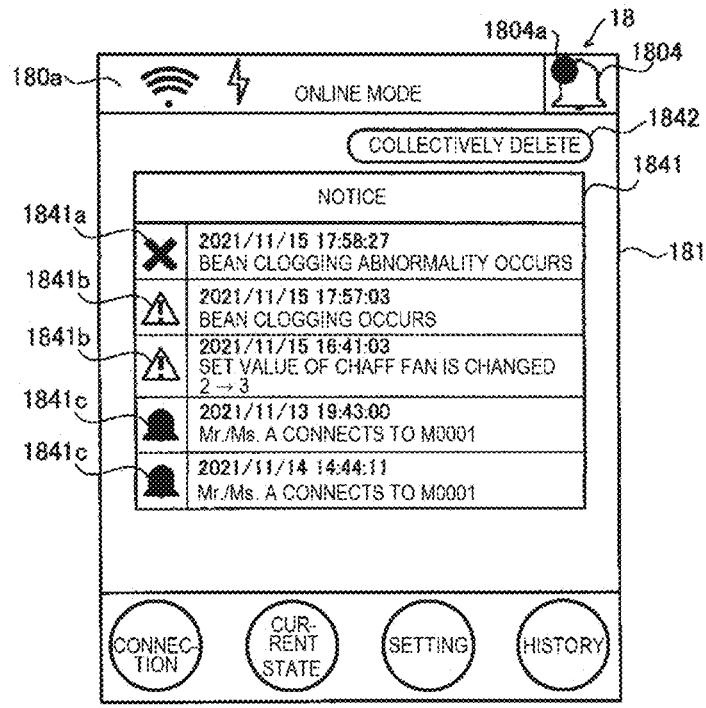

(B)

[Figure 86]
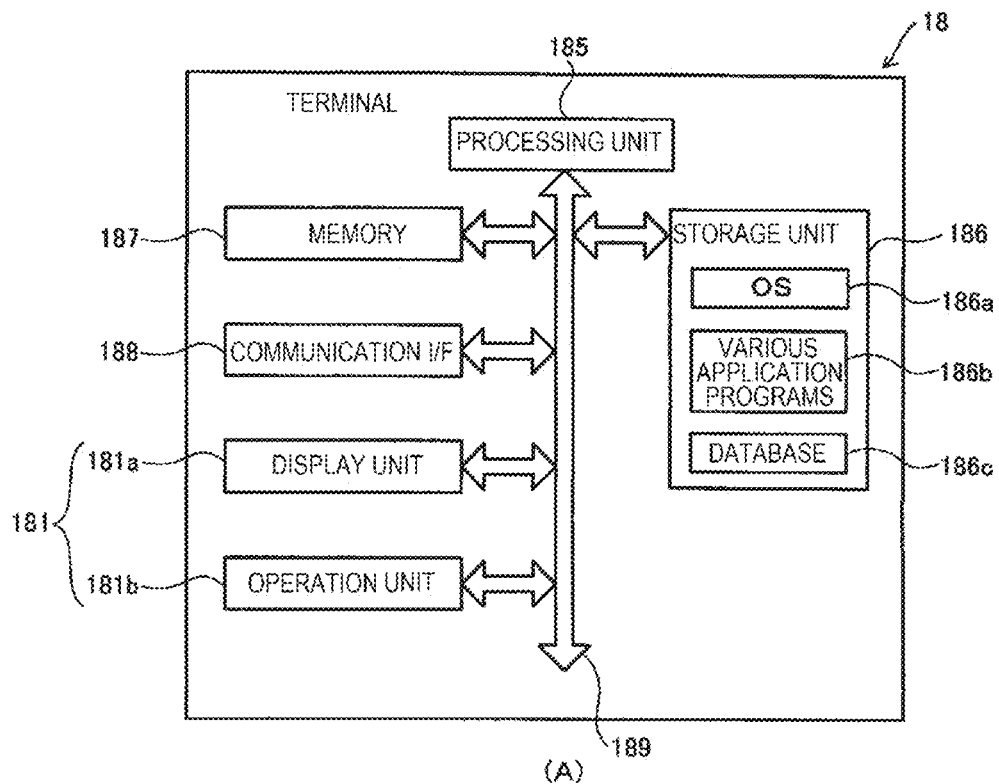
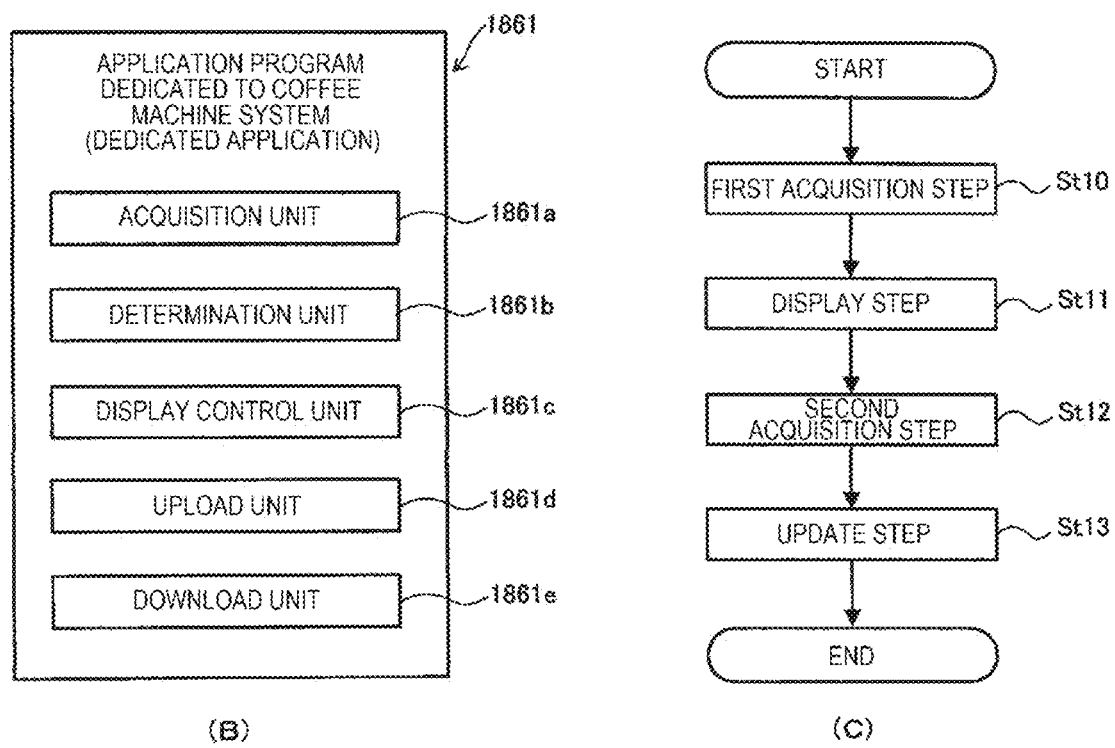

[Figure 87]
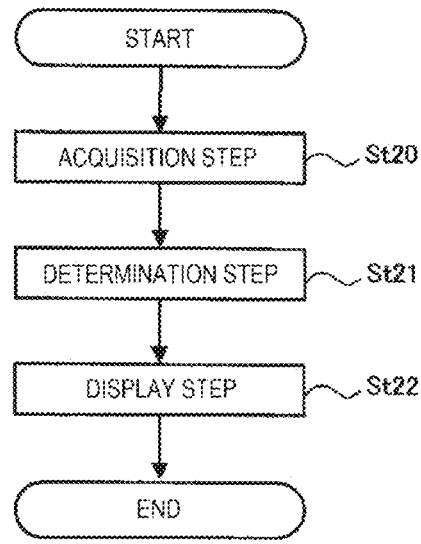
(A)
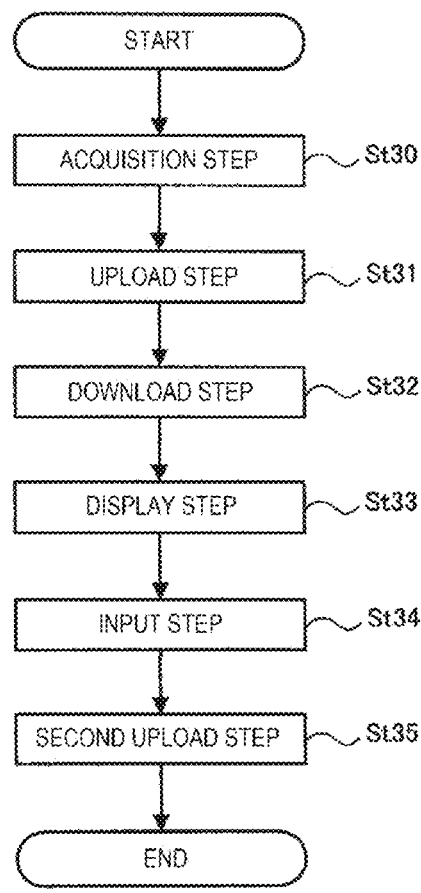
(B)

COFFEE MACHINE

TECHNICAL FIELD

The present invention relates to a coffee machine including a grinder configured to grind coffee beans.

BACKGROUND ART

A coffee machine that performs adjustment using coffee beans has been proposed (for example, Patent Literature 1). The coffee machine proposed in Patent Literature 1 is equipped with a coffee bean grinding mechanism (grinder) and a coffee beverage extraction mechanism. Coffee machines equipped with only a grinder are known.

By the way, waste such as chaff is mixed in ground beans ground by a grinder. The waste is a factor that deteriorates a taste of a coffee beverage obtained by extraction. Therefore, the waste such as chaff is separated from the ground beans using wind pressure.

CITATION LIST

Patent Literature

Japanese Patent Laid-Open No. 2019-30433

SUMMARY OF INVENTION

Technical Problem

However, in the coffee machine in the related art, it may be difficult to achieve an air volume for separating waste such as chaff as a target air volume.

In view of the above circumstances, an object of the present invention is to provide a coffee machine devised to be able to bring an air volume for separating waste such as chaff as close as possible to a target air volume.

Solution to Problem

A coffee machine according to the present invention for achieving the above object is a coffee machine including:
  a first grinder configured to grind coffee beans;
  a fan configured to generate a wind pressure by rotating to separate waste from the ground beans ground by the first grinder;
  a fan motor configured to cause the fan to rotate; and
  a control unit configured to control rotation of the fan motor according to a PWM value corresponding to a set value, in which
  the control unit acquires information related to a rotation speed of the actually rotating fan motor, corrects the PWM value based on the acquired information, and controls the rotation of the fan motor according to the corrected PWM value,
  a storage unit configured to update and store the correction PWM value each time the correction is performed,
  the storage unit is configured to store the corrected PWM value updated and saved even if power is cut, and
  when the power is applied next time, the control unit controls the rotation of the fan motor according to the corrected PWM value at the time of cutting the power, which is stored in the storage unit.

In addition, the control unit may be configured to acquire the information at a predetermined cycle after the power is applied, and correct the PWM value each time the information is acquired.

In addition, a setting unit configured to set the set value may be provided, the setting unit may set one set value selected from a plurality of types of set values as the set value, the control unit may control the rotation of the fan motor according to a PWM value corresponding to the one set value set by the setting unit, the control unit may correct the PWM value according to correction necessary conditions prepared for each of the plurality of types of set values, the storage unit may update and store the corrected PWM value for each of the plurality of types of set values, and when the power is applied next time, the control unit may control the rotation of the fan motor according to, among the corrected PWM values at the time of cutting the power, which are stored in the storage unit, the corrected PWM value corresponding to the one set value selected by the setting unit.

According to this coffee machine, an air volume of the fan can be brought as close as possible to a target air volume.

When the fan motor is a pulse motor and the control unit performs PWM control, the set value is a value representing a duty ratio, and the information is the number of rotation pulses per unit time (pulse speed). A permissible range of the number of rotation pulses with respect to the duty ratio is stored in advance as data, and the control unit monitors the number of rotation pulses per unit time, and when the number of rotation pulses deviates from the permissible range, the control unit acquires a duty ratio corresponding to the actual number of rotation pulses from the data, and corrects a set duty ratio that is set using a difference between the set duty ratio and the duty ratio acquired from the data.

The present invention may be the coffee machine in which the control unit acquires the information at a predetermined cycle [for example, every 6 seconds], and is configured to correct the set value each time the information is acquired.

In this way, the air volume of the fan can be continuously brought as close as possible to the target air volume while the fan is rotating.

The present invention may be the coffee machine further including:
  a setting unit [for example, an air volume dial 60D] configured to set the set value to the control unit, in which
  the setting unit sets one set value selected from a plurality of set values [for example, "setting 1" to "setting 5" ] as the set value, and
  the control unit determines whether correction of the set value is necessary according to a correction necessary condition of one set value selected by the setting unit from correction necessary conditions [for example, correction necessary conditions shown in FIG. 62]prepared for the respective plurality of set values.

According to this coffee machine, it is possible to easily set the set values, determine whether the correction is necessary for each of a plurality of settings, and perform detailed control.

The present invention may be an aspect in which a storage unit configured to store the correction necessary conditions for the respective plurality of set values is provided.

The present invention may be the coffee machine in which the control unit also corrects the set value using the same method [for example, corrects using a common correction formula] when the control unit determines whether the correction of the set value is necessary according to the different correction necessary conditions.

In this way, a capacity of a control program is reduced and a processing load is also reduced.

The present invention may be the coffee machine in which the control unit determines whether further correction of the set value is necessary according to the correction necessary condition of the corrected set value while the fan motor is rotating.

In this way, the air volume of the fan can be continuously brought as close as possible to the target air volume while the fan is rotating.

Advantageous Effects of Invention

According to the present invention, a coffee machine devised to be able to bring an air volume for separating waste such as chaff as close as possible to a target air volume.

BRIEF DESCRIPTION OF DRAWINGS

FIG. 1 is an external view of a beverage production device 1.

FIG. 2 is a partial front view of the beverage production device 1.

FIG. 3 is a schematic diagram of functions of the beverage production device 1.

FIG. 4 is a partially cutaway perspective view of a separation device 6.

FIG. 5 is a perspective view of a drive unit 8 and an extraction container 9.

FIG. 6 is a diagram showing a closed state and an open state of the extraction container 9.

FIG. 7 is a front view showing a configuration of a part of an upper unit 8A and a lower unit 8C.

FIG. 8 is a longitudinal cross-sectional view of FIG. 7.

FIG. 9 is a schematic diagram of a middle unit 8B.

FIG. 10 is a block diagram of a control device 11.

FIG. 11 (A) of FIG. 11 is a flowchart of a control process related to a single coffee beverage production operation, and (B) of FIG. 11 is a flowchart of an extraction process in S3.

FIG. 12 is a perspective view of a pulverizing device 5.

FIG. 13 is a longitudinal cross-sectional view of the pulverizing device 5 shown in FIG. 12.

FIG. 14 is a partially cutaway perspective view of the separation device 6.

FIG. 15 is a longitudinal cross-sectional view of a forming unit 6B.

FIG. 16 is a perspective view and a partially enlarged view of the forming unit 6B.

FIG. 17 is a plan view of the forming unit 6B, and is an explanatory diagram for comparison of cross-sectional areas.

FIG. 18 is an external perspective view of a coffee bean grinding machine.

FIG. 19 is a block diagram of a control device of the coffee bean grinding machine.

FIG. 20 (a) of FIG. 20 is a diagram showing a coffee bean grinding machine GM to which a hopper unit 402 is attached instead of a canister accommodation unit 401 shown in FIG. 18, and (b) of FIG. 20 is a diagram showing the coffee bean grinding machine GM to which a funnel unit 403 is attached.

FIG. 21 (a) of FIG. 21 is a diagram schematically showing a state in which a weighing unit 404 is attached to an option attachment portion GM11, and (b) of FIG. 21 is a perspective view showing an electric screw conveyor ESC.

FIG. 22 is a diagram showing some aspects of a cover member 460 disposed in a downstream end opening 4042o of a conveying passage 4042.

FIG. 23 is a schematic diagram showing further aspects of the cover member 460.

FIG. 24 (a) of FIG. 24 is a diagram showing a state in which a lid unit GM21 for opening and closing a bean outlet GM20 provided in a center casing GM10 of the coffee bean grinding machine GM is closed, and (b) of FIG. 24 is a diagram showing a state in which the lid unit GM21 is opened.

FIG. 25 is a diagram showing a main configuration of the pulverizing device 5 built in the coffee bean grinding machine GM in a posture in which a guide passage forming member GM22 faces the front.

FIG. 26 is a perspective view of a first grinder 5A.

FIG. 27 is a flowchart showing a grinding process of the first grinder 5A, which is executed by a processing unit 11a shown in FIG. 19.

FIG. 28 (a) of FIG. 28 is a diagram showing the separation device 6, and (b) of FIG. 28 is a diagram showing a state in which an outer circumferential wall 61a of an upper portion 61 of a collection container 60B is removed.

FIG. 29 (a) of FIG. 29 is a perspective view of the separation device 6 from which an outer case 60Bo is removed as viewed obliquely from below, and (b) of FIG. 29 is a diagram showing a positional relation between the outer case 60Bo and an inner case 60Bi by seeing through the outer case 60Bo.

FIG. 30 (a) of FIG. 30 is a diagram schematically showing a phenomenon such as an air flow in the separation device shown in FIG. 29, and (b) of FIG. 30 is a diagram schematically showing a phenomenon such as an air flow in a separation device according to a modification.

FIG. 31 is a diagram in which a manual setting disc dial 695 shown in FIG. 25 is removed so that the entire coupling duct 661 can be seen.

FIG. 32 is a diagram schematically showing a configuration of a second grinder 5B.

FIG. 33 is a flowchart showing steps of calibration executed in an initial operation.

FIG. 34 is a diagram showing a state of calibration in stages.

FIG. 35 is a diagram showing the second grinder 5B in a grinding process.

FIG. 36 (a) of FIG. 36 is a diagram showing the manual setting disc dial 695 and a fine adjustment knob dial 696 together with a second motor 503a, and (b) of FIG. 36 is a diagram showing a coupling dial 697 and a rotation shaft 6961 of the fine adjustment knob dial 696 with the manual setting disc dial 695 and the second motor 503a removed.

FIG. 37 is a flowchart showing a control process of the processing unit 11a in the grinding process.

FIG. 38 is a flowchart showing a control process executed by the processing unit 11a when a grinding process is executed according to order information.

FIG. 39 is a diagram showing an example of data stored in a server 16.

FIG. 40 is a diagram showing an example of an order information input screen.

FIG. 41 is a diagram showing an example of an input screen in a state in which order information is input.

FIG. 42 is a diagram showing a state when the order information is input.

FIG. 43 is a diagram showing a state when the order information is changed.

FIG. 44 is a diagram showing an example of control parameters of the second grinder 5B for an order.

FIG. 45 is a diagram showing an example of display during execution of the grinding process.

FIG. 46 (a) of FIG. 46 is a diagram showing an example of a porter filter used when producing an espresso beverage, (b) of FIG. 46 is a diagram showing a state in which a basket PFb held by a holding portion PFr is attached to a chute GM31 of the coffee bean grinding machine with a handle PFh being held, and (c) of FIG. 46 is a diagram schematically showing a state in which ground beans ground in a grinding way from a fine grind state to a coarse grind state clogs the basket PFb, and are subject to leveling and tamping.

FIG. 47 (a) of FIG. 47 is a perspective view showing a single rotary blade 58a constituting the first grinder 5A, and (b) of FIG. 47 is a diagram showing a modification of the pulverizing device 5 shown in FIG. 25 and the like.

FIG. 48 is a diagram schematically showing a hammer mechanism according to a modification together with a chute.

FIG. 49 is a diagram showing a striking operation of a hammer H10 in stages.

FIG. 50 is a diagram showing in stages a holding operation of holding a cup CP by a holding portion H121 of the hammer H10 and a fixed holding member GM33.

FIG. 51 shows perspective views of a coffee bean grinding machine according to a second embodiment.

FIG. 52 (A) of FIG. 52 is an enlarged view showing a state in which a front cover GM40 is removed from a coffee bean grinding machine GM shown in FIG. 51, and (B) of FIG. 52 is an exploded perspective view of a hammer mechanism H1.

FIG. 53 (A) of FIG. 53 is a side view of the hammer H10, and (B) of FIG. 53 is a perspective view showing the hammer H10 and the chute GM31 from below.

FIG. 54 (A) of FIG. 54 is a perspective view showing a rotary blade 58b and a fixed blade 57b positioned at an initial position and farthest from the rotary blade 58b, (B) of FIG. 54 is a perspective view showing only the rotary blade 58b with the fixed blade 57b removed from the state shown in (A) of FIG. 54, and (C) of FIG. 54 is a diagram showing a rotary base 59.

FIG. 55 (A) of FIG. 55 is a plan view of the rotary blade 58b, (B) of FIG. 55 is a diagram shown in cross-section to enable visualization of a first smooth portion 584 to a third flat portion 586, and (C) of FIG. 55 is a diagram shown in cross-section to enable visualization of the third smooth portion 586 and a fourth flat portion 587.

FIG. 56 (A) of FIG. 56 is a perspective view enabling visualization of a mechanical switch unit 600 with the manual setting disc dial 695 and a coupling duct (not shown) shown in FIG. 51 removed, and (B) of FIG. 56 is a plan view of the portions shown in (A).

FIG. 57 (A) of FIG. 57 is an enlarged view showing an inside of frames of a one-dot chain line in (B) of FIG. 56, and (B) of FIG. 57 is a view showing an internal structure of the mechanical switch unit 600 shown in (A).

FIG. 58 (A) of FIG. 58 is a diagram showing a lock lever 640 and a gear lock portion 641, and (B) of FIG. 58 is a diagram showing an example of a detection signal output from the mechanical switch unit 600 and a count value of a particle size adjustment counter.

FIG. 59 is a table showing a part of a relation between the count value of the particle size adjustment counter and a main mill interval.

FIG. 60 is a table showing 0th to 105th pulses of a reference table in PWM control of a chaff fan motor 60A2, which is performed by the processing unit 11a.

FIG. 61 is a table showing 106th to 255th pulses of the reference table.

FIG. 62 is a table showing a relation between a set value of the chaff fan 60A1 and a duty ratio in the PWM control.

FIG. 63 is a transition diagram of operating states in the coffee bean grinding machine GM according to the second embodiment.

FIG. 64 is a flowchart showing a flow of a starting process in the processing unit 11a when power is applied and the coffee bean grinding machine GM is started.

FIG. 65 (A) of FIG. 65 is a flowchart showing a flow of a normal standby state process executed by the processing unit 11a in a normal standby state, and (B) of FIG. 65 is a flowchart showing a flow of a normal standby state interruption process executed by the processing unit 11a in the normal standby state.

FIG. 66 is a timechart showing an example of fluctuation in a count value of a G counter.

FIG. 67 is a flowchart showing a flow of a G counter subtracting process.

FIG. 68 (A) of FIG. 68 is a flowchart showing a flow of a grinding interruption process 1 executed by the processing unit 11a in a grind state, and (B) of FIG. 68 is a flowchart showing a flow of a G counter adding process.

FIG. 69 (A) of FIG. 69 is a flowchart showing a flow of a grinding interruption process 2 executed by the processing unit 11a in the grind state, and (B) of FIG. 69 is a flowchart showing a flow of an air-cooling fan monitoring process.

FIG. 70 (A) of FIG. 70 is a flowchart showing a flow of a grinding process 3 executed by the processing unit 11a in the grind state, and (B) of FIG. 70 is a flowchart showing a flow of a grinding interruption process 3 executed by the processing unit 11a in the grind state.

FIG. 71 (A) of FIG. 71 is a diagram showing an example in which a bean clogging state is eliminated, and (B) of FIG. 71 is a diagram showing an example in which a current value of a top mill motor does not decrease to a clogging clearing current value even when a drive signal for reversely rotating the top mill motor is output three times with time intervals.

FIG. 72 (A) of FIG. 72 is a flowchart showing a flow of a standby state (a top mill is in a stop state) process executed by the processing unit 11a in a standby state (the top mill is in the stop state), and (B) of FIG. 72 is a flowchart showing a flow of a standby state (the top mill is in the stop state) interruption process executed by the processing unit 11a in the standby state (the top mill is in the stop state).

FIG. 73 is a diagram showing a path for coffee beans, a path for waste such as chaff, and a path for after-cleaning.

FIG. 74 is a diagram showing an example in which the waste such as chaff is aspirated while a top mill 5AM is rotating, and the after-cleaning is performed by a stronger aspiration without stopping the aspiration even if the top mill 5AM stops.

FIG. 75 (A) of FIG. 75 is a flowchart showing a flow of a standby state (during cleaning) process executed by the processing unit 11a in a standby state (during cleaning), and (B) of FIG. 75 is a flowchart showing a flow of a standby state (during cleaning) interruption process executed by the processing unit 11a in the standby state (during cleaning).

FIG. 76 is a flowchart showing a flow of a condition insufficient state interruption process executed by the processing unit 11a in a condition insufficient state.

FIG. 77 (A) of FIG. 77 is a flowchart showing a flow of a bean clogging state process executed by the processing unit 11a in the bean clogging state, and (B) of FIG. 77 is a flowchart showing a flow of a bean clogging state interruption process 1 executed by the processing unit 11a in the bean clogging state.

FIG. 78 is a flowchart showing a flow of a bean clogging state interruption process 2 executed by the processing unit 11a in the bean clogging state.

FIG. 79 is a flowchart showing a flow of a bean clogging state interruption process 3 executed by the processing unit 11a in the bean clogging state.

FIG. 80 is a diagram showing a display screen of a terminal.

FIG. 81 is a diagram showing exchange of various types of information in a coffee machine system GMS, which is executed by tapping a current state icon 1807 displayed on a display screen 181 of a terminal 18 in an online mode.

FIG. 82 (A) of FIG. 82 is a diagram showing the display screen 181 on which an abnormal state detail page is displayed by tapping detail display of an operating state display 1821 shown in (C) of FIG. 80, (B) of FIG. 82 is a diagram showing the display screen 181 on which an operation information detail page is displayed by tapping a next page display icon 1822a of a number-of-times-of-grinding display 1822 shown in (C) of FIG. 80, and (C) of FIG. 82 is a diagram showing the display screen 181 on which a log page is displayed.

FIG. 83 is a diagram showing the display screen 181 on which a status page of a first selected machine in an offline mode is displayed.

FIG. 84 (A) of FIG. 84 is a diagram showing the display screen 181 on which a log page with "grind history" selected is displayed, and (B) of FIG. 84 is a diagram showing the display screen 181 on which a grind history detail page is displayed.

FIG. 85 (A) of FIG. 85 is a table summarizing a notification timing and a notification content for each notification, and (B) of FIG. 85 is a diagram showing the display screen 181 on which a notice page is displayed.

FIG. 86 (A) of FIG. 86 is a diagram showing a configuration of the terminal 18, (B) of FIG. 86 is a schematic diagram showing an outline of an application program (dedicated application) dedicated to the coffee machine system GMS installed in a storage unit 186 shown in (A) of FIG. 86, and (C) of FIG. 86 is a flowchart showing a flow of a status information display method executed by the terminal 18 shown in (A) of FIG. 86.

FIG. 87 (A) of FIG. 87 is a flowchart showing a flow of an information processing method executed by the terminal 18 shown in (A) of FIG. 86, and (B) of FIG. 87 is a flowchart showing a flow of an information display method executed by the terminal 18 shown in (A) of FIG. 86.

DESCRIPTION OF EMBODIMENTS

Embodiments according to the present invention will be described with reference to the drawings.

<1. Overview of Beverage Production Device>

FIG. 1 is an external view of a beverage production device 1. The beverage production device 1 shown in FIG. 1 is a device for automatically producing a coffee beverage from roasted coffee beans and a liquid (here, water), and can produce a coffee beverage for one cup per one production operation. The roasted coffee beans as a raw material can be accommodated in canisters 40. A cup placing portion 110 is provided in a lower portion of the beverage production device 1, and a produced coffee beverage is poured into a cup from a pouring portion 10c.

The beverage production device 1 includes a housing 100 that forms an exterior of the beverage production device 1 and encloses an internal mechanism. The housing 100 is roughly divided into a main body portion 101 and a cover portion 102 that covers a part of a front surface and a part of a side surface of the beverage production device 1. The cover portion 102 is provided with an information display device 12. The information display device 12 shown in FIG. 1 is a touch panel type display, and is capable of receiving an input from an administrator of the device or a beverage consumer in addition to displaying various types of information. The information display device 12 is attached to the cover portion 102 via a moving mechanism 12a, and can be moved in a predetermined range in an upper-lower direction by the moving mechanism 12a.

The cover portion 102 is provided with a bean inlet 103 and an opening and closing door 103a that opens and closes the bean inlet 103. Roasted coffee beans different from the roasted coffee beans accommodated in the canisters 40 can be input to the bean inlet 103 by opening the opening and closing door 103a. As a result, it is possible to provide a cup of special beverage to a beverage consumer.

The cover portion 102 shown in FIG. 1 is made of a translucent material such as acrylic or glass, and constitutes a transparent cover whose entire body is a transmissive portion. Therefore, an inner mechanism covered by the cover portion 102 can be visually recognized from the outside. In the beverage production device 1 shown in FIG. 1, a part of a production portion for producing a coffee beverage can be visually recognized through the cover portion 102. The main body portion 101 shown in FIG. 1 is entirely a non-transmissive portion, and it is difficult to visually recognize the inside of the main body portion 101 from the outside.

FIG. 2 is a partial front view of the beverage production device 1, and is a diagram showing a part of the production portion that can be visually recognized by a user in a front view of the beverage production device 1. The cover portion 102 and the information display device 12 are shown by imaginary lines.

The housing 100 in a front portion of the beverage production device 1 has a double structure of the main body portion 101 and the cover portion 102 on an outer side (front side) of the main body portion 101. A part of mechanisms of the production portion are disposed between the main body portion 101 and the cover portion 102 in a front-rear direction, and can be visually recognized by a user through the cover portion 102.

A part of the mechanisms of the production portion that can be visually recognized by a user through the cover portion 102 include a collective conveying portion 42, a first grinder 5A, a second grinder 5B, a separation device 6, an extraction container 9, and the like. A rectangular concave portion 101a recessed in a rear side is formed in a front portion of the main body portion 101, and the extraction container 9 and the like are positioned in a rear side of the concave portion 101a.

Since these mechanisms can be visually recognized from the outside through the cover portion 102, an administrator may easily inspect or check the operation. In addition, a beverage consumer may enjoy a process of producing a coffee beverage.

A right end portion of the cover portion 102 is supported by the main body portion 101 via a hinge 102a in a manner of freely opening and closing horizontally. An engaging portion 102b is provided at a left end portion of the cover portion 102 to maintain the main body portion 101 and the cover portion 102 in a closed state. The engaging portion 102b is, for example, a combination of a magnet and iron. By opening the cover portion 102, an administrator can inspect a part of the production portion described above on an inner side of the cover portion 102.

The cover portion 102 shown in FIG. 1 is of a horizontal opening type, but may be of a vertical opening type or a slide type. In addition, the cover portion 102 may be configured such that the cover portion 102 cannot be opened or closed.

FIG. 3 is a schematic diagram of functions of the beverage production device 1. The beverage production device 1 includes a bean processing device 2 and an extraction device 3 as the production portion of a coffee beverage.

The bean processing device 2 produces ground beans from the roasted coffee beans. The extraction device 3 extracts a coffee liquid from the ground beans supplied from the bean processing device 2. The extraction device 3 includes a fluid supply unit 7, a drive unit 8 (see FIG. 5) which will be described later, the extraction container 9, and a switching unit 10. The ground beans supplied from the bean processing device 2 are put into the extraction container 9. The fluid supply unit 7 introduces hot water into the extraction container 9. A coffee liquid is extracted from the ground beans in the extraction container 9. The hot water containing the extracted coffee liquid is dispensed into a cup C as a coffee beverage through the switching unit 10.

<2. Fluid Supply Unit and Switching Unit>

Configurations of the fluid supply unit 7 and the switching unit 10 will be described with reference to FIG. 3. First, the fluid supply unit 7 will be described. The fluid supply unit 7 supplies the hot water to the extraction container 9 and controls an atmosphere pressure in the extraction container 9. In the present specification, when the atmosphere pressure is indicated by a numeral, it means an absolute pressure unless otherwise specified, and a gauge pressure means an atmosphere pressure in which an atmospheric pressure is 0 atm. The atmospheric pressure refers to an atmosphere pressure around the extraction container 9 or an atmosphere pressure of the beverage production device 1. For example, when the beverage production device 1 is disposed at a location of 0 meters above sea level, the atmospheric pressure is a standard atmosphere (1013.25 hPa) at 0 meters above sea level of the international standard atmosphere ([abbreviation] ISA) established in 1976 by the international civil aviation organization ([abbreviation] ICAO]).

The fluid supply unit 7 includes pipes L1 to L3. The pipe L1 is a pipe through which air flows, and the pipe L2 is a pipe through which water flows. The pipe L3 is a pipe through which both air and water can flow.

The fluid supply unit 7 includes a compressor 70 as a pressurized source. The compressor 70 compresses and sends out the air. The compressor 70 is driven by, for example, a motor (not shown) as a drive source. The compressed air sent out from the compressor 70 is supplied to a reserve tank (accumulator) 71 via a check valve 71a. An atmosphere pressure in the reserve tank 71 is monitored by a pressure sensor 71b, and the compressor 70 is driven such that the atmosphere pressure is maintained at a predetermined atmosphere pressure (for example, 7 atm (6 atm in gauge pressure)). A drain 71c for draining water is provided in the reserve tank 71, and water generated by the compression of air can be drained.

Hot water (water) constituting a coffee beverage is accumulated in a water tank 72. The water tank 72 is provided with a heater 72a for heating the water in the water tank 72 and a temperature sensor 72b for measuring a temperature of the water. The heater 72a maintains a temperature of the accumulated hot water at a predetermined temperature (for example, 120° C.) based on a detection result of the temperature sensor 72b. For example, the heater 72a is turned on when the temperature of the hot water is 118° C., and is turned off when the temperature of the hot water is 120° C.

The water tank 72 is also provided with a water level sensor 72c. The water level sensor 72c detects a water level of the hot water in the water tank 72. When the water level sensor 72c detects that the water level is lower than a predetermined water level, water is supplied to the water tank 72. The water tank 72 shown in FIG. 3 is supplied with tap water via a water purifier (not shown). An electromagnetic valve 72d is provided in the middle of the pipe L2 from the water purifier, and when a decrease in the water level is detected by the water level sensor 72c, the electromagnetic valve 72d is opened to supply water, and when the water level reaches a predetermined water level, the electromagnetic valve 72d is closed to cut the supply of water. In this way, the hot water in the water tank 72 is maintained at a constant water level. The water may be supplied to the water tank 72 every time the hot water used for producing one coffee beverage is discharged.

The water tank 72 is also provided with a pressure sensor 72g. The pressure sensor 72g detects an atmosphere pressure in the water tank 72. The atmosphere pressure in the reserve tank 71 is supplied to the water tank 72 via a pressure regulating valve 72e and an electromagnetic valve 72f. The pressure regulating valve 72e reduces the atmosphere pressure supplied from the reserve tank 71 to a predetermined atmosphere pressure. For example, the atmosphere pressure is reduced to 3 atm (2 atm in gauge pressure). The electromagnetic valve 72f switches between supplying to the water tank 72 and cutting the atmosphere pressure regulated by the pressure regulating valve 72e. The electromagnetic valve 72f is controlled to open and close so that the atmosphere pressure in the water tank 72 is maintained at 3 atm except when the tap water is supplied to the water tank 72. When the tap water is supplied to the water tank 72, the atmosphere pressure in the water tank 72 is reduced to a pressure lower than a water pressure of the tap water (for example, less than 2.5 atm) by an electromagnetic valve 72h so that the tap water is smoothly supplied to the water tank 72 by the water pressure of the tap water. The electromagnetic valve 72h switches whether to open the water tank 72 to the atmosphere, and opens the water tank 72 to the atmosphere when the atmosphere pressure is reduced. In addition, the electromagnetic valve 72h opens the water tank 72 to the atmosphere when the atmosphere pressure in the water tank 72 exceeds 3 atm and maintains the inside of the water tank 72 at 3 atm, except when the tap water is supplied to the water tank 72.

The hot water in the water tank 72 is supplied to the extraction container 9 via a check valve 72j, an electromagnetic valve 72i, and the pipe L3. The hot water is supplied to the extraction container 9 by opening the electromagnetic valve 72i, and the supply of the hot water is cut by closing the electromagnetic valve 72i. An amount of the hot water to be supplied to the extraction container 9 can be controlled by an open time of the electromagnetic valve 72i. However, the opening and closing of the electromagnetic valve 72i may be controlled by measuring the supply amount. A temperature sensor 73e for measuring a temperature of the hot water is provided in the pipe L3, and the temperature of the hot water supplied to the extraction container 9 is monitored.

The atmosphere pressure of the reserve tank 71 is also supplied to the extraction container 9 via a pressure regulating valve 73a and an electromagnetic valve 73b. The pressure regulating valve 73a reduces the atmospheric pressure supplied from the reserve tank 71 to a predetermined atmospheric pressure. For example, the atmospheric pressure is reduced to 5 atm (4 atm in gauge pressure). The electromagnetic valve 73b switches between supplying to the extraction container 9 and cutting the atmospheric pressure regulated by the pressure regulating valve 73a. The atmospheric pressure in the extraction container 9 is detected by a pressure sensor 73d. When the extraction container 9 is pressurized, the electromagnetic valve 73b is opened based on a detection result of the pressure sensor 73d, and the inside of the extraction container 9 is pressurized to a predetermined atmospheric pressure (for example, a maximum of 5 atm (4 atm in gauge pressure)). The atmospheric pressure in the extraction container 9 can be reduced by an electromagnetic valve 73c. The electromagnetic valve 73c switches whether to open the extraction container 9 to the atmosphere, and opens the extraction container 9 to the atmosphere when the pressure is abnormal (for example, when the inside of the extraction container 9 exceeds 5 atm).

When the production of one coffee beverage is completed, the inside of the extraction container 9 is washed with the tap water. An electromagnetic valve 73f is opened at the time of washing, and supplies the tap water to the extraction container 9.

Next, the switching unit 10 will be described. The switching unit 10 is a unit that switches a feed-out destination of a liquid fed out from the extraction container 9 to either the pouring portion 10c or a waste tank T. The switching unit 10 includes a switching valve 10a and a motor 10b that drives the switching valve 10a. When a coffee beverage in the extraction container 9 is being fed out, the switching valve 10a switches a flow path to the pouring portion 10c. The coffee beverage is poured into the cup C from the pouring portion 10c. When a waste liquid (tap water) and residue (ground beans) at the time of washing are to be discharged, the flow path is switched to the waste tank T. The switching valve 10a shown in FIG. 3 is a three-port ball valve. Since the residue passes through the switching valve 10a at the time of washing, the switching valve 10a is preferably a ball valve, and the motor 10b switches the flow path by rotating a rotation shaft thereof.

<3. Bean Processing Device>

The bean processing device 2 will be described with reference to FIGS. 1 and 2. The bean processing device 2 includes a reservoir device 4 and a pulverizing device 5.

<3-1. Reservoir Device>

The reservoir device 4 includes a plurality of canisters 40 in which roasted coffee beans are accommodated. Three canisters 40 shown in FIG. 1 are provided. Each of the canisters 40 includes a cylindrical main body 40a for accommodating the roasted coffee beans, and a handle 40b provided on the main body 40a, and is configured to be detachably attached to the beverage production device 1.

Each of the canisters 40 may accommodate different types of roasted coffee beans, and may be configured such that a type of roasted coffee beans used for producing a coffee beverage can be selected according to an operation input to an information display device 12. The roasted coffee beans of different types are, for example, roasted coffee beans of different coffee bean varieties. The roasted coffee beans of different types are coffee beans of the same type, but may be roasted coffee beans of different degrees of roasting. The roasted coffee beans of different types may be roasted coffee beans of different varieties and degrees of roasting. In addition, roasted coffee beans in which roasted coffee beans of a plurality of types and varieties are mixed may be accommodated in at least one of the three canisters 40. In this case, the roasted coffee beans of each variety may have the same degree of roasting.

Although a plurality of canisters 40 are provided in the beverage production device 1 shown in FIG. 1, only one canister 40 may be provided. When a plurality of canisters 40 are provided, roasted coffee beans of the same type may be accommodated in all or a plurality of canisters 40.

Each of the canisters 40 is detachably attached to a conveyor 41, which is a weighing conveying device. The conveyor 41 is, for example, an electric screw conveyor, and automatically measures a predetermined amount of the roasted coffee beans accommodated in the canister 40 and feeds out the roasted coffee beans to a downstream side.

Each of the conveyors 41 discharges the roasted coffee beans to the collective conveying portion 42 on the downstream side. The collective conveying portion 42 is implemented by a hollow member, and forms a conveying passage for the roasted coffee beans from each of the conveyors 41 to the pulverizing device 5 (in particular, the first grinder 5A). The roasted coffee beans discharged from each of the conveyors 41 move inside the collective conveying portion 42 by an own weight thereof, and flow down to the pulverizing device 5.

A guide portion 42a is formed in the collective conveying portion 42 at a position corresponding to the bean inlet 103. The guide portion 42a forms a passage for guiding the roasted coffee beans put from the bean inlet 103 to the pulverizing device 5 (in particular, the first grinder 5A). As a result, in addition to the roasted coffee beans accommodated in the canister 40, a coffee beverage whose raw material is the roasted coffee beans put from the bean inlet 103 can be produced.

<3-2. Pulverizing Device>

The pulverizing device 5 will be described with reference to FIGS. 2 and 4. FIG. 4 is a partially cutaway perspective view of the separation device 6. The pulverizing device 5 includes the first grinder 5A, the second grinder 5B, and the separation device 6. The first grinder 5A and the second grinder 5B are mechanisms for grinding roasted coffee beans supplied from the reservoir device 4. The roasted coffee beans supplied from the reservoir device 4 are ground by the first grinder 5A, then further ground by the second grinder 5B into powder, and are put into the extraction container 9 from a discharge pipe 5C.

The first grinder 5A and the second grinder 5B have different particle sizes for grinding beans. The first grinder 5A is a grinder for coarse grinding, and the second grinder 5B is a grinder for fine grinding. The first grinder 5A and the second grinder 5B are electric grinders, and include a motor as a drive source, a rotary blade driven by the motor, and the like. A size (particle size) of the roasted coffee beans to be pulverized can be changed by changing the number of rotations of the rotary blade.

The separation device 6 is a mechanism for separating wastes from the ground beans. The separation device 6 includes a passage portion 630a disposed between the first grinder 5A and the second grinder 5B. The passage portion 630a is a hollow body that forms a separation chamber through which ground beans falling freely from the first grinder 5A pass. A passage portion 630b extending in a direction (for example, a left-right direction) intersecting a passing direction (for example, the upper-lower direction) of the ground beans is connected to the passage portion 630a, and an aspiration unit 60 is connected to the passage portion 630b. By the aspiration unit 60 aspirating the air in the passage portion 630a, lightweight objects such as chaff and fine powder are aspirated. As a result, wastes can be separated from the ground beans.

The aspiration unit 60 is a mechanism of a centrifugal separation type. The aspiration unit 60 includes a chaff fan unit 60A and a collection container 60B. The chaff fan unit 60A shown in FIG. 4 includes a chaff fan motor and a chaff fan rotationally driven by the chaff fan motor, and exhausts the air in the collection container 60B upward.

The collection container 60B includes an upper portion 61 and a lower portion 62 that are engaged with each other in a separable manner. The lower portion 62 has a bottomed cylindrical shape with an open upper side, and forms a space for accumulating wastes. The upper portion 61 constitutes a lid portion to be attached to an opening of the lower portion 62. The upper portion 61 includes a cylindrical outer circumferential wall 61a and an exhaust pipe 61b formed coaxially with the outer circumferential wall 61a. The chaff fan unit 60A is fixed to the upper portion 61 above the exhaust pipe 61b so as to aspirate the air in the exhaust pipe 61b. The passage portion 630b is connected to the upper portion 61. The passage portion 630b is open to the side of the exhaust pipe 61b.

As the chaff fan unit 60A is driven, air flows indicated by arrows d1 to d3 in FIG. 4 are generated. Due to the air flows, the air containing wastes is aspirated into the collection container 60B from the passage portion 630a through the passage portion 630b. Since the passage portion 630b is open to the side of the exhaust pipe 61b, the air containing wastes swirls around the exhaust pipe 61b. Waste D in the air falls by a weight thereof and is collected in a part of the collection container 60B (accumulates on a bottom surface of the lower portion 62). The air is exhausted upward through the inside of the exhaust pipe 61b.

The plurality of fins 61d are integrally formed on a circumferential surface of the exhaust pipe 61b. The plurality of fins 61d are disposed in a circumferential direction of the exhaust pipe 61b. Each of the fins 61d is inclined obliquely with respect to an axial direction of the exhaust pipe 61b. The provision of such fins 61d facilitates the swirling of the air containing the waste D around the exhaust pipe 61b.

The lower portion 62 shown in FIG. 4 is made of a translucent material such as acrylic or glass, and constitutes a transparent container whose entire body is a transmissive portion. The lower portion 62 is a portion covered by the cover portion 102 (FIG. 2). An administrator or a beverage consumer can visually recognize the waste D accumulated in the lower portion 62 through the cover portion 102 and a circumferential wall of the lower portion 62. The administrator may easily determine a cleaning timing of the lower portion 62, and since the beverage consumer can visually recognize that the waste D is removed, expectation of a quality of a coffee beverage being produced may be increased.

As described above, the roasted coffee beans supplied from the reservoir device 4 are first coarsely ground by the first grinder 5A, and wastes are separated by the separation device 6 when the coarsely ground beans pass through the passage portion 630a. The coarsely ground beans from which the wastes are separated are finely ground by the second grinder 5B. The wastes to be separated by the separation device 6 are typically chaff and fine powder. These may impair taste of a coffee beverage, and the quality of the coffee beverage can be improved by removing chaff and the like from ground beans.

The roasted coffee beans may be pulverized by one grinder (one-stage pulverizing). However, performing two-stage pulverizing by the first grinder 5A and the second grinder 5B makes it easier for ground beans to have a uniform particle size and makes it possible to have a constant degree of extraction of a coffee liquid. At the time of pulverization of beans, heat may be generated due to friction between a cutter and the beans. By performing two-stage pulverizing, heat generation due to friction during pulverizing can be prevented, and deterioration of ground beans (for example, deterioration of flavor) can be prevented.

Through steps of coarse grinding, separation of wastes, and fine grinding, it is possible to increase a mass difference between the wastes such as chaff and ground beans (necessary part) when the wastes are separated. This makes it possible to improve a separation efficiency of wastes, and to prevent ground beans (necessary part) from being separated as wastes. In addition, since a waste separation process using air aspiration is interposed between the coarse grinding and the fine grinding, heat generation of ground beans can be prevented by air cooling.

Thereby, deterioration of ground beans (for example, deterioration of flavor) can be prevented.

<4. Drive Unit and Extraction Container>

<4-1. Overview>

The drive unit 8 and the extraction container 9 of the extraction device 3 will be described with reference to FIG. 5. FIG. 5 is a perspective view of the drive unit 8 and the extraction container 9. Most of the drive unit 8 is enclosed by the main body portion 101.

The drive unit 8 is supported by a frame F. The frame F includes upper and lower beam portions F1 and F2 and a column portion F3 that supports the beam portions F1 and F2. The drive unit 8 is roughly divided into three units: an upper unit 8A, a middle unit 8B, and a lower unit 8C. The upper unit 8A is supported by the beam portion F1. The middle unit 8B is supported by the beam portion F1 and the column portion F3 between the beam portion F1 and the beam portion F2. The lower unit 8C is supported by the beam portion F2.

The extraction container 9 is a chamber including a container main body 90 and a lid unit 91. The extraction container 9 may be referred to as a chamber. The middle unit 8B includes an arm member 820 that detachably holds the container main body 90. The arm member 820 includes a holding member 820a and a pair of shaft members 820b spaced apart from each other in the left-right direction. The holding member 820a is an elastic member such as a resin formed in a C-shaped clip shape, and holds the container main body 90 by its elastic force. The holding member 820a holds left and right side portions of the container main body 90, and a front side of the container main body 90 is exposed. This makes it easier to visually recognize the inside of the container main body 90 in a front view.

The container main body 90 is attached to and detached from the holding member 820a by manual operation, and the container main body 90 is attached to the holding member 820a by pressing the container main body 90 rearward in the front-rear direction against the holding member 820a. The container main body 90 can be separated from the holding member 820a by pulling out the container main body 90 forward in the front-rear direction from the holding member 820a.

Each of the pair of shaft members 820b is a rod extending in the front-rear direction and is a member that supports the holding member 820a. Although the number of the shaft members 820b is two, the number of the shaft members 820b may be one or three or more. The holding member 820a is fixed to front end portions of the pair of shaft members 820b. With a mechanism which will be described later, the pair of shaft members 820b are advanced and retracted in the front-rear direction, whereby the holding member 820a is advanced and retracted in the front-rear direction, and a moving operation of moving the container main body 90 in parallel in the front-rear direction can be performed. The middle unit 8B can also perform a pivoting operation of turning the extraction container 9 upside down, as will be described later.

<4-2. Extraction Container>

The extraction container 9 will be described with reference to FIG. 6. FIG. 6 is a diagram showing a closed state and an open state of the extraction container 9. As described above, the extraction container 9 is turned upside down by the middle unit 8B. The extraction container 9 in FIG. 6 shows a basic posture in which the lid unit 91 is positioned on an upper side. In the following description, when describing an upper-lower positional relation, the upper-lower positional relation means an upper-lower positional relation in the basic posture unless otherwise specified.

The container main body 90 is a bottomed container and has a bottle shape including a neck portion 90b, a shoulder portion 90d, a body portion 90e, and a bottom portion 90f. A flange portion 90c defining an opening 90a communicating with an internal space of the container main body 90 is formed at an end portion (an upper end portion of the container main body 90) of the neck portion 90b.

Both the neck portion 90b and the body portion 90e have a cylindrical shape. The shoulder portion 90d is a portion between the neck portion 90b and the body portion 90e, and has a tapered shape such that a cross-sectional area of an internal space thereof gradually decreases from the body portion 90e side toward the neck portion 90b side.

The lid unit 91 is a unit that opens and closes the opening 90a. The opening and closing operation (lifting and lowering operation) of the lid unit 91 is performed by the upper unit 8A.

The container main body 90 includes a main body member 900 and a bottom member 901. The main body member 900 is a cylindrical member that forms the neck portion 90b, the shoulder portion 90d, and the body portion 90e and is open at the top and bottom. The bottom member 901 is a member that forms the bottom portion 90f, and is inserted into and fixed to a lower portion of the main body member 900. A seal member 902 is interposed between the main body member 900 and the bottom member 901 to improve the airtightness in the container main body 90.

The main body member 900 shown in FIG. 6 is made of a translucent material such as acrylic or glass, and constitutes a transparent container whose entire body is a transmissive portion. An administrator or a beverage consumer can visually recognize an extraction state of a coffee beverage in the container main body 90 through the cover portion 102 and the main body member 900 of the container main body 90. The administrator may easily check an extraction operation, and the beverage consumer may enjoy the extraction state.

A convex portion 901c is provided in a central portion of the bottom member 901, and the convex portion 901c is provided with a communication hole that allows the inside of the container main body 90 to communicate with the outside and a valve (a valve 903 in FIG. 8) that opens and closes the communication hole. The communication hole is used for discharging a waste liquid and a residue when cleaning the inside of the container main body 90. A seal member 908 is provided on the convex portion 901c, and the seal member 908 is a member for maintaining the airtightness between the upper unit 8A or the lower unit 8C and the bottom member 901.

The lid unit 91 includes a base member 911 having a hat shape. The base member 911 includes a convex portion 911d and a flange portion 911c that overlaps the flange portion 90c when the lid unit 91 is closed. The convex portion 911d has the same structure as that of the convex portion 901c of the container main body 90, and is provided with a communication hole that allows the inside of the container main body 90 to communicate with the outside, and a valve (a valve 913 in FIG. 8) that opens and closes the communication hole. The communication hole of the convex portion 911d is mainly used for pouring hot water into the container main body 90 and feeding out a coffee beverage. A seal member 918a is provided on the convex portion 911d. The seal member 918a is a member for maintaining the airtightness between the upper unit 8A or the lower unit 8C and the base member 911. The lid unit 91 is also provided with a seal member 919. The seal member 919 improves the airtightness between the lid unit 91 and the container main body 90 when the lid unit 91 is closed. A filter for filtration is held in the lid unit 91.

<4-3. Upper Unit and Lower Unit>

The upper unit 8A and the lower unit 8C will be described with reference to FIGS. 7 and 8. FIG. 7 is a front view showing a configuration of a part of the upper unit 8A and the lower unit 8C, and FIG. 8 is a longitudinal cross-sectional view of FIG. 7.

The upper unit 8A includes an operation unit 81A. The operation unit 81A performs the opening and closing operation (lifting and lowering) of the lid unit 91 with respect to the container main body 90 and an opening and closing operation of the valves of the convex portions 901c and 911d. The operation unit 81A includes a support member 800, a holding member 801, a lifting and lowering shaft 802, and a probe 803.

The support member 800 is fixed such that a relative position with respect to the frame F does not change, and accommodates the holding member 801. The support member 800 also includes a communication portion 800a that allows the pipe L3 to communicate with the inside of the support member 800. Hot water, tap water, and atmospheric pressure supplied from the pipe L3 are introduced into the support member 800 via the communication portion 800a.

The holding member 801 is a member capable of detachably holding the lid unit 91. The holding member 801 has a cylindrical space into which the convex portion 911d of the lid unit 91 or the convex portion 901c of the bottom member 901 is inserted, and includes a mechanism that detachably holds the convex portion 911d and the convex portion 901c. The mechanism is, for example, a snap ring mechanism, and is engaged by a constant pressing force, and is disengaged by a constant separating force. The hot water, tap water, and atmospheric pressure supplied from the pipe L3 can be supplied into the extraction container 9 via the communication portion 800a and the communication hole 801a of the holding member 801.

The holding member 801 is also a movable member provided slidably in the upper-lower direction in the support member 800. The lifting and lowering shaft 802 is provided such that its axial direction is in the upper-lower direction. The lifting and lowering shaft 802 airtightly penetrates a top portion of the support member 800 in the upper-lower direction, and is provided so as to be vertically lifted and lowered with respect to the support member 800.

A top portion of the holding member 801 is fixed to a lower end portion of the lifting and lowering shaft 802. By the lifting and lowering of the lifting and lowering shaft 802, the holding member 801 slides in the upper-lower direction, and the holding member 801 can be attached to and separated from the convex portion 911d and the convex portion 901c. In addition, the lid unit 91 can be opened and closed with respect to the container main body 90.

A screw 802a constituting a lead screw mechanism is formed on an outer circumferential surface of the lifting and lowering shaft 802. A nut 804b is screwed to the screw 802a. The upper unit 8A includes a motor 804a, and the nut 804b is rotated on the spot by a driving force of the motor 804a (without moving up and down). The lifting and lowering shaft 802 is lifted and lowered by the rotation of the nut 804b.

The lifting and lowering shaft 802 is a tubular shaft having a through hole in its central axis, and the probe 803 is inserted into the through hole in a vertically slidable manner. The probe 803 airtightly penetrates the top portion of the holding member 801 in the upper-lower direction, and is provided so as to be vertically lifted and lowered with respect to the support member 800 and the holding member 801.

The probe 803 is an operator that opens and closes the valves 913 and 903 provided inside the convex portions 911d and 901c, and the valves 913 and 903 can be changed from a closed state to an open state by lowering the probe 803, and can be changed from the open state to the closed state (due to the action of a return spring (not shown)) by lifting the probe 803.

A screw 803a constituting a lead screw mechanism is formed on an outer circumferential surface of the probe 803. A nut 805b is screwed to the screw 803a. The upper unit 8A includes a motor 805a, and the nut 805b is rotated on the spot by a driving force of the motor 805a (without moving up and down). The probe 803 is lifted and lowered by the rotation of the nut 805b.

The lower unit 8C includes an operation unit 81C. The operation unit 81C has a configuration obtained by vertically turning the operation unit 81A upside down, and performs the opening and closing operation of the valves 913 and 903 provided inside the convex portions 911d and 901c. Although the operation unit 81C is also configured to be capable of opening and closing the lid unit 91, the operation unit 81C is not used to open and close the lid unit 91.

Hereinafter, although the description is substantially the same as the description of the operation unit 81A, the operation unit 81C will be described below. The operation unit 81C includes a support member 810, a holding member 811, a lifting and lowering shaft 812, and a probe 813.

The support member 810 is fixed such that a relative position with respect to the frame F does not change, and accommodates the holding member 811. The support member 810 also includes a communication portion 810a that allows the switching valve 10a of the switching unit 10 to communicate with the inside of the support member 810. Residues of a coffee beverage, tap water, and ground beans in the container main body 90 are introduced into the switching valve 10a via the communication portion 810a.

The holding member 811 has a cylindrical space into which the convex portion 911d of the lid unit 91 or the convex portion 901c of the bottom member 901 is inserted, and includes a mechanism that detachably holds the convex portion 911d and the convex portion 901c. The mechanism is, for example, a snap ring mechanism, and is engaged by a constant pressing force, and is disengaged by a constant separating force. Residues of a coffee beverage, tap water, and ground beans in the container main body 90 are introduced into the switching valve 10a via the communication portion 810a and a communication hole 811a of the holding member 811.

The holding member 811 is also a movable member provided slidably in the upper-lower direction in the support member 810. The lifting and lowering shaft 812 is provided such that its axial direction is in the upper-lower direction. The lifting and lowering shaft 812 airtightly penetrates a bottom portion of the support member 800 in the upper-lower direction, and is provided so as to be vertically lifted and lowered with respect to the support member 810.

A bottom portion of the holding member 811 is fixed to a lower end portion of the lifting and lowering shaft 812. By the lifting and lowering of the lifting and lowering shaft 812, the holding member 811 slides in the upper-lower direction, and the holding member 811 can be attached to and separated from the convex portion 901c and the convex portion 911d.

A screw 812a constituting a lead screw mechanism is formed on an outer circumferential surface of the lifting and lowering shaft 812. A nut 814b is screwed to the screw 812a. The lower unit 8C includes a motor 814a, and the nut 814b is rotated on the spot by a driving force of the motor 814a (without moving up and down). The lifting and lowering shaft 812 is lifted and lowered by the rotation of the nut 814b.

The lifting and lowering shaft 812 is a tubular shaft having a through hole in its central axis, and the probe 813 is inserted into the through hole in a vertically slidable manner. The probe 813 airtightly penetrates the bottom portion of the holding member 811 in the upper-lower direction, and is provided so as to be vertically lifted and lowered with respect to the support member 810 and the holding member 811.

The probe 813 is an operator that opens and closes the valves 913 and 903 provided inside the convex portions 911d and 901c, and the valves 913 and 903 can be changed from the closed state to the open state by lifting the probe 813, and can be changed from the open state to the closed state (due to the action of a return spring (not shown)) by lowering the probe 813.

A screw 813a constituting a lead screw mechanism is formed on an outer circumferential surface of the probe 813. A nut 815b is screwed to the screw 813a. The lower unit 8C includes a motor 815a, and the nut 815b is provided so as to rotate on the spot by a driving force of the motor 815a (without moving up and down). The probe 813 is lifted and lowered by the rotation of the nut 815b.

<4-4. Middle Unit>

The middle unit 8B will be described with reference to FIGS. 5 and 9. FIG. 9 is a schematic diagram of the middle unit 8B. The middle unit 8B includes a support unit 81B that supports the extraction container 9. The support unit 81B includes a unit main body 81B' that supports a lock mechanism 821 in addition to the arm member 820 described above.

The lock mechanism 821 is a mechanism for maintaining the lid unit 91 in a closed state with respect to the container main body 90. The lock mechanism 821 includes a pair of gripping members 821a that vertically sandwich the flange portion 911c of the lid unit 91 and the flange portion 90c of the container main body 90. The pair of gripping members 821a have a C-shaped cross section in which the flange portion 911c and the flange portion 90c are sandwiched therebetween and fitted to each other, and are opened and closed in the left-right direction by a driving force of a motor 822. When the pair of gripping members 821a are in a closed state, the gripping members 821a are fitted into the flange portion 911c and the flange portion 90c so as to vertically sandwich the flange portion 911c and the flange portion 90c, and the lid unit 91 is airtightly locked with respect to the container main body 90, as indicated by a solid line in an enclosing diagram of FIG. 9. In this locked state, even if the holding member 801 is lifted by the lifting and lowering shaft 802 to open the lid unit 91, the lid unit 91 does not move (the lock is not released). That is, a locking force by the lock mechanism 821 is set stronger than a force to open the lid unit 91 using the holding member 801. As a result, it is possible to prevent the lid unit 91 from being opened with respect to the container main body 90 on abnormal occasions.

When the pair of gripping members 821a are in an open state, the gripping members 821a are separated from the flange portion 911c and the flange portion 90c, and the lid unit 91 and the container main body 90 are unlocked, as indicated by a broken line in the enclosing diagram of FIG. 9.

In a case where the holding member 801 holds the lid unit 91 and the holding member 801 is lifted from a lowered position to a lifted position, the lid unit 91 is separated from the container main body 90 when the pair of gripping members 821a are in the open state. Conversely, when the pair of gripping members 821a are in the closed state, the engagement of the holding member 801 with respect to the lid unit 91 is released, and only the holding member 801 is lifted.

The middle unit 8B also includes a mechanism that horizontally moves the arm member 820 in the front-rear direction using a motor 823 as a drive source. As a result, the container main body 90 supported by the arm member 820 can be moved between a rear-side extraction position (state ST1) and a front-side bean input position (state ST2). The bean input position is a position at which ground beans are put into the container main body 90, and ground beans ground by the second grinder 5B are put into the opening 90a of the container main body 90 from which the lid unit 91 is separated, from the discharge pipe 5C shown in FIG. 2. In other words, a position of the discharge pipe 5C is above the container main body 90 positioned at the bean input position.

The extraction position is a position at which the container main body 90 can be operated by the operation unit 81A and the operation unit 81C, is a position coaxial with the probes 803 and 813, and is a position at which a coffee liquid is extracted. The extraction position is a position on the rear side of the bean input position. FIGS. 5, 7, and 8 show the case where the container main body 90 is positioned at the extraction position. In this way, by changing a position of container main body 90 according to the input of ground beans, the extraction of a coffee liquid, and the supply of water, it is possible to prevent the steam generated when extracting a coffee liquid from adhering to the discharge pipe 5C which is a supply portion of ground beans.

The middle unit 8B also includes a mechanism that rotates the support unit 81B about a shaft 825 in the front-rear direction using a motor 824 as a drive source. Accordingly, it is possible to change a posture of the container main body 90 (the extraction container 9) from an upright posture (state ST1) in which the neck portion 90b is on an upper side to an inverted posture (state ST3) in which the neck portion 90b is on a lower side. During the rotation of the extraction container 9, the lock mechanism 821 maintains a state in which the lid unit 91 is locked to the container main body 90. The extraction container 9 is turned upside down between the upright posture and the inverted posture. In the inverted posture, the convex portion 911d is positioned at the position of the convex portion 901c in the upright posture. In the inverted posture, the convex portion 901c is positioned at the position of the convex portion 911d in the upright posture. Therefore, in the inverted posture, the opening and closing operation with respect to the valve 903 can be performed by the operation unit 81A, and the opening and closing operation with respect to the valve 913 can be performed by the operation unit 81C.

<5. Control Device>

A control device 11 of the beverage production device 1 will be described with reference to FIG. 10. FIG. 10 is a block diagram of the control device 11.

The control device 11 controls the entire beverage production device 1. The control device 11 includes a processing unit 11a, a storage unit 11b, and an interface (I/F) unit 11c. The processing unit 11a is, for example, a processor such as a CPU. The storage unit 11b is, for example, a RAM or a ROM. The I/F unit 11c includes an input and output interface that inputs and outputs a signal between an external device and the processing unit 11a. The I/F unit 11c also includes a communication interface capable of performing data communication with a server 16 via a communication network 15 such as the Internet. The server 16 can communicate with a mobile terminal 17 such as a smartphone via the communication network 15, and can receive, for example, information such as a reservation for beverage production or an impression from the mobile terminal 17 of a beverage consumer.

The processing unit 11a executes a program stored in the storage unit 11b, and controls an actuator group 14 based on an instruction from the information display device 12, a detection result of a sensor group 13, or an instruction from the server 16. The sensor group 13 includes various sensors (for example, a hot water temperature sensor, an operation position detection sensor of a mechanism, a pressure sensor) provided in the beverage production device 1. The actuator group 14 includes various actuators (for example, a motor, an electromagnetic valve, a heater, and the like) provided in the beverage production device 1.

<6. Operation Control Example>

A control process example of the beverage production device 1 executed by the processing unit 11a will be described with reference to (A) and (B) of FIG. 11A. (A) of FIG. 11 shows a control example related to a single coffee beverage production operation. A state of the beverage production device 1 before a production instruction is referred to as a standby state. A state of each mechanism in the standby state is as follows.

The extraction device 3 is in the state of FIG. 5. The extraction container 9 is in the upright posture and is positioned at the extraction position. The lock mechanism 821 is in the closed state, and the lid unit 91 closes the opening 90a of the container main body 90. The holding member 801 is at the lowered position and is attached to the convex portion 911d. The holding member 811 is at the lifted position and is attached to the convex portion 901c. The valves 903 and 913 are in the closed state. The switching valve 10a allows the communication portion 810a of the operation unit 81C to communicate with the waste tank T.

When there is a coffee beverage production instruction in the standby state, a process of (A) of FIG. 11 is executed. In S1, a preheating process is executed. The process is a process of pouring hot water into the container main body 90 and heating the container main body 90 in advance. First, the valves 903 and 913 are opened. Thereby, the pipe L3, the extraction container 9, and the waste tank T communicate with one another.

The electromagnetic valve 72i is opened for a predetermined time (for example, 1500 milliseconds) and then closed. Thereby, hot water is poured into the extraction container 9 from the water tank 72. Next, the electromagnetic valve 73b is opened for a predetermined time (for example, 500 milliseconds) and then closed. Thereby, the air in the extraction container 9 is pressurized, and the discharge of hot water to the waste tank T is facilitated. Through the above process, the inside of the extraction container 9 and the pipe L2 are preheated, and hot water can be less cooled in the subsequent production of a coffee beverage.

In S2, a grinding process is performed. Here, roasted coffee beans are pulverized, and the ground beans are put into the container main body 90. First, the lock mechanism 821 is opened to lift the holding member 801 to the lifted position. The lid unit 91 is held by the holding member 801 and is lifted together with the holding member 801. As a result, the lid unit 91 is separated from the container main body 90. The holding member 811 is lowered to the lowered position. The container main body 90 is moved to the bean input position. Next, the reservoir device 4 and the pulverizing device 5 are operated. Thus, one cup of roasted coffee beans is supplied from the reservoir device 4 to the first grinder 5A. The roasted coffee beans are ground in two stages by the first grinder 5A and the second grinder 5B, and wastes are separated by the separation device 6. The ground beans are put into the container main body 90.

The container main body 90 is returned to the extraction position. The holding member 801 is lowered to the lowered position, and the lid unit 91 is attached to the container main body 90. The lock mechanism 821 is closed, and the lid unit 91 is airtightly locked to the container main body 90. The holding member 811 is lifted to the lifted position. In the valves 903 and 913, the valve 903 is in the closed state, and the valve 913 is in the open state.

In S3, an extraction process is performed. Here, a coffee liquid is extracted from the ground beans in the container main body 90. (B) of FIG. 11 is a flowchart of the extraction process of S3.

In S41, in order to steam the ground beans in the extraction container 9, hot water in an amount less than one cup is poured into the extraction container 9. Here, the electromagnetic valve 72i is opened for a predetermined time (for example, 500 milliseconds) and then closed. Thereby, hot water is poured into the extraction container 9 from the water tank 72. Thereafter, the process of S41 ends after waiting for a predetermined time (for example, 5000 milliseconds). By this process, the ground beans can be steamed. By steaming the ground beans, carbon dioxide gas contained in the ground beans can be released, and a subsequent extraction effect can be enhanced.

In S42, hot water is poured into the extraction container 9 in an amount to add up to one cup of hot water so that the extraction container 9 accommodates one cup of hot water. Here, the electromagnetic valve 72i is opened for a predetermined time (for example, 7000 milliseconds) and then closed. Thereby, hot water is poured into the extraction container 9 from the water tank 72.

By the process of S42, the inside of the extraction container 9 can be brought into a state of a temperature exceeding 100° C. at 1 atm (for example, about 110° C.). Next, the inside of the extraction container 9 is pressurized in S43. Here, the electromagnetic valve 73b is opened for a predetermined time (for example, 1000 milliseconds) and then closed, and the inside of the extraction container 9 is pressurized to an atmospheric pressure at which hot water does not boil (for example, about 4 atm (about 3 atm in gauge pressure)). Thereafter, the valve 913 is brought into the closed state.

Next, this state is maintained for a predetermined time (for example, 7000 milliseconds) to perform immersion-type coffee liquid extraction (S44). As a result, immersion-type coffee liquid extraction is performed under a high temperature and high pressure. In the immersion-type extraction under a high temperature and high pressure, the following effects can be expected. First, by setting a high pressure, hot water can be easily permeated into the ground beans, and extraction of a coffee liquid can be facilitated. Second, by setting a high temperature, the extraction of the coffee liquid is facilitated. Third, by setting a high temperature, the viscosity of an oil contained in the ground beans decreases, and the extraction of the oil is facilitated. As a result, a coffee beverage with high aroma can be produced.

A temperature of hot water (high temperature water) may be higher than 100° C., but a higher temperature is more advantageous in terms of the extraction of the coffee liquid. On the other hand, increasing the temperature of the hot water generally results in an increase in cost.

Therefore, the temperature of the hot water may be, for example, 105° C. or more, 110° C. or more, or 115° C. or more, and may be, for example, 130° C. or less, or 120° C. or less. The atmospheric pressure may be any atmospheric pressure at which the hot water does not boil.

In S45, the inside of the extraction container 9 is depressurized. Here, the atmospheric pressure in the extraction container 9 is switched to an atmospheric pressure at which the hot water boils. Specifically, the valve 913 is brought into the open state, and the electromagnetic valve 73c is opened for a predetermined time (for example, 1000 milliseconds) and then closed. The inside of the extraction container 9 is open to the atmosphere. Thereafter, the valve 913 is brought into the closed state again.

The inside of the extraction container 9 is rapidly depressurized to an atmospheric pressure lower than the boiling point pressure, and the hot water in the extraction container 9 boils at once. The hot water and ground beans in the extraction container 9 are explosively scattered in the extraction container 9. As a result, the hot water can evenly boil. The destruction of cell walls of the ground beans can be facilitated, and the subsequent extraction of the coffee liquid can be further facilitated. In addition, since the ground beans and the hot water can be stirred by this boiling, the extraction of the coffee liquid can be facilitated. In this way, the extraction efficiency of the coffee liquid can be improved.

In S46, the extraction container 9 is inverted from the upright posture to the inverted posture. Here, the holding member 801 is moved to the lifted position and the holding member 811 is moved to the lowered position. Then, the support unit 81B is rotated. Thereafter, the holding member 801 is returned to the lowered position, and the holding member 811 is returned to the lifted position. In the extraction container 9 in the inverted posture, the neck portion 90b and the lid unit 91 are positioned on the lower side.

In S47, permeation-type coffee liquid extraction is performed, and a coffee beverage is dispensed into the cup C. Here, the switching valve 10a is switched to allow the pouring portion 10c and the passage portion 810a of the operation unit 81C to communicate with each other. Both the valves 903 and 913 are brought into the open state. Further, the electromagnetic valve 73b is opened for a predetermined time (for example, 10000 milliseconds), and the inside of the extraction container 9 is set to a predetermined atmospheric pressure (for example, 1.7 atm (0.7 atm in gauge pressure)).

In the extraction container 9, a coffee beverage in which the coffee liquid is dissolved in the hot water passes through a filter provided in the lid unit 91 and is dispensed into the cup C. The filter regulates the leakage of a residue of the ground beans. Thus, the extraction process ends.

The extraction efficiency of the coffee liquid can be improved by using the immersion-type extraction in S44 and the permeation-type extraction in S47 in combination. When the extraction container 9 is in the upright posture, the ground beans accumulate from the body portion 90e to the bottom portion 90f. On the other hand, when the extraction container 9 is in the inverted posture, the ground beans accumulate from the shoulder portion 90d to the neck portion 90b. A cross-sectional area of the body portion 90e is larger than a cross-sectional area of the neck portion 90b, and a deposition thickness of the ground beans in the inverted posture is larger than a deposition thickness in the upright posture. That is, the ground beans accumulate relatively thinly and widely when the extraction container 9 is in the upright posture, and accumulate relatively thickly and narrowly when the extraction container 9 is in the inverted posture.

Since the immersion-type extraction in S44 is performed when the extraction container 9 is in the upright posture, the hot water and the ground beans can be brought into contact over a wide range, and the extraction efficiency of the coffee liquid can be improved. However, in this case, the hot water and the ground beans tend to partially come into contact with each other. On the other hand, since the permeation-type extraction in S47 is performed when the extraction container 9 is in the inverted posture, the hot water passes through the accumulated ground beans while being in contact with more of the ground beans. The hot water comes into contact with the ground beans more evenly, and the extraction efficiency of the coffee liquid can be further improved.

Returning to (A) of FIG. 11, after the extraction process of S3, a discharge process of S4 is performed. Here, a process related to cleaning in the extraction container 9 is performed. The extraction container 9 is cleaned by returning the extraction container 9 from the inverted posture to the upright posture and supplying tap water (purified water) to the extraction container 9. Then, the inside of the extraction container 9 is pressurized, and the water in the extraction container 9 is discharged to the waste tank T together with a residue of the ground beans.

Thus, one coffee beverage production process is completed. Thereafter, the same process is repeated for each production instruction. The time required for producing one coffee beverage is, for example, about 60 seconds to 90 seconds.

<7. Summary of Device Configuration>

As described above, the beverage production device 1 includes the bean processing device 2 and the extraction device 3 as a production portion, and more specifically, the bean processing device 2 includes the reservoir device 4 and the pulverizing device 5, and the extraction device 3 includes the fluid supply unit 7, the drive unit 8, the extraction container 9, and the switching unit 10 (see FIGS. 2, 3, etc.). The pulverizing device 5 receives one cup of roasted coffee beans from the reservoir device 4, and performs two-stage grinding by the first grinder 5A and the second grinder 5B. In this case, waste such as chaff is separated from the ground beans by the separation device 6. After the ground beans are put into the extraction container 9, the pouring of hot water into the extraction container 9 by the fluid supply unit 7, the posture inversion of the extraction container 9 by the drive unit 8, the liquid feeding from the extraction container 9 to the cup C by the switching unit 10, and the like are performed to provide a cup of beverage.

A part of the production portion is covered by the cover portion 102 configured as a transparent cover whose entire body is a transmissive portion, and can be visually recognized by a user (for example, an administrator of the beverage production device 1, a beverage consumer, or the like) from the outside of the beverage production device 1. In the above production portion, although the plurality of canisters 40, which are a part of the reservoir device 4, are exposed, and the other elements are substantially accommodated in the housing 100, the entire production portion may be accommodated in the housing 100. In other words, the cover portion 102 may be provided so as to cover at least a part of the production portion.

Since at least a part of the production portion is covered with the cover portion 102 so as to be visually recognized from the outside of the beverage production device 1, for example, when the user is an administrator of the beverage production device 1, the administrator may perform the operation inspection of the device together with the production preparation of a beverage. When the user is a beverage purchaser, the purchaser may wait for the completion of the production of a beverage while enhancing the expectation for the beverage. For example, the extraction container 9 of the extraction device 3 can be visually recognized from the outside of the beverage production device 1 via the cover portion 102, and among several processes for producing a beverage, an extraction step having a relatively high degree of interest for a user can be observed. The drive unit 8 functions as a posture changing unit that changes a posture of the extraction container 9, and as described above, the extraction container 9 is a movable portion that can be vertically inverted in the production portion. Therefore, an inverting operation of the extraction container 9 is relatively likely to attract the user, and by allowing the user to observe the inverting operation, the user may be able to enjoy the inverting operation.

Next, a modification of the pulverizing device 5 will be described. In the following description, components having the same names as those described above are denoted by the same reference numerals as those used above. The pulverizing device 5 described here has a different appearance from that of the pulverizing device shown in FIG. 2, but has the same function.

FIG. 12 is a perspective view of the pulverizing device 5, and FIG. 13 is a longitudinal cross-sectional view of the pulverizing device 5 shown in FIG. 12.

Similarly to the pulverizing device shown in FIG. 2, the pulverizing device 5 shown in FIG. 12 also includes the first grinder 5A, the second grinder 5B, and the separation device 6. The first grinder 5A and the second grinder 5B are mechanisms for grinding roasted coffee beans supplied from the reservoir device 4 shown in FIG. 2. The first grinder 5A is a grinder for crushing coffee beans into a predetermined size (for example, about ¼) to facilitate separation of wastes adhering to the coffee beans. The second grinder 5B is a grinder for grinding the coffee beans crushed by the first grinder 5A into ground coffee beans having a desired particle size. Therefore, the first grinder 5A and the second grinder 5B have different particle sizes for grinding beans, and the second grinder 5B is a grinder having a finer particle size than the first grinder 5A. The particle size of the ground beans in the second grinder 5B may have an error (about ±5 µm), but can be adjusted by adjusting an interval between a rotary blade 58b and a fixed blade 57b.

The first grinder 5A includes a motor 52a (see FIG. 12) and a main body portion 53a. The motor 52a is a drive source of the first grinder 5A. The main body portion 53a is a unit for accommodating a cutter, and includes a built-in rotation shaft 54a as shown in FIG. 13. A gear 55a is provided on the rotation shaft 54a, and a driving force of the motor 52a is transmitted to the rotation shaft 54a via the gear 55a.

As shown in FIG. 13, a rotary blade 58a, which is a cutter, is provided on the rotation shaft 54a. The fixed blade 57a, which is a cutter, is provided around the rotary blade 58a. The inside of the main body portion 53a communicates with an inlet 50a (see FIG. 12) and a discharge port 51a (see FIG. 13). Roasted coffee beans supplied from the reservoir device 4 shown in FIG. 2 enter the main body portion 53a from the inlet 50a formed in an upper portion of the main body portion 53a, and are pulverized while being sandwiched between the rotary blade 58a and the fixed blade 57a shown in FIG. 13. As shown in FIG. 13, a preventing plate 56a is provided on an upper side of the rotary blade 58a of the rotation shaft 54a, and the preventing plate 56a prevents the roasted coffee beans from escaping to the upper side. In the first grinder 5A, the roasted coffee beans are pulverized to, for example, about ¼. The pulverized ground beans are discharged from the discharge port 51a to the separation device 6.

Roasted coffee beans supplied to the inlet 50a may be supplied not from above the rotary blade 58a but at a height at which the roasted coffee beans come into contact with a side surface of the rotary blade 58a. In this case, since the roasted coffee beans are prevented from escaping to the upper side by the rotary blade 58a, the preventing plate 56a may not be provided.

The first grinder 5A may change a size of roasted coffee beans to be discharged after being pulverized by changing the number of rotations of the rotary blade 58a. The distance between the rotary blade 58a and the fixed blade 57a may be manually adjusted.

The separation device 6 shown in FIG. 12 has the same configuration as that of the separation device 6 described with reference to FIG. 4, and is a mechanism that is disposed between the first grinder 5A and the second grinder 5B and separates wastes such as chaff and fine powder from ground beans by an air aspiration force. Roasted coffee beans supplied from the reservoir device 4 are first coarsely ground by the first grinder 5A, and wastes are separated from the coarsely ground beans by the separation device 6. The coarsely ground beans from which the wastes are separated are finely ground by the second grinder 5B.

The second grinder 5B includes a motor 52b (see FIG. 12) and a main body portion 53b. The motor 52b is a drive source of the second grinder 5B. The main body portion 53b is a unit for accommodating a cutter, and includes a built-in rotation shaft 54b as shown in FIG. 13. A pulley 55b is provided on the rotation shaft 54b, and a driving force of the motor 52b is transmitted to the rotation shaft 54b via a belt 59b and the pulley 55b.

As shown in FIG. 13, the rotary blade 58b is provided on the rotation shaft 54b, and the fixed blade 57b is provided on an upper side of the rotary blade 58b. The inside of the main body portion 53b communicates with the inlet 50b shown in FIG. 12 and the discharge port 51b shown in FIG. 12. Ground beans falling from the separation device 6 enter the main body portion 53b from the inlet 50b, and are further pulverized while being sandwiched between the rotary blade 58b and the fixed blade 57b. The ground beans pulverized into powder are discharged from the discharge port 51b. A particle size of the ground beans in the second grinder 5B can be adjusted by adjusting the interval between the rotary blade 58b and the fixed blade 57b.

Next, the separation device 6 will be described again, although there are parts overlapping with the above description. FIG. 14 is a partially cutaway perspective view of the separation device 6. The separation device 6 includes an aspiration unit 6A and a forming unit 6B. The forming unit 6B is a hollow body that forms a separation chamber SC (see FIG. 13) through which ground beans falling freely from the first grinder 5A pass. The aspiration unit 6A is a unit that communicates with the separation chamber SC in a direction (in this example, the left-right direction) intersecting with a passing direction (in this example, the upper-lower direction) of the ground beans, and aspirates the air in the separation chamber SC. By aspirating the air in the separation chamber SC, lightweight objects such as chaff and fine powder are aspirated. As a result, wastes can be separated from the ground beans.

The aspiration unit 6A is a mechanism of a centrifugal separation type. The aspiration unit 6A includes the chaff fan unit 60A and the collection container 60B. The chaff fan unit 60A includes the chaff fan motor and the chaff fan rotationally driven by the chaff fan motor, and exhausts the air in the collection container 60B upward.

The collection container 60B includes the upper portion 61 and the lower portion 62 that are engaged with each other in a separable manner. The lower portion 62 has a bottomed cylindrical shape with an open upper side, and forms a space for accumulating wastes. The upper portion 61 constitutes a lid portion to be attached to an opening of the lower portion 62. As shown in FIG. 14, the upper portion 61 includes the cylindrical outer circumferential wall 61a and the exhaust pipe 61b formed coaxially with the outer circumferential wall 61a. The chaff fan unit 60A is fixed to the upper portion 61 above the exhaust pipe 61b so as to aspirate the air in the exhaust pipe 61b. The upper portion 61 includes a tubular connection portion 61c extending in a radial direction. The connection portion 61c is connected to the forming unit 6B, and allows the separation chamber SC to communicate with the collection container 60B. The connection portion 61c is open to the side of the exhaust pipe 61b.

As the chaff fan unit 60A is driven, the air flows indicated by the arrows d1 to d3 in FIG. 14 are generated. Due to the air flows, the air containing wastes is aspirated into the collection container 60B from the separation chamber SC through the connection portion 61c. Since the connection portion 61c is open to the side of the exhaust pipe 61b, the air containing wastes swirls around the exhaust pipe 61b. The waste D in the air falls by a weight thereof and is collected in a part of the collection container 60B (accumulates on a bottom surface of the lower portion 62). The air is exhausted upward through the inside of the exhaust pipe 61b.

The plurality of fins 61d are integrally formed on a circumferential surface of the exhaust pipe 61b. The plurality of fins 61d are disposed in a circumferential direction of the exhaust pipe 61b. Each of the fins 61d is inclined obliquely with respect to an axial direction of the exhaust pipe 61b. The provision of such fins 61 facilitates the swirling of the air containing the waste D around the exhaust pipe 61b. In addition, the fins 61 facilitate the separation of the waste D. As a result, a length of the aspiration unit 6A in the upper-lower direction can be reduced, which contributes to downsizing of the device.

The forming unit 6B is disposed on a falling path of ground beans by the first grinder 5A and the second grinder 5B, and the centrifugal separation type aspiration unit 6A is disposed on the side of the falling path. Although a mechanism of a centrifugal separation type tends to be long in the upper-lower direction, the aspiration unit 6A can be disposed side by side in a lateral direction with respect to the first grinder 5A and the second grinder 5B by disposing the aspiration unit 6A at the side shifted from the falling path. This contributes to reducing a length of the device in the upper-lower direction. In particular, when two-stage pulverizing is performed by the first grinder 5A and the second grinder 5B, since the length of the device in the upper-lower direction tends to be long, such disposition of the aspiration unit 6A is effective for downsizing of the device.

The forming unit 6B will be described with reference to FIGS. 12 to 17. FIG. 15 is a longitudinal cross-sectional view of the forming unit 6B. FIG. 16 is a perspective view and a partially enlarged view of the forming unit 6B. FIG. 17 is a plan view of the forming unit 6B, and is an explanatory diagram for comparison of cross-sectional areas.

The forming unit 6B shown in FIG. 15 is formed by combining two members divided into upper and lower halves. The forming unit 6B includes a pipe portion 63 and a separation chamber forming portion 64, and has a spoon shape in a plan view. The pipe portion 63 is a cylindrical body that forms a communication passage 63a with the aspiration unit 6A, and extends in the lateral direction (a direction intersecting a center line CL which will be described later). The separation chamber forming portion 64 is an annular hollow body that is connected to the pipe portion 63, forms the separation chamber SC, and has an opening at the center in the upper-lower direction.

In the separation device 6 shown in FIG. 14, when separating wastes from ground beans, a method is adopted in which wastes are aspirated by applying a lateral wind pressure to ground beans falling from the first grinder 5A. This is advantageous in that a length in a vertical direction can be shorter than in a centrifugal separation method.

The separation chamber forming portion 64 shown in FIG. 15 includes a cylindrical portion 65 extending in the upper-lower direction. The cylindrical portion 65 protrudes into the separation chamber SC from a central portion in the upper-lower direction to a lower portion thereof. The cylindrical portion 65 includes an opening portion 65a at one end on an upper side, and the opening portion 65a forms an inlet of ground beans communicating with the separation chamber SC. The opening portion 65a is positioned outside the separation chamber SC and is connected to the discharge port 51a (see FIG. 13) of the first grinder 5A. As a result, ground beans falling from the discharge port 51a are introduced into the separation chamber forming portion 64 without leaking. The cylindrical portion 65 includes an opening portion 65b at the other end on a lower side. The opening portion 65b is positioned in the separation chamber SC. Since the opening portion 65b faces the separation chamber SC, ground beans falling from the discharge port 51a are introduced into the separation chamber SC without leaking.

The cylindrical portion 65 has a cylindrical shape, and the opening portion 65a and the opening portion 65b have a concentric circular shape positioned on the center line CL. As a result, the ground beans falling from the discharge port 51a easily pass through the cylindrical portion 65. The cylindrical portion 65 has a tapered shape in which a cross-sectional area of an internal space gradually decreases from the opening portion 65a side toward the opening portion 65b side. Since an inner wall of the cylindrical portion 65 has a mortar shape, the falling ground beans easily collide with the inner wall. In some cases, the ground beans falling from the first grinder 5A adhere to each other and fall as a lump. When the ground beans are in the form of a lump, the separation efficiency of wastes may decrease. In the cylindrical portion 65 shown in FIG. 15, the lump of ground beans collides with the inner wall of the cylindrical portion 65, thereby breaking the lump and making it easier to separate wastes.

The inner wall of the cylindrical portion 65 is not limited to a mortar shape in terms of breaking the lump of ground beans. When there is a portion in which a cross-sectional area of an internal space is smaller than that of the opening portion 65a in a middle portion of the cylindrical portion 65 and thus the inner wall is inclined (not horizontal) with respect to the center line CL, it is possible to make the ground beans fall smoothly while facilitating collision with the lump. The cylindrical portion 65 does not have to protrude into the separation chamber SC, and may include only a portion protruding upward from an outer surface of the separation chamber forming portion 64. However, since the cylindrical portion 65 protrudes into the separation chamber SC, a wind speed around the cylindrical portion 65 can be improved. Therefore, in a region R1 relatively far from the pipe portion 63, an effect of separating wastes due to the wind pressure can be enhanced.

The separation chamber forming portion 64 includes a discharge port 66 communicating with the separation chamber SC, from which the ground beans are discharged after wastes are separated. The discharge port 66 shown in FIG. 15 is positioned below the opening portion 65b, and the ground beans having passed through the cylindrical portion 65 pass through the separation chamber SC and fall freely from the discharge port 66. The discharge port 66 is a circular opening positioned on the center line CL, and is an opening concentric with the opening portion 65a and the opening portion 65b. Therefore, the ground beans easily pass through the separation chamber forming portion 64 by free fall, and it is possible to prevent the ground beans from accumulating in the separation chamber forming portion 64.

As shown in FIG. 17, a cross-sectional area SC2 of the discharge port 66 is larger than a cross-sectional area SC1 of the opening portion 65b. The opening portion 65b and the discharge port 66 overlap each other when viewed in the upper-lower direction. Therefore, when the opening portion 65b is projected in the upper-lower direction with respect to the discharge port 66, the opening portion 65b is accommodated inside the discharge port 66. In other words, the opening portion 65b is accommodated in a region in which the discharge port 66 is extended in the upper-lower direction. It is also possible to adopt a configuration in which the opening portion 65b and the discharge port 66 are not on the same center line but overlap each other, or a configuration in which at least one of the opening portion 65b and the discharge port 66 is not circular but is overlapped.

A ratio of the cross-sectional area SC1 to the cross-sectional area SC2 is, for example, 95% or less, or 85% or less, and is, for example, 60% or more or 70% or more. Since the opening portion 65b and the discharge port 66 are concentric, the opening portion 65b and the discharge port 66 overlap each other when viewed in the direction of the center line CL. Therefore, ground beans falling freely from the opening portion 65b are easily discharged from the discharge port 66. In addition, it is possible to prevent the falling ground beans from colliding with an edge of the discharge port 66 and jumping to the pipe portion 63 side, and it is also possible to prevent the required ground beans from being aspirated to the aspiration unit 6A. Although it has been exemplified that an opening area of the opening portion on one end (for example, 65*a*) is smaller than an opening area of the discharge port (for example, 66), the opening area of the discharge port (for example, 66) and the opening area of the opening portion on one end (for example, 65*a*) may be the same, or the opening area of the opening portion on one end (for example, 65*a*) may be larger than the opening area of the discharge port (for example, 66). Although it has been exemplified that an opening area of the opening portion on the other end (for example, 65*b*) is smaller than the opening area of the discharge port (for example, 66), the opening area of the discharge port (for example, 66) and the opening area of the opening portion on the other end (for example, 65*b*) may be the same, or the opening area of the opening portion on the other end (for example, 65*b*) may be larger than the opening area of the discharge port (for example, 66). Although it has been exemplified that the air is aspirated from the discharge port 66 and the inlets (for example, 65*a* and 65*a'*) by the aspiration unit (for example, 6A), an amount of air aspirated from the discharge port 66 may be larger than an amount of air aspirated from the inlets (for example, 65*a* and 65*a'*). This may be implemented by the opening portion on the other end (for example, 65*b*) protruding into the separation chamber, a size of the cross-sectional area of the discharge port 66 being larger than a size of the opening area of the opening portion on one end (for example, 65*a*), the size of the cross-sectional area of the discharge port 66 being larger than a size of the opening area of the opening portion on the other end (for example, 65*b*), a distance from the discharge port 66 to the separation chamber being shorter than a distance from the opening portion on one end (for example, 65*a*) to the separation chamber, a distance from the discharge port 66 to the exhaust pipe 61*b* being shorter than a distance from the opening portion on one end (for example, 65*a*) to the exhaust pipe 61*b*, or a distance from the discharge port 66 to the chaff fan unit 60A being shorter than a distance from the opening portion on one end (for example, 65*a*) to the chaff fan unit 60A. Any one of inner wall portions of members (63 to 65) constituting the forming unit 6B and the separation chamber SC, the cylindrical portion 65, or the opening portion on the other end (for example, 65*b*) may vibrate by being in contact with the grinder (at least one of 5A or 5B) directly or indirectly via another member to receive the vibration due to rotation of the grinder. For example, in the case of the coffee bean grinding machine 1 in the embodiment, since they are in direct or indirect contact, during the operation of the grinder, any one of the inner wall portions of the members (63 to 65) constituting the forming unit 6B and the separation chamber SC, the cylindrical portion 65, or the opening portion on the other end (for example, 65*b*) vibrates, and by the turbulent air generated in the separation chamber SC due to the vibration, a brake is applied to light wastes entering the separation chamber SC from the opening portion on the other end (for example, 65*b*) to facilitate the aspiration of the wastes by the aspiration unit (for example, 6A). In particular, the forming unit 6B, like the coffee bean grinding machine 1 in the embodiment, is in direct contact with the first grinder 5A out of the first grinder 5A and the second grinder 5B, and by bringing the forming unit 6B into direct contact with one grinder in this way, appropriate vibration may be applied to the forming unit 6B to facilitate the aspiration of light wastes.

The air aspirated by the aspiration unit 6A is mainly aspirated through the discharge port 66. Therefore, as shown in FIG. 13, a gap is provided between the discharge port 66 and the inlet 50*b* of the second grinder 5B, and air aspiration is facilitated. An arrow d4 shown in FIG. 15 schematically indicates a direction of an air flow of the air aspirated by the aspiration unit 6A. Aspiration of air from the discharge port 66 makes it difficult for wastes to be discharged from the discharge port 66, and separation performance between ground beans and wastes can be improved. The air aspirated by the aspiration unit 6A is also aspirated through the opening portion 65*a*.

A turbulent flow generating portion 67 is formed in a surrounding wall defining the discharge port 66. The turbulent flow generating portion 67 generates a turbulent flow in the air aspirated from the discharge port 66 into the separation chamber SC. By forming the turbulent flow generating portion 67, a turbulent flow is particularly likely to occur in a region R2 between the opening portion 65*b* and the discharge port 66. In the forming unit 6B shown in FIG. 15, since the wind speed is improved around the cylindrical portion 65, the generation of the turbulent flow in the region R2 can be synergistically facilitated.

Ground beans put into the inlet 65*a* are stirred by being affected by the turbulent flow when passing through the region R2. In particular, as described above, since the cross-sectional area SC2 of the discharge port 66 is larger than the cross-sectional area SC1 of the opening portion 65*b*, the ground beans always pass through the region R2. Due to the turbulent flow, wastes such as chaff and fine powder are easily separated from the ground beans. Therefore, even if the separation chamber SC is a small space, it is possible to improve the separation efficiency of the wastes, and in particular, it contributes to reducing a length of the separation chamber SC in the upper-lower direction, which is advantageous in reducing the size of the device when two-stage pulverizing is performed by the first grinder 5A and the second grinder 5B.

As shown in FIGS. 15 and 16, the turbulent flow generating portion 67 includes a plurality of turbulent flow generating elements 67*a*. The turbulent flow generating element 67*a* is a protrusion protruding downward in the upper-lower direction. A direction in which the turbulent flow generating element 67*a* protrudes may be any direction, but a direction within a range from a lower direction to a radially inward direction is preferable in terms of facilitating the generation of a turbulent flow in the separation chamber SC. When the protruding direction is the lower direction, the falling ground beans are not caught, which is more preferable.

A cross-sectional shape of the turbulent flow generating element 67*a* is such that an upper base of a cross section of a quadrangular prism having a trapezoidal shape is oriented in the direction of the center line CL, and, as shown in FIG. 16, an inner side of a tip end portion is provided with a chamfer 67*b*. The shape of the turbulent flow generating element 67*a* is not limited thereto, but a shape that makes a shape of the discharge port 66 three-dimensionally complicated is preferable.

As shown in FIG. 16, the turbulent flow generating element 67*a* is repeatedly formed in a circumferential direction d5 of the discharge port 66. As a result, air is blown into the region R2 from multiple directions, which facilitates the generation of a turbulent flow. The adjacent turbulent flow generating elements 67*a* have the same pitch, but may have different pitches. Although twelve turbulent flow generating elements 67*a* are formed, the number of the turbulent flow generating elements 67*a* is any number.

Although the pulverizing device 5 described with reference to FIGS. 12 to 17 is to be incorporated in the beverage production device 1 shown in FIG. 1, the pulverizing device 5 alone can also be used as a coffee bean grinding machine. In this case, a reservoir device that accommodates roasted coffee beans and supplies the coffee beans to the inlet 50a, a control device that controls the pulverizing device 5, and an information display device are added.

FIG. 18 is an external perspective view of a coffee bean grinding machine, and FIG. 19 is a block diagram of a control device of the coffee bean grinding machine. A basic configuration of the coffee bean grinding machine shown in FIG. 18 is substantially the same as a basic configuration of the pulverizing device 5 described with reference to FIGS. 12 to 17. Hereinafter, components having the same names as those described above are denoted by the same reference numerals as those used above, and differences from the pulverizing device 5 described with reference to FIGS. 12 to 17 will be mainly described.

A coffee bean grinding machine GM shown in FIG. 18 includes a reservoir device 4, a pulverizing device 5, and a control device 11 shown in FIG. 19 which controls the reservoir device 4 and the pulverizing device 5. The coffee bean grinding machine GM also includes the information display device 12 (see FIG. 19) wirelessly connected to the control device 11. The information display device 12 is a touch panel type display for inputting various control instructions, set values, and the like of the coffee bean grinding machine GM, and can receive inputs from an administrator or a user in addition to displaying various types of information. The information display device 12 is provided with a speaker and a camera.

The control device 11 controls the entire coffee bean grinding machine GM. The control device 11 includes a processing unit 11a, a storage unit 11b, and an interface (I/F) unit 11c. The processing unit 11a is, for example, a processor such as a CPU. The storage unit 11b is, for example, a RAM or a ROM. A recipe is stored in the storage unit 11b. The recipe includes information on various conditions for grinding coffee beans, beans information, recipe creator information, comments of a recipe creator, and the like. The I/F unit 11c includes an input and output interface that inputs and outputs a signal between an external device and the processing unit 11a. The I/F unit 11c also includes a communication interface capable of performing data communication with an external terminal such as a server 16 or a mobile terminal 17 via a communication network 15 such as the Internet. The server 16 can communicate with the mobile terminal 17 such as a smartphone via the communication network 15, and can receive, for example, information such as a reservation for production of ground beans of coffee and an impression from the mobile terminal 17 of a consumer. A coffee bean grinding system GS for grinding coffee beans includes the coffee bean grinding machine 1, the server 16, and the mobile terminal 17.

The processing unit 11a executes a program stored in the storage unit 11b, and controls the reservoir device 4 and the pulverizing device 5 according to the recipe. More specifically, the processing unit 11a controls the actuator group 14 in accordance with the recipe, and controls the actuator group 14 based on an instruction from the information display device 12, a detection result of the sensor group 13, or an instruction from the server 16. The sensor group 13 includes various sensors (for example, an operation position detection sensor of a mechanism) provided in the reservoir device 4 and the pulverizing device 5. The actuator group 14 includes various actuators (for example, a motor) provided in the reservoir device 4 and the pulverizing device 5.

The reservoir device 4 shown in FIG. 18 includes a cylindrical canister accommodation unit 401 and a detachable cap 401c that is screwed to an upper end portion of the canister accommodation unit 401 and covers an upper surface of the canister accommodation unit 401. A canister accommodation chamber (not shown) is provided inside the canister accommodation unit 401. The plurality of canister accommodation chambers are provided in a circumferential direction, and a plurality of canisters can be accommodated inside the canister accommodation unit 401. Here, the canister (not shown) has the same structure as the canister shown in FIGS. 1 and 2 except that the handle 40b is not provided. The plurality of canisters accommodated in the reservoir device 4 can be selectively used. Therefore, it is possible to perform a grinding process by selecting roasted coffee beans of different varieties or roasted coffee beans having different degrees of roasting, and it is also possible to perform a grinding process by mixing a plurality of types of roasted coffee beans of different varieties or degrees of roasting.

The canister accommodation unit 401 is detachably attached to an option attachment portion GM11 provided in an upper portion of a center casing GM10 of the coffee bean grinding machine GM. In addition to the canister accommodation unit 401, a plurality of types of units can be attached to the option attachment portion GM11. The upper portion of the center casing GM10 covers a lower portion of a unit attached to the option attachment portion GM11. A type of the unit attached to the option attachment portion GM1l may be displayed on the external terminal such as the mobile terminal 17 capable of communicating with the coffee bean grinding machine GM.

(a) of FIG. 20 is a diagram showing the coffee bean grinding machine GM to which a hopper unit 402 is attached instead of the canister accommodation unit 401 shown in FIG. 18, and (b) of FIG. 20 is a diagram showing the coffee bean grinding machine GM to which a funnel unit 403 is attached.

FIG. 18 is a perspective view of the coffee bean grinding machine GM as viewed obliquely from a front left side, and FIG. 20 is a perspective view of the coffee bean grinding machine GM as viewed obliquely from a front right side.

The option attachment portion GM11 shown in FIG. 18 is provided on an inner circumferential surface of the center casing GM10. A method of attaching each of the units to the option attachment portion GM11 may be a screwing method, a method in which a locking claw provided in each of the units is locked to the option attachment portion GM11, or a method in which a locking claw provided in the option attachment portion GM11 is locked to each of the units.

The hopper unit 402 shown in (a) of FIG. 20 is a transparent container in which roasted coffee beans are accommodated, and an upper surface of the hopper unit 402 is covered with a detachable cap 402c. The hopper unit 402 corresponds to a large single canister.

On the other hand, the funnel unit 403 shown in (b) of FIG. 20 is in a shape of a funnel whose inner side is tapered toward the option attachment portion GM11, and an upper end thereof is open. The funnel unit 403 also accommodates roasted coffee beans. In the funnel unit 403, the supply of roasted coffee beans to a downstream side is smooth as compared with the canister and the hopper unit 402. The canister accommodation unit 401, the hopper unit 402, and the funnel unit 403 are reservoir units capable of storing roasted coffee beans. These reservoir units (401 to 403) are provided with supply ports for supplying roasted coffee beans to the downstream side.

A weighing unit can also be attached to the option attachment portion GM11.

(a) of FIG. 21 is a diagram schematically showing a state in which a weighing unit 404 is attached to the option attachment portion GM11.

In the coffee bean grinding machine GM shown in (a) of FIG. 21, the canister accommodation unit 401 shown in FIG. 20 is further attached to the weighing unit 404 attached to the option attachment portion GM11. The reservoir units (401 to 403) capable of storing roasted coffee beans can be detachably attached to the weighing unit 404. Similarly to the method of attaching each of the units to the option attachment portion GM11, a method of attaching the reservoir unit to the weighing unit 404 may be a screwing method, a method in which a locking claw provided in each of the units is locked to the weighing unit 404, or a method in which a locking claw provided in the weighing unit 404 is locked to the reservoir unit. In the example shown in (a) of FIG. 21, locking claws 404k provided in the weighing unit 404 are locked to protruding portions GM11t of the option attachment portion GM11. Locking claws 401k provided in the canister accommodation unit 401 are locked to protruding portions 404t provided on an upper portion of an inner circumferential wall of the weighing unit 404.

The weighing unit 404 includes a receiving port 4040, a guiding passage 4041, a conveying passage 4042, and a feed-out port 4043. When the reservoir units (401 to 403) are attached to the weighing unit 404, a supply port USP of the reservoir unit is connected to the receiving port 4040 of the weighing unit 404, and roasted coffee beans stored in the reservoir unit are supplied to the receiving port 4040. The receiving port 4040 and an upstream side of the conveying passage 4042 are connected by the guiding passage 4041. In the conveying passage 4042 shown in (a) of FIG. 21, a right side is the upstream side and a left side is a downstream side. An electric screw conveyor ESC is disposed in the conveying passage 4042, and roasted coffee beans are conveyed through the conveying passage 4042 and fed out from the feed-out port 4043 toward the pulverizing device 5. That is, the roasted coffee beans supplied to the receiving port 4040 are guided to the conveying passage 4042 through the guiding passage 4041, and are conveyed from the right side to the left side of the conveying passage 4042 shown in (a) of FIG. 21. The conveying path 4042 shown in (a) of FIG. 21 is horizontally provided, but a downstream end opening 4042o of the conveying path 4042 is formed to open obliquely upward. The conveying path 4042 may be inclined such that the downstream side is higher than the upstream side.

(b) of FIG. 21 is a perspective view showing the electric screw conveyor ESC.

In the electric screw conveyor ESC shown in (b) of FIG. 21, a right rear side is an upstream side, and a left front side is a downstream side. The electric screw conveyor ESC includes a screw shaft ESC1 and a screw blade ESC2 spirally provided on an outer circumferential surface of the screw shaft ESC1. A motor ESC3 that rotationally drives the screw shaft ESC1 is built in an upstream end portion of the electric screw conveyor ESC. Roasted coffee beans guided to the conveying passage 4042 are conveyed through the conveying passage 4042 by the rotating screw blade ESC2. The control device 11 controls the rotation of the motor ESC3, and roasted coffee beans is automatically weighed by a rotation amount of the screw shaft ESC1. The electric screw conveyor ESC automatically weighs roasted coffee beans accommodated in the reservoir units (401 to 403) and conveys the roasted coffee beans toward the downstream side.

As shown in (a) of FIG. 21, a cover member 460 is provided on the downstream end opening 4042o of the conveying passage 4042. As described above, the downstream end opening 4042o is formed obliquely upward, and the cover member 460 is also obliquely disposed. The cover member 460 includes a cover plate 461 and belt-shaped members 451.

FIG. 22 is a diagram showing some aspects of the cover member 460 disposed in the downstream end opening 4042o of the conveying passage 4042.

The upper half of the downstream end opening 4042o shown in (a) of FIG. 22 is covered by the cover plate 461. The cover plate 461 is a rigid body made of resin.

An outlet portion 45 is provided at a downstream end of the conveying passage 4042. In the outlet portion 45, the belt-shaped members 451 having flexibility are disposed in a lateral direction at an interval W1. The belt-shaped members 451 are more flexible than the cover plate 461. The interval W1 between the belt-shaped members 451 is smaller than a size of general roasted coffee beans B. An upper end of each of the belt-shaped members 451 is fixed to a lower edge portion of the cover plate 461, but a lower end of each of the belt-shaped members 451 is a free end. In addition, the lower end of each of the belt-shaped member 451 is positioned inside an edge 4042e defining the downstream end opening 4042o by a length shorter than the size of the roasted coffee beans B. The belt-shaped members 451 make the downstream end opening 4042o have a small area but allow the roasted coffee beans B conveyed by the rotating screw blade ESC2 to pass through by flexibility. That is, in the first place, the area of the downstream end opening 4042o is reduced to about half by the cover plate 461, and it is difficult for the roasted coffee beans B to fall from the downstream end opening 4042o when the screw blade ESC2 stops rotating. Moreover, the area of the downstream end opening 4042o is further reduced by the belt-shaped members 451, and it is difficult for the roasted coffee beans B to fall from the downstream end opening 4042o. Therefore, the roasted coffee beans B are prevented from inadvertently entering the downstream side. On the other hand, since the belt-shaped members 451 have flexibility and the lower ends are free ends, the belt-shaped members 451 are turned outward by an extrusion force (corresponding to a conveying force) of the roasted coffee beans B conveyed by the rotating screw blade ESC2. As a result, the interval W1 between the belt-shaped members 451 and gaps between the lower ends of the belt-shaped members 451 and the edge 4042e defining the downstream end opening 4042o are widened, and the roasted coffee beans B are fed out from the widened interval and gap.

In the cover member 460 disposed obliquely upward, the belt-shaped members 451 are also inclined, and the outlet portion 45 also faces obliquely upward. Outlet portions 45 shown in (a) to (f) of FIG. 22 face obliquely upward. As described above, the outlet portion 45 faces obliquely upward, and it is difficult for the roasted coffee beans B to fall from the outlet portion 45. However, the outlet portions 45 shown in (a) to (f) of FIG. 22 may be oriented just beside.

The upper half of the downstream end opening 4042o shown in (a) of FIG. 22 is covered by the cover plate 461. The cover plate 461 is a rigid body made of resin.

The cover members 460 shown in (b) and (c) of FIG. 22 are the same as the cover member 460 shown in (a) of FIG. 22 except that the belt-shaped members 451 are long. The belt-shaped members 451 shown in (b) of FIG. 22 extend downward beyond the edge 4042*e* defining the downstream end opening 4042*o*, and a lower end of each of the belt-shaped members 451 is positioned outside the edge 4042*e*. The belt-shaped members 451 shown in (c) of FIG. 22 extend downward just to the edge 4042*e* defining the downstream end opening 4042*o*, and a lower end of each of the belt-shaped members 451 overlaps the edge 4042*e*. Therefore, in the cover members 460 shown in (b) and (c) of FIG. 22, the area of the downstream end opening 4042*o* can be further reduced as compared with the cover member 460 shown in (a) of FIG. 22, and the allowance for passage of the roasted coffee beans B is reduced. However, since the belt-shaped members 451 shown in (b) of FIG. 22 and the belt-shaped members 451 shown in (c) of FIG. 22 have flexibility and the lower ends thereof are free ends, the belt-shaped members 451 are turned outward by the extrusion force of the roasted coffee beans B conveyed by the rotating screw blade ESC2. As a result, the roasted coffee beans B are fed out by the extrusion force from both the outlet portion 45 shown in (b) of FIG. 22 and the outlet portion 45 shown in (c) of FIG. 22.

The cover members 460 shown in (d) and (e) of FIG. 22 are the same as the cover member 460 shown in (a) of FIG. 22 except that sizes of the cover plates 461 are different. In the cover member 460 shown in (d) of FIG. 22, an upper portion corresponding to ⅓ a size of the downstream end opening 4042*o* is covered with the cover plate 461. In the cover member 460 shown in (e) of FIG. 22, a portion from an upper side to the middle corresponding to ⅔ the size of the downstream end opening 4042*o* is covered with the cover plate 461. Therefore, in the cover member 460 shown in (d) of FIG. 22, the area of the downstream end opening 4042*o* is not reduced as compared with the cover member 460 shown in (a) of FIG. 22, and the allowance for passage of the roasted coffee beans B is increased. However, when the belt-shaped members 451 are included, an area of a downstream side opening 41*h* is reduced to half or more, and it is difficult for the roasted coffee beans B to fall from the outlet portion 45 when the screw blade ESC2 stops rotating. In addition, in the cover member 460 shown in (e) of FIG. 22, the area of the downstream end opening 4042*o* is further reduced as compared with the cover member 460 shown in (a) of FIG. 22, and the allowance for passage of the roasted coffee beans B is rather low. Therefore, it is preferable to use belt-shaped members that are more flexible than the belt-shaped members 451 shown in (a) of FIG. 22.

The cover member 460 shown in (f) of FIG. 22 does not include the cover plate 461, and includes only the outlet portion 45 formed of the belt-shaped members 451. Both ends of each of the belt-shaped members 451 are fixed to the edge 4042*e* defining the downstream end opening 4042*o*. In the cover member 460 shown in (f) of FIG. 22, the area of the downstream end opening 4042*o* is reduced by the belt-shaped members 451. Since both ends of each of the belt-shaped members 451 are fixed, the end on one side is not turned to the outside. However, an interval W2 between the belt-shaped members 451 increases by the extrusion force of the roasted coffee beans B conveyed by the rotating screw blade ESC2. The belt-shaped members 451 shown in (f) of FIG. 22 are thinner than the belt-shaped members 451 shown in (a) of FIG. 22. In addition, although the interval W2 between the belt-shaped members 451 shown in (f) of FIG. 22 is smaller than the size of one of the general roasted coffee beans B, the interval W2 is wider than the interval W1 between the belt-shaped members 451 shown in (a) of FIG. 22. Therefore, in the belt-shaped members 451 shown in (f) of FIG. 22, as compared with the belt-shaped members 451 shown in (a) of FIG. 22, the interval W2 is easily widened by the extrusion force of the conveyed roasted coffee beans B, and the interval after the widening is also large. Thus, the roasted coffee beans B are also fed out from the outlet portion 45 shown in (f) of FIG. 22 by the extrusion force.

FIG. 23 is a schematic diagram showing further aspects of the cover member 460.

The cover member 460 shown in (a) of FIG. 23 is the same as the cover member 460 shown in (a) of FIG. 22 except that the configuration of the outlet portion 45 is different. That is, the upper half of the downstream end opening 4042*o* is covered with the cover plate 461, and the outlet portion 45 is provided in a lower half. The outlet portion 45 shown in (a) of FIG. 23 includes a pivot shaft 452 extending in the horizontal direction and a lid member 453 pivoting in the upper-lower direction about the pivot shaft 452. The lid member 453 covers the entire lower half of the downstream end opening 4042*o*, and has a rectangular outer shape. The lid member 453 shown in (a) of FIG. 23 is in a state of covering the entire lower half of the downstream end opening 4042*o*, and it is difficult for the roasted coffee beans B to fall from the outlet portion 45 when the screw blade ESC2 stops rotating. In addition, the outlet portions 45 shown in FIG. 23 also face obliquely upward. Therefore, the lid member 453 also faces obliquely upward and is difficult to pivot upward. However, by the extrusion force of the roasted coffee beans B conveyed by the rotating screw blade ESC2, the lid member 453 pivots upward as shown by an arrow in the drawing, and the roasted coffee beans B are also fed out from the outlet portion 45 shown in (a) of FIG. 23.

The cover member 460 shown in (b) of FIG. 23 is the same as the cover member 460 shown in (a) of FIG. 23 except that a size and a shape of the lid member 453 are different. The lid member 453 shown in (b) of FIG. 23 covers a part of the lower half of the downstream end opening 4042*o*, and has a semicircular outer shape. Therefore, although a gap W3 is generated between the lid member 453 and the edge 4042*e* defining the downstream end opening 4042*o*, the gap W3 is narrower than the size of one of the general roasted coffee beans B. In the cover member 460 shown in (b) of FIG. 23, it is also difficult for the roasted coffee beans B to fall when the screw blade ESC2 stops rotating. On the other hand, by the extrusion force of the conveyed roasted coffee beans B, the lid member 453 pivots upward as shown by an arrow in the drawing, and the roasted coffee beans B are also fed out from the outlet portion 45 shown in (b) of FIG. 23. In particular, since the outlet portion 45 shown in (b) of FIG. 23 has the gap W3, the allowance for passage of the roasted coffee beans B is higher than that of the outlet portion 45 shown in (a) of FIG. 23.

The cover member 460 shown in (c) of FIG. 23 does not include only the cover plate 461, and includes only the outlet portion 45 including two pivot shafts 452L and 452R and a pair of left and right lid members 453L and 453R. The two pivot shafts 452L and 452R are inclined from a vertical direction in a relation in which the downstream end opening 4042*o* faces obliquely upward. The left lid member 453L covers the entire left half of the downstream end opening 4042*o* and has a semicircular outer shape. The right lid member 453L covers the entire left half of the downstream end opening 4042*o* and has a semicircular outer shape. In the outlet portion 45 shown in (c) of FIG. 23, it is also difficult for the roasted coffee beans B to fall when the screw blade ESC2 stops rotating. On the other hand, by the extrusion force of the conveyed roasted coffee beans B, as shown by arrows in the drawing, the left lid member 453L pivots to the left side, the right lid member 453R pivots to the right side, and the roasted coffee beans B are also fed out from the outlet portion 45 shown in (c) of FIG. 23.

Although the outlet portions 45 shown in FIG. 23 also face obliquely upward, the outlet portions may face just beside.

In the above description, "a coffee machine [for example, the beverage production device 1, the coffee bean grinding machine GM] for performing preparation using coffee beans, including: a conveying mechanism [for example, the electric screw conveyor ESC] configured to convey coffee beans toward an opening [for example, the downstream end opening 4042o]; and an outlet portion [for example, the outlet portion 45] configured to allow the coffee beans conveyed by the conveying mechanism to pass therethrough while reducing an area of the opening." has been described.

The conveying mechanism may be disposed in a cylindrical body, and the cylindrical body may have an upstream side serving as a reservoir side in which the coffee beans are stored and the opening on a downstream side.

Here, the coffee machine may be a coffee machine including: a reservoir unit configured to store coffee beans; a conveying mechanism configured to convey the coffee beans from the reservoir unit toward an opening; and an outlet portion configured to allow the coffee beans conveyed by the conveying mechanism to pass therethrough while reducing an area of the opening.

"The coffee machine in which, in the outlet portion, flexible belt-shaped members [for example, the belt-shaped members 451] are disposed in one direction [for example, a lateral direction] at intervals [for example, the intervals W1 and W2]." has also been described.

The one direction may be the lateral direction, a vertical direction, or an oblique direction.

The outlet portion may have a comb shape.

Both ends of each of the belt-shaped members may be fixed [for example, the belt-shaped members 451 shown in (f) of FIG. 22].

"The coffee machine in which each of the belt-shaped members has one end as a fixed end and the other end as a free end [for example, the belt-shaped members 451 shown in (a) to (e) of FIG. 22]." has also been described.

"The coffee machine in which the other end is positioned inside an edge defining the opening [for example, the belt-shaped members 451 shown in (a), (d), and (e) of FIG. 22]." has also been described.

The other end may be separated from the edge [for example, the edge 4042e] defining the opening by a first length, and the first length may be shorter than a size of coffee beans.

"The beverage production device in which a part of the belt-shaped member [for example, the belt-shaped members 451 shown in (b) and (c) of FIG. 22] on a side to be the other end [for example, a free end side] overlaps the edge [for example, the edge 4042e] defining the opening." has also been described.

That is, the other end may be positioned on an outer side of the edge [for example, a tip end of each of the belt-shaped members 451 shown in (b) of FIG. 22] or may be positioned at the edge [for example, a tip end of each of the belt-shaped members 451 shown in (c) of FIG. 22].

"The coffee machine in which the interval [for example, the intervals W1 and W2] is smaller than a size of the coffee beans." has also been described.

"The coffee machine further including a cover portion [for example, the cover plate 461] configured to cover a part of the opening separately from the outlet portion." has also been described.

The cover portion may be fixedly disposed along an outer periphery of the opening. The cover portion may have a plate shape.

"The coffee machine in which the outlet portion is a lid member [for example, the lid members 453 shown in FIG. 23, the left lid member 453L, and the right lid member 453R] that opens by a conveying force [for example, an extrusion force of the roasted coffee beans B conveyed by the rotating screw blade ESC2] of coffee beans by the conveying mechanism." has also been described.

"The coffee machine in which the outlet portion faces obliquely upward [for example, see the downstream end opening 4042o shown in (a) of FIG. 21]." has also been described.

Next, a bean outlet will be described.

(a) of FIG. 24 is a diagram showing a state in which a lid unit GM21 for opening and closing a bean outlet GM20 provided in the center casing GM10 of the coffee bean grinding machine GM is closed, and (b) of FIG. 24 is a diagram showing a state in which the lid unit GM21 is opened.

As described above, the option attachment portion GM11 is provided in the upper portion of the center casing GM10 of the coffee bean grinding machine GM. A start button GM15 for instructing the start of a grinding process by being pressed is provided in a middle portion in a height direction of the center casing GM10. Further, a lower portion of the center casing GM10 covers the first grinder 5A. The bean outlet GM20 shown in (b) of FIG. 24 is provided downstream of the option attachment portion GM11 and upstream of the first grinder 5A. That is, when the weighing unit 404 is attached to the option attachment portion GM11, a position of the bean outlet GM20 is a position on a downstream side of the feed-out port 4043 (see (a) of FIG. 21) of the weighing unit 404, and when the reservoir units (401 to 403) are attached to the option attachment portion GM11, the position is a position on a downstream side of the supply port USP (see (a) of FIG. 21) of the reservoir units. Roasted coffee beans stored in the reservoir units (401 to 403) are fed out from the bean outlet GM20. In addition, when the weighing unit 404 is attached to the option attachment portion GM11, a surplus of the beans may be discharged from the bean outlet GM20 as a result of the weighing. A guide passage forming member GM22 is attached to the center casing GM10 so as to prevent the roasted coffee beans discharged from the bean outlet GM20 from being scattered. As shown in (b) of FIG. 24, the roasted coffee beans B discharged from the bean outlet GM20 are guided by the guide passage forming member GM22 and slide obliquely downward. When a collection container is attached to the vicinity of a tip end of the guide passage forming member GM22, the discharged roasted coffee beans can be easily collected in the collection container.

As shown in (b) of FIG. 24, the lid unit GM21 includes an inner lid GM211 and an outer lid 212. In a closed state shown in (a) of FIG. 24, the inner lid GM211 is a part of a circumferential wall of a bean conveying passage (not shown) provided inside the center casing GM10. On the other hand, the outer lid GM212 is a member constituting a part of the center casing GM10 in the closed state shown in (a) of FIG. 24. The bean outlet GM20 provided in the center casing GM10 is closed by the outer lid GM212.

For example, after the weighing by the weighing unit 404 is completed and the weighed roasted coffee beans are put into the first grinder 5A, the lid unit GM21 is automatically switched from a closed state to an open state under the control of the control device 11. When the lid unit GM21 is in the open state, the screw blade ESC2 resumes rotation, and remaining roasted coffee beans are conveyed, and are discharged from the bean outlet GM20 before arriving the first grinder 5A. When roasted coffee beans remain in the electric screw conveyor ESC, roasted coffee beans of a different type are mixed when the roasted coffee beans of a different type are subjected to a grinding process in the next. Therefore, it is necessary to take out the remaining roasted coffee beans from the inside of the electric screw conveyor ESC to the outside. Even when the weighing unit 404 is not mounted and roasted coffee beans of the same type are used, the bean outlet GM20 effectively functions. Normally, until a rotation speed of a first motor of the first grinder 5A reaches a constant speed, roasted coffee beans are not supplied to the first grinder 5A, but beans remaining in front of the first grinder 5A are only discarded because they are ground by the first grinder 5A. However, if the bean outlet GM20 is provided, the remaining beans in front of the first grinder 5A can be collected from the bean outlet GM20, and the beans are not wasted. When the driving of the first grinder 5A is stopped, the lid unit GM21 automatically changes from the closed state to the open state under the control of the control device 11. When the lid unit GM21 automatically enters into the open state, it is notified in advance that the lid unit GM21 will be opened. Not only in the case of remaining roasted coffee beans, but also in the case of stopping the grinding process in the middle, the lid unit GM21 is opened, and the roasted coffee beans can be taken out to the outside from the inside of the coffee bean grinding machine GM. Further, the lid unit GM21 may be manually opened. For example, when the first grinder 5A is being driven, the lid unit GM21 is automatically locked and cannot be opened, but when the first grinder 5A is stopped, the automatic lock may be released and the lid unit GM21 may be manually opened at any time. Alternatively, the lid unit GM21 may be opened according to an instruction from an external terminal such as the mobile terminal 17.

In a grinding method in the coffee bean grinding machine GM described above, first, the reservoir units (401 to 403) capable of storing coffee beans are attached to the option attachment portion GM11 provided upstream of the first grinder 5A (attachment step). Next, the coffee beans stored in the reservoir units attached to the option attachment portion GM11 are supplied to the first grinder 5A (supply step). Then, the supplied coffee beans are ground by the first grinder 5A (grinding step). Finally, the coffee beans remaining between the reservoir units (401 to 403) and the first grinder 5A are taken out to the outside from the bean outlet GM20 (take-out step).

The bean outlet GM20 and the outer lid 212 that opens and closes the bean outlet GM20 are also applicable to the beverage production device 1 shown in FIG. 1. The bean outlet GM20 may be provided at a position below the bean inlet 103, which is upstream of the pulverizing device 5, by changing a mounting position of the information display device 12.

According to the above description, "a coffee bean grinding machine [for example, the coffee bean grinding machine GM shown in FIG. 18] including a grinder [for example, the pulverizing device 5] configured to grind coffee beans, in which an option attachment portion [for example, the option attachment portion GM11] is provided upstream of the grinder, and a reservoir unit [for example, the canister accommodation unit 401 shown in FIG. 18, the hopper unit 402 shown in (a) of FIG. 20] capable of storing coffee beans can be attached to the option attachment portion." has been described.

According to this coffee bean grinding machine, various option units can be attached to the option attachment portion, which is excellent in development. An example of the option unit is a reservoir unit capable of storing roasted coffee beans to be supplied to the grinder.

"The coffee bean grinding machine in which a funnel unit [for example, the funnel unit 403 shown in (b) of FIG. 20] for introducing coffee beans can be attached to the option attachment portion." has also been described.

"The coffee bean grinding machine in which a weighing unit [for example, the weighing unit 404 shown in FIG. 21] for weighing coffee beans and conveying the coffee beans toward a downstream side can be attached to the option attachment portion." has also been described.

"The coffee bean grinding machine in which an outlet [for example, the bean outlet GM20] capable of taking out coffee beans to the outside is provided upstream of the grinder and downstream of the option attachment portion." has also been described.

"The coffee bean grinding machine provided with a lid [for example, the outer lid 212] for opening and closing the outlet." has also been described.

Further, "a coffee bean grinding system (for example, FIG. 10 or FIG. 19) including an external device (for example, the server 16 or the mobile terminal 17) capable of communicating with the coffee bean grinding machine." has also been described.

"A grinding method of coffee beans in a grinder for grinding coffee beans, including: an attachment step of attaching a reservoir unit [for example, the canister accommodation unit 401 shown in FIG. 18, the hopper unit 402 shown in (a) of FIG. 20, and the funnel unit 403 shown in (b) of FIG. 20] capable of storing coffee beans to an option attachment portion [for example, the option attachment portion GM11] provided upstream of the grinder; and a grinding step of grinding coffee beans stored in the reservoir unit attached to the option attachment portion with the grinder." has also been described.

According to the above description, "a coffee bean grinding machine [for example, the beverage production device 1 shown in FIG. 1 or the coffee bean grinding machine GM shown in FIG. 18] provided with a grinder [for example, the pulverizing device 5) for grinding coffee beans, in which an outlet [for example, the bean outlet GM20] from which coffee beans can be taken out is provided upstream of the grinder]." has been described.

According to this coffee bean grinding machine, coffee beans that do not need to be supplied to the grinder can be taken out from the outlet to the outside. As a result, coffee beans that do not need to be ground can be collected.

"The coffee bean grinding machine provided with a lid [for example, the outer lid 212] for opening and closing the outlet port." has also been described.

"The coffee bean grinding machine, further including: a reservoir unit [for example, the reservoir device 4] capable of storing coffee beans on an upstream side of the grinder, in which the coffee beans stored in the reservoir unit can be taken out from the outlet." has also been described.

"The coffee bean grinding machine, further including: a cover body [for example, the center casing GM10] configured to cover at least a part of the grinder, in which when the lid is in an open state, a part of the cover body is also in an open state, and coffee beans can be taken out." has also been described.

"The coffee bean grinding machine, further including: a cover body [for example, the center casing GM10] configured to cover at least a part of the reservoir unit, in which when the lid is in an open state, a part of the cover body is also in an open state, and coffee beans can be taken out." has also been described.

"The coffee bean grinding machine further including a guide passage [for example, a guide passage formed by the guide passage forming member GM22] configured to guide coffee beans taken out from the outlet." has also been described.

Further, "a coffee bean grinding system (for example, FIG. 10 or FIG. 19) including an external device (for example, the server 16 or the mobile terminal 17) capable of communicating with the coffee bean grinding machine." has also been described.

"A grinding method for coffee beans in a grinder for grinding coffee beans, including: a supply step of supplying coffee beans to the grinder; a grinding step of grinding the coffee beans supplied in the supply step with the grinder; and a take-out step of taking out coffee beans to the outside from an outlet provided upstream of the grinder." has also been described.

Next, the pulverizing device 5 of the coffee bean grinding machine GM will be described. The pulverizing device 5 has a basic configuration same as the basic configuration of the pulverizing device 5 described with reference to FIGS. 12 to 17, and includes the first grinder 5A, the second grinder 5B, and the separation device 6. Hereinafter, differences from the pulverizing device 5 described with reference to FIGS. 12 to 17 will be mainly described, and redundant descriptions may be omitted.

FIG. 25 is a diagram showing a main configuration of the pulverizing device 5 built in the coffee bean grinding machine GM in a posture in which the guide passage forming member GM22 shown in FIG. 24 faces the front.

In FIG. 25, the first grinder 5A, the forming unit 6B, and the second grinder 5B are disposed from an upstream side. That is, the forming unit 6B is provided downstream of the first grinder 5A and upstream of the second grinder 5B. The first grinder 5A and the second grinder 5B are mechanisms that grind roasted coffee beans supplied from a reservoir unit such as the canister accommodation unit 401, the hopper unit 402, or the funnel unit 403. When the weighing unit 404 shown in (a) of FIG. 21 is attached, the first grinder 5A and the second grinder 5B serve as mechanisms that grind roasted coffee beans conveyed by the electric screw conveyor ESC. A connecting structure of the first grinder 5A and the forming unit 6B is the same as the connecting structure described with reference to FIG. 13. That is, the forming unit 6B is provided with the cylindrical portion 65 (see FIG. 13), which is not shown in this example, and the discharge port 51a (see FIG. 13 or FIG. 26) of the first grinder 5A is connected to the opening portion 65a (see FIG. 13) at an upper end of the cylindrical portion 65.

An upper end of a coupling duct 661 is connected to the discharge port 66 of the forming unit 6B. In FIG. 25, a lower side portion of the coupling duct 661 is obscured by the manual setting disc dial 695. The coupling duct 68 and the manual setting disc dial 695 are provided only in the coffee bean grinding machine GM, and details thereof will be described later.

FIG. 25 shows the fixed blade 57b disposed on an upper side and the rotary blade 58b disposed on a lower side, which constitute the second grinder 5B.

The fixed blade 57b can be moved up and down with respect to the rotary blade 58b, and a particle size of ground beans can be adjusted by adjusting an interval between the rotary blade 58b and the fixed blade 57b. FIG. 25 also shows a worm wheel 691 and a worm gear 692 that meshes with the worm wheel 691 as a part of a lifting mechanism for the fixed blade 57b. Details of the lifting mechanism of the fixed blade 57b will be described later.

First, the first grinder 5A will be described.

FIG. 26 is a perspective view of the first grinder 5A.

The first grinder 5A shown in FIG. 26 is a grinder for crushing coffee beans into a predetermined size (for example, about ¼) to facilitate separation of wastes adhering to the coffee beans. A rotation shaft (not shown in FIG. 26) extends from above, and the rotary blade 58a serving as a cutter is provided on the rotation shaft. The fixed blade 57a, which is a cutter, is provided around the rotary blade 58a. The fixed blade 57a shown in FIG. 26 is provided on an inner circumferential surface of the main body portion 53a. The rotation shaft is rotated by a first motor (not shown) (see the motor 52a shown in FIG. 12), and the rotary blade 58a is rotated.

Roasted coffee beans introduced into a bean conveying passage provided inside the center casing GM10 pass through a portion blocked by the inner lid GM211 shown in (b) of FIG. 24, and arrive the first grinder 5A.

FIG. 27 is a flowchart showing a grinding process of the first grinder 5A, which is executed by the processing unit 11a shown in FIG. 19.

The grinding process of the first grinder 5A shown in FIG. 27 is started in response to pressing of the start button GM15 shown in FIG. 24. When the weighing unit 404 shown in FIG. 21 is attached to the option attachment portion GM11, the grinding process may be started in response to the start of the rotation of the screw blade ESC2. On the other hand, when a predetermined time elapses after the electric screw conveyor ESC finishes conveying a set amount of roasted coffee beans, an end condition is satisfied, and the grinding process of the first grinder 5A ends. A sensor for detecting roasted coffee beans passing through an inlet of the first grinder 5A may be provided, and the grinding process of the first grinder 5A may be started or ended according to a detection result of the sensor.

First, the processing unit 11a starts forward rotation of the first motor (step S11), and the rotary blade 58a starts forward rotation. Next, it is determined whether to continue the forward rotation of the first motor based on whether the end condition is satisfied (step S12). If the end condition is satisfied, the determination result is No, the forward rotation of the first motor is stopped (step S17), and the grinding process of the first grinder 5A ends. On the other hand, if the end condition is not satisfied, the determination result is Yes, the process proceeds to step S13, and the forward rotation of the first motor is continued.

An upper surface 58a1 of the rotary blade 58a is inclined downward toward a downstream side in a forward rotation direction. At least the highest position of the upper surface 58a1 of the rotary blade 58a is a position above the fixed blade 57a. Roasted coffee beans that arrive the first grinder 5A are guided by the upper surface 58a1 of the rotating rotary blade 58a and are directed toward the fixed blade 57a by a centrifugal force, or are directed toward the fixed blade 57a without being guided by the upper surface 58a1 of the rotary blade 58a, and are pulverized while being sandwiched between the fixed blade 57a and the rotating rotary blade 58a. The pulverized ground beans are discharged from the discharge port 51a (see (a) of FIG. 26) to the forming unit 6B.

Although rare, in roasted coffee beans B that arrive the first grinder 5A, foreign substances harder than the roasted coffee beans B, such as stones and nails, may be mixed. Such foreign substances cannot be ground between the fixed blade 57a and the rotary blade 58a, and the rotary blade 58a cannot rotate normally with the foreign substances caught between the fixed blade 57a and the rotary blade 58a.

In (a) of FIG. 26, a stone St is caught between the fixed blade 57a and the rotary blade 58a, and the rotary blade 58a cannot normally rotate forward. That is, the rotation is stopped or a rotation speed is significantly reduced. The processing unit 11a shown in FIG. 19 monitors a value of a current flowing through the first motor. When the rotary blade 58a cannot normally rotate forward, the current value becomes an abnormal value (a value exceeding a reference value). In step S13 shown in FIG. 27, the processing unit 11a determines whether the current value is an abnormal value, and if the current value is a normal value, the processing unit 11a returns to step S12. On the other hand, when it is determined that the current value is an abnormal value, the first motor is rotated in reversely (step S14), and the rotary blade 58a starts to rotate reversely.

In (b) of FIG. 26, the first motor starts to rotate reversely, and the stone St caught between the fixed blade 57a and the rotary blade 58a falls. In addition to the current value, the processing unit 11a may monitor a rotational torque and determine whether a value of the rotational torque is an abnormal value. Alternatively, instead of monitoring the first motor, the processing unit 11a may monitor the number of rotations and a rotation speed of the rotary blade 58a and determine whether these values are abnormal values.

In step S15 subsequent to step S14 shown in FIG. 27, an instruction is issued to output a notification indicating that an abnormal value is detected. Although the notification here is an error display displayed on a display screen of the information display device 12 (for example, a character display of "a bean clogging error has occurred in the first grinder 5A"), an error notification sound may be output from a speaker provided in the information display device 12. The processing unit 11a records a log indicating that an abnormal value is detected in the storage unit 11b (step S16). Either the abnormality notification or the abnormality log recording may be performed first, or may be performed at the same time. Alternatively, only one of the abnormality notification and the abnormality log recording may be executed, or both the abnormality notification and the abnormality log recording may not be executed.

When the execution of step S16 is completed, the process returns to step S11, and the processing unit 11a outputs an instruction to start forward rotation of the first motor.

(c) of FIG. 26 shows a state in which the rotation of the first motor returns to the forward rotation, and the roasted coffee beans B are normally pulverized. The reverse rotation of the first motor shown in (b) of FIG. 26 is instantaneous, and the first motor is immediately returned to the forward rotation. The reverse rotation of the first motor may be continued for a predetermined time. For example, the reverse rotation of the first motor may be continued while an abnormality is being notified, and when the first motor returns to the forward rotation, an error resolution notification saying that "the bean clogging error has been resolved" may be output.

The falling stone St in (b) of FIG. 26 arrives at the second grinder 5B. Since the second grinder 5B is a grinder for fine grinding, a gap between the fixed blade 57b and the rotary blade 58b is narrow, the possibility that the stone St enters this gap is low, and the stone St remains on the fixed blade 57b. After the error notification in step S15 or the abnormality log storage in step S16, mentenance of the pulverizing device 5 is performed, and the stone St is removed at that time.

As described above, although the reverse rotation of the first motor is performed during the grinding process of the first grinder 5A executed by the processing unit 11a, an instruction to start the reverse rotation of the first motor may be output from an external terminal such as the mobile terminal 17 shown in FIG. 19. Alternatively, an instruction to stop the rotation of the first motor may be output from the external terminal. Further, an instruction to stop the operation of the entire coffee bean grinding machine GM may be output from the external terminal. The processing unit 11a controls the actuator group 14 according to such instructions from the external terminal.

In the description using FIG. 26, an example in which a stone is caught between the fixed blade 57a and the rotary blade 58a has been described, but in some cases, roasted coffee beans that are extremely hard and degraded may be caught between the fixed blade 57a and the rotary blade 58a, and even in such a case, it is possible to continue the grinding process of the first grinder 5A by performing the reverse rotation control of step S14. Damages to the first motor, the fixed blade 57a, and the rotary blade 58a are avoided.

A reverse rotation button that rotates the first motor reversely is provided in advance, and when an abnormal value is detected, the abnormality notification is instructed in step S15 without performing the reverse rotation control in step S14, and the reverse rotation of the first motor may be performed by the user of the coffee bean grinding machine GM in a manner of operating the reverse rotation button.

Roasted coffee beans can be more accurately weighed using the weighing unit 404 shown in FIG. 21, but the roasted coffee beans can be weighed by the first grinder 5A on the assumption that a predetermined amount of roasted coffee beans is continuously supplied to the first grinder 5A per unit time without using the weighing unit 404. That is, by measuring the time from when the current value of the first motor of the first grinder 5A becomes high after starting to grind beans, it is possible to calculate an amount of the beans ground by the first grinder 5A.

The grinding process of the first grinder 5A described above with reference to FIGS. 26 and 27 is also applicable to the grinding process of the first grinder 5A in the beverage production device 1 shown in FIG. 1. Further, the grinding process of the first grinder 5A described with reference to FIGS. 26 and 27 is also applicable to the grinding process of the second grinder 5B.

According to the above description, "a coffee machine [for example, the beverage production device 1 shown in FIG. 1 or the coffee bean grinding machine GM shown in FIG. 18], including: a grinder [for example, the first grinder 5A] for grinding coffee beans, in which the grinder includes a grinding unit [for example, the rotary blade 58a] capable of performing a predetermined rotation operation, and includes a determination device [for example, the processing unit 11a that executes step S13 shown in FIG. 27] that determines whether the grinding unit is in a normal state capable of performing a normal rotation operation." has been described.

According to this coffee machine, it is possible to detect, based on a determination result of the determination device, an abnormal state in which the grinding unit is not performing a normal rotation operation.

"The coffee machine, further including: a control device configured to control the grinder [for example, the processing unit 11a shown in FIG. 10 or FIG. 19], in which the control device can cause the grinding unit to perform a rotation operation in a direction opposite to the predetermined rotation operation when the determination device determines that the grinding unit is not in the normal state [for example, step S14 shown in FIG. 27]." has also been described.

"The coffee machine, further including: a drive unit [for example, the motor 52a shown in FIG. 12 and the first motor] configured to drive the grinding unit, in which the determination device determines whether the grinding unit is in the normal state based on whether a current flowing through the drive unit exceeds a predetermined value [for example, step S13 shown in FIG. 27]." has also been described.

"The coffee machine, further including: a notification device [for example, the information display device 12] configured to, when the determination device determines that the grinding unit is not in the normal state, notify that the grinding unit is in an abnormal state [for example, output an error display or an error notification sound]." has also been described.

"The coffee machine further including: a storage device [for example, the storage unit 11b shown in FIG. 10 or FIG. 19] capable of storing an abnormal state [for example, an abnormality log] when the determination device determines that the grinding unit is not in the normal state." has also been described.

Further, "a coffee machine system (for example, FIG. 10 or FIG. 19), including: an external device (for example, the server 16 or the mobile terminal 17) capable of communicating with the coffee machine." has also been described.

"A grinding method of coffee beans, including: a start step of starting a rotation operation of a grinding unit grinding coffee beans [for example, step S11 shown in FIG. 27]; and a determination step of determining whether the grinding unit is in a normal state capable of performing a normal rotation operation [for example, step S13 shown in FIG. 27]." has also been described.

Next, the aspiration unit 6A, which is not shown in FIG. 25, will be described.

(a) of FIG. 28 is a diagram showing the separation device 6. (a) of FIG. 28 shows the aspiration unit 6A and the forming unit 6B constituting the separation device 6.

A configuration of the forming unit 6B shown in (a) of FIG. 28 is the same as the configuration of the forming unit 6B described with reference to FIGS. 13 to 17, and a detailed description thereof will be omitted here.

The aspiration unit 6A shown in (a) of FIG. 28 is a unit that communicates with the separation chamber SC (see FIGS. 13 and 15 as well) in a direction (in this example, the left-right direction) intersecting with a passing direction BP (in this example, the upper-lower direction) of ground beans and aspirates the air in the separation chamber SC. By aspirating the air in the separation chamber SC, lightweight objects such as chaff and fine powder are aspirated. As a result, wastes can be separated from the ground beans.

The aspiration unit 6A is a mechanism of a centrifugal separation type. The aspiration unit 6A includes the chaff fan unit 60A and the collection container 60B. The chaff fan unit 60A includes a chaff fan 60A1 and a chaff fan motor 60A2 (see FIG. 30), the chaff fan 60A1 is rotationally driven by the chaff fan motor 60A2, so that the air in the separation chamber SC is aspirated, and lightweight objects such as chaff and fine powder are collected in the collection container 60B. The chaff fan unit 60A is covered with a casing 60C shown in FIG. 18, and the chaff fan unit 60A is not visible in the external perspective view of the coffee bean grinding machine GM shown in FIG. 18. An exhaust slit (not shown) is provided on a back surface side of the casing 60C, and the air aspirated by the chaff fan unit 60A is exhausted from the exhaust slit to the outside of the coffee bean grinding machine GM. An air volume dial 60D (see FIG. 18) is provided above the chaff fan unit 60A. By operating the air volume dial 60D, an aspiration volume of the fan motor of the chaff fan unit 60A can be changed.

Similarly to the collection container 60B described with reference to FIGS. 13 and 14, the collection container 60B shown in (a) of FIG. 28 includes the upper portion 61 and the lower portion 62.

(b) of FIG. 28 is a diagram showing a state in which the outer circumferential wall 61a (see (a) of FIG. 28) of the upper portion 61 of the collection container 60B is removed.

(b) of FIG. 28 shows the chaff fan unit 60A attached to the removed outer circumferential wall 61a. Further, the exhaust pipe 61b of the upper portion 61 is also shown. Similarly to the exhaust pipe 61b shown in FIG. 14, the exhaust pipe 61b shown in (b) of FIG. 28 also has a plurality of fins 61d formed on a circumferential surface thereof. The plurality of fins 61d are disposed in a circumferential direction of the exhaust pipe 61b. Each of the fins 61d is inclined obliquely with respect to an axial direction of the exhaust pipe 61b. The provision of such fins 61d facilitates the swirling of the air containing wastes around the exhaust pipe 61b.

(b) of FIG. 28 shows an internal structure of the lower portion 62 of the collection container 60B. Unlike the lower portion 62 shown in FIG. 14, the lower portion 62 shown in (b) of FIG. 28 has a double structure including an outer case 60Bo and an inner case 60Bi. In (b) of FIG. 28, a part of the inner case 60Bi disposed inside the outer case 60Bo is visible. The inner case 60Bi includes an upper end opening 6uo opened upward, and the exhaust pipe 61b is positioned above and inside the upper end opening 6uo.

(a) of FIG. 29 is a perspective view of the separation device 6 from which the outer case 60Bo is removed, as viewed obliquely from below.

(a) of FIG. 29 shows the inner case 60Bi. A plurality of (four in this example) openings 6io are provided at intervals in a circumferential direction in a lower portion pf a circumferential wall 6iw of the inner case 60Bi. Lower edges 6ioe of the edges defining the openings 6io are a part of an outer circumferential edge of a bottom surface 6ibs of the inner case 60Bi.

(b) of FIG. 29 is a perspective view of the outer case 60Bo showing a positional relation between the outer case 60Bo and the inner case 60Bi.

As shown in (b) of FIG. 29, the bottom surface 6ibs of the inner case 60Bi is positioned near a middle position in a height direction of the outer case 60Bo. A predetermined gap is provided between an inner circumferential surface 6ois of the outer case 60Bo and an outer circumferential surface 6ios of the inner case 60Bi.

(a) of FIG. 30 is a diagram schematically showing a phenomenon such as an air flow in the separation device shown in FIG. 29. In (a) of FIG. 30 and (b) of FIG. 30 which will be described later, an air flow containing wastes such as chaff and fine powder is indicated by solid and dotted arrows, the movement of the wastes is indicated by a one-dot chain line arrow, and an air flow from which the wastes is separated is indicated by a two-dot chain line arrow.

When the chaff fan 60A1 is rotationally driven by a chaff fan motor 60A2, the air containing the waste such as chaff and fine powder arrives the inside of the upper portion 61 of the collection container 60B through the connection portion 61c from the separation chamber SC in the forming unit 6B shown in (a) of FIG. 29. The connection portion 61c is open to the side of the exhaust pipe 61b, the air containing wastes swirls around the exhaust pipe 61b as indicated by the solid and dotted arrows in (a) of FIG. 30, and eventually enters the inner case 60Bi from the upper end opening 6uo of the inner case 60Bi. In an upper part of the inner case 60Bi, wastes such as chaff and fine powder fall due to their weights (see the one-dot chain line arrow), further fall into the outer case 60Bo from the plurality of openings 6io provided in the vicinity of the bottom surface 6ibs of the inner case 60Bi (see the one-dot chain line arrow), and accumulate on a bottom surface 6obs of the outer case 60Bo. The air from which the wastes fall and are separated in the inner case 60Bi becomes an upward air flow in the inner case 60Bi as indicated by the two-dot chain line arrow, rises along a central axis of the exhaust pipe 61b, and is exhausted to the outside of the coffee bean grinding machine GM from the exhaust slit (not shown) provided on the back surface side of the casing 60C shown in FIG. 18. As a result, the case (outer case 60Bo) in which the wastes such as chaff and fine powder are accumulated is different from the case (inner case 60Bi) in which the upward air flow is generated, so that the wastes hardly rise up, and the backflow of the wastes is reduced.

Both the outer case 60Bo and the inner case 60Bi have an entire transparent body, and the state of the inside can be checked from the outside. Therefore, it is possible to check an accumulation state of the wastes such as chaff and fine powder and an air flow from the outside. The entire body may not be transparent, or a part of the entire body may be transparent, and the entire body may be translucent instead of being transparent.

(b) of FIG. 30 is a diagram schematically showing a phenomenon such as an air flow in a separation device according to a modification.

In this modification, an upper end of the inner case 60Bi is not open and is closed by a doughnut-shaped top plate 6ub. The air that swirls around the exhaust pipe 61b and contains wastes such as chaff and fine powder continues to swirl along the outer circumferential surface 6ios of the inner case 60Bi and heads toward the bottom surface 6ibs of the inner case 60Bi (see the solid and dotted arrows). Eventually, the air enters the inner case 60Bi through the plurality of openings 6io provided in the vicinity of the bottom surface 6ibs of the inner case 60Bi. At this time, the wastes such as chaff and fine powder fall due to their weights (see the one-dot chain line arrow) and accumulates on the bottom surface 6obs of the outer case 60Bo. The air from which the wastes fall and are separated becomes an upward air flow in the inner case 60 as indicated by the two-dot chain line arrow, rises along a central axis of the inner case 60, heads upward through the inside of the exhaust pipe 61b, and is exhausted to the outside of the coffee bean grinding machine GM from the exhaust slit (not shown) provided on the back surface side of the casing 60C shown in FIG. 18. In this modification as well, the case (outer case 60Bo) in which the wastes such as chaff and fine powder are accumulated is different from the case (inner case 60Bi) in which the upward air flow is generated, so that the wastes hardly rise up, and the backflow of the wastes is reduced.

The separation device 6 described above with reference to FIGS. 28 to 30 is also applicable to the separation device of the beverage production device 1 shown in FIG. 1.

According to the above description, "a coffee machine [for example, the beverage production device 1 shown in FIG. 1 or the coffee bean grinding machine GM shown in FIG. 18], including: a grinder [for example, the first grinder 5A] configured to grind coffee beans; a separation unit [for example, the separation chamber SC] configured to separate a waste [for example, chaff and fine powder] from coffee beans; and a reservoir unit [for example, the lower portion 62 of the collection container 60B] configured to store the waste separated from the coffee beans in the separation unit, in which the reservoir unit includes an outer case body [for example, the outer case 60Bo shown in FIG. 28 or (b) of FIG. 29] and an inner case body [for example, the inner case 60Bi shown in FIG. 29] inside the outer case body, and the inner case body has, in a circumferential wall [for example, the circumferential wall 6iw shown in (a) of FIG. 29] thereof, an opening [for example, the opening 6io] connected to the inside of the outer case body" has been described.

The opening may allow the wastes to pass therethrough or may allow an air flow to pass therethrough.

"The coffee machine, further including: an aspiration unit [for example, the chaff fan unit 60A] above the reservoir unit, in which the inner case body is configured such that an air flow containing the waste enters inside the circumferential wall, the waste falls by an own weight thereof inside the circumferential wall [for example, the one-dot chain line shown in (a) of FIG. 30], and an air flow [for example, the two-dot chain line shown in (a) of FIG. 30] is aspirated by the aspiration unit and rises, and the outer case body stores the waste [for example, the one-dot chain line shown in (a) of FIG. 30] passed through the opening" has also been described.

The inner case body may be configured such that an air flow containing wastes swirls along the circumferential wall, the wastes fall by an own weight thereof in the vicinity of the opening [for example, the one-dot chain line arrow shown in (b) of FIG. 30], and an air flow [for example, the two-dot chain line arrow shown in (b) of FIG. 30] is aspirated by the aspiration unit and rises, and the outer case body may store the wastes [for example, the one-dot chain line arrow shown in (b) of FIG. 30] fallen from the vicinity of the opening.

"The coffee machine in which the outer case body is provided with a transparent portion [for example, an entire transparent body]." has also been described.

"The coffee machine in which the inner case body is provided with a transparent portion [for example, an entire transparent body]." has also been described.

"The coffee machine in which a discharge unit [for example, the exhaust slit provided on the back surface side of the casing 60C] configured to discharge air in the reservoir unit to an outside is provided above the reservoir unit." has also been described.

"The coffee machine, in which the grinder includes a first grinder [for example, the first grinder 5A] and a second grinder [for example, the second grinder 5B], and the separation unit is provided downstream of the first grinder and upstream of the second grinder." has also been described.

Further, "a coffee machine system (for example, FIG. 10 or FIG. 19), including: an external device (for example, the server 16 or the mobile terminal 17) capable of communicating with the coffee machine." has also been described.

"A method for collecting a waste generated from coffee beans when the coffee beans are ground, the method including: a separation step of separating a waste from coffee beans; a first step of directing an air flow containing the waste inside a circumferential wall of an inner case body which is disposed inside an outer case body and in which the circumferential wall is provided with an opening connected to the inside of the outer case body; and a second step of generating an upward air flow inside the circumferential wall by aspirating the inside of the circumferential wall from above." has also been described.

According to this method for collecting a waste, in the second step, the waste may fall on a bottom wall of the inner case body by an own weight thereof, and may further fall from the opening to a bottom wall of the outer case body.

Next, the coupling duct 661 will be described.

FIG. 31 is a diagram in which the manual setting disc dial 695 shown in FIG. 25 is removed so that the entire coupling duct 661 can be seen.

FIG. 31 shows the rotary blade 58b that constitutes the second grinder 5B, the fixed blade 57b that can move up and down with respect to the rotary blade 58b, and shows the worm wheel 691 and the worm gear 692 that meshes with the worm wheel 691 as a part of a lifting mechanism of the fixed blade 57b. The worm wheel 691 includes a gear portion 691g, a connection portion 691c, and a coupling port 691j (see FIG. 32). FIG. 31 shows a holder portion 693 provided between the fixed blade 57b and the worm wheel 691. The fixed blade 57b is screwed to the connection portion 691c of the worm wheel 691 via the holder portion 693. Therefore, when the gear portion 691g of the worm wheel 691 rotates, the fixed blade 57b also rotates together with the holder portion 693. A screw groove 693s is provided on an outer circumferential surface of the holder portion 693.

The coupling port 691j of the worm wheel 691 is connected to a lower end of the coupling duct 661. As a result, a path through which roasted coffee beans pass is formed in the order of the discharge port 66 of the forming unit 6B, the coupling duct 661, the worm wheel 691, the holder portion 693, the fixed blade 57b, and the rotary blade 58b. As shown in FIG. 31, air aspiration ports 661a are provided in a lower portion of the coupling duct 661. The air aspiration port 661a has the same function as that of a gap between the discharge port 66 and the inlet 50b of the second grinder 5B shown in FIG. 13, and aspiration of air from the air aspiration port 661a improves the performance of separating ground beans and wastes.

FIG. 32 is a diagram schematically showing a configuration of the second grinder 5B.

The second grinder 5B includes the second motor 52b, a motor base 502, a base portion 505a, and a particle size adjusting mechanism 503.

The second motor 52b is a drive source of the second grinder 5B, and is supported above the motor base 502. A pinion gear 52b' fixed to an output shaft of the second motor 52b and a gear 502a that meshes with the pinion gear are disposed above the motor base 502.

A gear 55b' that meshes with the gear 502a is disposed above the base portion 505a. The rotation shaft 54b is fixed to the gear 55b', and the rotation shaft 54b is rotatably supported by the base portion 505a. The rotation shaft 54b is rotated by a driving force of the second motor 52b transmitted to the gear 55b' via the gear 502a. The rotary blade 58b is provided at an end portion of the rotation shaft 54b, and the fixed blade 57b is provided above the rotary blade 58b. That is, the fixed blade 57b is disposed to face the rotary blade 58b.

The particle size adjusting mechanism 503 includes a motor 503a as a drive source thereof and the worm gear 692 rotated by a driving force of the motor 503a. The gear portion 691g of the worm wheel 691 meshes with the worm gear 692.

FIG. 32 shows a frame member 694. The frame member 694 is fixedly disposed in a casing (not shown), and a screw groove is provided on an inner circumferential surface of the frame member 694. The screw groove 693s provided on the outer circumferential surface of the holder portion 693 meshes with the screw groove of the frame member 694. As described above, the fixed blade 57b is screwed to the connection portion of the worm wheel 691 via the holder portion 693. Therefore, when the gear portion 691g of the worm wheel 691 rotates, the fixed blade 57b moves up and down in an axial direction of the gear portion 691g. The coupling port 691j of the worm wheel 691 is connected so as to overlap the lower end of the coupling duct 661, and the connection with the lower end of the coupling duct 661 is maintained even when the worm wheel 691 moves downward. The fixed blade 57b shown in FIG. 32 is positioned at an initial position and is in a state of being most distant from the rotary blade 58b.

The processing unit 11a shown in FIG. 19 controls a rotation amount of the motor 503a to adjust a gap between the rotary blade 58b and the fixed blade 57b. By adjusting this gap, the particle size of ground beans in the second grinder 5B can be adjusted.

The fixed blade 57b that moves up and down has a detection position that is a predetermined distance (for example, 0.7 mm) separated from the rotary blade 58b. The detection position is a position closer to the rotary blade 58b than the initial position of the fixed blade 57b. The second grinder 5B is provided with a sensor 57c that detects the fixed blade 57b at the detection position.

The second grinder 5B described above performs an initial operation when the coffee bean grinding machine GM is turned on. In the initial operation of the second grinder 5B, calibration is executed.

FIG. 33 is a flowchart showing steps of the calibration executed in the initial operation. FIG. 34 is a diagram showing a state of the calibration in stages.

In the second grinder 5B, when the pulverizing of roasted coffee beans is finished, the fixed blade 57b returns to the initial position.

When the initial operation is started, the fixed blade 57b is positioned at the initial position, and a contact step (step S51) shown in FIG. 33 is executed as a first step of the calibration. In the contact step, the processing unit 11a shown in FIG. 19 drives the motor 503a shown in FIG. 32. The gear portion 691g of the worm wheel 691 is rotated by the driving of the motor 503a, and the fixed blade 57b at the initial position is lowered until it comes into contact with the rotary blade 58b. (a) of FIG. 34 is a diagram showing a state in which a first contact step is executed. In (a) of FIG. 34, the fixed blade 57b positioned at the initial position is indicated by a two-dot chain line. In the assembly of the second grinder 5B, even if the fixed blade 57b and the rotary blade 58b are intended to be attached as designed, a slight attaching error may occur, and an attaching posture of the fixed blade 57b and the rotary blade 58b may be out of alignment. The fixed blade 57b and the rotary blade 58b may be out of alignment when used for a long time. Further, the frame member 694 and the rotation shaft 54*b* may be obliquely attached. FIG. 34 exaggeratedly shows that the fixed blade 57*b* and the rotary blade 58*b* are out of alignment in the attaching posture. As designed, both the fixed blade 57*b* and the rotary blade 58*b* always maintain a horizontal posture, but the rotary blade 58*b* shown in (a) of FIG. 34 is in a posture inclined upward to the right, and the fixed blade 57*b* is in a posture inclined downward to the right. When the contact step is executed, the fixed blade 57*b* moves downward as indicated by an arrow in the drawing, and as indicated by a solid line in (a) of FIG. 34, a portion of the fixed blade 57*b* that is positioned at a lowermost position due to the inclination comes into contact with a portion of the rotary blade 58*b* that is positioned at an uppermost position due to the inclination. When any part of the fixed blade 57*b* comes into contact with any part of the rotary blade 58*b*, a rotational torque or a current value of the motor 503*a* increases. When the processing unit 11*a* detects an increase in the rotational torque or an increase in the current value, the processing unit 11*a* stops the motor 503*a*, and the contact step ends.

Next, a moving step (step S52) is executed. In the moving step, the processing unit 11*a* rotates the motor 503*a* in a direction opposite to that in the contact step, and raises the fixed blade 57*b* to the detection position. (b) of FIG. 34 is a diagram showing a state in which a first moving step is executed. When the moving step is executed, the fixed blade 57*b* moves upward as shown by an arrow in the drawing, and the fixed blade 57 continues to move upward until the fixed blade 57*b* is detected by the sensor 57*c* shown in FIG. 32. When the processing unit 11*a* acquires a detection signal from the sensor 57*c*, the processing unit 11*a* stops the rotation of the motor 503*a*. The motor 503*a* is a stepping motor, and the processing unit 11*a* counts the number of steps from the start to the stop of the rotation of the motor 503*a* in the moving step, and stores the counted number in the storage unit 11*b* shown in FIG. 19. The moving step of (b) of FIG. 34 is 20150 steps.

Next, a rotation step (step S53) is executed. In the rotation step, the processing unit 11*a* rotates the second motor 52*b* shown in FIG. 32 by a predetermined rotation angle. The predetermined rotation angle referred to herein may be an angle other than 360 degrees, and is set to 90 degrees here for easy understanding, but is actually, for example, a predetermined angle of around 35 degrees. As a result, the state of the rotary blade 58*b* shown in (c) of FIG. 34 is changed to a posture inclined upward toward a rear side of a paper surface. The second motor 52*b* may be rotated for a predetermined time (for example, 0.1 seconds).

Next, step S54 is executed to determine whether the rotary blade 58*b* has made one rotation after the calibration is started. In this example, since the predetermined rotation angle in the rotation step of step S53 is less than 360 degrees, in step S54, it is determined whether the rotary blade 58*b* has made one rotation, but step S54 is a step for determining whether a count value of the number of steps has been acquired a plurality of times. In order to increase the accuracy, step S54 may be a step for determining whether the count value of the number of steps has been acquired a predetermined number of times. As the number of the predetermined number of times increases, the accuracy of the calibration improves, but it takes time to finish the calibration. An example of the predetermined number of times is about 10 times.

In the case of "NO" in the determination of step S54, a data acquisition process including three steps of the contact step (step S51), the moving step (step S52), and the rotation step (step S53) is executed again. In (d) of FIG. 34, a second contact step is executed, and the fixed blade 57*b* moves downward as shown by an arrow in the drawing. Since the rotation step is executed, a position in a circumferential direction of an uppermost portion of the rotary blade 58*b* is different from that in the first contact step. Therefore, in the fixed blade 57*b* and the rotary blade 58*b* shown in (d) of FIG. 34, portions different from those in the first contact step are in contact with each other. In (e) of FIG. 34, a second moving step is executed. The second moving step is 20170 steps. In (f) of FIG. 34, a second rotation step is executed, and the rotary blade 58*b* is rotated by 90 degrees. As a result, the state of the rotary blade 58*b* shown in (f) of FIG. 34 is changed to a posture inclined upward to the left.

When the rotation step in (f) of FIG. 34 is finished, the rotary blade 58*b* has rotated 180 degrees from the start of the calibration, and a third data acquisition process is executed. In (g) of FIG. 34, a third contact step is executed, and the fixed blade 57*b* moves downward as shown by an arrow in the drawing. As a result of the second rotation step being executed, in the fixed blade 57*b* and the rotary blade 58*b* shown in (g) of FIG. 34, portions different from those in the previous contact steps are in contact with each other. In (h) of FIG. 34, a third moving step is executed. The third moving step is 20160 steps. In (i) of FIG. 34, a second rotation step is executed, and the rotary blade 58*b* is rotated by 90 degrees. As a result, the state of the rotary blade 58*b* shown in (i) of FIG. 34 is changed to a posture inclined upward toward a front side of the paper surface.

When the rotation step in (i) of FIG. 34 is finished, the rotary blade 58*b* has rotated 270 degrees from the start of the calibration, and a fourth data acquisition process is executed. In FIG. 34, the state of the fourth data acquisition process is not shown, but is similar to (d) to (f) of FIG. 34. A fourth moving step was 20168 steps. When a fourth rotation step is executed, the rotary blade 58*b* rotates 360 degrees from the start of the calibration, "Yes" is determined in the determination of step S54 shown in FIG. 33, and the process proceeds to step S55.

In step S55, the processing unit 11*a* shown in FIG. 19 executes a calibration value calculation step. The storage unit 11*b* stores the count values of the number of steps of the motor 503*a* acquired in the four data acquisition processes. The processing unit 11*a* calculates a calibration value based on these four count values. The calibration value may be an average value of the four count values, or may be a median value of the four count values (½ of the sum of a minimum value and a maximum value).

In the example shown in FIG. 34, the average value is 20162 steps, and the median value is 20160 steps. The calculated calibration value is stored in the storage unit 11*b*. The calibration value is updated every time the coffee bean grinding machine GM is turned on and the initial operation is performed. When the execution of step S55 is completed, the calibration ends.

FIG. 35 is a diagram showing the second grinder 5B in a grinding process.

(a) of FIG. 35 is a diagram showing an example of an ideal state in which both the fixed blade 57*b* and the rotary blade 58*b* always maintain the horizontal posture as designed.

The diagram shown on a left side of (a) of FIG. 35 is a diagram showing a state in which the fixed blade 57*b* is positioned at the initial position. The processing unit 11*a* shown in FIG. 19 adjusts, according to various production conditions (recipes) for grinding roasted coffee beans stored in the storage unit 11*b*, a particle size of ground beans in second grinder 5B using the particle size adjusting mechanism 503 shown in FIG. 32. In the above recipes, production conditions in an ideal state are defined, and in the particle size adjustment of ground beans in the second grinder 5B, the motor 503*a* is rotated by 20160 steps, and the fixed blade 57*b* is lowered from the initial position. The diagram shown on a right side of (a) of FIG. 35 is a diagram schematically showing how the roasted coffee beans B are being pulverized. The fixed blade 57*b* in the diagram on the right side is at a position defined by a recipe where the motor 503*a* is rotated by 20160 steps and the fixed blade 57*b* is lowered from the initial position.

(b) of FIG. 35 is a diagram showing an example of a state in which the attaching posture of the fixed blade 57*b* and the rotary blade 58*b* is out of alignment as shown in FIG. 34.

The diagram shown on the left side of (b) of FIG. 35 is also a diagram showing a state in which the fixed blade 57*b* is positioned at the initial position. The fixed blade 57*b* shown in (b) of FIG. 35 is in a posture inclined downward to the right. On the other hand, the rotary blade 58*b* shown in (b) of FIG. 35 is in a posture inclined upward to the right. Here, the same recipe as the example shown in (a) of FIG. 35 is used. Therefore, the motor 503*a* should be rotated by 20160 steps, but the rotation amount of the motor 503*a* is corrected using the calibration value obtained in step S55 shown in FIG. 33. In the ideal state shown in (a) of FIG. 35, the number of steps of the motor 503*a* required to raise the fixed blade 57*b* from a state in which the fixed blade 57*b* is in contact with the rotary blade 58*b* to the detection position is stored in advance as a reference value in the storage unit 11*b* shown in FIG. 19. In the correction of the rotation amount of the motor 503*a*, the rotation amount after the correction is calculated based on a ratio between the calibration value obtained in step S55 shown in FIG. 33 and the reference value stored in advance in the storage unit 11*b*. In this example, the rotation amount after the correction is 20140 steps. The diagram shown on a right side of (b) of FIG. 35 is also a diagram schematically showing how the roasted coffee beans B are being pulverized. The fixed blade 57*b* in the diagram on the right side is at a corrected position where the motor 503*a* is rotated by 20140 steps and the fixed blade 57*b* is lowered from the initial position. However, an average interval between the fixed blade 57*b* and the rotary blade 58*b* shown in (b) of FIG. 35 is substantially the same as an interval between the fixed blade 57*b* and the rotary blade 58*b* shown in (a) of FIG. 35. Therefore, even when the roasted coffee beans B are pulverized in the state shown on the right side of (b) of FIG. 35, ground beans having the same particle size as in the case where the roasted coffee beans B are pulverized in the state shown on the right side of (a) of FIG. 35 can be obtained.

In the above description, although the calibration value is obtained by using the number of steps of the motor 503*a* when the fixed blade 57*b* is raised to the detection position, the calibration value can also be obtained by using the number of steps until the fixed blade 57*b* is lowered from the detection position and comes into contact with the rotary blade 58*b*.

In addition, although only the fixed blade 57*b* of the fixed blade 57*b* and the rotary blade 58*b* is configured to move up and down, the rotary blade 58*b* may also be configured to move up and down, and in this case, the calibration value may be obtained using the number of steps for both blades. Further, the movement of the blade is not limited to the vertical movement, and may be horizontal movement, for example. Positions of the fixed blade 57*b* and the rotary blade 58*b* may be opposite to each other, and the fixed blade 57*b* may be disposed on the lower side and the rotary blade 58*b* may be disposed on the upper side.

When the roasted coffee beans B are pulverized, the fixed blade 57*b* does not rotate, but even when the fixed blade 57*b* rotates, the calibration method shown in FIG. 33 can be applied. Although the calibration method shown in FIG. 33 is a method for the second grinder 5B, the calibration method shown in FIG. 33 can be performed in the same manner for the first grinder 5A.

The calibration value calculation step of step S55 shown in FIG. 33 may not be executed at the calibration stage, and the calibration value may be calculated at the stage where only count values for a plurality of times are stored in the storage unit 11*b* and a recipe to be used is determined, or the rotation amount may be directly corrected based on the stored count values for a plurality of times. The calculation of the calibration value and the correction of the rotation amount may be performed by a control unit of the information display device 12 instead of the processing unit 11*a* shown in FIG. 19.

According to the above description, "an extraction target pulverizing device [for example, the second grinder 5B] including: a first pulverizing unit [for example, the rotary blade 58*b*]; a second pulverizing unit [for example, the fixed blade 57*b*]; a rotation mechanism [for example, the second motor 52*b*, the pinion gear 52*b*', the gear 502*a*, the gear 55*b*', the rotation shaft 54*b*] configured to rotate at least one pulverizing unit [for example, the rotary blade 58*b*] of the first pulverizing unit and the second pulverizing unit; a moving mechanism [for example, the particle size adjusting mechanism 503] configured to move [for example, raise and lower] at least the second pulverizing unit out of the first pulverizing unit and the second pulverizing unit to adjust an interval between the first pulverizing unit and the second pulverizing unit; a sensor [for example, the sensor 57*c*] configured to detect the second pulverizing unit at a position [for example, the detection position] separated by a predetermined distance [for example, 0.7 mm] from the first pulverizing unit; and a control unit [for example, the processing unit 11*a* shown in FIG. 19] configured to control the moving mechanism, in which an extraction target [for example, roasted coffee beans stored in the reservoir device 4 or the roasted coffee beans B (ground beans) ground by the first grinder 5A)] is pulverized between the first pulverizing unit and the second pulverizing unit, an operation [for example, the operations shown by the arrows in (b), (e), and (h) of FIG. 34] of moving the second pulverizing unit from a state [for example, the states shown in (a), (d), and (g) of FIG. 34] in which the second pulverizing unit is in contact with the first pulverizing unit until the sensor detects the second pulverizing unit is performed a plurality of times by changing a state of the pulverizing unit [for example, a direction of the rotary blade 58*b*] by the rotation of the rotation mechanism, and the control unit controls the moving mechanism [for example, a calibration value is obtained, and the motor 503*a* is rotated by a rotation amount corrected using the calibration value] based on a value [For example, the count value of the number of steps of the motor 503*a*] related to a movement amount of the second pulverizing unit in the plurality of operations." has been described.

The rotation mechanism may rotate the first pulverizing unit, may rotate the second pulverizing unit, or may rotate blades of both the first pulverizing unit and the second pulverizing unit.

The moving mechanism may move only the second pulverizing unit out of the first pulverizing unit and the second pulverizing unit, or may also move the first pulverizing unit.

The operation may be an operation of moving only the second pulverizing unit out of the first pulverizing unit and the second pulverizing unit, or may be an operation of moving blades of both the first pulverizing unit and the second pulverizing unit.

The state change of the pulverizing unit in the operation may be a state change of the first pulverizing unit, a state change of the second pulverizing unit, or a state change of both pulverizing units of the first pulverizing unit and the second pulverizing unit. The state change referred to herein may be a direction change or a posture change.

"An extraction target pulverizing device [for example, the second grinder 5B], including: a first pulverizing unit [for example, the rotary blade 58b]; a second pulverizing unit [for example, the fixed blade 57b]; a rotation mechanism [for example, the second motor 52b, the pinion gear 52b', the gear 502a, the gear 55b', the rotation shaft 54b] configured to rotate at least one pulverizing unit [for example, the rotary blade 58b] out of the first pulverizing unit and the second pulverizing unit; a moving mechanism [for example, the particle size adjusting mechanism 503] configured to move [for example, raise and lower] at least the second pulverizing unit out of the first pulverizing unit and the second pulverizing unit to adjust an interval between the first pulverizing unit and the second pulverizing unit; a sensor [for example, the sensor 57c] configured to detect the second pulverizing unit at a position [for example, the detection position] separated by a predetermined distance [for example, 0.7 mm] from the first pulverizing unit; and a control unit [for example, the processing unit 11a shown in FIG. 19] configured to control the moving mechanism, in which an extraction target is pulverized between the first pulverizing unit and the second pulverizing unit, an operation [for example, the operations shown by the arrows in (a), (d), and (g) of FIG. 34] of moving the second pulverizing unit from a state [for example, the states shown in (b), (e), and (h) of FIG. 34] in which the second pulverizing unit is separated by a predetermined distance from the first pulverizing unit until the second pulverizing unit comes into contact with the first pulverizing unit is performed a plurality of times by changing a state of the pulverizing unit [for example, a direction of the rotary blade 58b] by the rotation [for example, the rotations shown by arrows in (c), (f), and (i) of FIG. 34] of the rotation mechanism, and the control unit controls the moving mechanism [For example, a calibration value is obtained, and the motor 503a is rotated by a rotation amount corrected using the calibration value] based on a value [For example, the count value of the number of steps of the motor 503a] related to a movement amount of the second pulverizing unit in the plurality of operations." has also been described.

In addition, the extraction target pulverizing device may be an extraction target pulverizing device including: a first pulverizing unit; a second pulverizing unit attached to face the first pulverizing unit; a rotation mechanism configured to rotate the first pulverizing unit; a moving mechanism configured to move the second pulverizing unit in a direction toward and away from the one blade; a sensor configured to detect the second pulverizing unit at a position separated by a predetermined distance from the first pulverizing unit; and a control unit configured to control the moving mechanism, in which an extraction target is pulverized between the first pulverizing unit and the second pulverizing unit, an operation of moving the second pulverizing unit from a state in which the second pulverizing unit is in contact with the first pulverizing unit until the sensor detects the second pulverizing unit is performed a plurality of times by changing a direction of the first pulverizing unit by the rotation of the rotation mechanism, and the control unit controls the moving mechanism based on values related to a movement amount of the second pulverizing unit in the plurality of operations.

"The extraction target pulverizing device in which the control unit controls the moving mechanism based on an average value or a median value [for example, ½ of the sum of a minimum value and a maximum value] of the values related to the movement amount of the second pulverizing unit in the plurality of operations." has also been described.

"The extraction target pulverizing device in which the operation is performed in an initial operation when the power is turned on." has also been described.

"The extraction target pulverizing device in which the control unit controls the moving mechanism according to a desired particle size [for example, the particle size of ground beans] after the pulverizing of the extraction target, and causes the moving mechanism to adjust the interval." has also been described.

"The extraction target pulverizing device in which the moving mechanism includes a motor [for example, the second motor 52b] as a drive source, and the value related to the movement amount of the second pulverizing unit is a value related to a rotation amount of the motor [for example, a count value of the number of steps of the motor 503a]." has also been described.

"The extraction target pulverizing device in which the first pulverizing unit is a first blade [for example, the rotary blade 58b], the second pulverizing unit is a second blade [for example, the fixed blade 57b], and the second pulverizing unit is attached facing the first pulverizing unit." has also been described.

"The extraction target pulverizing device in which an operation of moving the second pulverizing unit from a state in which the second pulverizing unit is in contact with the first pulverizing unit until the sensor detects the second pulverizing unit is performed a plurality of times by changing a direction of the pulverizing unit by the rotation of the rotation mechanism [for example, the example shown in FIG. 34]." has also been described.

According to the above description, "a calibration method [for example, the calibration method shown in FIG. 33] executed when power is applied in an extraction target pulverizing device [for example, the second grinder 5B], the calibration method including: a moving step [for example, the moving step of Step S52, (b), (e), and (h) of FIG. 34] of moving a second pulverizing unit [for example, the fixed blade 57b] from a state in which a first pulverizing unit [for example, the rotary blade 58b] and the second pulverizing unit are in contact with each other until the second pulverizing unit is separated by a predetermined distance [for example, 0.7 mm] from the first pulverizing unit; a state changing step of changing a state of at least one pulverizing unit [for example, the rotary blade 58b] out of the first pulverizing unit and the second pulverizing unit after the moving step is performed (for example, the rotation step of Step S53, (c), (f), and (i) of FIG. 34); and a contact step of bringing the second pulverizing unit separated by the predetermined distance from the first pulverizing unit into contact with the first pulverizing unit in a state in which the state of the pulverizing unit is changed by the state changing step [for example, Step S51, (a), (d), and (g) of FIG. 34], in which, by repeatedly executing the moving step, the state changing step, and the contact step (for example, the data acquisition process shown in FIG. 33), the state of the pulverizing unit [for example, a direction of the rotary blade 58*b*] is changed to acquire a value [for example, a count value of the number of steps of the motor 503*a*] related to a movement amount of the second pulverizing unit a plurality of times." has also been described.

The state changing step may be a rotation step of rotating at least one pulverizing unit out of the first pulverizing unit and the second pulverizing unit to change the direction of the pulverizing unit after the moving step is performed, and may be an aspect in which, by repeatedly executing the moving step, the rotation step, and the contact step, the direction of the pulverizing unit is changed to acquire the value related to the movement amount of the second pulverizing unit a plurality of times.

The value related to the movement amount of the second pulverizing unit may be a value related to a movement amount [for example, an increase amount] of the second pulverizing unit in the moving step, or may be a value related to a movement amount [for example, a decrease amount] of the second pulverizing unit in the contact step. Alternatively, the two movement amounts may be used in combination.

A calibration value calculation process [for example, the calibration value calculation step of step S55] of calculating a calibration value based on the movement amounts of the second pulverizing unit acquired a plurality of times may be included. The calibration value may be an average value or a median value of the movement amounts of the second pulverizing unit acquired a plurality of times.

In the above description, the fixed blade 57*b* is moved up and down by being driven by the second motor 52*b*, but the fixed blade 57*b* can also be moved up and down manually to set the particle size of ground beans. The manual setting of the particle size of ground beans can be performed using a manual setting disc dial and a fine adjustment knob dial.

(a) of FIG. 36 is a diagram showing the manual setting disc dial 695 and a fine adjustment knob dial 696 together with the second motor 503*a*, and (b) of FIG. 36 is a diagram showing a coupling dial 697 and a rotation shaft 6961 of the fine adjustment knob dial 696 with the manual setting disc dial 695 and the second motor 503*a* removed. FIG. 36 shows a part of the coupling duct 661 and the forming unit 6B. (b) of FIG. 36 also shows a hammer member GM32, which will be described in detail later.

FIG. 36 also shows a lever member 698. As shown in (a) of FIG. 36, a rotation shaft 6921 of the worm gear 692 that meshes with the gear portion 691*g* of the worm wheel 691 is pivotally supported by the lever member 698. The lever member 698 is pivotally supported by the rotation shaft 6961 of the fine adjustment knob dial 696 shown in (b) of FIG. 36. A posture of the lever member 698 shown in FIG. 36 is an initial posture. When the lever member 698 is in the initial posture, the worm gear 692 meshes with the gear portion 691*g* of the worm wheel 691, and when the worm gear 692 rotates, the worm wheel 691 rotates and the fixed blade 57*b* moves up and down. The lever member 698 is rotatable about the rotation shaft 6961 of the fine adjustment knob dial 696 in a direction of an arrow shown in (b) of FIG. 36. The lever member 698 is lifted by rotating in the direction of the arrow and changed to a released posture, and can maintain the released posture. When the lever member 698 is lifted and changed to the released posture, the worm gear 692 pivotally supported by the lever member 698 is separated from the gear portion 691*g* of the worm wheel 691, and is released from meshing with the gear portion 691*g*. The lever member 698 is capable of changing its posture between the initial posture and the released posture, and a biasing force is applied to the lever member 698 in a direction in which the lever member 698 returns to the initial posture by a spring member 6981 provided on the rotation shaft 6961. When the lever member 698 is in the released posture, the worm wheel 691 is in a rotatable state, and the fixed blade 57*b* is also in a rotatable state. When a grinding process is performed in this state, the fixed blade 57*b* also rotates with the rotation of the rotary blade 58*b*, and the interval between the fixed blade 57*b* and the rotary blade 58*b* increases. Therefore, it is necessary to return the lever member 698 to the initial posture during the grinding process.

(a) of FIG. 36 shows a pinion gear 503*b* attached to a rotation shaft of the second motor 503*a*, and the pinion gear 503*b* is also shown in (b) of FIG. 36 with the second motor 503*a* removed. A rotational driving force of the second motor 503*a* is transmitted from the pinion gear 503*b* to the gear portion 691*g* of the worm wheel 691 from the worm gear 692 via a two-stage gear and a transmission gear 6962, which will be described later.

The coupling dial 697 shown in (b) of FIG. 36 connects the manual setting disc dial 695 and the worm gear 692. (b) of FIG. 36 shows the coupling dial 697 coupled to the worm wheel 691, both of which rotate together. A coupling gear 697*g* is provided on an upper surface of the coupling dial 697. The manual setting disc dial 695 shown in (a) of FIG. 36 is provided with a gear (not shown) that meshes with the coupling gear 697*g*, and when the manual setting disc dial 695 is placed on the coupling dial 697, the gear (not shown) meshes with the coupling gear 697*g*.

When the lever member 698 is in the initial posture, the worm gear 692 meshes with the gear portion 691*g* of the worm wheel 691, and thus the manual setting disc dial 695 cannot be rotated. On the other hand, when the lever member 698 is in the released posture, the worm gear 692 does not mesh with the gear portion 691*g* of the worm wheel 691, and thus the manual setting disc dial 695 can be rotated. When the manual setting disc dial 695 is rotated, the worm gear 692 is rotated via the coupling gear 697*g*, and the fixed blade 57*b* can be raised and lowered.

The minimum unit that can be adjusted by rotating the manual setting disc dial 695 is one tooth of the gear portion 691*g* of the worm wheel 691. That is, unless the gear portion 691*g* of the worm wheel 691 is rotated by one tooth, the worm gear 692 cannot mesh with the gear portion 691*g*, and the lever member 698 cannot return from the released posture to the initial posture. Therefore, the adjustment of less than one tooth is not possible with the manual setting disc dial 695.

On the other hand, when the second motor 503*a* rotates and the worm gear 692 rotates, it takes time to perform a large adjustment (adjustment of one tooth or more) by a reduction ratio of the worm gear 692. Therefore, in order to perform a large adjustment, it is possible to perform a quick adjustment by operating the manual setting disc dial 695 capable of directly rotating the worm wheel 691. In the adjustment using the manual setting disc dial 695, the fixed blade 57*b* is lowered, and a position of the fixed blade 57*b* at the moment when the fixed blade 57*b* hits the rotary blade 58*b* is set to a reference point (zero point). The moment of this hitting can be recognized by the sound of the blade hitting. Although not shown, the manual setting disc dial 695 has a scale including 0 in a circumferential direction. The manual setting disc dial 695 rotates below the center casing GM10 shown in FIG. 18 and the like, and a reference line GM10k is marked on a lower end portion of the center casing GM10. The manual setting disc dial 695 is rotated to lower the fixed blade 565, and when the fixed blade 57b hits the rotary blade 58b, the rotation operation is stopped at that time. The manual setting disc dial 695 is lifted up, the scale of 0 is aligned with the reference line GM10k marked on the center casing GM10, and then the lifted manual setting disc dial 695 is lowered downward. In this way, the reference point (zero point) can be recorded. In particle size setting of ground beans, the fixed blade 57b is raised and lowered with reference to the reference point (zero point) recorded in this way, and the interval between the fixed blade 57b and the rotary blade 58b is adjusted.

The transmission gear 6962 is provided at a terminal end of the rotation shaft 6961 of the fine adjustment knob dial 696. The transmission gear 6962 meshes with a second gear 503c2 (see (b) of FIG. 36) of the two-stage gear and also meshes with the worm gear 692. A first gear 503c1 of the two-stage gear is meshed with the pinion gear 503b. Therefore, when the second motor 503a is rotationally driven, the fine adjustment knob dial 696 and the worm wheel 691 also rotates. In a state in which the second motor 503a is stopped, the fine adjustment knob dial 696 can be rotated, and the worm wheel 691 is also rotated by rotating the fine adjustment knob dial 696. When the fine adjustment knob dial 696 is rotated once, the gear portion 691g of the worm wheel 691 is rotated by one tooth. Therefore, when the fine adjustment knob dial 696 is rotated, the adjustment of less than one tooth of the worm gear 692 can be performed as in the case where the second motor 503a is rotationally driven to rotate the worm wheel 691. In manual setting of the particle size of ground beans, the manual setting disc dial 695 is used to roughly set the particle size, and the fine adjustment knob dial 696 is used to perform fine adjustment of the particle size setting. In this way, it is possible to set the particle size quickly and finely.

The manual setting by the manual setting disc dial 695 and the fine adjustment knob dial 696 is also applicable to the second grinder 5B of the beverage production device 1 shown in FIG. 1.

Next, a contrivance to control an input amount of ground beans to be put into the second grinder 5B will be described.

As described above, roasted coffee beans are crushed to a predetermined size (for example, about ¼) by the first grinder 5A. Hereinafter, beans crushed to a predetermined size by the first grinder 5A are referred to as cracked beans to be distinguished from ground beans (in particular, coarsely ground beans). The second grinder 5B grinds the cracked beans crushed by the first grinder 5A into ground beans having a desired particle size. Here, when a large amount of cracked beans exceeding an appropriate allowable amount of a grinding process by the second grinder 5B is fed from the first grinder 5A, the cracked beans excessively enter between the fixed blade 57b and the rotary blade 58b, and the ground beans stay between the fixed blade 57b and the rotary blade 58b. The staying ground beans receive frictional heat from the rotating rotary blade 58b and heat up. In particular, in a finely ground state, the ground beans are easily affected by heat and a surface thereof easily produce more oil than necessary. A coffee beverage extracted from the ground beans ground in this way tends to be too rich in taste.

In a case where the first grinder 5A is driven at an upper limit of the processing capacity, when the number of rotations of a first motor for the first grinder 5A is reduced, an amount of the cracked beans fed from the first grinder 5A per unit time is reduced.

FIG. 37 is a flowchart showing a control process of the processing unit 11a in the grinding process.

The control process shown in FIG. 37 is started in response to pressing of the start button GM15 shown in FIG. 24. When the weighing unit 404 shown in FIG. 21 is attached to the option attachment portion GM11, the control process may be started in response to the start of the rotation of the screw blade ESC2 shown in (b) of FIG. 21.

First, the processing unit 11a starts the rotation of the first motor for the first grinder 5A and the second motor 503a for the second grinder 5B (step S21). In step S21, both the first motor and the second motor 503a start rotating at preset rotation speeds. As a result, the rotary blade 58a starts rotating in the first grinder 5A, and the rotary blade 58b starts rotating in the second grinder 5B. The rotation of the first motor and the rotation of the second motor 503a may not be started at the same time, and the rotation of the second motor 503a may be started after the rotation of the first motor is started. For example, when the grinding process is started by the first grinder 5A, the rotational torque or the current value of the first motor increases. The processing unit 11a may start the rotation of the second motor 503a when detecting an increase in the rotational torque or an increase in the current value of the first motor. When the first motor for the first grinder 5A starts to rotate, the cracked beans are fed to the second grinder 5B.

In the subsequent step S22, it is determined whether to continue the rotation of the first motor. For example, if a predetermined time elapses after the electric screw conveyor ESC finishes conveying, if a predetermined time elapses after the rotational torque of the first motor decreases, or if a predetermined time elapses after the current value of the first motor decreases, the determination result is No, and the rotation of the first motor is stopped (step S27). On the other hand, if the determination result is Yes, the process proceeds to step S23.

A sensor for detecting passage of the cracked beans is provided in the vicinity of an inlet of the second grinder 5B, and the processing unit 11a shown in FIG. 19 monitors an input amount of the cracked beans to be put into the second grinder 5B per unit time. In step S23, it is determined whether the input amount per unit time exceeds a reference value. The reference value is a variable that varies depending on the type of coffee beans, the particle size of ground beans, the rotation speed set in the second motor 503a, and the like, and a plurality of types of reference values are stored in the storage unit 11b shown in FIG. 19. For example, the harder the coffee beans, the smaller the reference value. The recipe specifies the type of coffee beans, the particle size of ground beans, and the like, and the processing unit 11a selects a reference value according to the recipe and executes the determination process of step S23, or selects a reference value according to various set values and executes the determination process of step S23. When the input amount per unit time exceeds the reference value, the rotation speed of the first motor is reduced (step S24), and the process returns to step S22. A rate of reducing the rotation speed of the first motor may be a predetermined rate, or may be a rate corresponding to a degree at which the input amount exceeds the reference value. When the rotation speed of the first motor is decreased, the amount of cracked beans fed out from the first grinder 5A per unit time is reduced. As a result, the input amount can also be reduced, the ground beans can be prevented from staying between the fixed blade 57b and the rotary blade 58b, and the ground beans are hardly affected by heat. A coffee beverage extracted from the ground beans ground in this way tends to have a refreshing taste without being adversely affected by oil content.

If it is determined in step S23 that the input amount is equal to or less than the reference value, it is determined whether the rotation speed of the first motor is in a state of being reduced. If the rotation speed is not in a state of being reduced, the process returns to step S22, and if the rotation speed is in a state of being reduced, the rotation speed is restored to the set rotation speed (step S26), and then the process returns to step S22.

In step S28 following step S27 of stopping the rotation of the first motor, it is determined whether to stop the rotation of the second motor 503a this time. For example, if a predetermined time elapses after the rotational torque of the second motor 503a decreases or if a predetermined time elapses after the current value of the second motor 503a decreases, the determination result is Yes, the rotation of the second motor 503a is stopped (step S29), and the control process ends.

In the control process described above, although the input amount of ground beans to be put into the second grinder 5B is controlled by controlling the rotation speed of the first motor for the first grinder 5A, the input amount of ground beans to be put into the second grinder 5B can also be controlled by controlling a rotation speed of the motor ESC3 that rotates the screw blade ESC2 of the weighing unit 404 shown in FIG. 21. By controlling both the rotation speed of the first motor and the rotation speed of the motor ESC3, it is also possible to control the input amount of ground beans to be put into the second grinder 5B.

The control process shown in FIG. 37 can also be executed by the processing unit 11a shown in FIG. 10, and by controlling the rotation speed of the motor 52a for the first grinder 5A shown in FIG. 12 or by controlling a conveying speed of the conveyor 41 shown in FIG. 2, the input amount of ground beans to be put into the second grinder 5B shown in FIG. 2 can be controlled.

A rotation speed of the rotary blade 58a of the first grinder 5A may change depending on the hardness or the like of roasted coffee beans. Originally, although the rotation speed of the first motor of the first grinder 5A is set so as not to exceed the allowable amount of the grinding process by the second grinder 5B, the number of rotations per unit time (rotation speed) of the rotary blade 58a or the first motor of the first grinder 5A may be monitored, and when the number of rotations per unit time exceeds the reference value, the rotation speed of the first motor may be reduced.

The control process in the grinding process described above with reference to FIG. 37 is also applicable to the control process in the grinding process of the pulverizing device of the beverage production device 1 shown in FIG. 1. An instruction to reduce or restore the rotation speed of the first motor may be output from an external terminal such as the mobile terminal 17 shown in FIG. 19.

According to the above description, "a coffee machine [for example, the coffee bean grinding machine GM shown in FIG. 18 or the beverage production device 1 shown in FIG. 1] including: a second grinder configured to grind coffee beans [for example, the second grinder 5B], in which an input amount of coffee beans to be put into the second grinder is controlled [for example, step S24 shown in FIG. 37]." has been described.

According to this coffee machine, the input amount is controlled in consideration of a state for grinding coffee beans in the grinder.

The coffee beans referred to herein may be cracked beans, ground beans, or beans that are not cracked or ground.

The input amount is controlled to prevent ground beans from staying in the second grinder for an unnecessarily long time. In the second grinder, when the input amount of coffee beans is larger than an output amount of ground beans, the ground beans stay in the second grinder for a longer time, and the ground beans are easily adversely affected by heat. Therefore, in the coffee machine, the input amount is controlled to prevent this from happening. Therefore, the machine is controlled in consideration of a state for grinding coffee beans in the grinder.

"The coffee machine in which the input amount is controlled according to a type of coffee beans." has also been described.

The type of coffee beans may be a variety of coffee beans, a degree of roasting of coffee beans, or a combination of the type and the degree of roasting.

"The coffee machine, further including: a first grinder [for example, the first grinder 5A] provided upstream of the second grinder and configured to grind coffee beans, in which the input amount of coffee beans to be put into the second grinder is controlled by controlling a speed [for example, the rotation speed of the first motor] at which the first grinder grinds coffee beans." has also been described.

"The coffee machine, further including: a supply device [for example, the weighing unit 404 shown in FIG. 21 and the conveyor 41 shown in FIG. 2] provided upstream of the second grinder and configured to supply coffee beans downstream, in which the input amount of coffee beans to be put into the second grinder is controlled by controlling a supply speed of coffee beans by the supply device." has also been described.

"The coffee machine, further including: a first grinder [for example, the first grinder 5A] disposed upstream of the second grinder and configured to grind coffee beans; and a supply device [for example, the weighing unit 404 shown in FIG. 21 and the conveyor 41 shown in FIG. 2] disposed upstream of the first grinder and configured to supply coffee beans downstream, in which at least one of the first grinder or the supply device is controlled to reduce the input amount of coffee beans to be put into the second grinder." has also been described.

For example, both the first grinder and the supply device may be controlled to reduce the input amount of coffee beans to be put into the second grinder.

Further, "a coffee machine system (for example, FIG. 10 or FIG. 19) including an external device (for example, the server 16 or the mobile terminal 17) capable of communicating with the coffee machine." has also been described.

In addition, "a grinding method of coffee beans including: a step of starting to put coffee beans into a second grinder (step S21 shown in FIG. 37); and a step of controlling an input amount of coffee beans to be put into the second grinder (step S24 shown in FIG. 37)." has also been described.

The ground beans ground by the second grinder 5B are discharged from a chute GM31 shown in FIG. 18.

The chute GM31 shown in FIG. 18 guides the ground beans fed in a substantially horizontal direction downward. The coffee bean grinding machine GM shown in FIG. 18 is provided with a hammer member GM32 that strikes the chute GM31. The hammer member GM32 pivots about a pivot shaft GM321 extending in the upper-lower direction.

The ground beans fed out in the substantially horizontal direction may collide with and adhere to an inner wall of the chute GM31. A user pivots the hammer member GM32 to strike the chute GM31, and applies an impact to the adhered ground beans to cause the ground beans to fall.

Next, an example in which a grinding process is executed according to order information from the outside of the coffee bean grinding machine GM (for example, the server 16 or the mobile terminal 17 shown in FIG. 19) will be described.

FIG. 38 is a flowchart showing a control process executed by the processing unit 11a when a grinding process is executed according to order information.

In step S31, it is determined whether order information is received. If the order information is not received, step S31 is repeatedly executed. If the order information is received, the process proceeds to step S32. Specific contents of the order information will be described later.

In step S32, the received order information is displayed on the information display device 12 shown in FIG. 19, and the process proceeds to step S33.

In step S33, it is determined whether a grinding start operation of coffee beans is received. The grinding start operation here is an operation of the information display device 12, which will be described in detail later. If the grinding start operation is not received, the process proceeds to step S34, and if the grinding start operation is received, the process proceeds to step S36.

In step S34, it is determined whether an order information change operation is received. The order information change operation here is also an operation of the information display device 12, which will be described in detail later. If the order information change operation is received, the process proceeds to step S35, and if the order information change operation is not received, the process returns to step S33.

In step S35, the received order information is updated according to the order information change operation, and the process returns to step S33.

During the period from the reception of the order information to the reception of the grinding start operation, the received order information can be changed in steps S34 and S35. The grinding start operation and the order information change operation are not limited to the operation of the information display device 12, an operation from the mobile terminal 17 may be received, and as long as the information of this operation is transmitted to the coffee bean grinding machine GM, a transmission path thereof may be any path.

In step S36, a grinding process of coffee beans is executed. First, an amount of roasted coffee beans specified by the order information is supplied from the reservoir device 4 to the first grinder 5B. In the first grinder 5B, the ground cracked beans are supplied to the second grinder 5B after wastes are separated by the separation device 6. In the second grinder 5B, coffee beans are ground while the interval between the fixed blade 57b and the rotary blade 58b is changed at a predetermined interval (for example, every 50 μm) according to the order information, and the ground coffee beans are discharged from the chute GM31 shown in FIG. 18. When the grinding process ends, a process of producing ground coffee beans ends.

In the above example, although a case where the grinding process is executed according to the order information from the outside of the ground coffee bean machine GM has been described, the order information may be directly input to the ground coffee bean machine GM using the information display device 12. In the case of this configuration, step S32, step S34, and step S35 shown in FIG. 38 may be omitted.

In the above example, although the order information can be changed during the period from the reception of the order information to the reception of the grinding start operation, the grinding process may be started as soon as the order information is received without providing an opportunity for such changes.

Here, a recipe will be described in detail. The recipe includes a grinding recipe including only grind information for grinding coffee beans, and a beverage production recipe including information on various production conditions for preparing a coffee beverage, such as extraction conditions for a coffee beverage, in addition to the grind information. In the coffee bean grinding machine GM, a grinding process can be executed as long as there is a grinding recipe, but if a beverage production recipe is displayed on the information display device 12, grinding conditions may be corrected in view of conditions of a coffee beverage extraction process executed after the grinding process, and a better quality coffee beverage may be obtained.

The storage unit 11b shown in FIG. 19 may keep storing a recipe, or may acquire a recipe from the server 16 before starting the grinding process, store the recipe only while the grinding process is being executed, and delete the recipe from the storage unit 11b when the grinding process ends. Alternatively, only a part of the information of a recipe (for example, beans information or recipe creator information) may be stored in the storage unit 11b, the remaining information of the recipe (for example, information of various conditions for grinding coffee beans) may be acquired from the server 16 before the grinding process is started, and the remaining information may be deleted from the storage unit 11b when the grinding process ends. Recipes stored in the storage unit 11b are encrypted.

The recipes are managed as a database in the server 16.

(A) to (C) of FIG. 39 are diagrams showing an example of data stored in the server 16. (A) of FIG. 39 shows data 1500 stored in a beverage information database. The data 1500 includes a recipe ID 1501, creator information 1502 indicating a creator of a recipe, number-of-times-of-production information 1503 indicating the number of times of production in which beverage information has been selected by a user in the past, raw material information, a production method, and types 1512 and 1513. The raw material information includes beans information 1504 indicating a type of beans, production area information 1505 indicating a production area of beans, and information of a degree of roasting 1506 indicating a degree of roasting of beans. The production method includes the amount of beans used in one extraction 1507, a grinding particle size of beans 1508, a steaming hot water amount 1509, a steaming time 1510, and an extracted hot water amount 1511. Among these pieces of information, the most necessary information in a grinding process is the grinding particle size of beans 1508, but other pieces of information may also be necessary in considering the grinding particle size of beans 1508. A type 1 (1512) is type information indicating whether a beverage is a hot beverage or an iced beverage, and a type 2 (1513) is type information indicating the flavor of the beverage. In the present embodiment, although the number-of-times-of-production information 1503 is described as the number of times a beverage corresponding to the number-of-times-of-production information 1503 has been produced by a plurality of beverage production devices, the number-of-times-of-production information 1503 may be stored for each of the beverage production devices.

(B) of FIG. 39 shows exemplary data 1520 of a user information database. A user may be a store, or a clerk or a customer of the store. The data 1520 includes ID information 1521 indicating a user identifier, name information 1522 indicating a name of a user, age information 1523 indicating the age of a user, and gender information 1524 indicating the gender of a user. For example, the data 1520 may further include information corresponding to an address of a user, nickname information of a user, and photograph data of a user.

(C) of FIG. 39 shows exemplary data 1530 of a grind history database. The data 1530 includes user information 1531 on a user who instructed grinding, date and time information 1532 on a grinding date and time, a recipe ID 1533 used in a grinding process, a machine ID 1534 corresponding to the coffee bean grinding machine GM that performed a grinding process, and a store ID 1535 corresponding to a store where the coffee bean grinding machine GM is installed. For example, the data 1530 may further include price information corresponding to the price of ground beans of ground coffee. In addition, a coffee beverage production history database may also be stored, similar to the grind history database.

The data 1500, 1510, and 1530 described above may also be stored in the storage unit 11b of the control device 11 in the coffee bean grinding machine GM.

Next, while referring to the flow of the control process described with reference to FIG. 38, an example of an operation for the order information will be described with reference to FIG. 40 to FIG. 45. FIG. 40 to FIG. 42 are diagrams showing a state when the order information is input. FIG. 43 is a diagram showing a state when the order information is changed. FIG. 44 is a diagram showing an example of control parameters of the second grinder 5B for an order. FIG. 45 is a diagram showing an example of display during execution of a grinding process.

In this example, it is assumed that an application for transmitting order information on ground beans of coffee is installed in the mobile terminal 17 such as a smartphone. FIG. 40 shows an example of an order information input screen using this application. On this input screen, there are displayed an order title input field 170, a desired type of coffee beans 1711, the amount of coffee beans 1712, an input table 172 for specifying a ratio with respect to a particle size at the time of grinding coffee beans, a fine grinding to coarse grinding button 173a for indicating a grinding way from a fine grind state to a coarse grind state, a coarse grinding to fine grinding button 173b for indicating a grinding way from a coarse grind state to a fine grind state, a graph area 174 for displaying contents input to the input table 172 in a graph, a send button 175 for sending order information, and a recipe registration button 176 for registering order information as a grinding recipe. As for the desired type of coffee beans, selectable types of coffee beans are transmitted from the coffee bean grinding machine GM with which the mobile terminal 17 communicates, and all the transmitted selectable types of coffee beans are displayed by tapping a pull-down button at a right end. For example, all types of beans stored in canisters currently accommodated in the canister accommodation unit 401 shown in FIG. 18 are displayed. Alternatively, all types of beans prepared in a store where the coffee bean grinding machine GM is installed may be displayed. The types of coffee beans are distinguished from each other not only by a variety of coffee beans but also by a name of a cultivated farm. The types of coffee beans are also distinguished by the degree of roasting (extremely light roast, light roast, medium light roast, medium roast, medium dark roast, dark roast, extremely dark roast, and totally dark roast). The amount of coffee beans 1712 can also be specified in increments of 5 g using a pull-down menu. Direct input may be possible. The grinding way of coffee beans will be described in detail later.

FIG. 41 is a diagram showing an example of an input screen in a state in which order information is input. On this input screen, a character "Geisha For French press" is input in the title input field 170. In the type of coffee beans 1711, coffee beans cultivated in a Copey farm and having a variety name of Geisha are selected and are roasted in an extremely dark roast manner, and the amount of the coffee beans is selected to be 60 g. In the input table 172, "40" indicating a ratio of a particle size of 200 μm and "60" indicating a ratio of a particle size of 800 μm are input, and it is shown that a total ratio is "100"%. It is shown that comments corresponding to the particle size of 200 p m, the particle size of 800 μm, and the total are input. In addition, the fine grinding to coarse grinding button 173a is selected. In the graph area 174, the content input to the input table 172 is displayed as a graph. Two peaks are shown in this graph, where a left peak indicates that the ratio of the particle size of 200 μm is 40%, and a right peak indicates that the ratio of the particle size of 800 μm is 60%.

In the graph area 174, the content input to the input table 172 can be indirectly changed by dragging a part of the graph. FIG. 42 shows an example in which the right peak of the two peaks in the graph area 174 shown in FIG. 41 is moved to the left. This operation indicates that "60" indicating the ratio of the particle size of 800 μm input to the input table 172 is changed to "0" and "0" indicating a ratio of a particle size of 600 μm is changed to "60". Such an input method by dragging the graph is not limited to changing the particle size, and may also change the ratio. For example, the ratio of the corresponding particle size may be increased or decreased by vertically dragging a part of the graph.

In the example shown in FIG. 42, after a value is input to the input table 172, the value input to the input table 172 is changed by dragging a part of the graph. Without being limited to this configuration, a graph (a flat straight line, shown by a thick line in FIG. 39) of an initial state may be displayed in the graph area 174 from a state (initial state) before a value is input to the input table 172, and the value in the input table 172 may be set by dragging the graph.

By the input method using the graph as described above, a user can set the ratio of the particle size more intuitively.

In addition, when the magnitude of one peak is increased, the magnitude of another peak may be relatively decreased, for example, by increasing or decreasing the magnitude of one peak, the magnitude of another peak may be relatively increased or decreased. If a size of the graph area 174 is limited, the graph area 174 can be more effectively used.

After the title, the type and amount of coffee beans, the ratio of the particle size, and the grinding way (fine to coarse, coarse to fine) are set, by tapping the send button 175, order information is transmitted to the control device 11 of the coffee bean grinding machine GM via the communication network 15 shown in FIG. 19. After being transmitted to the server 16 once, the order information may be transmitted to the coffee bean grinding machine GM via the server 16 and the communication network 15.

Here, although the order information such as the title, the type and amount of coffee beans, the ratio of the particle size, and the grinding way (fine to coarse, coarse to fine) is set, it is also possible to save these pieces of order information and use the order information as a grinding recipe. In this case, the order information is transmitted to the server 16 via the communication network 15 by tapping the recipe registration button 176. The server 16 also manages grinding recipes in the form of a database, and adds a grinding recipe ID to the transmitted order information and stores the order information. At the time of transmission to the server 16, restrictions may be set on recipes. For example, the mobile terminal 17 may display a screen for selecting various restrictions such as production (grind) prohibition, display prohibition, download prohibition, duplication prohibition, and alteration prohibition. On the above screen, a method of releasing these restrictions (charging, elapse of a period of time, use of a given number of times or more by charging, and the like) may also be set. In addition, a comment input by a creator is also stored as a part of the grinding recipe, and the comment can be displayed at the time of displaying the recipe.

Further, a chaff removal strength (a chaff removal rate) (%) may be set as the order information and the grinding recipe.

When the order information is received, the content of the received order information is displayed on the information display device 12 (Yes in step S31 and step S32 of FIG. 38). (A) of FIG. 43 shows an example in which the control device 11 receives the order information transmitted with the content shown in FIG. 42, and the content is displayed on the information display device 12. Specifically, the title input in the title input field 170 of FIG. 42 and the content of the input table 172 excluding a row of a particle size in which the ratio is 0 and a comment field is blank (rows of particle sizes of 400 μm and 1000 μm in FIG. 42) are displayed in a reception table 121. Further, in a grinding way indication field 122, it is shown that a grinding way from a fine grind state to a coarse grind state is indicated by selecting the fine grinding to coarse grinding button 173*a* in FIG. 42. The received type of beans is shown in a bean type field 1231, and the received amount of beans is shown in a bean amount field 123. The amount of beans may be set separately at a store.

When a grinding start button 124 is tapped in this state, a grinding process of coffee beans is executed (details will be described later), and in a state before the grinding start button 124 is tapped, the order information can be changed (No in step S33, Yes in step S34, and step S35 in FIG. 38). When the order information is changed, the grinding process of coffee beans is executed according to this information. Depending on a temperature and humidity at the time of grinding, the particle size of ground coffee beans may be small (or large), and the order information can be changed and adjusted at a store.

For example, although the order information of (A) of FIG. 43 is received, since the humidity is low, it is assumed that the particle size of ground coffee beans is fine. At this time, for example, as shown in (B) of FIG. 43, in the reception table 121, "40" indicating the ratio of the particle size of 200 μm is changed to "45", and "60" indicating the ratio of the particle size of 600 μm is changed to "55", so that the particle size of ground coffee beans can be adjusted to a preferable large particle size. In the example of (B) of FIG. 43, a description of "low humidity to ratio increase" is added to the comment field, and with such a comment, for example, information such as a correction reason can be transmitted. As described above, the order information (here, the particle size of ground beans) can be adjusted according to an installation environment of the coffee bean grinding machine GM.

A recipe registration button 125 is also provided on the display screen of the information display device 12, and the order information can also be registered in the server 16 from the information display device 12 (coffee bean grinding machine GM) as a grinding recipe. It is possible to save, in the server 16 with a comment, a grinding recipe including a parameter corrected according to the installation environment of the coffee bean grinding machine GM. The grinding recipe may include environmental information (temperature, humidity, atmospheric pressure, and the like) at the time of creating the order information (recipe). A temperature and humidity sensor and an atmospheric pressure sensor may be provided in the coffee bean grinding machine GM, and when the recipe registration button 125 is tapped, the environmental information acquired by these sensors may be automatically added to the grinding recipe. Further, when the coffee bean grinding machine GM transmits the order information to the server 16, a selection screen may also be displayed on the display screen of the information display device 12 so that recipe restrictions can be set. On the selection screen, a method of releasing these restrictions may also be set.

In addition, the order information may be encrypted and stored in the storage unit 11*b* of the control device 11 in the coffee bean grinding machine GM as a grinding recipe. The mobile terminal 17 may also be able to encrypt and store the order information in the storage unit 11*b* as a grinding recipe.

The grinding recipe registered in this way can also be used in a coffee beverage production device equipped with the coffee bean grinding machine GM and a coffee extraction device.

Next, an operation after the grinding start button 124 is tapped will be described by taking a case where the grinding start button 124 is tapped in a state shown in (B) of FIG. 43 as an example. When the grinding start button 124 is tapped, a grinding process of coffee beans is executed according to the order information (Yes in step S33 and step S36 in FIG. 38). If coffee beans other than the coffee beans stored in the reservoir device 4 are specified, the grinding process is started after the specified coffee beans are set in the reservoir device 4.

Alternatively, the grinding process may be started after the calibration executed in the initial operation described with reference to FIG. 33 is performed. The execution or non-execution of the calibration is transmitted from the mobile terminal 17 together with the order information. That is, it is possible to specify that the mobile terminal 17 to execute the calibration before starting the grinding process based on the order information.

(A) of FIG. 44 shows the particle sizes and the ratios specified in (B) of FIG. 43. In this grinding process, the processing unit 11*a* shown in FIG. 19 performs control of grinding coffee beans while changing the interval between the blades (the interval between the fixed blade 57*b* and the rotary blade 58*b*) of the second grinder 5B at a predetermined interval (for example, every 50 μm) such that a particle size distribution of ground coffee beans to be produced spreads to a range (in the present embodiment, a range of ±100 μm to 150 μm) with respect to the particle size of the ground coffee beans specified by the order information. For example, (B) of FIG. 44 shows that an operation time for operating the second grinder 5B while changing the interval between the blades of the second grinder 5B within a range of 50 μm to 350 μm is set with respect to the specification of the particle size of 200 μm specified in (A) of FIG. 44. (B) of FIG. 44 shows that an operation time for operating the second grinder 5B while changing the interval between the blades of the second grinder 5B within a range of 450 μm to 700 μm is set with respect to the specification of the particle size of 600 μm specified in (A) of FIG. 44. (D) of FIG. 44 is a graph showing a length of the operation time for each interval between the blades of the second grinder 5B shown in (B) of FIG. 44. Since the interval between the blades of the second grinder 5B and the operation time thereof set here are calculated by the processing unit 11a based on the order information and correspond to the particle size distribution of the ground coffee beans to be produced, it can be said that the particle size distribution is set. When the calibration is executed in the initial operation before the start of the grinding process, the processing unit 11a performs control to change the interval between the blades of the second grinder 5B while correcting the rotation amount of the motor 503a using the calibration value obtained in step S55 shown in FIG. 33.

In the above example, it is assumed that it takes 30 seconds in total to produce 60 g of ground coffee beans specified by the order information. Then, 45% (13.5 seconds) of the operation time is assigned to an operation for the particle size of 200 μm. In the above example, since the second grinder 5B is operated while the interval between the blades of the second grinder 5B is changed in the range of 50 μm to 350 μm with respect to the specification of the particle size of 200 μm, the operation time of 13.5 seconds is assigned to the operation of the grinder in this range. In (B) of FIG. 44, the total operation time of the grinder in the interval range of 50 μm to 350 μm is 13.5 seconds. In addition, 55% (16.5 seconds) of the operation time of 30 seconds in total is assigned to an operation for the particle size of 600 μm. In the above example, since the second grinder 5B is operated while the interval between the blades of the second grinder 5B is changed in the range of 450 μm to 700 μm with respect to the specification of the particle size of 600 μm, the operation time of 16.5 seconds is assigned to the operation of the grinder in this range. In (B) of FIG. 44, the total operation time of the grinder in the interval range of 450 μm to 700 μm is 16.5 seconds. As described above, the operation time shown in (B) of FIG. 44 is derived from the time required for the production of ground coffee beans. In (B) of FIG. 44, an example has been described in which the ranges of the interval between the blades of the second grinder 5B with respect to the specification of the two types of particle size do not overlap, and when these ranges overlap each other, the operation time for the overlapping part is added.

As described in the example of (B) of FIG. 44, by producing ground coffee beans while changing the interval between the blades of the second grinder 5B, the particle size of the ground coffee beans can be dispersed. Coffee extracted from the ground coffee beans having a dispersed particle size can have various tastes as compared with coffee extracted from ground coffee beans having no dispersed particle size. For example, an operation time as shown in (C) of FIG. 44 may be set for a person who does not like such tastes. In (C) of FIG. 44, the operation time of the second grinder 5B is set only for an operation at an interval of the blades having the same value as the particle size specified by the order information, and corresponds to a particle size distribution in which the particle size dispersion is prevented. These configurations are merely examples, and the range of the particle size distribution may be specified when the particle size is specified.

In the example of (B) of FIG. 44, although the operation time at the interval of the blades having the same value as the particle size specified by the order information is the longest, and the operation time is shorter as a difference between the specified particle size and the interval of the blades of the second grinder 5B is larger, for example, the operation times may be set to the same value for the operation of the second grinder 5B at intervals of the blades of ±50 μm with respect to the specified particle size, or a plurality of patterns of the particle size distribution may be provided so as to be selectable therefrom.

Information of the operation time as shown in (B) of FIG. 44 may be input when the order information is created, and when the information of the operation time is included in the order information, the grinding process may be executed according to the information of the operation time.

Further, the information of the operation time shown in (B) or (C) of FIG. 44 (a change pattern of the interval between the blades of the second grinder 5B) may also be saved in the server 16 or the storage unit 11b as a part of a grinding recipe. That is, various types of information may be saved in the server 16 or the storage unit 11b in association with the particle size of ground beans. In addition, these pieces of information and grinding recipes saved in the storage unit 11b may be able to be output to an external terminal such as the server 16 or the mobile terminal 17 via the communication network 15.

Although two types of particle size values are set in (A) of FIG. 44, the number of types of the particle size for which a value is specified may be one instead of a plurality of types. For example, when one type of a particle size value is set, the operation time is set based on this value.

In addition, the input of the order information from an external terminal (mobile terminal 17) and the calculation of the control parameters of the second grinder 5B based on the order information, which have been described with reference to FIGS. 40 to 45, are also applicable to the beverage production device 1 shown in FIG. 1.

According to the above description, "a coffee bean grinding machine [for example, the beverage production device 1 shown in FIG. 1 or the coffee bean grinding machine GM shown in FIG. 18], including: a grinder [for example, the second grinder 5B] configured to grind coffee beans under set conditions [for example, the interval between the blades and the operation time according to the particle size specified by the order information, which are shown in (B) or (C) of FIG. 44]; a reception unit [for example, the I/F unit 11c shown in FIG. 10 or FIG. 19] configured to receive a specification [for example, the order information from the mobile terminal 17 such as a smartphone] from a user; and a setting unit [for example, the processing unit 11a shown in FIG. 10 or FIG. 19] configured to set the conditions, in which the setting unit is capable of setting the conditions based on the specification received by the reception unit [for example, the processing unit 11a calculates control data shown in (B) or (C) of FIG. 44 based on the order information and controls the second grinder 5B based on the control data], and the reception unit is capable of receiving a signal including the specification from the outside [for example, FIG. 10 or FIG. 19]." has been described.

According to this coffee bean grinding machine, a specification from a user can be easily performed.

The specification is a specification of a particle size of ground beans or a specification of executing calibration in an initial operation of the grinder. The specification may be various specifications (for example, a specification of a type or the amount of coffee beans to be used, or a specification of a grinding way) in a grinding recipe.

"The coffee bean grinding machine in which the setting unit is capable of acquiring a calibration value [for example, a calibration value calculated in step S55 shown in FIG. 33] at the time of setting the conditions based on the specification [for example, a specification for performing calibration regarding the interval between the fixed blade 57b and the rotary blade 58b in the initial operation of the second grinder 5B] received by the reception unit." has also been described.

"The coffee bean grinding machine, further including: a storage device [for example, the storage unit 11b shown in FIG. 10 or FIG. 19] configured to store a specification [for example, a grinding recipe or a beverage production recipe] received by the reception unit." has also been described.

"The coffee bean grinding machine in which the reception unit receives at least a specification of a particle size of ground beans [for example, a specification of the particle size in the input table 172 shown in FIG. 41] as the specification, and the storage device is capable of storing various types of information [for example, the control data shown in (B) or (C) of FIG. 44] in association with the particle size of the ground beans." has also been described.

The particle size may be a particle size represented by a peak in a particle size distribution. The various types of information may be conditions set in the grinder in order to grind coffee beans to the particle size by the grinder.

"The coffee bean grinding machine in which information stored in the storage device is allowed to be output to the outside [for example, the server 16 or the mobile terminal 17]." has also been described.

Further, "a coffee bean grinding system (for example, FIG. 10 or FIG. 19), including an external device (for example, the server 16 or the mobile terminal 17) capable of communicating with the coffee bean grinding machine, in which the external device is operated by a user to perform a specification operation." has also been described.

"A grinding method of coffee beans in a grinder for grinding coffee beans under set conditions, the method including: a receiving step [for example, a process as a premise of step S31 shown in FIG. 38] of receiving a specification [for example, order information from the mobile terminal 17 such as a smartphone] from a user; and a condition setting step of setting the conditions according to the specification received in the receiving step [for example, a process performed between step S32 and step S33 or a process performed between step S34 and step S33 shown in FIG. 38]." has also been described.

According to the above description, "a coffee bean grinding machine [for example, the beverage production device 1 shown in FIG. 1 or the coffee bean grinding machine GM shown in FIG. 18], including: a grinder [for example, the second grinder 5B] configured to grind coffee beans under set conditions [for example, the interval between the blades and the operation time according to the particle size specified by the order information, which are shown in (B) or (C) of FIG. 44]; a setting unit [for example, the processing unit 11a shown in FIG. 10 or FIG. 19] capable of setting the conditions; and an operation unit [for example, the manual setting disc dial 695, the fine adjustment knob dial 696] capable of being operated by a user, in which the setting unit is capable of setting the condition based on input information [for example, the processing unit 11a calculates control data shown in (B) or (C) of FIG. 44 based on order information, and controls the second grinder 5B based on the control data], and among the conditions, the operation unit is capable of changing, according to an operation, a condition [for example, the interval between the fixed blade 57b and the rotary blade 58b] related to a particle size of ground beans." has also been described.

According to this coffee bean grinding machine, the conditions are set based on the input information, and conditions related to the particle size of ground beans can be manually adjusted.

The particle size may be a particle size represented by a peak in a particle size distribution. The input information may be information on the particle size of ground beans or information for instructing execution of calibration in an initial operation of the grinder. The input information may be various types of information (for example, information on a type or the amount of coffee beans to be used, or information of a grinding way) in a grinding recipe.

"The coffee bean grinding machine in which the setting unit is capable of acquiring a calibration value [for example, a calibration value calculated in step S55 shown in FIG. 33] for setting the conditions." has also been described.

"The coffee bean grinding machine, further including: a storage device [for example, the storage unit 11b shown in FIG. 10 or FIG. 19] configured to store the input information [for example, a grinding recipe or a beverage production recipe]." has also been described.

"The coffee bean grinding machine in which the setting unit is capable of setting a condition related to a particle size of ground beans [for example, the interval between the blades and the operation time according to the particle size specified by the order information shown in (B) or (C) of FIG. 44] based on the input information [for example, a specification of the particle size in the input table 172 shown in FIG. 41], and the storage device is capable of storing various types of information [for example, the control data shown in (B) or (C) of FIG. 44] in association with the particle size of the ground beans." has also been described.

The various types of information may be conditions set in the grinder in order to grind coffee beans to the particle size by the grinder.

"The coffee bean grinding machine in which information stored in the storage device is allowed to be output to the outside [for example, the server 16 or the mobile terminal 17]." has also been described.

Further, "a coffee bean grinding system (for example, FIG. 10 or FIG. 19), including: an external device (for example, the server 16 or the mobile terminal 17) capable of communicating with the coffee bean grinding machine, in which the external device is operated by a user to perform an operation of specifying the conditions." has also been described.

"A grinding method of coffee beans in a grinder for grinding coffee beans under set conditions, the method including: an automatic setting step of automatically setting the conditions based on input information; and a manual change step of changing, according to an operation, a condition related to a particle size of ground beans among the conditions." has also been described.

Either the automatic setting step or the manual change step may be executed first, or only one of the automatic setting step and the manual change step may be executed.

The grinding way in the second grinder 5B in the present embodiment includes two types of grinding ways, that is, a grinding way from a fine grind state to a coarse grind state and a grinding way from a coarse grind state to a fine grind state, and any one of the ways is specified by using the fine grinding to coarse grinding button 173a and the coarse grinding to fine grinding button 173b described with reference to FIG. 40. When the grinding way from a fine grind state to a coarse grind state is specified, while the interval between the blades of the second grinder 5B is increased from 50 μm to 1000 μm, the second grinder 5B is operated for an operation time set for each interval. On the other hand, when the grinding way from a coarse grind state to a fine grind state is specified, while the interval between the blades of the second grinder 5B is reduced from 1000 μm to 50 μm, the second grinder 5B is operated for an operation time set for each interval. Depending on the grinding way, a slight difference may occur in a particle size distribution of ground coffee beans to be produced, which may cause a difference in taste. Therefore, the present embodiment adopts a configuration in which these grinding ways can be set.

In (B) of FIG. 43, since the grinding way from a fine grind state to a coarse grind state is specified, while the interval between the blades of the second grinder 5B is increased from 50 μm to 1000 μm, the second grinder 5B is operated for an operation time set for each interval. At this time, a graph shown in (D) of FIG. 44 is displayed on the information display device 12, and a color of in the graph region changes according to the progress of this operation. (A) of FIG. 45 shows a state when 12.4 seconds have elapsed from the start of grinding. At this time, the interval between the blades of the second grinder 5B is set to 250 μm, and in (A) of FIG. 45, it is indicated by hatching that a color of a left side region of the boundary of 250 μm has changed. This hatching is an example indicating that the grinding process of the corresponding region has been completed. (B) of FIG. 45 shows a state in which the grinding process is completed after 30 seconds have elapsed from the start of the grinding. In (B) of FIG. 45, all the regions are hatched as an example indicating that all the grinding processes have been completed. As in the examples of (A) and (B) of FIG. 45, by displaying the progress of the grinding process, efficient work may be possible, such as preventing a customer from getting bored while waiting, or allowing a store clerk to do other work during that time.

(a) of FIG. 46 is a diagram showing an example of a porter filter used for producing an espresso beverage. A porter filter PF shown in (a) of FIG. 46 is of a naked type, and a metal basket PFb (see (c) of FIG. 46) having a filter structure at a bottom surface is filled with ground beans, and the basket PFb is held by a cylindrical holding portion PFr. The holding portion PFh is provided with a handle PFh.

(b) of FIG. 46 is a diagram showing a state in which the basket PFb held by the holding portion PFr is attached to the chute GM31 of a coffee bean grinding machine with the handle PFh being held. Ground beans are discharged from the chute GM31, and the basket PFb is filled with the ground beans. This operation is referred to as dosing. The basket PFb may be fixed to a discharge port of the chute GM31 to save the time and effort required for an operator to hold and attach the handle PFh. Next, a leveling operation is performed such that the ground beans are evenly filled in the basket PFb. Finally, an operation of tamping is performed in which the evenly filled ground beans are pressed and packed.

(c) of FIG. 46 is a diagram schematically showing a state in which ground beans ground in a grinding way from a fine grind state to a coarse grind state are filled into the basket PFb and subjected to leveling and tamping.

(c) of FIG. 46 shows the basket PFb held by the holding portion PFr. A bottom surface PFf of the basket PFb has a filter structure. (c) of FIG. 46 schematically shows meshes Fi of the filter, but actually, the meshes Fi of the filter are finer meshes. A region on the bottom surface PFf side is filled with extra-fine ground beans Bvt having a particle size of 200 μm as a peak in a particle size distribution. In (c) of FIG. 46, a state in which the extra-fine ground beans Bvt are filled is shown by fine cross-hatching. A region above the region is filled with medium-fine ground beans Bmt having a particle size of 600 μm as a peak in a particle size distribution. In (c) of FIG. 46, a state in which the medium-fine ground beans Bmt are filled is shown by coarse cross-hatching. That is, relatively fine ground beans are accommodated in a region close to the filter, and relatively coarse ground beans are accommodated in a region far from the filter.

When an extraction operation is performed using the porter filter PF prepared in this way, hot water is favorably drained in the region with a large particle size, and an extraction efficiency, which is an indicator of how the taste comes out, decreases. On the other hand, in the region with a small particle size, the extraction efficiency is increased due to poor draining of hot water. Hot water poured from above (from a side opposite to the filter) first passes through the region where the extraction efficiency is low, and finally passes through a particle size where the extraction efficiency is high. Here, considering the opposite, it is expected that the poured hot water becomes a strong coffee beverage in a first region, coffee components are hardly extracted from ground beans having a large particle size in a last region, and the ground beans in the last region are likely to be wasted. This expectation is based on the fact that coffee components are easily extracted from hot water, but coffee components hardly extracted from a coffee beverage. The poured hot water first passes through the region with a low extraction efficiency, whereby a coffee beverage is sufficiently extracted from the ground beans in the region. However, the coffee beverage is weak. However, since the coffee beverage is weak, the coffee beverage has a margin in its concentration, and the coffee beverage is sufficiently extracted even when the poured hot water passes through the region with a high extraction efficiency. As described above, in order to effectively utilize all of the ground beans in the porter filter PF, it is considered preferable that the closer the region to the filter, the finer the ground beans. In particular, it is effective in extracting a strong coffee beverage such as espresso.

Similarly, in the second grinder 5B in the beverage production device 1 shown in FIG. 1, the grinding way from a fine grind state to a coarse grind state or the grinding way from a coarse grind state to a fine grind state can be performed. In the beverage production device 1 shown in FIG. 1, ground beans are accommodated in the extraction container 9. The extraction container 9 is inverted, and at the time of accommodation of ground beans (before the extraction container 9 is inverted), relatively coarse ground beans are accommodated in a lower region, relatively fine ground beans are accommodated in an upper region. By the inversion of the extraction container 9, relatively fine ground beans are positioned in the lower region, and relatively coarse ground beans are positioned in the upper region. However, when the filter provided in the lid unit 91 shown in FIG. 6 and the like is viewed as a reference, similarly to the basket PFb, relatively fine ground beans are accommodated in a region close to the filter, and relatively coarse ground beans are accommodated in a region far from the filter.

A plurality of sets of grinding processes may be performed such that ground beans for extraction for a plurality of times are ground in one grinding start operation. In this way, a plurality of baskets PFb may be prepared, and a new basket PFb may be attached to the chute GM31 for each set.

In the example of (A) and (B) of FIG. 45, a display example has been described in which hatching spreads from the left side to the right side of the graph in a case where the grinding way from a fine grind state to a coarse grind state is specified, but in a case where the grinding way from a coarse grind state to a fine grind state is specified, unlike the example of (A) and (B) of FIG. 45, it is displayed that hatching spreads from the right side to the left side of the graph.

Further, in the above example, although the configuration in which the progress of the grinding process is displayed on the information display device 12 has been described, the progress of the grinding process may be displayed on the mobile terminal 17 that has transmitted the order information.

According to the above description, "a coffee bean grinding machine [for example, the coffee bean grinding machine GM shown in FIG. 18 or the beverage production device 1 shown in FIG. 1], including: a grinder configured to grind coffee beans [for example, the second grinder 5B]; and a container [for example, the basket PFb or the extraction container 9] configured to accommodate the ground beans ground by the grinder, in which a set of grinding operations can be executed in response to a start operation by a user [for example, tapping of the grinding start button 124, pressing of the start button GM15, or an instruction to produce a coffee beverage], and the one set of grinding operations is an operation of grinding coffee beans to different particle sizes such that ground beans having a first particle size [for example, a relatively small particle size or a relatively large particle size] are accommodated in a first region [for example, a region relatively close to a filter or a region below the filter] of the container and ground beans having a second particle size [for example, a relatively large particle size or a relatively small particle size] are accommodated in a second region [for example, a region relatively far from the filter or a region above the filter] of the container." has been described.

The finer the particle size of the ground beans, the more difficult it is for hot water to be drained, which tends to increase the extraction efficiency. According to this coffee machine, by utilizing this tendency, regions in which ground beans having different particle sizes are accommodated are provided, and different regions can have different extraction efficiencies to improve the taste of the coffee beverage.

The amount of coffee beans to be ground by the one set of grinding operations may be an amount necessary for extracting one cup of coffee beverage, or may be an amount necessary for one extraction. The first particle size may be a particle size that is larger than the second particle size.

"The coffee bean grinding machine in which the first particle size is a particle size smaller than the second particle size." has also been described.

"The coffee bean grinding machine in which the container includes a filter [for example, meshes Fi of the filter provided on the bottom surface PFf shown in (c) of FIG. 46, or the filter provided on the lid unit 91 shown in FIG. 6 or the like], and the first region is a region closer to the filter than the second region in the container." has also been described.

The first region may be a region lower than the second region in the container.

"The coffee bean grinding machine further including a storage device [for example, the storage unit 11b shown in FIG. 10 or FIG. 19] capable of storing the one set of grinding operations as a recipe." has also been described.

"The coffee bean grinding machine in which in response to a start operation by a user, the one set of grinding operations can be executed a plurality of times [for example, ground beans for extraction for a plurality of times can be ground]." has also been described.

Further, "a coffee bean grinding machine system (for example, FIG. 10 or FIG. 19) including an external device (for example, the server 16 or the mobile terminal 17) capable of communicating with the coffee bean grinding machine." has also been described.

"A grinding method of coffee beans, including: a first step of accommodating ground beans having a first particle size [for example, a relatively small particle size or a relatively large particle size] in a first region [for example, a region relatively close to a filter or a region below the filter] of a container [for example, the basket PFb or the extraction container 9]; and a second step of accommodating ground beans having a second particle size [for example, a relatively large particle size or a relatively small particle size] in a second region [for example, a region relatively far from the filter or a region above the filter] of the container." has also been described.

Next, a combination of the first grinder 5A and the second grinder 5B will be described.

As shown in FIG. 25 and the like, the first grinder 5A and the second grinder 5B are provided in series on the upstream side and the downstream side when viewed in a conveying direction of coffee beans. The first grinder 5A is capable of grinding coffee beans having a large particle size more accurately than the second grinder 5B, and the second grinder 5B is capable of grinding coffee beans having a small particle size more accurately than the first grinder 5A. More specifically, the first grinder 5A crushes roasted coffee beans to a predetermined size (for example, about ¼) to obtain cracked beans. The second grinder 5B grinds the cracked beans crushed by the first grinder 5A into ground beans having a desired particle size. For example, the second grinder 5B can perform coarse grinding, medium grinding, medium-fine grinding, fine grinding, and extra-fine grinding, and the first grinder 5A cannot grind as finely as coarse grinding. However, in order to facilitate separation of a waste adhering to coffee beans, it is preferable to crush the coffee beans to a predetermined size by the first grinder 5A.

However, if the ease of separation of a waste such as chaff and fine powder by the separation device 6 is ignored, it is also possible to perform a grinding process of coffee beans only by the second grinder 5B without driving the first grinder 5A.

(a) of FIG. 47 is a perspective view showing the single rotary blade 58a constituting the first grinder 5A.

The rotary blade 58a is provided with a guide passage 58ag extending obliquely downward around a rotation shaft 58as from each of the four blades 58a*l* to 58a4. As shown in (a) of FIG. 47, when the rotary blade 58a does not rotate, the roasted coffee beans B fed from the reservoir device 4 pass through the guide passage 58ag and are fed to the second grinder 5B while maintaining their shapes and sizes. Then, the roasted coffee beans B are ground to a desired particle size by the second grinder 5B. In this case, the pulverizing is not performed in two stages by the first grinder 5A and the second grinder 5B, but is performed in one stage by only the second grinder 5B.

Instead of the first grinder 5A, the same grinder as the second grinder 5B may be provided, and the grinder on the upstream side may also be able to perform coarse grinding, medium grinding, medium-fine grinding, fine grinding, and extra-fine grinding. In this case, for example, coarse grinding may be performed by the grinder on the upstream side, wastes may be separated by the separation device 6, and then fine grinding below medium grinding may be performed by the second grinder 5B. Alternatively, medium-fine grinding may be performed by the grinder on the upstream side, wastes may be separated by the separation device 6, and then ground beans subjected to the medium-fine grinding may be discharged from the chute GM31 without performing the grinding process in the second grinder 5B.

(b) of FIG. 47 is a diagram showing a modification of the pulverizing device 5 shown in FIG. 25 and the like.

In the pulverizing device 5 shown in FIG. 25 and the like, two grinders are disposed in series, but in a pulverizing device 5' of this modification, two grinders on a downstream side among three grinders are disposed in parallel. The first grinder 5A is disposed on a downstream side of the reservoir device 4 shown in (b) of FIG. 47.

In the pulverizing device 5 shown in FIG. 25 and the like, the forming unit 6B is provided downstream of the first grinder 5A, but in this modification, the forming unit 6B is omitted, and a cylindrical guiding passage 6C is provided. Two second grinders 5B to which the coupling ducts 661 are respectively connected are disposed on a downstream side of the guiding passage 6C. The guiding passage 6C is a passage through which cracked beans subjected to the grinding process by the first grinder 5A are distributed to any one of the two second grinders 5B. The number of the second grinders 5B is not limited to two, and may be three or more. Passage switching of the guiding passage 6C is executed by the processing unit 11a shown in FIG. 19. The passage switching of the guiding passage 6C may be performed manually. Alternatively, the passage switching may be performed in response to an instruction from an external terminal such as the mobile terminal 17. In this modification, a selection step of selecting a grinder for grinding coffee beans from a total of three grinders such as one first grinder 5A and two second grinders 5B provided in the coffee bean grinding machine GM, a supply step of supplying coffee beans to the selected grinder, and a grinding step of grinding the coffee beans supplied in the supply step with the grinder are executed. In the supply step, when one of the two second grinders 5B is selected, coffee beans are supplied to the selected second grinder 5B through the guiding passage 6C. In the selection step, the one first grinder 5A is freely selected, but in the selection of two second grinders 5B, one of the second grinders 5B may always be selected. Alternatively, when the two second grinder 5B are not selected, coffee beans may be directly discharged from the guiding passage 6C.

According to this modification, since a plurality of second grinders 5B are installed, grinding processes by the second grinders 5B can be performed in parallel. For example, in the control of the input amount of ground beans to the second grinder 5B described with reference to FIG. 37, when it becomes necessary to reduce the input amount to the first second grinder 5B, by switching the guiding passage 6C and starting the input to the second grinder 5B, it is no longer necessary to reduce the input amount, and a reduction in the efficiency of the grinding process can be avoided.

Although the forming unit 6B is omitted in the modification shown in (b) of FIG. 47, the forming unit 6B may be provided at an upstream end of the guiding passage 6C, and wastes may be separated after the passage switching is completed. In addition, an aspect may be adopted in which a fixed passage is provided instead of the switchable guiding passage 6C, and the grinder is switched by a plurality of provided second grinders 5B moving to a downstream end of the fixed passage. Further, instead of providing a plurality of grinders having the same function in parallel, a plurality of grinders having different functions may be provided in parallel. For example, a grinder dedicated to coarse grinding, a grinder dedicated to medium grinding, a grinder dedicated to medium-fine grinding, a grinder dedicated to fine grinding, and a grinder dedicated to extra-fine grinding may be provided in parallel so as to be selectable. In addition, the first grinder 5A on the upstream side may be omitted. Alternatively, a grinder may be further provided downstream of the second grinder 5B. The number of grinders provided downstream of the second grinder 5B may be one or more. In the case of a plurality of grinders, the grinders may be disposed in series or in parallel.

The aspect of the pulverizing device 5 described above with reference to FIG. 47 is also applicable to the pulverizing device of the beverage production device 1 shown in FIG. 1.

According to the above description, "a coffee bean grinding machine [for example, the coffee bean grinding machine GM shown in FIG. 18 or the beverage production device 1 shown in FIG. 1], including: a plurality of grinders [for example, the first grinder 5A and the second grinder 5B in a serial relation or a plurality of second grinders 5B in a parallel relation], in which a grinder for grinding coffee beans is selectable from the plurality of grinders [for example, both the first grinder 5A and the second grinder 5B in a serial relation are selected, only the second grinder 5B is selected, or the plurality of second grinders 5B in a parallel relation are selected one by one]." has been described.

According to this coffee bean grinding machine, since the grinder for grinding coffee beans can be selected from a plurality of grinders, it is easier to meet a demand for a larger number of grinding processes than a coffee bean grinding machine in the related art.

The number of grinders to be selected may be one or more.

"The coffee bean grinding machine in which the plurality of grinders include a first grinder [for example, the first grinder 5A] and a second grinder [for example, the second grinder 5B], and it is possible to select whether to grind coffee beans by one of the first grinder and the second grinder [for example, only the second grinder 5B] or both of the first grinder and the second grinder [for example, the first grinder 5A and the second grinder 5B]" has also been described.

"The coffee bean grinding machine in which the first grinder is capable of grinding coffee beans more accurately and coarsely than the second grinder [for example, roasted coffee beans are crushed to a predetermined size (for example, about ¼)], and the second grinder is capable of grinding coffee beans more accurately and finely than the first grinder [for example, coarse grinding, medium grinding, medium-fine grinding, fine grinding, and extra-fine grinding can be performed]." has also been described.

"The coffee bean grinding machine in which when coffee beans are ground by both the first grinder [for example, the first grinder 5A] and the second grinder [for example, the second grinder 5B], the coffee beans ground by the first grinder [for example, the first grinder 5A on the upstream side] are further finely ground by the second grinder [for example, the second grinder 5B on the downstream side]." has also been described.

"The coffee bean grinding machine in which when coffee beans are ground by one of the first grinder [for example, the second grinder 5B on the left side shown in (b) of FIG. 47] and the second grinder [for example, the second grinder 5B on the right side shown in (b) of FIG. 47], the coffee beans are guided to the one grinder [for example, guided by the guiding passage 6C]." has also been described.

That is, one of the first grinder and the second grinder may be provided with a guiding passage [for example, the guiding passage 6C shown in (b) of FIG. 47] for guiding coffee beans. Coffee beans may be guided to the one grinder by the movement of the guiding passage with respect to the one grinder, coffee beans may be guided to the one grinder by the movement of the one grinder with respect to the guiding passage, or coffee beans may be guided to the one grinder by the movement of the guiding passage and the movement of the one grinder.

Further, "a coffee bean grinding machine system (for example, FIG. 10 or FIG. 19) including an external device (for example, the server 16 or the mobile terminal 17) capable of communicating with the coffee bean grinding machine." has also been described.

"A grinding method of coffee beans including: a selection step of selecting a grinder for grinding coffee beans from a plurality of grinders provided in a coffee bean grinding machine; a supply step of supplying coffee beans to the selected grinder; and a grinding step of grinding the coffee beans supplied in the supply step with the grinder." has also been described.

The number of grinders to be selected may be one or more.

Next, a modification of the hammer member GM32 shown in FIG. 18 will be described. In the following description, components having the same names as those described above are denoted by the same reference numerals as those used above.

FIG. 48 is a view schematically showing a hammer mechanism according to a modification together with a chute. FIG. 48 is a front view in which a front side of the paper is a front side and a right side thereof is a left side of a coffee bean grinding machine.

A hammer mechanism H1 is disposed on the left side of the coffee bean grinding machine with respect to the chute GM31, that is, on a right hand side of an operator. Therefore, the hammer mechanism H1 is disposed on a side opposite to the hammer member GM32 shown in FIG. 18. The hammer mechanism H1 shown in FIG. 48 includes a hammer H10, a shaft H20, and a torsion coil spring H30. The shaft H20 is fixed to a front cover (not shown). The hammer H10 pivots manually from an initial position, and the shaft H20 passes through a pivot center of the hammer H10. The torsion coil spring H30 is fitted to the shaft H20, and the hammer H10 manually pivoted from the initial position returns to the initial position by an elastic force of the torsion coil spring H30. A pivoting operation of the hammer H10 will be described in detail later. The hammer H10 is obtained by integrally molding a nylon resin containing glass fibers. The hammer H10 includes a shaft penetrating portion H11, a holding arm H12 extending downward from the shaft penetrating portion H11, a striking arm H13 extending from the shaft penetrating portion H11 toward the chute GM31 side, and an operation arm H14 extending from the shaft penetrating portion H11 toward a side opposite to the chute GM31 side.

In FIG. 48, a fixed holding member GM33 is shown, and a cup CP accommodating the ground beans discharged from the chute GM31 is also shown below the fixed holding member GM33. The cup CP is not an element constituting the coffee bean grinding machine, but is held by a hand of an operator.

Although only one fixed holding member GM33 is shown in FIG. 48, two fixed holding members GM33 are provided side by side in a backward direction of the coffee bean grinding machine, and in FIG. 48, the other fixed holding member is disposed on a rear side of the fixed holding member GM33 shown in FIG. 48. The fixed holding member GM33 is located between the holding arm H12 of the hammer H10 and the chute GM31. The fixed holding member GM33 includes a shaft GM331 fixed to a front cover (not shown) and a rubber cap GM332 attached to a lower end of the shaft GM331.

The holding portion H121 protruding toward the fixed holding member GM33 is provided at a tip end portion of the holding arm H12 of the hammer H10, and the holding portion H121 shown in FIG. 48 abuts against the rubber cap GM332 of the fixed holding member GM33. A striking portion H131 is provided at a tip end portion of the striking arm H13 of the hammer H10 shown in FIG. 48, and the striking portion H131 shown in FIG. 48 abuts against a left side wall portion of the chute GM31. Further, the operation arm H14 of the hammer H10 shown in FIG. 48 extends to the right hand side of the operator. The hammer H10 shown in FIG. 48 is in an initial state. That is, the hammer H10 is biased in a clockwise arrow direction by the elastic force of the torsion coil spring H30, and the striking portion H131 abuts against the chute GM31 and the holding portion H121 abuts against the fixed holding member GM33, whereby the pivot in the arrow direction is stopped.

FIG. 49 shows views showing a striking operation of the hammer H10 in stages. In FIG. 49, the cup CP shown in FIG. 48 is not shown. The torsion coil spring H30 is not shown.

(A) of FIG. 49 is a view showing the hammer H10 in the initial state, similarly to the hammer H10 shown in FIG. 48. That is, the striking portion H131 abuts against the left side wall portion of the chute GM31, and the holding portion H121 abuts against the rubber cap GM332 of the fixed holding member GM33. The operation arm H14 of the hammer H10 in the initial state extends to the right hand side of the operator, and the operator places a finger on a back side of a finger rest portion H141 at a tip end of the operation arm H14 to lift the finger rest portion H141. The hammer H10 pivots in a counterclockwise arrow direction against the biasing force of the torsion coil spring H30 shown in FIG. 48, and the hammer H10 enters a striking preparation state.

(B) of FIG. 49 is a view showing the hammer H10 in the striking preparation state. The hammer H10 in the striking preparation state is in a state in which the striking portion H131 is sufficiently separated from the chute GM31. In (B) of FIG. 49, the striking arm H13 abuts against the rubber cap GM332 of the fixed holding member GM33, and further counterclockwise pivot of the hammer H10 is prevented. However, the striking arm H13 may be allowed to pass between the two fixed holding members GM33 arranged in the backward direction, and the hammer H10 may be allowed to pivot counterclockwise. In (B) of FIG. 49, the finger rest portion H141 is still lifted by the operator.

(C) of FIG. 49 shows the state after the operator releases the finger from the finger rest portion H141. The hammer H10 is vigorously pivoted in the clockwise arrow direction by the elastic force of the torsion coil spring H30 shown in FIG. 48, and the striking portion H131 strikes the left side wall portion of the chute GM31 to apply an impact to the chute GM31. Due to this impact, ground beans Bdp adhering to an inner circumferential wall of the chute GM31 are peeled off, and are discharged from a discharge port GM311 of the chute GM31. The hammer H10 striking the left side wall portion of the chute GM31 returns to the initial state shown in (A) of FIG. 49.

FIG. 50 shows views showing a holding operation of holding the cup CP by the holding portion H121 of the hammer H10 and the fixed holding member GM33 in stages. In FIG. 50, the torsion coil spring H30 is also not shown.

(A) of FIG. 50 is a view showing the hammer H10 in the initial state, similarly to the hammer H10 shown in FIG. 48.

Therefore, the holding portion H121 abuts against the rubber cap GM332 of the fixed holding member GM33. The finger rest portion H141 of the hammer H10 in the initial state is lifted in the same manner as in the striking operation. However, in the specification, it is not necessary to lift the finger rest portion H141 to a height as high as the striking operation, and it is just required that a gap large enough for a circumferential wall CP1 of the cup CP to enter is formed between the holding portion H121 and the rubber cap GM332. In (A) of FIG. 50, the cup CP is prepared below the hammer H10.

As shown in (B) of FIG. 50, when such a gap is formed between the holding portion H121 and the rubber cap GM332, the cup CP is lifted and the circumferential wall CP1 of the cup CP is inserted between the holding portion H121 and the rubber cap GM332. When the insertion is completed, the operator releases the finger from the finger rest portion H141 while holding the cup CP.

(C) of FIG. 50 shows the state after the operator releases the finger from the finger rest portion H141. The hammer H10 returns in a clockwise direction by the elastic force of the torsion coil spring H30 shown in FIG. 48, the holding portion H121 approaches the rubber cap GM332, and the circumferential wall CP1 of the cup CP is sandwiched between the rubber cap GM332 and the holding portion H121 as shown in (C) of FIG. 50. That is, although only one fixed holding member GM33 is shown here, two fixed holding members GM33 arranged side by side in the backward direction of the coffee bean grinding machine are in contact with the circumferential wall CP1 of the cup CP at two positions from an inner side of the circumferential wall CP1, and the holding portion H121 of the hammer H10 is in contact with the circumferential wall CP1 at one position from an outer side of the circumferential wall CP1. A state of the hammer H10 shown in (C) of FIG. 50 is referred to as a holding state. In the hammer H10 in this holding state, even if the hand is released from the cup CP, the cup CP is held by the elastic force of the coil spring H30. Furthermore, the rubber cap GM332 provided on the fixed holding member GM33 functions as a slip stopper of the cup CP, and the cup CP is more stably held. The holding portion H121 is made of a nylon resin containing glass fibers, and an anti-slip material is not added thereto, but the anti-slip material may be added to the holding portion H121 as in the rubber cap GM332 of the fixed holding member GM33.

As described above, transitioning from the initial state to the holding state is performed by operating the finger rest portion H141, but it is also possible to insert the circumferential wall CP1 between the holding portion H121 and the rubber cap GM332 with a force of lifting the cup CP without operating the finger rest portion H141. In particular, if the cup CP is made of metal or the like and is less likely to be broken, as will be described later, it is not necessary to make the elastic force of the torsion coil spring H30 stronger than necessary, and thus, it is possible to easily transition from the initial state to the holding state only by the force of lifting the cup CP.

A mouth CP2 of the cup CP shown in (C) of FIG. 50 is located above the discharge port GM311 of the chute GM31, and the ground beans discharged from the discharge port GM311 are reliably accommodated in the cup CP.

(D) of FIG. 50 is a view showing a state in which the cup CP is removed from between the holding portion H121 of the hammer H10 in the holding state and the rubber cap GM332.

The discharge of the ground beans from the chute GM31 ends, the cup CP is removed. First, the cup CP is held by a left hand, and the finger rest portion H141 of the hammer H10 in the holding state is slightly lifted by a finger of the right hand in the same manner as in the case of (A) of FIG. 50. Thus, the gap is formed between the holding portion H121 and the rubber cap GM332, and the cup CP can be removed by pulling the cup CP downward. Thereafter, the striking operation of the hammer H10 described with reference to FIG. 49 may be performed to strike down the ground beans adhering to the inner circumferential wall of the chute GM31.

In a coffee bean grinding machine in related art, it is necessary to always hold the cup CP during a grinding process, and it is difficult to perform other work. However, in this modification, since the cup CP is held by the coffee bean grinding machine, it is easy to perform other work during the grinding process. Furthermore, since the hammer H10 is used for two purposes such as the holding of the cup CP and the striking of the chute GM31, a space for disposing members is made compact and a cost is also reduced as compared with a case in which separate members are provided for these two purposes. Since the chute GM31 is manually struck, the disposition space is more compact and the cost is lower than in a case in which the chute GM31 is electrically driven. Further, in the case in which the chute GM31 is manually struck, the use of the torsion coil spring H30 enables the cup CP to be held by utilizing the elastic force of the torsion coil spring H30. As described above, when the common torsion coil spring H30 is used for striking the chute GM31 and holding the cup CP, since the striking and the holding are performed in different scenes, it is considered that the striking and the holding are performed at a common portion of the hammer G10. For example, the cup CP may be sandwiched between the chute GM31 and the striking portion H131. In this case, it is necessary to provide an anti-slip member such as the rubber cap GM332 in at least one of the chute GM31 and the striking portion H131. However, the anti-slip member such as the rubber cap GM332 generally has a function of weakening the impact, and when the chute GM31 is struck, the impact caused by the striking is weakened. Therefore, it is necessary to increase the elastic force of the torsion coil spring H30, and an operation of the operation arm H14 may become difficult. On the other hand, in the above-described modification, by providing the striking portion H131 and the holding portion H121 at different portions, it is not necessary to make the elastic force of the torsion coil spring H30 stronger than necessary, and the operation of the operation arm H14 becomes easy.

Next, a coffee bean grinding machine according to a second embodiment will be described in a case in which the coffee bean grinding machine shown in FIG. 18 is used as a coffee bean grinding machine according to a first embodiment. In the following description, components having the same names as those of the components described above are also denoted by the same reference signs as those used above. Differences from the coffee bean grinding machine shown in FIG. 18 will be described, and a repetitive description will be omitted. The coffee bean grinding machine GM according to the second embodiment includes the pulverizing device 5 having the same structure as the pulverizing device 5 of the coffee bean grinding machine GM according to the first embodiment, and in a description of the second embodiment, the first grinder 5A is referred as a top mill 5AM, and the second grinder 5B is referred to as a main mill 5BM. A motor that causes the top mill 5AM to rotate is referred to as a top mill motor (corresponding to the first motor), and a motor that causes the main mill 5BM to rotate is referred to as a main mill motor (corresponding to the second motor 52b shown in FIG. 32).

FIG. 51 shows perspective views of the coffee bean grinding machine according to the second embodiment. (A) of FIG. 51 is the perspective view of the coffee bean grinding machine GM in a state of holding a cup CP when viewed obliquely from the front left of the machine, that is, from the front right when viewed from an operator, and (B) of FIG. 51 is the perspective view of the coffee bean grinding machine GM from which the cup CP is removed when viewed obliquely from the front right of the machine, that is, from the front left when viewed from the operator.

The coffee bean grinding machine GM according to the second embodiment shown in FIG. 51 includes a mechanism similar to the hammer mechanism H1 described with reference to FIGS. 48 to 50, and FIG. 51 shows the operation arm H14 of the hammer H10. (A) of FIG. 51 shows the two fixed holding members GM33 each including the rubber cap GM332 attached to a lower end thereof. Further, (B) of FIG. 51 shows the holding portion H121 of the hammer H10. The hammer H10 shown in (A) of FIG. 51 is in a holding state, and the hammer H10 shown in (B) of FIG. 51 is in an initial state.

In the coffee bean grinding machine GM shown in FIG. 18, the hammer member GM32 is provided on a right side of the machine, and the operator have to operate the hammer member GM32 with the left hand, but in the coffee bean grinding machine GM shown in FIG. 51, the operation arm H14 extends to a left side of the machine, and the operator can operate the operation arm H14 with the right hand. Further, most of a left half of the chute GM31 is covered with a front cover GM40, and the striking portion H131 of the hammer H10 is also invisible due to the front cover GM40. The discharge port GM311 is not covered by the front cover GM40.

Next, the hammer mechanism H1 of the coffee bean grinding machine GM shown in FIG. 51 will be described in detail. Differences from the hammer mechanism H1 described with reference to FIGS. 48 to 50 will be mainly described, and a repetitive description will be omitted.

(A) of FIG. 52 is an enlarged view showing a state in which the front cover GM40 is removed from the coffee bean grinding machine GM shown in FIG. 51, and (B) of FIG. 52 is an exploded perspective view of the hammer mechanism H1.

As shown in (B) of FIG. 52, the hammer mechanism H1 includes the hammer H10 and the shaft H20. The shaft H20 is fixed to the detached front cover GM40. FIG. 52 also shows the shaft GM331 of the fixed holding member GM33. An upper end portion of the shaft GM331 is also fixed to the removed front cover GM40.

The hammer H10 is obtained by integrally molding a nylon resin containing glass fibers, and includes the shaft penetrating portion H11, the holding arm H12, the striking arm H13, and the operation arm H14. The hammer mechanism H1 also includes a torsion coil spring H. The torsion coil spring H includes a coil portion wound in a coil shape and arm portions extending in two directions from the coil portion. The torsion coil spring H is fitted into the shaft penetrating portion H11, and the shaft H20 penetrates through the coil portion. In FIG. 52, one of arm portions H31 extending in the two directions from the coil portion is visible. (B) of FIG. 52 also shows a slip-off preventing member H21 attached to a tip end of the shaft H20.

A holding portion H121 protruding toward the fixed holding member GM33 side is provided at a tip end portion of the holding arm H12, and in (A) of FIG. 52, the holding portion H121 abuts against the rubber cap GM332 of the fixed holding member GM33.

(A) of FIG. 52 shows the hammer H10 in the initial state. In the hammer mechanism H1 mounted on the coffee bean grinding machine GM according to the second embodiment, a biasing direction by an elastic force of the coil spring H30 is opposite to that of the hammer mechanism H1 shown in FIG. 48. That is, the hammer H10 shown in (A) of FIG. 52 is biased in a counterclockwise direction, and the striking portion H131 abuts against the chute GM31 and the holding portion H121 abuts against the rubber cap GM332 of the fixed holding member GM33, whereby pivot in the counterclockwise direction is stopped. In (A) of FIG. 52, a portion of the chute GM31 against which the striking portion H131 abuts is invisible, but in (B) of FIG. 52, the portion is visible. An L-shaped receiving portion GM312 is provided at the portion of the chute GM31 against which the striking portion H131 abuts. Like the hammer H10, the chute GM31 is also obtained by integrally molding nylon resin containing glass fibers by injection molding. The receiving portion GM312 is also integrally formed with a tubular portion GM313 and the like. The receiving portion GM312 is thick in order to increase strength. The receiving portion GM312 is provided with a slit, and the slit is thinned to prevent sink marks in manufacturing.

Here, a structure of the chute GM31 will be further described with reference to (B) of FIG. 52. (B) of FIG. 52 shows the frame member 694 which is the same member as the frame member 694 shown in FIG. 36. The chute GM31 can be opened and closed in a lateral direction about a pivot shaft GM314 extending in an upper-lower direction. When the chute GM31 is opened in the lateral direction, a discharge port of ground beans ground by the main mill 5BM can be accessed, and maintenance such as cleaning around the discharge port can be easily performed.

The chute GM31 shown in (B) of FIG. 52 is joined to a frame member 694 side by a magnetic force at a position of an upper joint portion GM315, and the chute GM31 is prevented from unexpectedly opening. In the tubular portion GM313 of the chute GM31, a position just beside the upper joint portion GM315 is an inlet 3130 (see (B) of FIG. 53). The discharge port of the ground beans ground by the main mill 5BM is provided in the frame member 694, the inlet 3130 is connected to the discharge port, and the ground beans rapidly fly out from the discharge port. The ground beans collide with an inner circumferential wall of the tubular portion 313 at a height position between the inlet 3130 and the receiving portion GM312, and if left unattended, the ground beans will accumulate at a colliding position, which may hinder the discharge of the ground beans from the chute GM31. Therefore, a striking operation of the hammer H10 is performed.

In the striking operation of the hammer H10 shown in FIG. 52, the finger is placed on the finger rest portion H141 which is a tip end portion of the operation arm H14 of the hammer H10 in the initial state, and the hammer H10 is pushed downward (see an arrow shown in (A) of FIG. 52). The hammer H10 pivots such that the striking portion H131 is lifted up, and enters a striking preparation state. When the finger is released from the finger rest portion H141 in this state, the hammer H10 is vigorously pivoted in the counterclockwise direction by the elastic force of the torsion coil spring H30. That is, the striking portion H131 is vigorously pivoted from a position on a 10 o'clock side toward the receiving portion GM312 provided at a position on a 9 o'clock side, and the striking portion H131 strikes the receiving portion GM312 to apply an impact to the chute GM31. Due to this impact, the ground beans adhering to the inner circumferential wall of the tubular portion GM313 are peeled off, and are discharged from the discharge port GM311 of the chute GM31. The receiving portion GM312 includes an inclined surface 3121 inclined in a manner of protruding toward the hammer H10 as it extends downward, and a protruding surface 3122 protruding toward the hammer H10 from a lower end of the inclined surface 3121.

(A) of FIG. 53 is a side view of the hammer H10, and (B) of FIG. 53 is a perspective view showing the hammer H10 and the chute GM31 from below. In (B) of FIG. 53, the discharge port GM311 of the chute GM31 opens toward a front side of the paper. In (B) of FIG. 53, a lower side in the figure is a main mill 5BM side, and the inlet 3130 of the chute GM31 which is connected to a discharge port of the main mill 5BM is also shown.

(A) of FIG. 53 shows a first striking surface 1311 of the striking portion H131 which abuts against the inclined surface 3121 of the receiving portion GM312. When the hammer H10 is in the initial state, the first striking surface 1311 abuts against the entire inclined surface 3121. (A) of FIG. 53 also shows a second striking surface 1312 of the striking portion H131 which abuts against the protruding surface 3122 of the receiving portion GM312. Further, as shown in (B) of FIG. 53, when the hammer H10 is in the initial state, the second striking surface 1312 also abuts against the entire protruding surface 3122. In (B) of FIG. 53, a length of a lateral width of each portion is a length in the upper-lower direction indicated by an arrow Wt. A lateral width of the second striking surface 1312 is larger than a lateral width of the protruding surface 3122 shown in (B) of FIG. 53, and a lateral width of the first striking surface 1311 is larger than a lateral width of the inclined surface 3121. That is, a lateral width of the striking portion H131 is wider than a lateral width of the receiving portion GM312, and the striking portion H131 reliably abuts against the receiving portion GM312.

The striking portion H131, which is pivoted, continues to pivot while the first striking surface 1311 collides with the inclined surface 3121 at first, and finally stops when the second striking surface 1312 collides with the protruding surface 3122. As a result, the chute GM31 is struck obliquely. That is, an impact in a downward direction and an impact in the lateral direction are applied to the chute GM31, vibrations in a plurality of directions are generated, and the ground beans adhering to the inner circumferential wall are more likely to peel off. In the hammer mechanism H1 shown in FIG. 52, since the elastic force of the coil spring H30 is not excessively strong, it is possible to easily perform the striking operation by slightly strongly flicking the finger rest portion H141 of the hammer H10 in the initial state downward. If this flicking operation is repeatedly and continuously performed, striking the chute GM31 more effectively functions.

Next, a holding operation of the cup CP will be described with reference to FIG. 51 and the like.

A finger of the right hand is placed on the finger rest portion H141 of the hammer H10 in the initial state shown in (B) of FIG. 51, and the hammer H10 is lightly pressed to form a gap large enough for the circumferential wall CP1 of the cup CP to enter between the holding portion H121 and the rubber cap GM332. The cup CP is held by the left hand, and the circumferential wall CP1 of the cup CP is inserted between the holding portion H121 and the rubber cap GM332. When the insertion is completed, the operator releases the finger from the finger rest portion H141 while holding the cup CP. The hammer H10 returns in the counterclockwise direction by the elastic force of the torsion coil spring H30, and enters a state (holding state) shown in (A) of FIG. 51 in which the circumferential wall CP1 of the cup CP is sandwiched between the rubber cap GM332 and the holding portion H121. That is, the two fixed holding members GM33 arranged side by side are in contact with the circumferential wall CP1 of the cup CP at two positions from an outer side of the circumferential wall CP1, and the holding portion H121 of the hammer H10 is in contact with the circumferential wall CP1 at one position from an inner side of the circumferential wall CP1. In this state, even if the hand is released from the cup CP, the cup CP is held by the elastic force of the coil spring H30. Furthermore, the rubber cap GM332 functions as a slip stopper of the cup CP, and the cup CP is held more stably.

The grinding process is executed in the coffee bean grinding machine GM, the ground beans are discharged from the chute GM31, and the ground beans are accommodated in the cup CP held by the coffee bean grinding machine GM. When the discharge of the ground beans from the chute GM31 is completed, the cup CP is held with the left hand, and the finger of the right hand is placed on the finger rest portion H141 of the hammer H10 in the holding state, and the hammer H10 is lightly pressed. Thus, the gap is formed between the holding portion H121 and the rubber cap GM332, and the cup CP can be removed by pulling the cup CP downward. Thereafter, the striking operation of the hammer H10 may be performed to strike down the ground beans adhering to the inner circumferential wall of the chute GM31.

In the hammer mechanism H1 according to the second embodiment, since it is not necessary to make the elastic force of the torsion coil spring H30 stronger than necessary, transitioning from the initial state to the holding state and transitioning from the holding state to the initial state can be performed only by the force for operating the cup CP without operating the finger rest portion H141.

According to the above description, "a coffee machine [for example, the beverage production device 1 and the coffee bean grinding machine GM], including: a grinder [for example, the pulverizing device 5] configured to grind coffee beans; a chute [for example, the chute GM31] configured to discharge the ground beans ground by the grinder; a pivotable hammer [for example, the hammer H10]; and a first holding member [for example, the fixed holding member GM33], in which the hammer includes a striking member [for example, the striking portion H131] configured to abut against the chute by an elastic force in an initial state [for example, FIG. 48, (A) of FIG. 49, (A) of FIG. 50, (A) of FIG. 51, and (A) of FIG. 52], and a second holding member [for example, the holding portion H121] configured to sandwich and hold a cup [for example, the cup CP] accommodating the ground beans discharged from the chute with the first holding member by the elastic force, and enters a striking preparation state [for example, (B) of FIG. 49] in which the striking member is temporarily separated from the chute by pivoting from the initial state, the second holding member is disposed at a position where an interval with the first holding member is smaller than a thickness of a circumferential wall [for example, the circumferential wall CP1] of the cup in the initial state, and the striking member applies an impact to the chute when the hammer returns from the striking preparation state to the initial state by the elastic force [for example, (C) of FIG. 49]." has been described.

According to this coffee machine, since the impact is applied to the chute by utilizing the elastic force, a mechanism that reduces accumulation of the ground beans on an inner circumferential wall of the chute can be mounted compactly and inexpensively. Further, since the hammer also functions as a member that holds the cup, not only operability is improved, but also the machine can be made more compact and a cost is also reduced as compared with a case in which the striking member and the holding member are separately provided.

The coffee machine can be widely applied as long as the coffee machine is a device that performs adjustment using the coffee beans, and may be a coffee beverage production device or a coffee bean grinding machine.

An elastic force imparting member (for example, a spring member) that imparts the elastic force may be provided.

The hammer may enter a holding state when the cup is inserted between the first holding member and the second holding member. The holding state may be a state in which the gap can be formed between the striking member and the chute.

The second holding member may be disposed at a position in contact with the first holding member in the initial state.

The hammer includes the striking member and the second holding member at different positions. For example, the striking member and the second holding member may be provided at branched positions. That is, the hammer may include a first arm portion [for example, the striking arm H13] and a second arm portion [for example, the holding arm H12] different from the first arm portion, the first arm portion may be provided with the striking member [for example, the striking portion H131], and the second arm portion may be provided with the second holding member [for example, the holding portion H121]. More specifically, the hammer may include the first arm portion that abuts against the chute in the initial state and the second arm portion that abuts against the circumferential wall of the cup in the holding state, the first arm portion may be provided with the striking member at a portion that abuts against the chute in the initial state, and the second arm portion may be provided with the second holding member at a portion that abuts against the circumferential wall of the cup in the holding state.

In addition, "the coffee machine, in which at least one of the first holding member and the second holding member includes an anti-slip portion [for example, the rubber cap GM332]." has also been described.

The cup is held more stably by providing the anti-slip portion. Further, since the striking member is a member separate from the second holding member, even if the anti-slip portion is provided, striking the chute by the striking member is not affected.

Each of the first holding member and the second holding member may include the anti-slip portion.

In addition, "the coffee machine, in which one holding member [for example, the holding portion H121 shown in FIG. 51] of the first holding member and the second holding member is in contact with the circumferential wall at one position from an inner side of the circumferential wall [for example, the circumferential wall CP1], and the other [for example, the fixed holding member GM33 shown in FIG. 51] of the first holding member and the second holding member with respect to the one holding member is in contact with the circumferential wall at two positions from an outer side of the circumferential wall [for example, the circumferential wall CP1]." has been described.

The cup is held more stably by holding the circumferential wall at three positions.

Further, "the coffee machine, in which the first holding member is fixedly disposed and corresponds to the other holding member [for example, the fixed holding member GM33 shown in FIG. 51], and the second holding member corresponds to the one holding member [for example, the holding portion H121 shown in FIG. 51]." has been described.

According to this aspect, since the second holding member in the pivotable hammer is in contact with the circumferential wall at one position, there are advantages that a weight of the hammer can be reduced and the hammer can be easily operated.

"The coffee machine, in which the hammer includes an operation unit [for example, the finger rest portion H141] that is operated when the hammer transitions from the initial state to the striking preparation state, and the operation unit is located on a right hand side of an operator." has been described.

It is easy for a right-handed operator to operate the operation unit.

The operation unit is operated both when the hammer transitions from the initial state to the holding state and when the hammer returns from the holding state to the initial state.

Next, the fixed blade 57*b* and the rotary blade 58*b* provided in the main mill 5BM mounted on the coffee bean grinding machine GM according to the second embodiment will be described in detail. The fixed blade 57*b* does not rotate, but lifts and lowers with respect to the rotary blade 58*b*. The rotary blade 58*b* rotates, but a position thereof in the upper-lower direction is fixed.

(A) of FIG. 54 is a perspective view showing the rotary blade 58*b* and the fixed blade 57*b* positioned at an initial position and farthest from the rotary blade 58*b*, and (B) of FIG. 54 is a perspective view showing only the rotary blade 58*b* with the fixed blade 57*b* removed from the state shown in (A) of FIG. 54.

A through hole 571 is provided in the central portion of the fixed blade 57*b* shown in (A) of FIG. 54. Attachment holes 579 are also provided at intervals of 120 degrees in the circumferential direction.

Since surfaces of the fixed blade 57*b* and the rotary blade 58*b* facing each other (hereinafter, referred to as blade surfaces) have the same configuration, the rotary blade 58*b* will be described below as an example.

The blade surface is provided with a grinding portion 582 continuously around an outermost edge for grinding coffee beans to a set particle size, and a depth of the grinding portion 582 does not change between an outer side and an inner side. On the other hand, an inner side of the grinding portion 582 on the blade surface is a dish-shaped inclined surface 583 that becomes deeper toward the center.

(A) of FIG. 55 is a plan view of the rotary blade 58*b*.

A rotation direction of the rotary blade 58*b* shown in (A) of FIG. 55 is a counterclockwise direction indicated by an arrow in the figure. A through hole 581 is provided in a central portion of the rotary blade 58*b*, and the rotary blade 58*b* is doughnut-shaped in plan view. Attachment holes 589 are also provided at intervals of 120 degrees in the circumferential direction. The rotary blade 58*b* is non-rotatably fixed to the rotary base by using these attachment holes 589.

(C) of FIG. 54 is a diagram showing a rotary base 59.

The rotary base 59 shown in (C) of FIG. 54 is provided with bolt receiving holes 591 at intervals of 120 degrees in the circumferential direction, and bolts (not shown) inserted through the attachment holes 589 of the rotary blade 58*b* are screwed into these bolt receiving holes 591. In addition, a fitting hole 592 into which the rotation shaft 54*b* shown in FIG. 32 is also provided in a center portion of the rotary base 59. When the rotation shaft 54b rotates, the rotary base 59 rotates in a direction of an arrow, and the rotary blade 58b attached to the rotary base 59 rotates. Further, six blades 593 are erected on an outer circumferential portion of the rotary base 59 at intervals in the circumferential direction. These six blades 593 are positioned in a discharge space between the rotary blade 54b and an inner circumferential wall of the frame member 694 shown in (B) of FIG. 52, and move in the discharge space in the circumferential direction by rotating together with the rotary blade 58b. The ground beans ground between the blade surface of the rotary blade 54b and the blade surface of the fixed blade 57b are discharged into the discharge space and are moved in the circumferential direction by these six blades 593. When the ground beans moved by the blades 593 reach the discharge port provided in the frame member 694, the ground beans rush out from the discharge port into the chute GM.

In (C) of FIG. 54, a shape of the two blades 593 shown in front is particularly easy to understand, and a first surface 5931 that pushes the ground beans on the downstream side in the rotation direction is formed with an arc-shaped curved surface (a curved surface that is concave on the downstream side). On the other hand, a second surface 5932 connected to the upstream side in the rotation direction from the first surface 5931 is obliquely arranged in a corrugated shape (an undulating shape is such that the downstream side is convex outward and the upstream side is concave inward) such that the ground beans that have climbed over the first surface 5931 can easily move to the upstream side.

In (A) of FIG. 55, an imaginary circle is shown at an inner side of the through hole 581 by a one-dot chain line. A center of the imaginary circle coincides with the center of the rotary blade 58b (a center of the through hole 581). A large number of blades 580 are provided on the entire blade surface. These blades 580 extend in a tangential direction indicated by the dotted line of the imaginary circle, and strictly speaking, are slightly curved in a manner of being inclined upstream in the rotation direction indicated by an arrow. Each blade 580 extends to the outermost grinding portion 582 except where the attachment holes 589 are provided.

The inclined surface 583 has a plurality of smooth portions 584 to 587 on which the blades 580 are not provided. These smooth portions 584 to 587 are inclined from the through hole 581 toward the outer circumferential side (grinding portion 582 side) and inclined to the upstream side in the rotation direction indicated by the arrow, and tapered toward the outer circumference. Hereinafter, a smooth portion with a largest area is referred to as the first smooth portion 584, a smooth portion with a second largest area is referred to as the second flat portion 585, a smooth portion with a third largest area is referred to as the third flat portion 586, and a smooth portion with a smallest area is referred to as the fourth smooth portion 587. The inclined surface 583 has two sets of the first smooth portion 584 to the fourth smooth portion 587. That is, the smooth portions 584 to 587 are provided at intervals of 180 degrees in the circumferential direction, and eight smooth portions in total are present. The smooth portions 584 to 587 are sometimes referred to as inner blades, and portions outside the smooth portions 584 to 587 are sometimes referred to as outer blades.

The first smooth portion 584 to the third smooth portion 586 are continuously provided in the circumferential direction, and only the fourth smooth portion 587 is provided at intervals in the circumferential direction. The larger the area of the smooth portion, the smaller the angle of inclination toward the upstream side in the rotation direction indicated by the arrow. Therefore, the first smooth portion 584 has the smallest inclination angle and lies flat. On the other hand, the fourth smooth portion 587 has the largest inclination angle and stands upright. An outer edge of each of the smooth portions (inner blades) 584 to 587, that is, an inner edge of the outer blade has a zigzag shape when viewed for each of the blades 580.

Further, the smooth portion extends to the outer circumferential side as the area increases. Therefore, the first smooth portion 584 extends to the outermost circumferential side, and a tip end of the first smooth portion 584 shown in (A) of FIG. 55 reaches the grinding portion 582. The first smooth portion 584 may not reach the grinding portion 582.

(B) of FIG. 55 is a diagram shown in cross-section to enable visualization of the first smooth portion 584 to the third flat portion 586, and (C) of FIG. 55 is a diagram shown in cross-section to enable visualization of the third smooth portion 586 and the fourth flat portion 587.

Each of the first smooth portion 584 to the fourth smooth portion 587 is deeper toward the upstream side in the rotation direction indicated by the arrow, and as shown in the plan view of (A) of FIG. 55, grooves 5841 to 5861 linearly extending toward the outer circumference are formed at the upstream end portions in the rotation direction of the smooth portions. The grooves 5841 to 5861 are sometimes referred to as crushing blades.

In addition, at an innermost position of the blade surface (a position of an edge of the through hole 581), the first smooth portion 584 is depressed to a deepest position, and in the following, the second smooth portion 585, the third smooth portion 586, and the fourth smooth portion 587 are described in descending order of depth. In the edge of the through hole 581, regions where the smooth portions 584 to 587 are not provided are narrower than regions where the smooth portions 584 to 587 are provided. The regions where the smooth portions 584 to 587 are not provided include a first region α between the first smooth portion 584 and the fourth smooth portion 587 that are adjacent to each other when viewed in the rotation direction, and a second region β between the fourth smooth portion 587 and the third smooth portion 586 that are similarly adjacent to each other in the edge of the through hole 581. The blades 580 are present from the edge of the through hole 581 in the first region α and the second region 3.

A first smooth portion 574, a second smooth portion 575, a third smooth portion 576, and a fourth smooth portion 577 are similarly provided on the fixed blade 57b. (A) of FIG. 54 shows a part of the fixed blade 57b, and edges of the first smooth portion 574, the second smooth portion 575 and the third smooth portion 576 are visible. The rotary blade 58b shown in (A) of FIG. 54 is slightly displaced in the circumferential direction with respect to the fixed blade 57b.

In the main mill 5BM, the cracked beans are supplied from the top mill 5AM to a center side of the fixed blade 57b and the rotary blade 58b. The supplied cracked beans are ground between the blade surface of the fixed blade 57b and the blade surface of the rotary blade 58b. Movement of the beans between the blade surface of the fixed blade 57b and the blade surface of the rotary blade 58b is complicated, and it is difficult to explain in general terms, and the movement of the beans on the blade surface of the rotary blade 58b will be explained below as an example. Among the beans supplied between the blade surface of the fixed blade 57b and the blade surface of the rotary blade 58b, the beans that have entered any one of the smooth portions 584 to 587 are directed downstream and outward in the rotation direction of the smooth portions 584 to 587 by a centrifugal force. In the smooth portions 584 to 587, the areas of the smooth portions 584 to 587 gradually narrow toward the downstream side in the rotation direction. Therefore, the beans that have entered the smooth portions 584 to 587 tend to move from the smooth portions 584 to 587 to the outer side blades 580 (outer blades) toward the downstream side in the rotation direction. The beans moved to the outer side blades 580 (outer blades) are ground by the outer blades, and finally, finished by the grinding portion 582 to the particle size adjusted by the particle size adjusting mechanism 503 shown in FIG. 32 or the particle size (hereinafter, these particle sizes are collectively referred to as a desired particle size) set using the manual setting disc dial 695 and the fine adjustment knob dial 696 shown in FIG. 36, and discharged from the chute GM31 described above. On the other hand, among the beans falling into the grooves (crushing blades) 5851 and 5861 in the adjacent smooth portions at the downstream side in the rotation direction, some beans are guided by these grooves (crushing blades) 5851 and 5861 and head toward the outer circumference, and some beans are pulled out of the grooves (crushing blades) 5851 and 5861 by the centrifugal force and head downstream and outward in the rotation direction, and repeats the same movement as described above. The beans guided by the grooves (crushing blades) 5851 and 5861 and reaching the outer blades between the groove and the grinding portion 582 are ground by the outer blades, and finally finished to the desired particle size by the grinding portion 582 and discharged from the chute GM31. After being ground by the blades 580 in the second region β, the beans that have moved to the downstream side in the rotation direction of the third smooth portion 586 may drop into the groove (crushing blade) 5871 in the adjacent fourth smooth portion 587 at the downstream side in the rotation direction. Also in this case, the beans guided by the groove (crushing blade) 5871 and reaching the outer blades between the groove and the grinding portion 582 are ground by the outer blades, and finally finished to the desired particle size by the grinding portion 582 and discharged from the chute GM31. After being ground by the blades 580 in the first region α, the beans that have moved to the downstream side in the rotation direction of the fourth smooth portion 587 reach the grinding portion 582, are finished to the desired particle size by the grinding portion 582, and are discharged from the chute GM31. Alternatively, the beans may fall into the groove (crushing blade) 5841 in the adjacent first smooth portion 584 at the downstream side in the rotation direction. The beans falling into the groove (crushing blade) 5841 are guided as they are to the grinding portion 582, are finished to the desired particle size by the grinding portion 582, and are discharged from the chute GM31.

Next, manual adjustment of the interval between the rotary blade 58*b* and the fixed blade 57*b* in the main mill 5BM will be described in detail. In the following description, the interval between the rotary blade 58*b* and the fixed blade 57*b* is referred to as a main mill interval. The coffee bean grinding machine GM according to the second embodiment also includes the same coupling duct (not shown) as the coupling duct 661 of the coffee bean grinding machine GM according to the first embodiment. In addition, the coffee bean grinding machine GM according to the second embodiment is provided with a mechanical switch unit 600 that is not provided in the coffee bean grinding machine GM according to the first embodiment.

(A) of FIG. 56 is a perspective view enabling visualization of the mechanical switch unit 600 with the manual setting disc dial 695 and the coupling duct (not shown) shown in FIG. 51 removed, and (B) of FIG. 56 is a plan view of the portions shown in (A).

In the coffee bean grinding machine GM according to the first embodiment, by rotational driving of the second motor 503*a* shown in FIG. 36, finer adjustment than the manual adjustment performed by the manual setting disc dial 695 is possible. The fine adjustment knob dial 696 is also provided, and the fine adjustment also can be performed by the manual operation. On the other hand, in the coffee bean grinding machine GM according to the second embodiment, the second motor 503*a* and the fine adjustment knob dial 696 are not provided, and the main mill interval can be adjusted only by the manual operation using the manual setting disc dial 695. That is, it is not possible to perform motor-driven adjustment or finer adjustment than the manual setting disk dial 695. This is for the purpose of reducing a cost of the device, and if performance is more important than the cost, the second motor 503*a* and the fine adjustment knob dial 696 may be provided in the same way as in the coffee bean grinding machine GM according to the first embodiment.

In addition to the chute GM31, FIG. 56 also shows the worm wheel 691 and the coupling dial 697 that couples the worm wheel 691 with the manual setting disc dial 695 (not shown). The coupling gear 697*g* is also provided on the upper surface of the coupling dial 697 shown in FIG. 56, and when the manual setting disc dial 695 is placed on the coupling dial 697, the coupling gear 697*g* and a gear of the manual setting disc dial 695 mesh with each other.

The gear portion 691*g* provided on an outer circumference of the worm wheel 691 is also shown. The mechanical switch unit 600 detects movement of teeth constituting the gear portion 691*g*. Therefore, the mechanical switch unit 600 is fixedly arranged in a manner of being opposite to the gear portion 691*g*. Therefore, the mechanical switch unit 600 shown in (B) of FIG. 56 is fixedly arranged in a 2 o'clock direction and is surrounded by frames of a one-dot chain line.

(A) of FIG. 57 is an enlarged view showing an inside of the frames of the one-dot chain line in (B) of FIG. 56, and (B) of FIG. 57 is a view showing an internal structure of the mechanical switch unit 600 shown in (A) of FIG. 57.

As shown in (B) of FIG. 57, the mechanical switch unit 600 includes a first mechanical switch 610 and a second mechanical switch 620. The first mechanical switch 610 includes an iron detection ball 611, a magnet member 612 that attracts the detection ball 611, and a detection piece 613 having spring properties. The second mechanical switch 620 has the same configuration, and includes an iron detection ball 621, a magnet member 622 that attracts the detection ball 621, and a detection piece 623 having spring properties. The detection balls 611 and 621 at initial positions are pushed by the teeth of the gear portion 691*g* when the teeth pass, and the magnet members 612 and 622 advance outward to push down the detection pieces 613 and 623. When the detection pieces 613 and 623 are pushed down, a conductive state is entered into, and a detection signal is output. On the other hand, when the teeth finish passing, the conductive state ends due to the spring properties of the detection pieces 613 and 623, the magnet members 612 and 622 retreat, and the detection balls 611 and 621 return to the initial positions thereof. That is, a combination of the detection balls 611 and 621 and the magnet members 612 and 622 corresponds to a moving body that advances and retreats following unevenness of a tooth tip and a tooth bottom of the gear portion 691*g*. The detection balls 611 and 621 are made of a material having magnetism so as not to be displaced from positions of the magnet members 612 and 622, and are not limited to iron.

The gear portion 691g includes 60 teeth. That is, every time the worm wheel 691 rotates by 6°, a detection signal is output from the first mechanical switch 610, and a detection signal is also output from the second mechanical switch 620. Both the detection ball 611 of the first mechanical switch 610 and the detection ball 621 of the second mechanical switch 620 are disposed on a straight line extending radially from a central axis of the worm wheel 691 (see two-dot chain lines in (A) of FIG. 57). That is, the detection ball 611 and the magnet member 612 as a whole face the center of the worm wheel 691, and the detection ball 621 and the magnet member 622 as a whole also face the center of the worm wheel 691. Since the mechanical switch unit 600 detects forward rotation and reverse rotation of the worm wheel 691, the two detection balls 611 and 621 are disposed out of phase such that reaction timings do not match. Here, the detection ball 611 of the first mechanical switch 610 and the detection ball 621 of the second mechanical switch 620 are arranged at intervals of 6°×2+1.5°=13.5° with a shift of 1.5°.

(A) of FIG. 58 is a diagram showing a lock lever 640 and a gear lock portion 641.

The lock lever 640 shown in (A) of FIG. 58 is in a lock position, and the gear lock portion 641 meshes with some teeth of the gear portion 691g of the worm wheel 691. The worm wheel 691 cannot rotate when the lock lever 640 is in the lock position. The lock lever 640 is pivotable around a pivot shaft (not shown).

In the coffee bean grinding machine GM according to the second embodiment, similarly to the coffee bean grinding machine GM according to the first embodiment, when the manual setting disc dial 695 (see FIG. 51) is rotated, the worm wheel 691 directly rotates via the coupling dial 697, and the fixed blade 57b shown in (a) of FIG. 54 can be lifted and lowered. In order to rotate the manual setting disc dial 695, the lock lever 640 is pivoted upward as indicated by an arrow in the figure. Thus, the gear lock portion 641 is disengaged from the gear portion 691g, the worm wheel 691 becomes rotatable, and the forward rotation and reverse rotation of the manual setting disc dial 695 can be performed.

The coffee bean grinding machine GM according to the second embodiment also includes the control device 11 shown in FIG. 19. The control device 11 in the second embodiment controls the entire coffee bean grinding machine GM. As shown in FIG. 19, the control device 11 includes the processing unit 11a, the storage unit 11b, and the I/F unit 11c. The processing unit 11a is, for example, a processor such as a CPU. The storage unit 11b is, for example, a RAM or a ROM. The coffee bean grinding machine GM is not provided with the information display device 12 shown in FIG. 19, and as will be described later, the state and history of the machine can be known using a terminal. In the coffee bean grinding machine GM according to the second embodiment, the cost of the machine is reduced by omitting the information display device 12.

The control device 11 is provided with a particle size adjustment counter, and the processing unit 11a increases or decreases a count value of the particle size adjustment counter according to the detection signal output from the mechanical switch unit 600.

(B) of FIG. 58 is a diagram showing an example of the detection signal output from the mechanical switch unit 600 and the count value of the particle size adjustment counter.

Each of the first mechanical switch 610 and the second mechanical switch 620 detects the teeth of the gear portion 691g, and the control device 11 calculates and stores a direction and a distance in which the manual setting disc dial 695 is manually rotated. Four types of patterns of the detection signal output from the first mechanical switch 610 are present, and four types of patterns of the detection signal output from the second mechanical switch 620 are present. That is, four types of patterns: "1"→"1", "1"→"0", "0"→"1", and "0"→"0".

For example, when a value representing the detection signal from the first mechanical switch 610 is "1"→"1" and a value representing the detection signal from the second mechanical switch 620 is "1"→"0", the count value of the particle size adjustment counter is added by clockwise rotating the manual setting disc dial 695. When the value representing the detection signal from the first mechanical switch 610 is "1"→"0" and the value representing the detection signal from the second mechanical switch 620 is "1"→"1", the count value of the particle size adjustment counter is subtracted by counterclockwise rotating the manual setting disc dial 695.

In the example shown in (B) of FIG. 58, the first mechanical switch 610 detects a "tooth 1" during t1 to t3, and the detection signal (on-level signal) is output from the first mechanical switch 610. When the manual setting disc dial 695 continues to rotate in one direction (for example, clockwise rotation), the first mechanical switch 610 detects the "tooth 1" and then a "tooth 2". The first mechanical switch 610 detects the "tooth 2" during t5 to t8, and the detection signal (on-level signal) is output from the first mechanical switch 610. On the other hand, the second mechanical switch 620 detects a "tooth A" during t1 to t2, and the detection signal (on-level signal) is output from the second mechanical switch 620. When the manual setting disc dial 695 continues to rotate in the above one direction (for example, clockwise rotation), the second mechanical switch 620 detects the "tooth A" and then a "tooth B". The second mechanical switch 620 detects the "tooth B" during t4 to t6, and the detection signal (on-level signal) is output from the second mechanical switch 620. The second mechanical switch begins to detect the "tooth B" after the t7, and the detection signal (on-level signal) is output from the second mechanical switch 620.

In the control device 11, the count value of the particle size adjustment counter is added one by one until t7, but is subtracted after t7. That is, in the example shown in (B) of FIG. 58, the rotation direction of the manual setting disc dial 695 is reversed with the timing t7 serving as a boundary.

In an initialization operation when the power is applied, the manual setting disc dial 695 in a powered-off state is rotated until a sound of the fixed blade 57b hitting the rotary blade 58b is heard, and in response to the hitting sound, the rotation operation is stopped, the manual setting disc dial 695 is lifted up, the scale of 0 is aligned with the reference line GM10k (see FIG. 51) marked on the center casing GM10, and then the lifted manual setting disc dial 695 is lowered downward. Next, by turning on a power switch GM51 while pressing a reverse rotation button GM52 shown in FIG. 51, the count value of the particle size adjustment counter can be reset to 0.

When the manual setting disc dial 695 is rotated once, the main mill interval changes by 1000 μm. As described above, the gear portion 691g includes the 60 teeth, and based on 1000 μm/60 teeth, if the manual setting disc dial 695 is rotated by one tooth, the main mill interval changes by 16.6 μm. The manual setting disc dial 695 is marked with a scale only between 0 μm and 830 μm, and is not marked with a scale between 830 μm and 1000 μm. That is, 11 scales are marked between 0 µm and 830 µm as large scales, and if the manual setting disc dial 695 is rotated by one large scale, the main mill interval changes by 83 µm. Furthermore, four small scales dividing one large scale into five are marked in accordance with 16.6 µm for one tooth. In calculation, if the manual setting disc dial 695 is rotated by one small scale, the main mill interval changes by one tooth (16.6 µm).

FIG. 59 is a table showing part of a relation between the count value of the particle size adjustment counter and the main mill interval.

The particle size adjustment counter is a counter with a resolution of 240 counts per rotation of the manual setting disc dial 695. As described above, when the manual setting disc dial 695 is rotated once, the main mill interval changes by 1000 µm, and thus, the main mill interval is 4.166 . . . µm for one count. In the table shown in FIG. 59, 4.166 . . . µm/count is a "main mill interval (µm) in calculation". On the other hand, since the value in calculation is too fine for handling the machine, the main mil interval is treated as 4 µm for one count. In this case, it becomes 4 µm×240 counts, and when the manual setting disc dial 695 is rotated once, the main mill interval changes by 960 µm. In the table shown in FIG. 59, the value expressed by 4 µm/count is the "main mill interval (µm) in machine handling".

Here, even if the main mill interval is treated strictly, the rotary blade 58*b* and the fixed blade 57*b* is soon worn out, and thus, the shift is likely to occur in practice. Handling data is easier to handle if the value is suitable. For these reasons, it is preferable to treat the main mill interval in units of 10 µm when saving the data as a log. In the table shown in FIG. 59, the main mill interval treated in the units of 10 µm is a "main mill interval (µm) in data handling".

In the above description, "a coffee machine, including: a first blade [for example, the rotary blade 58*b*]; a second blade [for example, the fixed blade 57*b*] configured to pulverize coffee beans with the first blade and change an interval with the first blade; an operation unit [for example, the worm wheel 691] configured to operate according to a length of the interval; and a detection unit [for example, the mechanical switch unit 600] configured to detect an operation of the operation unit." has been described.

According to the coffee machine, it is easy to know the interval using the detection result of the detection unit. In addition, it is suitable for converting a change in the interval into data.

The coffee machine may be a device that prepares coffee using coffee beans, and may be a coffee bean grinding machine, or a beverage production device provided with the coffee bean grinding machine to produce coffee beverages (same below).

"The coffee machine, in which the operation unit includes a gear and rotates according to the length of the interval, and the detection unit detects movement of teeth of the gear [for example, the teeth constituting the gear portion 691*g*]." has been described.

"The coffee machine, in which the detection unit detects the movement of the teeth by coming into contact with the gear teeth." has been described.

"The coffee machine, in which the detection unit includes a moving body [for example, the combination of the detection balls 611 and 621 and the magnet members 612 and 622] that advances and retreats following unevenness of a tooth tip and a tooth bottom of the gear, and a detection piece [for example, the detection pieces 613 and 623] that detects the advance of the moving body.]" has been described.

When the detection piece detects the advance of the moving body, a conductive state is entered into, and a detection signal is output.

"The coffee machine, in which the detection unit detects movement of two teeth of the gear by coming into contact with the teeth [for example, the first mechanical switch 610 and the second mechanical switch 620]." has been described.

According to this aspect, it is possible to distinguish between the forward rotation and the reverse rotation of the gear.

"The coffee machine, including: a counter [for example, the particle size adjustment counter] whose count value is added or subtracted according to the detection result of the detection unit, in which in the counter, the count value is increased when the gear rotates in a predetermined direction, and the count value is decreased when the gear rotates in a direction opposite to the predetermined direction." has been described.

According to this coffee machine, the length of the interval can be recorded by the count value of the counter, and data management of the length of the interval can be easily performed.

Next, the coffee bean grinding machine GM according to the second embodiment also includes the chaff fan 60A1 and the cha fan motor 60A2 shown in FIG. 30. As described with reference to FIG. 30, the air from which the waste is separated passes through the chaff fan 60A1 and is exhausted as indicated by the two-dot chain line arrow. Originally, the waste falls due to own weight and does not pass through the chaff fan 60A1, but in a case of extremely light waste (bean flour, or the like) or when the chaff fan 60A1 has a strong aspiration force, there are cases where the waste remains in the rising air, and the remaining waste may adhere to the chaff fan 60A1. In some cases, the waste adhering to the chaff fan 60A1 is peeled off. In these cases, the rotation speed of the chaff fan 60A1 increases or decreases. Alternatively, deterioration of the cha fan motor 60A2 may also reduce the rotation speed of the chaff fan 60A1. Therefore, in order to bring the rotation speed of the chaff fan 60A1 as close as possible to the set speed and maintain the air volume at the target air volume, the processing unit 11*a* (see FIG. 19) in the control device 11 performs air volume monitoring control of the chaff fan 60A1. The chaff fan motor 60A2 is a pulse motor, and the processing unit 11*a* performs PWM control.

FIG. 60 is a table showing 0th to 105th pulses of a reference table in the PWM control of the chaff fan motor 60A2 performed by the processing unit 11*a*, and FIG. 61 is a table showing 106th to 255th pulses of the reference table.

A "number of pulses" in this reference table is the number of rotation pulses per unit time (500 ms) of the chaff fan motor 60A2, and the "PWM value" is a value (%) of a duty ratio corresponding to the number of rotation pulses. The reference tables shown in FIGS. 60 and 61 are stored in the storage unit 11*b* (see FIG. 19) of the control device 11.

FIG. 62 is a table showing a relation between a set value of the chaff fan 60A1 and the duty ratio in the PWM control.

As the set value of the chaff fan 60A1, five levels of setting 1 to setting 5 are prepared. These sets can be selected by operating the air volume dial 60D shown in FIG. 51. In the setting 1, the chaff fan motor 60A2 does not rotate. On the other hand, the PWM value (duty ratio) is 60% at the setting 5 which causes the chaff fan 60A1 to rotate most powerfully. The chaff may become a bitter or miscellaneous component of coffee beverages, and removal of the chaff can be expected to make the taste of coffee beverages cleaner.

However, some people feel that bitterness and miscellaneous taste are delicious. Therefore, it is not preferable to uniformly remove all the chaff. In the above description, the chaff is described as the waste, but how much the chaff is removed is a matter of taste preference, and strictly speaking, the chaff is not just waste. Therefore, five levels are prepared as the set values for the chaff fan 60A1.

The processing unit 11a obtains an actual number of rotation pulses per unit time (500 ms) of the chaff fan motor 60A2, and corrects the PWM value when a correction necessary condition provided for each of the setting 2 to the setting 5 is satisfied. The number of rotation pulses is obtained every 6 seconds after the chaff fan motor 60A2 starts rotating. The processing unit 11a determines whether the correction is necessary each time the number of rotation pulses is obtained. The correction necessary condition is a condition that is satisfied if the acquired number of rotation pulses (acquired value) is outside a permissible range. The permissible range is prepared for each set value.

For example, if the setting 2 is selected, a "current PWM value" will be 5(%). The "PWM value corresponding to set value" is 5(%). Here, when the acquired number of rotation pulses (acquired value 1) is 79, this value is below the permissible range and satisfies the correction necessary condition. From the reference table in FIG. 60, the PWM value corresponding to the acquired value 1 is 3(%). The processing unit 11a obtains a "corrected PWM value" from a correction formula. In this case, the "corrected PWM value" is 5+(5-3)=7(%). On the other hand, when the acquired number of rotation pulses (acquired value 2) is 98, this value exceeds the permissible range, and also in this case, the correction necessary condition is satisfied. From the reference table in FIG. 60, the PWM value corresponding to the acquired value 2 is 8(%). The processing unit 11a obtains the "corrected PWM value" from the correction formula. In this case, the "corrected PWM value" is 5+(5-8)=2%.

The processing unit 11a controls the chaff fan motor 60A2 using the corrected PWM value calculated based on the correction formula. The corrected PWM value is stored in the storage unit 11b, and is updated each time the correction necessary condition is satisfied. After the set value is changed, when the value is returned to the set value, the corrected PWM value immediately before the change of the set value is taken over. The corrected PWM value is saved even if the power of the machine is cut, and the corrected PWM value at the time of cutting the power is taken over when the power is applied next time.

In the above description, "a coffee machine, including: a first grinder [for example, the top mill 5AM] configured to grind coffee beans; a fan [for example, the chaff fan 60A1] configured to generate a wind pressure by rotating to separate waste from the ground beans ground by the first grinder; a fan motor [for example, the chaff fan motor 60A2] configured to cause the fan to rotate; and a control unit [for example, the processing unit 11a] configured to control rotation of the fan motor according to a set value [for example, the PWM value], in which the control unit acquires information [for example, the number of rotation pulses] related to a rotation speed of the actually rotating fan motor, corrects the set value based on the acquired information, and controls the rotation of the fan motor according to the corrected set value." has been described.

According to this coffee machine, an air volume of the fan can be brought as close as possible to the target air volume.

When the fan motor is a pulse motor and the control unit performs the PWM control, the set value is a value representing the duty ratio, and the information may be the number of rotation pulses per unit time (pulse speed). The permissible range of the number of rotation pulses with respect to the duty ratio is stored in advance as data, and the control unit monitors the number of rotation pulses per unit time, and when the number of rotation pulses is out of the permissible range, the control unit acquires a duty ratio corresponding to the actual number of rotation pulses from the data, and corrects the set duty ratio that is set using a difference between the set duty ratio and the duty ratio acquired from the data.

"The coffee machine, in which the control unit acquires the information at a predetermined cycle [for example, every 6 seconds], and is configured to correct the set value each time the information is acquired." has been described.

In this way, the air volume of the fan can be continuously brought as close as possible to the target air volume while the fan is rotating.

"The coffee machine, further including: a setting unit [for example, the air volume dial 60D] configured to set the set value to the control unit, in which the setting unit sets one set value selected from a plurality of set values [for example, 'setting 1' to 'setting 5'] as the set value, and the control unit determines whether correction of the set value is necessary according to a correction necessary condition of one set value selected by the setting unit from correction necessary conditions [for example, the correction necessary conditions shown in FIG. 62] prepared for the respective plurality of set values." has been described.

According to this coffee machine, it is possible to easily set the set values, determine whether the correction is necessary for each of a plurality of settings, and perform detailed control.

The present invention may be an aspect in which a storage unit configured to store the correction necessary conditions for the respective plurality of set values is provided.

"The coffee machine, in which the control unit also corrects the set value using the same method [for example, corrects using a common correction formula] when the control unit determines whether the correction of the set value is necessary according to the different correction necessary conditions." has been described.

In this way, a capacity of a control program is reduced and a processing load is also reduced.

"The coffee machine, in which the control unit determines whether further correction of the set value is necessary according to the correction necessary condition of the corrected set value while the fan motor is rotating." has been described.

In this way, the air volume of the fan can be continuously brought as close as possible to the target air volume while the fan is rotating.

Next, a plurality of operating states of the coffee bean grinding machine GM according to the second embodiment will be described, and a control process in each operating state will be described in detail.

FIG. 63 is a transition diagram of operating states in the coffee bean grinding machine GM according to the second embodiment.

In the coffee bean grinding machine GM according to the second embodiment, there are the plurality of operating states such as a state during initialization process, a normal standby state, a grind state, a standby state (the top mill is in the stop state), a standby state (during cleaning), a condition insufficient state, a bean clogging state, and an abnormal state. The normal standby state is an operable state and corresponds to a basic state of the coffee bean grinding machine GM according to the second embodiment. In the coffee bean grinding machine GM, the various operating states are notified by changing emission colors of a button LED 151 incorporated in a grind button 150 (corresponding to the start button GM15 shown in FIG. 24) shown in FIG. 51. The state during the initialization process is indicated by yellow lighting, the normal standby state, the standby state (the top mill 5AM is in the stop state), and the standby state (during cleaning) are indicated by white lighting, the grind state is indicated by blue lighting, the condition insufficient state is indicated by orange lighting, the bean clogging state is indicated by purple lighting, and the abnormal state is indicated by red lighting. The white lighting is limited to a normal mode which will be described later.

FIG. 64 is a flowchart showing a flow of a starting process in the processing unit 11a when power is applied and the coffee bean grinding machine GM is started.

If the power switch GM51 shown in FIG. 51 is turned on to apply the power, the processing unit 11a lights the button LED 151 in yellow (step Sg100) and executes the initialization process (step Sg101). In the initialization process, setting (temporarily setting) of a stack initial value to a stack pointer of the CPU which is the processing unit 11a, interrupt mask setting, initial setting of I/F unit 11c, initial setting of various variables to be stored in the RAM which is one of the storage units 11b, and the like are performed.

When the initialization process is completed, the processing unit 11a reads a state at the time of a previous power failure from the RAM (step Sg102), and first determines whether the state is a state in which a RAM abnormality does not occur (step Sg103). If the state at the time of the previous power failure is the state in which the RAM abnormality occurs, the button LED 151 lights red, the operating state of the machine is set to the abnormal state (step Sg105), and the starting process shown in FIG. 64 ends. If no RAM abnormality occurs, it is determined whether the reverse rotation button GM52 shown in FIG. 51 is operated, and if the reverse rotation button GM52 is not operated, the process proceeds to step Sg107. On the other hand, if the reverse rotation button GM52 is operated, the count value of the above particle size adjustment counter is reset to "0" (step Sg106), and the process proceeds to step Sg107.

In step Sg107, the state at the time of the previous power failure is set. If the state at the time of the previous power failure is the abnormal state other than the RAM abnormality, the button LED 151 lights red, and the operating state of the machine is set to the abnormal state. If a count value of a G counter which will be described later is larger than "0", an air-cooling fan (not shown) for cooling the main mill motor is started, the button LED 151 lights orange, and the operating state of the machine is set to the condition insufficient state. If the state at the time of the previous power failure is the bean clogging state, the button LED 151 lights purple, and the operating state of the machine is set to the bean clogging state. If the state at the time of the previous power failure is the normal standby state of the normal mode, the button LED 151 lights white, and the operating state of the machine is set to the normal standby state.

When the execution of step Sg107 is completed, the starting process shown in FIG. 64 ends.

(A) of FIG. 65 is a flowchart showing a flow of a normal standby state process executed by the processing unit 11a in the normal standby state.

First, it is determined whether the grind button 150 shown in FIG. 51 is operated (step Sg200), and if the grind button 150 is not operated, it is determined whether the reverse rotation button GM52 shown in FIG. 51 is operated (step Sg201), and if the reverse rotation button GM52 is also not operated, the process returns to Sg200.

On the other hand, when the grind button 150 is operated, a main mill start timer is started (step Sg202). The main mill start timer counts (for example, counts 30 ms) up to a start timing of the main mill motor. Next, the air-cooling fan (not shown) for cooling the main mill motor is started (step Sg203), and finally the button LED 151 lights blue (step Sg204), and the normal standby state process ends. When the grind button 150 is operated, the operating state of the machine transitions to the grind state, and the processing unit 11a executes a grinding interruption process 1 next time.

When the reverse rotation button GM52 is operated, it is determined whether a cupping mode flag is set to ON (step Sg205). The coffee bean grinding machine GM according to the second embodiment includes the normal mode and a cupping mode as operation modes. The cupping mode is a mode in which the chaff fan 60A1 shown in FIG. 30 does not rotate and chaff separation is not performed, and the normal mode is a mode in which the chaff fan 60A1 can rotate to perform the chaff separation. In cupping, since the coffee beans themselves are evaluated, the chaff cannot be removed, and thus, the cupping mode is provided. The reverse rotation button GM52 functions here as a toggle switch that switches between the normal mode and the cupping mode, and if the cupping mode flag is set to ON, the cupping mode flag is set to OFF (step Sg206), the mode is transitioned to the normal mode, and the button LED 151 lights white (step Sg207), and the normal standby state process ends. If the cupping mode flag is set to OFF, the cupping mode flag is set to ON (step Sg208), the mode is transitioned to the cupping mode, and the button LED 151 lights green (step Sg209), and the normal standby state process ends. When the grind button 150 is not operated, the normal standby state is continued, and the button LED 151 lights green in the normal standby state in the cupping mode.

(B) of FIG. 65 is a flowchart showing a flow of a normal standby state interruption process executed by the processing unit 11a in the normal standby state.

The processing unit 11a starts various interruption processes (standby state interruption process, grinding interruption process, condition insufficient state interruption process, bean clogging state interruption process) in response to a timer interrupt signal generated at a predetermined circle (for example, once every 1 ms).

In step Sg10, a G counter subtracting process is executed. The G counter subtracting process will be described in detail later. Next, various abnormality detection processes (step Sg211) are executed. For example, when the RAM abnormality, a current value abnormality of the top mill motor at a non-drive time, a current value abnormality of the main mill motor at the same non-drive time are detected, the button LED 151 lights red, and the operating state of the machine transitions to the abnormal state. In addition, when there is undetection of the hopper unit 402 due to the hopper unit 402 shown in FIG. 51 not being attached, or undetection of the chute GM31 due to the opening of the chute GM31 described with reference to (B) of FIG. 52, the button LED 151 lights orange, and the operating state of the machine transitions to the condition insufficient state.

In a subsequent step Sg212, it is determined whether an abnormality occurs in the air-cooling fan that cools the main mill motor, and if an abnormality does not occur in the air-cooling fan, the normal standby state interruption process ends. Conversely, if an abnormality occurs in the air-cooling fan, power supply to a drive motor of the air-cooling fan is terminated to stop the air-cooling fan (step Sg213), and the normal standby state interruption process ends.

When the main mill 5BM performs the grinding process for a certain period of time, a temperature of the mill motor rises, and the mill motor itself or components around the mill motor fail. The coffee bean grinding machine GM according to the second embodiment is provided with the G counter that monitors a grindable time of the main mill 5BM. This G counter counts up every predetermined time (1 ms in this example) while the main mill motor is rotating, and except when the main mill motor is rotating, the G counter counts down every predetermined time (1 ms in this example) until the G counter reaches a lower limit threshold ("0" in this example). When the G counter reaches an upper limit threshold, the main mill motor is stopped, and the state is transitioned to the condition insufficient state. After transitioning to the condition insufficient state, the condition insufficient state is continued until the count value of the G counter reaches the lower limit threshold ("0" in this example), and the normal standby state is not restored. That is, the main mill motor cannot rotate and the grinding process cannot be performed. The air-cooling fan that cools the main mill motor stops when the count value of the G counter is equal to or less than the lower limit threshold, and starts when the count value exceeds the lower limit threshold. When an abnormality occurs in the air-cooling fan, a fan lock signal is output from a sensor that monitors the driving of the air-cooling fan. In step Sg213 described above, based on whether the fan lock signal is output, the processing unit 11a determines that an abnormality occurs if the fan lock signal is output.

FIG. 66 is a timechart showing an example of fluctuation in the count value of the G counter. In this timechart, time elapses from a left side to a right side of the figure. Below the graph showing the increase and decrease in the count value of the G counter, output examples of a drive signal for the air-cooling fan that cools the main mill motor and the fan lock signal that indicates failure of the air-cooling fan are shown.

In the leftmost normal standby state, the count value of the G counter is the lower limit threshold (hereinafter, referred to as a specific numerical value of "0"). The air-cooling fan is stopped, and the fan lock signal is not output from the sensor that monitors the driving of the air-cooling fan.

The grind button 150 shown in FIG. 51 is operated, and the main mill motor starts rotating (step Sg316 which will be described later). If the main mill motor starts rotating, an adding process of the count value of the G counter (steps Sg310, Sg330, and Sg350 which will be described later) is performed in the interruption process that starts every 1 ms (see (B) of FIG. 68). Since the fan lock signal is not output, a predetermined normal value (m (m represents a natural number, for example, "10")) is repeatedly added to the count value. In this timechart, an output timing of a drive-on signal for the air-cooling fan is shown to coincide with a timing at which the count value of the G counter starts to increase, and strictly speaking, is an execution timing of step Sg203 shown in (A) of FIG. 65 before the main mill motor starts rotating.

If the main mill motor stops rotating, a subtracting process (step Sg210 described above, step Sg230, step Sg260, step Sg400, step Sg510, step Sg520, and step Sg540 which will be described later) of the count value of the G counter is performed in the interruption process that starts every 1 ms (see FIG. 67). In this timing chart, the normal standby state is restored before the count value of the G counter reaches the upper limit threshold, and the fan lock signal is not output, and thus, the predetermined normal value (2n (n represents a natural number, for example, "10")) is subtracted from the count value.

The count value of the G counter reaches "0" during the normal standby state by repeating the subtracting process. If the count value of the G counter becomes "0", the main mill motor is sufficiently cooled, and the air-cooling fan stops (step Sg210g which will be described later).

The grind button 150 is operated again, and the main mill motor starts rotating, and the count value of the G counter returned to "0" is added. Since the fan lock signal is not output here as well, the predetermined normal value is repeatedly added to the count value. The air-cooling fan also starts driving. After a short normal standby state, the state transition to a third grind state. In this short normal standby state, the count value of the G counter does not return to the value of "0", and the addition during the third grind state is started. Since the fan lock signal is also not output in the third grind state, the predetermined normal value continues to be added repeatedly to the count value, and eventually, the count value reaches the upper limit threshold. If the count value reaches the upper limit threshold, in order to avoid a risk of failure of the main mill motor and peripheral components, the main mill motor is stopped and the state is transitioned to the condition insufficient state. Even if the main mill motor is stopped, the air-cooling fan continues to be driven, and since the fan lock signal is not output, the predetermined normal value is repeatedly subtracted from the count value. As a result, the count value reaches "0" and the normal standby state is restored. The air-cooling fan stops.

When the state transitions to a fourth grind state, the air-cooling fan fails, and the fan lock signal is output from the sensor that monitors the driving of the air-cooling fan. In the air-cooling fan monitoring process which will be described later (see (B) of FIG. 69), it is determined whether an abnormality occurs in the air-cooling fan depending on whether the fan lock signal is output (step Sg338a which will be described later). When the fan lock signal is output, the predetermined abnormal value (5 m (for example, "50")) is repeatedly added to the count value of the G counter. The abnormal value to be added is a value five times of the predetermined normal value to be added, and the count value reaches the upper limit threshold five times faster than that in a case where the normal value is added. In order to cool the main mill motor which generates heat due to the rotation, it is necessary to rely on natural air cooling when forced air cooling of the main mill motor cannot be performed by the air-cooling fan, and since the natural air cooling has a lower cooling capacity than that of the forced air cooling, a rate of increase in the count value of the G counter is made larger in a case where an abnormality occurs in the air-cooling fan than in a normal case, so that the count value reaches the upper limit threshold within a short period of time.

When the count value reaches the upper limit threshold, the main mill motor is stopped, and the state is transitioned to the condition insufficient state. The output of the fan lock signal continues, and the predetermined abnormal value (n (for example, "5")) is repeatedly subtracted from the count value. The abnormal value to be subtracted is ½ times of the predetermined normal value to be subtracted, and the count value reaches "0" ½ times faster than that in a case where the normal value is subtracted. As described above, since it is necessary to rely on the natural air cooling, which has a low cooling capacity, when the forced air cooling of the main mill motor cannot be performed by the air-cooling fan, a rate of decrease in the count value of the G counter is made smaller in a case where an abnormality occurs in the air-cooling fan than in the normal case, so that the count value takes time to reach "0". When the count value reaches "0", the normal standby state is restored.

The processing unit 11a can calculate a time required for the count value to reach "0". In the grind button 150 shown in FIG. 51, the circular button LED 151 is divided into four parts in the circumferential direction, in accordance with a remaining time until the count value reaches "0", an orange lighting region is exchanged with a white lighting region, and required time information until the count value reaches "0" is displayed. For example, when 60 seconds are spent for the count value to become "0", all four divisions are lit in orange at the start of subtraction, and every time 15 seconds elapse, one division is exchanged with white lighting clockwise, and when 60 seconds elapse from the start of subtraction, all four divisions are lighted in white. A 7-segment LED may be provided to display the remaining time numerically.

In the example shown in FIG. 66, the subtracted values are the same for both a case where the count value reaches the upper limit threshold and the subtraction of the count value starts (after the third grind ends), and a case where the subtraction of the count value is started before the count value reaches the upper limit threshold (after the second grind ends). That is, the subtracted value is 2n ("10") when an abnormality does not occur in the air-cooling fan, and is n ("5") when an abnormality occurs in the air-cooling fan. In this regard, the subtracted value (hereinafter, referred to as "first subtracted value") when the count value reaches the upper limit threshold and the subtraction of the count value is started may be smaller than the subtracted value (hereinafter, referred to as "second subtracted value") when the subtraction of the count value is started before the count value reaches the upper limit threshold. For example, when an abnormality does not occur in the air-cooling fan, the first subtracted value is set to "8" and the second subtracted value is set to "10", and when an abnormality occurs in the air-cooling fan, the first subtracted value is set to "3" and the second subtracted value is set to "5".

In the example shown in FIG. 66, when an abnormality does not occur in the air-cooling fan, an added value (m=10) and the subtracted value (2n=10) are the same, and when an abnormality occurs in the air-cooling fan, the added value (5 m=50) is larger than the subtracted value (n=5), and even when an abnormality occurs in the air-cooling fan, the added value may be larger than the subtracted value. That is, an absolute value of an amount of once update of the count value during the rotation of the main mill motor may be larger than an absolute value of an amount of once update of the count value during the stop of the main mill motor.

FIG. 67 is a flowchart showing a flow of the G counter subtracting process.

In the G counter subtracting process, first, it is determined whether the count value of the G counter reaches the lower limit threshold, that is, whether the G counter is larger than "0" (step Sg210a), and if the lower limit threshold is not reached (equal to or smaller than "0"), the G counter subtracting process ends. If the lower limit threshold is not reached (larger than "0"), it is determined whether the air-cooling fan abnormality flag is set to ON (step Sg210b). According to the air-cooling fan monitoring process shown in (B) of FIG. 69, the air-cooling fan abnormality flag is a flag that is set to ON if an abnormality occurs in the air-cooling fan that cools the main mill motor, and is set to OFF if the air-cooling fan is normal. If the air-cooling fan abnormality flag is set to ON, the abnormal value (for example, n (n represents a natural number)) is subtracted from the count value of the G counter (step Sg210c), and the process proceeds to step Sg210e, and if the air-cooling fan abnormality flag is set to OFF, the predetermined normal value (for example, 2n) is subtracted from the count value of the G counter (step Sg210d), and the process proceeds to step Sg210e. An absolute value of the abnormal value is a value smaller than an absolute value of the normal value.

In step Sg210e, it is determined whether the count value of the G counter reaches (is equal to or smaller than "0") the lower limit threshold, and if the lower limit threshold is not reached, the G counter subtracting process ends. On the other hand, if the count value of the G counter reaches the lower limit threshold, the count value of the G counter may be below the lower limit threshold, and thus, the count value is reset to "0" (step Sg210f), and since the count value reaches the lower limit threshold, the main mill motor is assumed to be sufficiently cooled, and the air-cooling fan is stopped (step Sg210g), and the G counter subtracting process ends.

(A) of FIG. 68 is a flowchart showing a flow of the grinding interruption process 1 executed by the processing unit 11a in the grind state.

The processing unit 11a starts the grinding interruption process 1 with the timer interrupt signal as a trigger. First, various abnormality detection processes (step Sg311) are executed. The various abnormality detection processes (step Sg311) here are also the same as the abnormality detection processes (step Sg211) described above. Subsequently, it is determined whether an upper limit threshold reaching flag is set to ON. The upper limit threshold reaching flag is a flag that is set to ON when the count value of the G counter reaches the upper limit threshold in the G counter adding process which will be described later. If the upper limit threshold reaching flag is set to ON, the main mill start timer started in step Sg202 is stopped (step Sg313), the button LED 151 lights orange (step Sg314), and the grinding interruption process 1 ends. Since the upper limit threshold reaching flag is set to ON, the operating state of the machine transitions to the condition insufficient state.

On the other hand, if the upper limit threshold reaching flag is set to OFF, it is determined whether the main mill start timer expires (whether the main mill start timer counts up) (step Sg315). If the main mill start timer expires, the G counter adding process (step Sg310) is executed. The G counter adding process will be described in detail later. Next, the main mill motor is started (step Sg316), and it is determined whether the cupping mode flag is set to OFF (step Sg317a). If the cupping mode flag is set to OFF, that is, the normal mode, the chaff fan motor 60A2 is rotated to start the chaff fan 60A1 (step Sg317b), and the process proceeds to step Sg318. The processing unit 11a constantly monitors the set values (the setting 1 to the setting 5) of the chaff fan 60A1 selected by the air volume dial 60D in a sensor task interrupted by 1 ms. If there is no change in the set value while the sensor task is executed a predetermined number of times (for example, 500 times) or for a predetermined time period (500 ms), the set value is set as a definite value. In step Sg317b, the chaff fan motor 60A2 is rotated at the definite value to start the chaff fan 60A1. Either a start timing of the main mill motor or a start timing of the chaff fan 60A1 may come first or may be simultaneous. On the other hand, if the cupping mode flag is ON, that is, the cupping mode, the process proceeds to step Sg318 without starting the chaff fan motor 60A2.

In step Sg318, a top mill start timer is started. The top mill start timer counts (for example, counts 150 ms) up to a start timing of the top mill motor. In the grind state, the main mill 5BM is started first, and then the top mill 5AM is started. Next, it is determined whether an abnormality occurs in the air-cooling fan that cools the main mill motor based on the presence or absence of the fan lock signal (step Sg319), and if an abnormality does not occur in the air-cooling fan, the grinding interruption process 1 ends. Conversely, if an abnormality occurs in the air-cooling fan, the power supply to the drive motor of the air-cooling fan is terminated to stop the air-cooling fan (step Sg320), and the grinding interruption process 1 ends. When the main mill 5BM is thus started to be driven, the processing unit 11a executes a grinding interruption process 2 next time.

If the main mill start timer does not expire, as in step Sg319, it is determined whether an abnormality occurs in the air-cooling fan (step Sg321), and if an abnormality does not occur in the air-cooling fan, the grinding interruption process 1 ends, and if an abnormality occurs in the air-cooling fan, the air-cooling fan is also stopped here (step Sg322), and the grinding interruption process 1 ends. When the main mill start timer does not expire, the processing unit 11a executes the grinding interruption process 1 next time.

(B) of FIG. 68 is a flowchart showing a flow of the G counter adding process.

In the G counter adding process, first, it is determined whether the air-cooling fan abnormality flag is set to OFF (step Sg310a), and if the air-cooling fan abnormality flag is set to ON, the predetermined abnormal value (for example, 5 m (m represents a natural number)) is added to the count value of the G counter (step Sg310b), and the process proceeds to step Sg310d, and if the air-cooling fan abnormality flag is set to OFF, the predetermined normal value (for example, m) is added to the count value of the G counter (step Sg310c), and the process proceeds to step Sg310d. The absolute value of the abnormal value is a value larger than the absolute value of the normal value.

In step Sg310d, it is determined whether the count value of the G counter reaches the upper limit threshold, and if the upper limit threshold is not reached, the G counter adding process ends. On the other hand, if the count value of the G counter reaches the upper limit threshold, the upper limit threshold reaching flag is set to ON (step Sg310e), and the G counter adding process ends.

(A) of FIG. 69 is a flowchart showing a flow of the grinding interruption process 2 executed by the processing unit 11a in the grind state.

The processing unit 11a starts the grinding interruption process 2 with a timer interrupt signal as a trigger. First, in step Sg330, the same G counter adding process as the G counter adding process shown in (B) of FIG. 68 is executed. Next, various abnormality detection processes (step Sg331) are executed. The various abnormality detection processes (step Sg331) here are also the same as the abnormality detection processes (step Sg211) described above. Subsequently, a chaff fan set value confirmation process (step Sg317c) is executed. In the chaff fan set value confirmation process, if a change is present in a definite value of a set value of the chaff fan 60A1, the chaff fan motor 60A2 is set to rotate with the changed definite value. Next, it is determined whether the upper limit threshold reaching flag is set to ON (step Sg332). If the upper limit threshold reaching flag is set to ON, the main mill motor started in step Sg316 is stopped (step Sg333), the top mill start timer started in step Sg318 is stopped (step Sg334), the button LED 151 lights orange (step Sg335), and the grinding interruption process 2 ends. Since the upper limit threshold reaching flag is set to ON, the operating state of the machine transitions to the condition insufficient state.

On the other hand, if the upper limit threshold reaching flag is set to OFF, it is determined whether the top mill start timer expires (whether the top mill start timer counts up) (step Sg336). If the top mill start timer expires, the top mill motor is started (step Sg337), and the air-cooling fan monitoring process (step Sg338) is executed. This air-cooling fan monitoring process (step Sg338) will be described in detail later. After executing the air-cooling fan monitoring process, the processing unit 11a lights the button LED 151 in blue (step Sg339), and the grinding interruption process 2 ends. When the top mill 5AM is thus started to be driven, the processing unit 11a executes a grinding interruption process 3 next time.

If the top mill start timer does not expire, the same air-cooling fan monitoring process (step Sg340) as step Sg338 is executed, and the grinding interruption process 2 ends. When the top mill start timer does not expire, the processing unit 11a executes the grinding interruption process 2 next time.

(B) of FIG. 69 is a flowchart showing a flow of the air-cooling fan monitoring process.

In the air-cooling fan monitoring process, first, it is determined whether an abnormality occurs in the air-cooling fan that cools the main mill motor (step Sg338a). Specifically, as described with reference to FIG. 66, the processing unit 11a determines that an abnormality occurs if the fan lock signal is output from the sensor that monitors the driving of the air-cooling fan. If an abnormality occurs, the air-cooling fan abnormality flag is set to ON (step Sg338b), and the air-cooling fan monitoring process ends. On the other hand, if normal, the air-cooling fan abnormality flag is set to OFF (step Sg338c), and the air-cooling fan monitoring process ends.

(A) of FIG. 70 is a flowchart showing a flow of the grinding process 3 executed by the processing unit 11a in the grind state.

The grinding process 3 is not an interruption process, and the processing unit 11a repeatedly determines whether the grind button 150 has been operated until the grind button 150 shown in FIG. 51 is operated (step Sg340). The operation of the grind button 150 here is an operation of requesting to interrupt grinding, and when the grind button 150 is operated, the top mill motor is stopped (step Sg341). Next, a main mill stop timer is started (step Sg342), the grinding process 3 ends, and the operating state of the machine transitions to the standby state (the top mill is in the stop state).

The main mill stop timer counts (for example, counts 500 ms) until a stop timing of the main mill motor. In the grind state, the top mill 5AM is stopped first, and then the main mill 5BM is stopped.

(B) of FIG. 70 is a flowchart showing a flow of the grinding interruption process 3 executed by the processing unit 11a in the grind state.

The processing unit 11a starts the grinding interruption process 3 with a timer interrupt signal as a trigger. First, in step Sg350, the same G counter adding process as the G counter adding process shown in (B) of FIG. 68 is executed. Next, various abnormality detection processes (step Sg351) are executed. The various abnormality detection processes (step Sg351) here are also the same as the abnormality detection processes (step Sg2/1) described above. Furthermore, the same chaff fan set value confirmation process (step Sg317*d*) as in step Sg317*c* of (A) of FIG. 69 is executed.

Subsequently, it is determined whether a current value of the top mill motor is an abnormal value (step Sg352). As described with reference to FIGS. 26 and 27, in the top mill 5AM, foreign substances such as stones or extremely hard and deteriorated roasted coffee beans may be sandwiched between the fixed blade 57*a* and the rotary blade 58*a*. In this case, the current value of the top mill motor that causes the rotary blade 58*a* to rotate becomes an abnormal value.

(A) of FIG. 71 is a diagram showing an example in which the bean clogging state is eliminated.

When the reverse rotation button GM52 shown in FIG. 51 is operated in the bean clogging state, a drive signal is output to start the top mill motor in a direction opposite to a the direction in the case where the top mill motor is started in step Sg337 shown in (A) of FIG. 69. The reverse rotation button GM52 functions as a reset button for the particle size adjustment counter in step Sg106 immediately after the initialization process when the power is applied as shown in FIG. 64, functions as a switching button between the normal mode and the cupping mode in steps Sg206 and Sg208 in the normal standby state process shown in (A) of FIG. 65, and functions as an original button to reversely rotate the top mill motor only in the bean clogging state. In this way, even if the reverse rotation button GM52 is erroneously operated in a situation other than the bean clogging state, the top mill motor will not rotate reversely, thus ensuring safety.

The top mill motor is also a pulse motor and is PWM-controlled.

The bottom of (A) of FIG. 71 shows a graph indicating a signal intensity of a current monitoring input signal in which the current value flowing through the top mill motor is monitored and a signal with intensity corresponding to the current value is output. The current value of the top mill motor during standby (in the stop state) is 0 A, and the signal intensity of the current monitoring input signal is also 0. In the coffee bean grinding machine GM according to the second embodiment, the current value of the top mill motor during idling in which the roasted coffee beans are not ground is about 0.1 A, and the current value of the top mill motor when the roasted coffee beans are normally ground is about 0.6 A.

In step Sg352, 3 A or more is treated as an abnormal current value of the top mill motor.

In the current monitoring input signal shown in the bottom of (A) of FIG. 71, when the reverse rotation of the top mill motor is started, a waveform with very high signal intensity corresponding to current values of 3 A or more is output, but the signal intensity quickly drops. The decrease in the signal intensity is a result of clearing the bean clogging by the reverse rotation, and causing an idling state. In the coffee bean grinding machine GM according to the second embodiment, the current value considered to clear the bean clogging (hereinafter, referred to as "clogging clearing current value") is set to 0.6 A in accordance with the current value of the top mill motor when normally crushing the roasted coffee beans. In the current monitoring input signal shown at the bottom of (A) of FIG. 71, the signal intensity suddenly drops, and a waveform with the signal intensity corresponding to the current value that drops below 0.6 A is output. Then, the drive signal for reversely rotating the top mill motor is turned off, and the state transitions to the normal standby state.

(B) of FIG. 71 is a diagram showing an example in which the current value of the top mill motor does not decrease to the clogging clearing current value even when the drive signal for reversely rotating the top mill motor is output three times with time intervals.

When the reverse rotation button GM52 is operated in the bean clogging state, the drive signal for reversely rotating the top mill motor is continuously output for 1 s if the current value of the top mill motor does not decrease to the clogging clearing current value. Therefore, the top mill motor continues to rotate reversely for 1 s. The 1 s period is controlled by a reverse rotation timer which will be described later. After a pause of 1 s, the drive signal for reversely rotating the top mill motor is output again. Here, if the current value of the top mill motor does not decrease to the clogging clearing current value, the drive signal for reverse rotation is continuously output for 1 s. Furthermore, if the current value of the top mill motor does not decrease to the clogging clearing current value, the drive signal for reversely rotating the top mill motor for the third time is output continuously for 1 s after a pause of 1 s. The pause of 1 s period is controlled by a pause timer which will be described later. An output of the drive signal for the reverse rotation three times is controlled by a reverse rotation retry counter which will be described later. If the current value of the top mill motor does not decrease to the clogging clearing current value even if the drive signal for reversely rotating the top mill motor for the third time is continuously output for 1 s, the state transitions to the abnormal state, and the drive signal for the reverse rotation is not output from fourth and subsequent times.

Hereinafter, the description returns to the grinding interruption process 3 using (B) of FIG. 70. In the grinding interruption process 3, when the current value of the top mill motor is an abnormal value, the chaff fan motor is stopped (step Sg353), the main mill motor is stopped (step Sg354), and the top mill motor is stopped (step Sg356). The order of stopping these motors is not limited to this order, and the top mill motor may be stopped first or may be stopped simultaneously. After the motors are stopped, the button LED 151 lights purple (step Sg356), and the grinding interruption process 3 ends. When the current value of the top mill motor becomes the abnormal value, the operating state of the machine transitions to the bean clogging state regardless of whether the operation mode is the normal mode or the cupping mode. That is, regardless of the operation mode of the machine, the state transitions to the bean clogging state.

On the other hand, if the current value of the top mill motor is not the abnormal value, it is determined whether the upper limit threshold reaching flag is set to ON (step Sg357). If the upper limit threshold reaching flag is set to ON, the chaff fan motor is stopped (step Sg358), the main mill motor is stopped (step Sg359), and the top mill motor is stopped (step Sg360). Here, the order of stopping these motors is also not limited to this order. After the motors are stopped, the button LED 151 lights orange (step Sg361), and the grinding interruption process 3 ends. Since the upper limit threshold reaching flag is set to ON, the operating state of the machine transitions to the condition insufficient state. Conversely, if the upper limit threshold reaching flag is set to OFF, the same process (step Sg362) as the air-cooling fan monitoring process shown in (B) of FIG. 69 is executed, the grinding interruption process 3 ends, and the processing unit 11*a* executes the grinding interruption process 3 next time as well.

(A) of FIG. 72 is a flowchart showing a flow of the standby state (the top mill is in the stop state) process executed by the processing unit 11*a* in the standby state (the top mill is in the stop state).

The standby state (the top mill is in the stop state) process is not the interruption process, but similar to the grinding process 3 described with reference to (A) of FIG. 70, and the processing unit 11a repeatedly determines whether the grind button 150 has been operated until the grind button 150 shown in FIG. 51 is operated (step Sg220). The operation of the grind button 150 here is an operation of requesting to restart the grinding, and when the grind button 150 is operated, the top mill start timer is restarted (step Sg221). Next, the main mill stop timer started in step Sg342 is stopped (step Sg222), the same process (step Sg223) as the air-cooling fan monitoring process shown in (B) of FIG. 69 is executed, the button LED 151 lights blue (step Sg224), and the standby state (the top mill is in the stop state) ends. When a grinding restart request is present, the processing unit 11a executes the grinding interruption process 2 next time.

(B) of FIG. 72 is a flowchart showing a flow of the standby state (the top mill is in the stop state) interruption process executed by the processing unit 11a in the standby state (the top mill is in the stop state).

The processing unit 11a starts the standby state (the top mill is in the stop state) interruption process with a timer interrupt signal as a trigger. First, in step Sg230, the same G counter adding process as the G counter adding process shown in (B) of FIG. 68 is executed. Next, various abnormality detection processes (step Sg231) are executed. The various abnormality detection processes (step Sg231) here are also the same as the abnormality detection processes (step Sg211) described above. Subsequently, it is determined whether the upper limit threshold reaching flag is set to ON (step Sg232). If the upper limit threshold reaching flag is set to ON, the chaff fan motor is stopped (step Sg233) and the main mill motor is stopped (step Sg234), the button LED 151 lights orange (step Sg235), and the standby state (the top mill is in the stop state) interruption process ends. Since the upper limit threshold reaching flag is set to ON, the operating state of the machine transitions to the condition insufficient state. The order of stopping the chaff fan motor (step Sg233) and stopping the main mill motor (step Sg234) may be reversed or may be simultaneous.

On the other hand, if the upper limit threshold reaching flag is set to OFF, it is determined whether the main mill stop timer expires (whether the main mill stop timer counts up) (step Sg236). If the main mill stop timer does not expire, the same process (step Sg237) as the air-cooling fan monitoring process shown in (B) of FIG. 69 is executed, and the standby state (the top mill is in the stop state) interruption process ends. The processing unit 11a executes the standby state (the top mill is in the stop state) interruption process next time as well. If the main mill stop timer expires, the main mill motor is stopped (step Sg238), and the same process (step Sg239) as the air-cooling fan monitoring process shown in (B) of FIG. 69 is executed here as well. Next, it is determined whether the cupping mode flag is set to OFF. That is, it is determined whether the normal mode is set in which the chaff separation is performed by rotating the chaff fan 60A1. If the cupping mode flag is set to ON, that is, if the cupping mode does not perform the chaff separation, the standby state (the top mill is in the stop state) interruption process ends, and the operating state of the machine transitions to the normal standby state.

If the cupping mode flag is set to OFF, that is, if the operation mode is the normal mode, after-cleaning is performed. In the normal mode, the chaff fan 60A1 is rotated while the top mill 5AM is rotating to aspirate the waste such as chaff. As described above, the set value of the chaff fan 60A1, which can be selected by operating an air volume dial 60D, are five levels from Setting 1 to Setting 5, and even at Setting 5 at which the chaff fan 60A1 is rotated most strongly, a PWM value (duty ratio) is 60%.

On the other hand, in the after-cleaning, the PWM value (duty ratio) is set to 100% and inner circumferential walls of the pipe portion 63 and the separation chamber forming portion 64 are cleaned. In step Sg241, the PWM value (duty ratio) of the chaff fan motor 60A2 is set to 100%. The chaff fan 60A1 continues to rotate at the set value selected with the air volume dial 60D until step Sg241 is executed, and when step Sg241 is executed, an aspiration force is increased and the rotation is continued without stopping.

FIG. 73 is a diagram showing a path for the coffee beans, a path for the waste such as chaff, and a path for the after-cleaning.

FIG. 73 shows the top mill 5AM, a top mill upper case 501 covering an upper portion of the top mill 5AM, the separation chamber forming portion 64, the coupling duct 661, the coupling dial 697, the worm wheel 691, the frame member 694 covering the main mill 5BM, the chute GM31, the pipe portion 63, the upper portion 61 of the collection container 60B, the inner case 60Bi disposed in the lower portion 62 of the collection container 60B, and the fan unit 60A. The outer case 60Bo disposed in the lower portion 62 of the collection container 60B is not shown.

In FIG. 73, the path for the coffee beans is indicated by a one-dot chain line. That is, the roasted coffee bean becomes cracked beans by the top mill 5AM, the cracked beans pass through the separation chamber forming portion 64 and the coupling duct 661 to be ground beans by the main mill 5BM, and the ground beans are discharged from the chute GM31.

Further, in FIG. 73, the path for the waste such as chaff is indicated by a two-dot chain line. That is, the waste such as chaff that enters the separation chamber forming portion 64 together with the cracked beans is aspirated by the rotation of the chaff fan in the fan unit 60A, passes through the separation chamber forming portion 64 and the pipe portion 63, and arrives the collection container 60B. In the collection container 60B, as described with reference to FIG. 30, the waste such as chaff accumulates on the bottom of the lower portion 62 of the collection container 60B (the bottom surface of the outer case 60Bo (not shown)) due to own weight. The air obtained by the separation of the waste becomes the upward air flow from inside the inner case 60Bi, passes through the fan unit 60A, and is exhausted to the outside of the coffee bean grinding machine GM. In this way, even if the fan unit 60A is aspirating the waste such as chaff while the top mill 5AM is rotating, if the set value is low (when an aspiration force is weak), the waste such as chaff may remain in inner regions of the pipe portion 63 and the separation chamber forming portion 64. Even if the set value is high, the waste such as chaff may adhere to the inner circumferential walls of the pipe portion 63 and the separation chamber forming portion 64 and cannot be completely removed. Therefore, after the grinding process ends, the inner regions of the pipe portion 63 and the separation chamber forming portion 64 (inner regions surrounded by thick solid lines in FIG. 73) are aspirated with a stronger aspiration force to collect the waste such as chaff remaining in the inner regions, and to remove the waste such as chaff adhering to the inner circumferential walls. The waste such as chaff remaining in the inner regions or adhering to the inner circumferential walls arrives the collection container 60B as indicated by a thick solid line arrow and falls by own weight. By performing the after-cleaning every time the grinding process ends, it is possible to prevent the waste such as chaff from accumulating on the inner circumferential walls.

FIG. 74 is a diagram showing an example in which the waste such as chaff is aspirated while the top mill 5AM is rotating, and the after-cleaning is performed by stronger aspiration without stopping the aspiration even if the top mill 5AM stops.

At a top of FIG. 74, the operating state of the coffee bean grinding machine GM according to the second embodiment is shown, and then, a timing chart representing ON and OFF of the grind button 150 shown in FIG. 51 is shown. A below portion shows a timing chart representing ON and OFF of the drive signal for the top mill motor, a timing chart representing ON and OFF of a drive signal for the main mill motor, and a timing chart representing ON and OFF of a drive signal for the chaff fan motor. Further, the bottom shows the PWM value that controls the rotation of the chaff fan motor.

When the grind button 150 is operated in the normal standby state, the state transitions to the grind state. A drive-on signal is output to the main mill motor in step Sg316 shown in (A) of FIG. 68, and the main mill motor starts forward rotation. The drive-on signal is output to the chaff fan motor in the subsequent step Sg317, and the chaff fan motor also starts the forward rotation. In this case, the rotation of the chaff fan motor is controlled by the PWM value corresponding to the set value (dial set value) selected by the air volume dial 60D shown in FIG. 51. Eventually, the top mill start timer expires, and in step Sg337 shown in (A) of FIG. 69, the drive-on signal is output to the top mill motor, and the top mill motor starts the forward rotation.

When the grind button 150 is operated in the grind state, in step Sg341 shown in (A) of FIG. 70, the output of the drive-on signal to the main mill motor ends, and the state transitions to the standby state (the top mill is in the stop state). Eventually, the main mill stop timer expires in the standby state (the top mill is in the stop state), and the output of the drive-on signal to the main mill motor is ended at step Sg238 shown in (B) of FIG. 72. As described above, in the normal mode, in step Sg241, the PWM value (duty ratio) of the chaff fan motor 60A2 is set to 100%, and the chaff fan continues to rotate while increasing the aspiration force without stopping.

As shown in (B) of FIG. 72, when the process of step Sg241 ends, the processing unit 11a starts a cleaning timer (step Sg242), and the standby state (the top mill is in the stop state) interruption process ends. When the after-cleaning is started in this way, the operating state of the machine transitions to the standby state (during cleaning). The cleaning timer counts (for example, counts 5000 ms) until an end timing of the after-cleaning (stop timing of the chaff fan motor 60A2).

(A) of FIG. 75 is a flowchart showing a flow of a standby state (during cleaning) process executed by the processing unit 11a in the standby state (during cleaning).

The standby state (during cleaning) process is not the interruption process, but the same as the previous standby state (the top mill is in the stop state) process, and the processing unit 11a repeatedly determines whether the grind button 150 has been operated until the grind button 150 shown in FIG. 51 is operated (step Sg250). If the grind button 150 is operated, the main mill start timer is restarted (step Sg251). Next, the same process as the air-cooling fan monitoring process shown in (B) of FIG. 69 is executed (step Sg252), the button LED 151 lights blue (step Sg253), and the standby state (during cleaning) ends. The processing unit 11a executes the grinding interruption process 1 next time.

(B) of FIG. 75 is a flowchart showing a flow of a standby state (during cleaning) interruption process executed by the processing unit 11a in the standby state (during cleaning).

The processing unit 11a starts the standby state (during cleaning) interruption process with a timer interrupt signal as a trigger. First, in step Sg260, the same G counter adding process as the G counter adding process shown in (B) of FIG. 68 is executed. Next, various abnormality detection processes (step Sg261) are executed. The various abnormality detection processes (step Sg261) here are also the same as the abnormality detection processes (step Sg2/1) described above. Subsequently, it is determined whether the upper limit threshold reaching flag is set to ON (step Sg262). If the upper limit threshold reaching flag is set to ON, the chaff fan is stopped (step Sg263), the same process as the air-cooling fan monitoring process shown in (B) of FIG. 69 (step Sg264) is executed, the button LED 151 lights orange (step Sg265), and the standby state (during cleaning) interruption process ends. Since the upper limit threshold reaching flag is set to ON, the operating state of the machine transitions to the condition insufficient state.

On the other hand, if the upper limit threshold reaching flag is set to OFF, it is determined whether the cleaning timer started in step Sg242 expires (whether the cleaning timer counts up) (step Sg266). If the cleaning timer does not expire, the same process (step Sg267) as the air-cooling fan monitoring process shown in (B) of FIG. 69 is executed, and the standby state (during cleaning) interruption process ends. The processing unit 11a executes the standby state (during cleaning) interruption process next time. If the cleaning timer expires, the chaff fan is stopped (step Sg268), and the after-cleaning ends. Next, the same process (step Sg269) as the air-cooling fan monitoring process shown in (B) of FIG. 69 is executed, and the standby state (during cleaning) interruption process ends. When the after-cleaning is ended in this way, the operating state of the machine transitions to the normal standby state.

FIG. 76 is a flowchart showing a flow of the condition insufficient state interruption process executed by the processing unit 11a in the condition insufficient state.

The processing unit 11a starts the condition insufficient state interruption process with a timer interrupt signal as a trigger. First, in step Sg400, the same G counter adding process as the G counter adding process shown in (B) of FIG. 68 is executed. Next, the same process (step Sg401) as the air-cooling fan monitoring process shown in (B) of FIG. 69 is executed, and the various abnormality detection processes are further executed (step Sg402). The various abnormality detection processes (step Sg402) here are also the same as the abnormality detection processes (step Sg211) described above. Subsequently, it is determined whether the upper limit threshold reaching flag is set to ON (step Sg403). In addition to the case where the upper limit threshold reaching flag is set to ON, the condition insufficient state is also entered when the hopper unit 402 is not detected or the chute GM31 is not detected in various abnormality detection processes, and thus, the determination in step Sg403 is performed. If the upper limit threshold reaching flag is set to OFF, the condition insufficient state interruption process ends, and the operating state of the machine transitions to the normal standby state. If the upper limit threshold reaching flag is set to ON, it is determined whether the count value of the G counter reaches the lower limit threshold, that is, whether the G counter is larger than "0" (step Sg404). If the lower limit threshold is not reached (if the G counter is larger than "0"), the button LED 151 lights orange (step Sg265), and the condition insufficient state interruption process ends. The processing unit 11a executes the condition insufficient state interruption process next time. On the other hand, if the count value of the G counter reaches the lower limit threshold (equal to or smaller than "0"), the upper limit threshold reaching flag is set to OFF (step Sg406), and the condition insufficient state interruption process ends. When the count value of the G counter reaches the lower limit threshold, the operating state of the machine transitions to the normal standby state.

(A) of FIG. 77 is a flowchart showing a flow of a bean clogging state process executed by the processing unit 11a in the bean clogging state.

The bean clogging state process is not an interruption process, and the processing unit 11a repeatedly determines whether the reverse rotation button GM52 has been operated until the reverse rotation button GM52 shown in FIG. 51 is operated (step Sg500). The operation of the reverse rotation button GM52 in the bean clogging state is an operation of requesting the reverse rotation of the top mill 5AM, and if the reverse rotation button GM52 is operated, the top mill motor is started in the reverse rotation (step Sg501). That is, in both the normal mode and the cupping mode, the top mill motor is started in a direction opposite to the direction in the case where the top mill motor is started in step Sg337 shown in (A) of FIG. 69. In other words, the reverse rotation of the top mill motor is performed regardless of the operation mode of the machine. Next, the reverse rotation timer is started (step Sg502). The reverse rotation timer counts up to an end timing of the reverse rotation of the top mill motor. That is, the reverse rotation timer is a timer that measures the time for 1 s described with reference to (B) of FIG. 71. When the reverse rotation of the top mill motor is started, the button LED 151 blinks in purple (step Sg503), and the bean clogging state process ends. The processing unit 11a executes a bean clogging state interruption process 2 next time.

(B) of FIG. 77 is a flowchart showing a flow of a bean clogging state interruption process 1 executed by the processing unit 11a in the bean clogging state.

The processing unit 11a starts the bean clogging state interruption process 1 with a timer interrupt signal as a trigger. First, in step Sg510, the same G counter adding process as the G counter adding process shown in (B) of FIG. 68 is executed. Next, the same process (step Sg51l) as the air-cooling fan monitoring process shown in (B) of FIG. 69 is executed, and various abnormality detection processes are further executed (step Sg512). The various abnormality detection processes (step Sg512) here are also the same as the abnormality detection processes (step Sg211) described above. Subsequently, it is determined whether the upper limit threshold reaching flag is set to ON (step Sg513), and if the upper limit threshold reaching flag is set to OFF, the bean clogging state interruption process 1 ends. If the upper limit threshold reaching flag is set to ON, it is determined whether the count value of the G counter reaches the lower limit threshold, that is, whether the G counter is larger than "0" (step Sg514). If the lower limit threshold is not reached (if the G counter is larger than "0"), the bean clogging state interruption process 1 ends. On the other hand, if the count value of the G counter reaches the lower limit threshold (equal to or smaller than "0"), the upper limit threshold reaching flag is set to OFF (step Sg515), and the bean clogging state interruption process 1 ends. If the bean clogging state interruption process 1 ends, the processing unit 11a executes the bean clogging state interruption process 1 next time.

FIG. 78 is a flowchart showing a flow of the bean clogging state interruption process 2 executed by the processing unit 11a in the bean clogging state.

The processing unit 11a starts the bean clogging state interruption process 2 with a timer interrupt signal as a trigger. First, in step Sg520, the same G counter adding process as the G counter adding process shown in (B) of FIG. 68 is executed. Next, the same process (step Sg521) as the air-cooling fan monitoring process shown in (B) of FIG. 69 is executed, and various abnormality detection processes are further executed (step Sg522). The various abnormality detection processes (step Sg522) here are also the same as the abnormality detection processes (step Sg211) described above. Subsequently, similarly to the determination process of step Sg352 shown in (B) of FIG. 70, it is determined whether the current value of the top mill motor decreases to the clogging clearing current value (0.6 A) (step Sg523). If the current value of the top mill motor decreases to the clogging clearing current value (0.6 A), the bean clogging is assumed to be cleared, the button LED 151 lights white (step Sg524), and the bean clogging state interruption process 2 ends. When it is determined that the bean clogging is cleared in this way, the operating state of the machine transitions to the normal standby state. There is no change in the operation mode of the machine, and the operation mode (normal mode or cupping mode) before occurring of the bean clogging is maintained. After transitioning to the normal standby state, the operation mode can be changed in steps Sg205 to Sg209 shown in (A) of FIG. 65.

On the other hand, if the current value of the top mill motor does not decrease to the clogging clearing current value, it is determined whether the reverse rotation timer started in step Sg502 expires (whether the reverse rotation timer counts up) (step Sg525). If the reverse rotation timer does not expire, the bean clogging state interruption process 2 ends. The processing unit 11a executes the bean clogging state interruption process 2 next time as well. If the reverse rotation timer expires, the reverse rotation timer is reset (step Sg526), and the reverse rotation of the top mill motor is stopped (step Sg527). Next, after adding 1 to the reverse rotation retry counter (step Sg528), it is determined whether a value of the reverse rotation retry counter is a predetermined value (step Sg529). The predetermined value is "3" as described with reference to (B) of FIG. 71, but the predetermined value may be a natural number of 2 or more other than "3". If the value is the predetermined value, the button LED 151 lights red (step Sg530), and the bean clogging state interruption process 2 ends. If the value of the reverse rotation retry counter is the predetermined value, the operating state of the machine transitions to the abnormal state. Conversely, if the value of the reverse rotation retry counter is not the predetermined value, the pause timer is started (step Sg531). The pause timer counts up to a start timing of a next reverse rotation of the top mill motor. That is, the pause timer is a timer that measures the time for 1 s described with reference to (B) of FIG. 71. Subsequently, the button LED 151 lights purple (step Sg532), and the bean clogging state interruption process 2 ends. When the pause timer is started, the processing unit 11a executes a bean clogging state interruption process 3 next time.

FIG. 79 is a flowchart showing a flow of the bean clogging state interruption process 3 executed by the processing unit 11a in the bean clogging state.

The processing unit 11*a* starts the bean clogging state interruption process 3 with a timer interrupt signal as a trigger. First, in step Sg540, the same G counter adding process as the G counter adding process shown in (B) of FIG. 68 is executed. Next, the same process (step Sg541) as the air-cooling fan monitoring process shown in (B) of FIG. 69 is executed, and various abnormality detection processes are further executed (step Sg542). The various abnormality detection processes (step Sg542) here are also the same as the abnormality detection processes (step Sg211) described above. Subsequently, it is determined whether the pause timer started in the previous step Sg531 expires (whether the pause timer counts up) (step Sg543). If the pause timer does not expire, the bean clogging state interruption process 3 ends. The processing unit 11*a* executes the bean clogging state interruption process 3 next time as well. If the pause timer expires, the top mill motor is started in the reverse rotation (step Sg544), the reverse rotation timer is started (step Sg545), the button LED 151 blinks in purple (step Sg546), and the bean clogging state interruption process 3 ends. When the top mill motor is started in the reverse rotation, the processing unit 11*a* executes the bean clogging state interruption process 2 next time.

In the above description, "a coffee machine, including: a grinder [for example, the main mill 5BM] including a motor [for example, the main mill motor] and configured to grind coffee beans by rotation of the motor; and a counter [for example, the G counter] configured to repeatedly update a count value, in which the counter updates the count value by adding the count value during the rotation of the motor [for example, the G counter adding process shown in (B) of FIG. 68], updates the count value by subtracting the count value during stop of the motor [for example, the G counter subtracting process shown in FIG. 67], and a first threshold [for example, the upper limit threshold] reached by adding the count value and a second threshold [for example, the lower limit threshold ('0')] reached by subtracting the count value are provided, the motor is rotatable until the count value reaches the first threshold and stops rotating when the count value reaches the first threshold [for example, step Sg333 shown in FIG. 69], and continues to stop rotating from the count value reaches the first threshold value until the count value reaches the second threshold value [for example, the normal standby state is restored through step Sg406 shown in FIG. 76]." has been described.

According to this coffee machine, a rotation time and a stop time of the motor can be managed by the count value of the counter, and temperature rise of the motor can be suppressed and failure of the motor itself and components around the motor can be reduced.

An amount of once update of the count value may be a positive number or a negative number. When the amount of once update of the count value is a positive number, the first threshold becomes the upper limit threshold and the second threshold becomes the lower limit threshold. On the other hand, when the amount of once update of the count value is a negative number, the first threshold becomes the lower limit threshold and the second threshold becomes the upper limit threshold.

In addition, "the coffee machine, further including: a cooling fan [for example, the air-cooling fan] configured to cool the motor [or example, the main mill motor], in which an absolute value [for example, the added value] of an amount of once update of the count value during the rotation of the motor is larger during a failure of the cooling fan [for example, 5 m ('50')] than during normal rotation of the cooling fan [for example, m ('10')]." has been described.

A rotation time of the motor can be managed in consideration of the cooling performed by the cooling fan, and the temperature rise of the motor can be suppressed more accurately.

The amount of once update of the count value during the rotation of the motor may be a positive number or a negative number.

The absolute value of the amount of once update of the count value during the rotation of the motor is smaller during the failure of the cooling fan than during the normal rotation of the cooling fan.

In addition, "the coffee machine, further including: a cooling fan [for example, the air-cooling fan] configured to cool the motor [or example, the main mill motor], in which an absolute value [for example, the subtracted value] of an amount of once update of the count value during the stop of the motor is smaller during the failure of the cooling fan [for example, n ('5')] than during the normal rotation of the cooling fan [for example, 2n ('10')]." has been described.

A stop time of the motor can be managed in consideration of the cooling performed by the cooling fan, and temperature drop of the motor can be managed more accurately.

The amount of once update of the count value during the stop of the motor may be a positive number or a negative number. However, if the amount of once update of the count value during the stop of the motor is a positive number, the amount of once update of the count value during the rotation of the motor is also a positive number, and if the amount of once update of the count value during the stop of the motor is a negative number, the amount of once update of the count value during the rotation of the motor is also a negative number.

In addition, the present invention may be an aspect of the coffee machine, including: a cooling fan [for example, the air-cooling fan] configured to cool the motor [for example, the main mill motor], in which an absolute value [for example, the added value] of an amount of once update of the count value during rotation of the motor is larger during failure of the cooling fan [for example, 5 m ("50")] than during normal rotation of the cooling fan [for example, m ("10")], and an absolute value [for example, the subtracted value] of an amount of once update of the count value during the stop of the motor is smaller during the failure of the cooling fan [for example, n ("5")] than during the normal rotation of the cooling fan [for example, 2n ("10")].

"The coffee machine, in which the absolute value of the amount of once update of the count value in a case where the count value is subtracted to be updated is smaller in a case where subtraction of the count value is started when the count value reaches the first threshold than a case where the subtraction of the count value is started before the count value reaches the first threshold." has been described.

That is, if the amount of once update of the count value is a positive number, a decrease rate of the count value is smaller in a case where the count value starts to decrease when reaching the first threshold than a case where the count value starts decreasing before reaching the first threshold.

In this way, after reaching the first threshold, the motor can be cooled over time.

"The coffee machine, in which the absolute value of the amount of once update of the count value is larger during the rotation of the motor [for example, the added value] than during the stop of the motor [for example, the subtracted value]." has been described.

In this way, even if the motor generates a large amount of heat due to the rotation, the temperature rise of the motor can be suppressed and the failure of the motor itself and parts around the motor can be reduced.

"The coffee machine, further including: a display device [for example, split lighting using circular button LED 151] configured to display information on a time required from when the count value reaches the first threshold to when the count value reaches the second threshold." has been described.

According to this aspect, it is possible to known the remaining time until the motor can restart the rotation.

In the above description, "a coffee machine, including: a grinder [for example, the top mill 5AM] configured to grind coffee beans by a predetermined rotation operation in a normal state; and an operation unit [for example, the reverse rotation button GM52 shown in FIG. 51], in which when the grinder is in an abnormal state [for example, the bean clogging state] in which the predetermined rotation operation cannot be performed, if the operation unit is operated, a reverse rotation operation is executed in a direction opposite to that of the predetermined rotation operation [for example, step Sg501 shown in FIG. 77], and in the normal state, the reverse rotation operation is not executed even if the operation unit is operated [for example, step Sg106 shown in FIG. 64, and steps Sg206 and Sg208 shown in FIG. 65]." has been described.

According to the coffee machine, even when the operation unit is erroneously operated in the normal state, the reverse rotation operation is not executed, and a grinding process performed by the grinder is not adversely affected. On the other hand, in the abnormal state, the reverse rotation operation is executed in accordance with the operation of the operation unit, and the abnormal state may be eliminated.

When the grinder is in the abnormal state in which the predetermined rotation operation cannot be performed, the operation unit is operated to cause the grinder to perform the reverse rotation operation in the direction opposite to that of the predetermined rotation operation.

A detection unit configured to detect that the grinder is in the abnormal state is provided, and the operation unit may cause the grinder to perform the reverse rotation operation by being operated only when the detection unit detects the abnormal state.

The detection unit may detect the abnormal state based on a current value flowing through a drive unit configured to cause the predetermined rotation operation to be performed, and more specifically, may detect the abnormal state when the current value is equal to or larger than a predetermined value [for example, 3 A].

When the grinder returns to the normal state, the grinder may not execute the reverse rotation operation even if the operation unit is operated [for example, step Sg106 shown in FIG. 64, and steps Sg206 and Sg208 shown in FIG. 65]. That is, when the grinder returns to the normal state, the operation unit may prevent the grinder from performing the reverse rotation operation even if the operation unit is operated.

In addition, "the coffee machine, further including: a mode transition control unit configured to control mode transition of a machine [for example, a processing unit 11a executing steps Sg205 to Sg209 shown in (A) of FIG. 65], in which the mode transition control unit transitions to one mode from a plurality of types of modes [for example, the normal mode and the cupping mode], and even when the abnormal state occurs in any one of the plurality of modes, the grinder executes the reverse rotation operation if the operation unit is operated [for example, step Sg501 shown in FIG. 77]." has been described.

It is not a matter that the abnormal state occurs or does not occur due to the plurality of modes, and the plurality of modes and the occurrence of the abnormal state are irrelevant, and thus, even when the abnormal state occurs in any one of the plurality of modes, the grinder executes the reverse rotation operation if the operation unit is operated.

The plurality of types of modes may be operation modes of the machine, and the plurality of types of modes include, for example, a first mode (normal mode) in which waste is separated from ground beans, and a second mode (cupping mode) in which the waste is not separated from the ground beans.

"The coffee machine, in which the plurality of types of modes include a normal mode in which waste [for example, chaff] can be separated from the ground beans ground by the grinder, and a cupping mode in which the waste is not separated from the ground beans ground by the grinder." has been described.

"The coffee machine, in which when the grinder returns from the abnormal state [for example, the bean clogging state] to the normal state [for example, the normal standby state], the mode transition control unit maintains the mode before the grinder enters the abnormal state." has been described.

Similarly, it is not a matter that the abnormal state occurs or does not occur due to the plurality of modes, and the plurality of modes and the occurrence of the abnormal state are irrelevant, and thus, when the grinder returns from the abnormal state to the normal state, the mode transition control unit maintains the mode before the grinder enters the abnormal state.

When the grinder returns from the abnormal state to the normal state, the mode transition control unit may enable the mode transition [for example, steps Sg205 to Sg209 shown in (A) of FIG. 65].

"The coffee machine, in which the grinder stops a rotation operation when the state does not return to the normal state even after repeating the reverse rotation operation a predetermined number of times in the abnormal state [for example, the reverse rotation is stopped in step Sg527 shown in FIG. 78, and the state transitions to the abnormal state via step Sg530]." has been described.

If the abnormal state is not eliminated even after the reverse rotation operation is performed the predetermined number of times, the eliminating of the abnormal state performed by the reverse rotation operation is given up, and further a load on the grinder can be reduced.

In the abnormal state, the grinder may perform the reverse rotation operation if the operation unit is operated, or may not perform the reverse rotation operation even if the operation unit is operated.

In the above description, "a coffee machine, including: a first grinder [for example, the top mill 5AM] configured to be driven to grind coffee beans; and a separation area [for example, an inner region of the separation chamber forming portion 64] where waste is separated from the ground beans ground by the first grinder, in which the separation area is an area cleaned by wind pressure while the first grinder is in a stop state." has been described.

According to the coffee machine, the waste such as chaff remaining in the separation area can be collected, the waste such as chaff attached to an inner circumferential wall of the separation area can be peeled off, and the waste such as chaff can be removed from the separation area.

The separation area may be a portion cleaned by the wind pressure caused by aspirating air, or may be an area cleaned by the wind pressure caused by blowing air.

The coffee machine may include only the first grinder as a grinder, or may include another grinder in addition to the first grinder.

A passage area which is connected to the separation area and through which the waste passes [for example, an inner region of the pipe portion 63] is provided, and the passage area, together with the separation area, may be areas cleaned by the wind pressure when the first grinder is in the stop state.

In addition, "the coffee machine, further including: a second grinder [for example, the main mill 5BM] disposed downstream of the first grinder; and an air aspiration portion [for example, the fan unit 60A having the chaff fan 60A1] configured to aspirate air in the separation area, in which the separation area is located between the first grinder and the second grinder, and is an area where the waste is separated from the ground beans by air aspiration performed by the air aspiration portion, and the air aspiration portion cleans the separation area by aspirating air in the separation area while the first grinder is in the stop state." has been described.

"The coffee machine, in which the air aspiration portion cleans the separation area with air aspiration [for example, air aspiration with a duty ratio of 100%] that is stronger than the air aspiration [for example, air aspiration with the setting 1 to the setting 5] for separating the waste from the ground beans." has been described.

In this way, it is possible to remove the waste remaining after the separation and the waste that cannot be removed during the separation.

"The coffee machine, in which the air aspiration portion does not end the air aspiration even if the first grinder stops, and performs the air aspiration for cleaning the separation area [for example, the chaff fan 60A1 increases an aspiration force and continues to rotate without stopping]." has been described.

According to the coffee machine, it is possible to shorten a time from stopping the first grinder to completing the cleaning, and it is possible to drive with energy saving by not temporarily stopping the air aspiration.

"The coffee machine, in which the second grinder stops after the first grinder stops, and the air aspiration portion performs the air aspiration for separating the waste from the ground beans until the second grinder stops, and performs the air aspiration for cleaning the separation area after the second grinder stops [for example, FIG. 74]." has been described.

According to the coffee machine, it is possible to shorten a time from an end of the grinding process to the completion of cleaning.

The configuration of the coffee bean grinding machine GM according to the second embodiment described above can be applied to the coffee bean grinding machine GM according to the first embodiment, and can also be applied to the beverage production device 1 shown in FIG. 1 and the like.

Next, a coffee machine system including the coffee machine GM according to the second embodiment, a terminal having a display screen, such as a smartphone or a tablet computer, and a cloud server will be described. In the coffee machine system, the coffee machine GM and the terminal can communicate by short-range wireless communication for digital devices (for example, Bluetooth (registered trademark)), and the terminal and the cloud server can communicate via a communication network such as the Internet. In order to reduce costs, the coffee machine GM according to the second embodiment cannot be directly connected to the cloud server via the communication network.

FIG. 80 is a diagram showing the display screen of the terminal.

(C) of FIG. 80 shows a coffee machine system GMS. That is, the upper right of (C) of FIG. 80 shows a coffee machine GM of the same machine type (hereinafter, referred to as "A type") as the coffee machine GM according to the second embodiment shown in FIG. 51, and the lower right thereof shows a coffee machine GM of the same machine type (hereinafter, referred to as "B type") as the coffee machine GM according to the first embodiment shown in FIG. 18. A display screen 181 of a terminal 18 is shown largely on the left side. The display screen 181 of the terminal 18 is a touch panel. Further, a cloud server 19 connected to the terminal 18 via a communication network 15 such as the Internet is also shown. The connection between the terminal 18 and the coffee machine GM by the short-range wireless communication is represented by outline lightning bolt-shaped figures (a circled number 1 and a circled number 3 attached). The short-range wireless communication enables interconnection with paired coffee machines.

The terminal 18 shown in FIG. 80 is installed with an application program dedicated to the coffee machine system GMS (hereinafter, simply referred to as "dedicated application"), and a screen of the dedicated application is displayed on the display screen 181. The dedicated application will be described later with reference to (B) of FIG. 86.

A page when the dedicated application is activated for the first time is displayed on the display screen 181 of the terminal 18 shown in (A) of FIG. 80. This page is an online mode page with the short-range wireless communication. On the screen of the dedicated application, an icon relating to a communication status for each communication method is displayed on an upper bar 180a. A left-most radio-wave icon 1801 is an icon representing a status of access to the Internet via Wi-Fi (registered trademark). In addition to Wi-Fi, it is possible to connect to the Internet via a network of a carrier, in which case another icon is displayed. The radio-wave icon 1801 shown in (A) of FIG. 80 is not hatched, indicating a state of connecting to the Internet via Wi-Fi. A lightning bolt-shaped icon 1802 at the second leftmost position is an icon representing the communication status of the short-range wireless communication, and the lightning bolt-shaped icon 1802 shown in (A) of FIG. 80 is also not hatched, indicating that the short-range wireless communication is being performed. A third icon from the left is a mode icon 1803, and displays the "online mode" when the short-range wireless communication is being performed, and displays an "offline mode" when the short-range wireless communication is not performed. A notification icon 1804 shaped like a bell is displayed at a right end of the upper bar 180a. The notification icon 1804 shown in (A) of FIG. 80 does not display a mark 1804a (see (B) of FIG. 85) indicating that the notification has arrived.

Below the upper bar 180a, a registered machine list 1811 and a communicable machine list 1812 are displayed. The registered machine list 1811 displays information on the coffee machines GM already registered on the dedicated application. That is, the information on the paired coffee machine GM stored in a storage unit (ROM or the like) of the terminal 18 is displayed. Specifically, the machine type (for example, A type), a media access control address (MAC address) (for example, 11.22.33.44.55), and a machine serial number (for example, M0001) are displayed. The communicable machine list 1812 displays the information on the coffee machine GM (the machine type and the MAC address of the coffee machine GM) which is located within the short-range wireless communication range but has not yet been paired.

If the non-hatched lightning bolt-shaped icon 1802 is tabbed, the mode is switched to the offline mode.

(B) of FIG. 80 is a diagram showing the display screen 181 switched to the offline mode. The mode icon 1803 is displayed as the "offline mode", and the lightning bolt-shaped icon 1802 is hatched. On the other hand, the radio-wave icon 1801 is not hatched. In the online mode, the short-range wireless communication is not performed, but the Internet is connected. On the display screen 181 with the offline mode, the registered machine list 1811 is displayed, but the communicable machine list 1812 is not displayed.

If the hatched lightning bolt-shaped icon 1802 is tabbed, the mode is switched to the online mode.

On the screen of the dedicated application, four icons are displayed on a lower bar 180b. A leftmost connection icon 1806 is an icon operated when establishing pairing in the short-range wireless communication with the coffee machine GM displayed in the communicable machine list 1812, or canceling the pairing with the coffee machine GM displayed in the registered machine list 1811. The target coffee machine is selected by tapping the display of the coffee machine GM in the registered machine list 1811 or the communicable machine list 1812, and the connection icon 1806 is tapped. The display screen 181 switches to a connection page (not shown), and displays the information on the coffee machine GM and displays the disconnection icon on the connection page when the coffee machine GM displayed in the registered machine list 1811 is selected. When this disconnection icon is tapped, the pairing with this terminal 18 is canceled, and the page at the time of initial startup shown in (A) of FIG. 80 is returned. The coffee machine for which pairing is canceled in this way is deleted from the registered machine list 1811 thereafter. On the other hand, when the coffee machine GM displayed in the communicable machine list 1812 is selected, the pairing with this terminal 18 is established, and the information on the pairing destination coffee machine GM is displayed on the connection page. The coffee machine for which pairing is established in this way is added to the registered machine list 1811 thereafter.

A current state icon 1807 at a second leftmost position is an icon for executing acquisition of status information. A desired coffee machine GM is selected from the coffee machines GM displayed in the registered machine list 1811, and the display of the coffee machine GM (hereinafter, referred to as "first selected machine") is tapped. Then, when the current state icon 1807 is tapped in the online mode, the display screen 181 displays a status page of the first selected machine.

The status page is displayed on the display screen 181 of the terminal 18 shown in (C) of FIG. 80. As described above, (C) of FIG. 80 shows the A type coffee machine GM, the B type coffee machine GM, and the cloud server 19 included in the coffee machine system GMS.

FIG. 81 is a diagram showing exchange of various types of information in the coffee machine system GMS executed by tapping the current state icon 1807 displayed on the display screen 181 of the terminal 18 in the online mode.

FIG. 81 also shows the coffee machine GM, the terminal 18, and the cloud server 19 included in the coffee machine system GMS.

Information handled by the coffee machine system GMS includes "state information", "operation cumulative value", "operation history", and "abnormality history" of the coffee machine GM.

The "state information" in the coffee machine GM includes information on the operating state (state during initialization process, normal standby state, grind state, standby state (the top mill is in the stop state), standby state (during cleaning), condition insufficient state, bean clogging state, and abnormal state) of the coffee machine GM shown in FIG. 63, set value information of the coffee machine GM (for example, the set value of the chaff fan 60A1 and the main mill interval (bean particle size set value)), operation mode information (normal mode, cupping mode), sensor information (for example, the current value of the top mill motor, and the number of rotation pulses per unit time of the chaff fan motor 60A2), state information of the operation unit (state information of the grind button 150, the state information of the reverse rotation button GM52), count value information of various counters (for example, information on the count value of G counter), state information of various flags (for example, state information of the upper limit threshold reaching flag, and state information of air-cooling fan abnormality flag), machine installation environment information (for example, ambient temperature and ambient humidity), alarm information, and the like. The coffee machine GM can output the "state information" to the terminal 18 in response to a request from the terminal 18.

In addition, the coffee machine GM manages various operation cumulative values. Examples of the "operation cumulative value" of the coffee machine GM include a cumulative energization time, a top mill motor driving time, a main mill motor driving time, a top mill motor bean grinding time, a main mill motor bean grinding time, a top mill motor bean grinding amount, a main mill motor bean grinding amount, the number of times of grinder operation, a chaff fan separation driving time, an air-cooling fan driving time, the number of times of applying power, and main mill blade wear. The "operation cumulative value" is stored in the storage unit 11b of the coffee machine GM, and similar to the "state information", the coffee machine GM can output the "operation cumulative value" to the terminal 18 in response to a request from the terminal 18.

The "operation history" of the coffee machine GM is log information recorded in the storage unit 11b of the coffee machine GM each time the coffee machine GM finishes a grind process. That is, the operation history is recorded based on an operation of the grind button 150 determined in the determination process in step Sg340 shown in FIG. 70. When recording the operation history, each index (0 to a predetermined number) is recorded by assigning a management number referred to as the index in association with the date and time. The date and time may be a start timing or an end timing of the grinding process. The larger the index number, the newer the operation history. When the predetermined number is recorded, the operation history returns to 0 and is overwritten. Examples of the "operation history" include the top mill motor driving time, the main mill motor driving time, the chaff fan driving time, the air-cooling fan driving time, the top mill motor bean grinding time, the main mill motor bean grinding time, the top mill motor bean grinding amount, the main mill motor bean grinding amount, the main mill interval (particle size of ground beans), the set value of chaff fan, a chaff fan strength (PWM value), the ambient temperature, the ambient humidity, presence and absence of origin adjustment of the main mill blade, and the main mill blade wear.

The "abnormality history" of the coffee machine GM is log information recorded in the storage unit 11b of the coffee machine GM in association with the detected date and time each time the processing unit 11a of the coffee machine GM detects the abnormal state. The "abnormality history" is also recorded with an index different from that of the "operation history". Examples of the abnormal state include the abnormal state detected by various abnormality detection processes such as step Sg211 (for example, the RAM abnormality, and the abnormality in the motor current value when not driving), a state in which the current value of the top mill motor during the driving determined in step Sg352 is abnormal (bean clogging abnormal state), and the abnormal state of the air-cooling fan determined in step Sg338a.

The status information related to the state and situation of the coffee machine GM includes the "state information" and the "operation cumulative value", and history information includes the "operation history" and the "abnormality history". In addition, individual device information for each coffee machine GM includes the status information and the history information.

On the display screen 181 of the terminal 18, if the first selected machine is specified and the current state icon 1807 is tapped, as shown in FIG. 81, the terminal 18 connects to the first selected machine (here, the type A coffee machine GM shown in the upper right of (C) of FIG. 80) by the short-range wireless communication, and acquires the "state information", the "operation cumulative value", the "operation history", and the "abnormality history" from the first selected machine. First, the terminal 18 transmits a state update request command to the first selected machine, and in response to this command, the first selected machine transmits the current "state information" to the terminal 18. In the terminal, display contents of the status page on the display screen 181 are updated based on the "state information" transmitted from the first selected machine. Next, the terminal 18 transmits an operation cumulative value update request command to the first selected machine, and in response to this command, the first selected machine transmits the "operation cumulative value" until the present to the terminal 18. In the terminal 18, the "operation cumulative value" transmitted from the first selected machine is saved in a storage unit 186 (see (A) of FIG. 86).

In the display screen 181 of the terminal 18 shown in (C) of FIG. 80, the lightning bolt-shaped icon 1802 is not hatched, and the mode icon 1803 indicates the "online mode". This display screen 181 displays an operating state display 1821 indicating a current operating state of the first selected machine. This operating state display 1821 is displayed based on operating state information included in the "state information". The number-of-times-of-grinding display 1822 is displayed below the operating state display 1821. The number-of-times-of-grinding display 1822 is displayed based on the information of the number of times of grinder operations included in the "operation cumulative value". A various-parameters display 1823 is displayed below the number-of-times-of-grinding display 1822. The temperature and humidity are displayed based on the machine installation environment information included in the "state information", the particle size is displayed based on the main mill interval in the set value information included in the "state information", and the set value of chaff fan is similarly displayed based on the set value of the chaff fan 60A1 in the set value information. The various-parameters display 1823 can be scrolled in an upper-lower direction, and other parameters are displayed by scrolling.

(A) of FIG. 82 is a diagram showing the display screen 181 on which an abnormal state detail page is displayed by tapping detail display of the operating state display 1821 shown in (C) of FIG. 80.

it is possible to confirm a cause of the abnormal state from this abnormal state detail page. In this example, it can be seen that the causes are the RAM abnormality and an abnormality in the current value of the top mill motor during driving.

(B) of FIG. 82 is a diagram showing the display screen 181 on which an operation information detail page is displayed by tapping a next page display icon 1822a of the number-of-times-of-grinding display 1822 shown in (C) of FIG. 80.

From this operation information detail page, it is possible to confirm the number of times of grinding up to the present time on that day, the top mill motor driving time, the main mill motor driving time, and the chaff fan motor driving time. These pieces of information are also displayed based on the information included in the "operation cumulative value", and all of them are cumulative values on that day.

The description of FIG. 81 now continues. The terminal 18 receiving the "operation cumulative value" then transmits an operation history request command to the first selected machine, and in response to this command, the first selected machine transmits the "history" to the terminal 18 along with an index for operation history. In the terminal 18, the received "operation history" is saved in the storage unit 186 for each machine. In this case, the same index for operation history as that of the first selected machine is added and each index is saved. The operation history request command is a command that requests the "operation history" with a newer index than the latest saved index for operation history, and the first selected machine transmits to the terminal 18 only the "operation history" with the corresponding index. For example, the operation history request command is a command that requests the "operation history" with an index newer than an index 123, and if only the "operation history" with the index 123 is stored in the storage unit 11b of the first selected machine, a matter that there is no "operation history" with the corresponding index is transmitted to the terminal 18. On the other hand, if the "operation history" up to an index 130 is stored in the storage unit 11b of the first selected machine, the "operation history" with the indexes 124 to 130 is transmitted to the terminal 18. As a result, the terminal 18 saves, in the storage unit 186, only an "operation history" difference between the latest "operation history" saved in the first selected machine and the "operation history" saved so far in the storage unit 186.

The terminal 18 receiving the "operation history" now transmits an abnormality history request command to the first selected machine, and in response to this command, the first selected machine transmits the "abnormality history" to the terminal 18 along with an index for abnormality history. In the terminal 18, the received "abnormality history" is saved in the storage unit 186 for each machine. In this case, the same index for abnormality history as that of the first selected machine is added and each index is saved. The abnormality history request command is a command that requests the "abnormality history" with a newer index than the latest saved index for abnormality history, and the first selected machine transmits to the terminal 18 only the "abnormality history" with the corresponding index. As a result, the terminal 18 saves, in the storage unit 186, only an "abnormality history" difference between the latest "abnormality history" saved in the first selected machine and the "abnormality history" saved so far in the storage unit 186.

After the acquisition of the abnormality history ends, the terminal 18 disconnects the short-range wireless communication with the first selected machine.

The terminal 18 acquires the information from the first selected machine in an order of the "state information", the "operation cumulative value", the "operation history", and the "abnormality history", and the order is not limited thereto.

Next, the terminal 18 connects to the cloud server 19 via the Internet, and uploads to the cloud server 19 the information which is acquired through the short-range wireless communication with the first selected machine and is saved in the storage unit 186. That is, the terminal 18 uploads, to the cloud server 19 without communicating with the coffee machine GM, the "operation cumulative value", then only the "operation history" difference, and finally only the "abnormality history" difference. The uploaded "operation cumulative value", "operation history" difference, and "abnormality history" difference are distinguished for each coffee machine GM and saved in the storage unit of the cloud server 19.

The coffee machine system GMS of the present embodiment may include a plurality of terminals, and each of the plurality of terminals can perform the short-range wireless communication with the coffee machine GM individually. That is, the plurality of terminals can perform the short-range wireless communication with the coffee machine GM at different timings. As a result, a situation may arise in which the "operation history" and the "abnormality history" have already been uploaded from another terminal 18 to the cloud server 19. Since both the terminal 18 and the cloud server 19 are managed using a common index, such a situation can be grasped, and in this case, the "operation history" and the "abnormality history" that have been uploaded are not uploaded, and only the difference information that has not yet been uploaded is uploaded. For example, the own terminal 18 acquires from the first selected machine both second information, which is the latest "operation history" information, and first information, which is the previous "operation history" information, and when the first information has already been uploaded to the cloud server 19 from another terminal 18, the own terminal 18 uploads only the second information to the cloud server 19.

In addition, it is also possible to download the "operation history" and the like uploaded to the cloud server 19 from the own terminal to the terminal 18 of another person, and the downloaded "operation history" and the like can be referred to on the display screen 181 of the terminal 18 of another person.

The cloud server 19 disconnects the Internet connection with the terminal 18 when saving to the storage unit is completed.

The terminal 18 uploads to the cloud server 19 in an order of the "operation cumulative value", the "operation history" difference, and the "abnormality history" difference, and the order is not limited thereto.

In (C) of FIG. 80, the connection using the short-range wireless communication between the terminal 18 and the type A coffee machine GM shown in the upper right, which is the first selected machine, is represented by the circled number 1, and the connection between the terminal 18 and the cloud server 19 via the Internet is represented by a circled number 2.

The terminal 18 performs, as one set, a series of information transfer such as acquisition of various kinds of information from the coffee machine GM shown in FIG. 81 and the uploading of part of the acquired information to the cloud server 19, and when there are a plurality of coffee machines GM with which pairing is established in the short-range wireless communication, this set is repeated for each coffee machine GM. The repetition of this set continues while the status page is displayed on the display screen 181 of the terminal 18. That is, the above set is repeated unless another page is returned. Even if the "state information" and the "operation cumulative value" of the coffee machines GM other than the first selected machine are acquired, the display screen 181 of the terminal 18 continues to display the status page of the first selected machine. After acquiring the information from all the coffee machines GM with which the pairing is established, the terminal 18 acquires information from the first selected machine again, and the display screen 181 of the terminal 18 is updated according to the newly acquired "state information" and "operation cumulative value".

In addition to the first selected machine, the terminal 18 shown in (C) of FIG. 80 starts acquiring various kinds of information from the type B coffee machine GM shown in the lower right, which is different from the first selected machine. In (C) of FIG. 80, the connection between the terminal 18 and the type B coffee machine GM using the short-range wireless communication is represented by the circled number 3, and in the coffee machine system GMS shown in (C) of FIG. 80, connections are made in the order of the circled numbers.

The coffee machine GM can only communicate one-to-one with the terminal 18. Therefore, during the activation of the dedicated application, if the terminal 18 repeatedly requests the coffee machine GM to connect, and obtains necessary information in response to the connection, the terminal 18 immediately disconnects from the coffee machine GM. By disconnecting immediately, the coffee machine GM can respond to a connection request from another terminal. If a certain terminal 18 is once connected and then disconnected, reconnection with that terminal 18 may be disabled for a predetermined period of time (for example, 10 seconds).

In addition, the coffee machine GM forcibly disconnects the short-range wireless communication with the terminal 18 if no command is transmitted from the terminal 18 for a predetermined period of time (for example, 3 minutes). If the certain terminal 18 fails, commands may not be transmitted from that certain terminal 18. Also, the certain terminal 18 does not disconnect from the coffee machine GM. In this case, another terminals has no choice but to wait until the connection between the certain terminal 18 and the coffee machine GM is terminated. If the coffee machine GM can forcibly disconnect the short-range wireless communication with the certain terminal 18, it is possible to prevent a state in which communication with another terminal is always unable.

In the coffee machine system GMS of the present embodiment, a plurality of people (for example, staff members in one store) connect to one coffee machine GM, and update the recorded information in the dedicated application in each terminal to latest information. In this way, it becomes possible for a plurality of people to share the current state and history information of one coffee machine GM.

Return to the page shown in (A) of FIG. 80, the coffee machine GM other than the first selected machine from the coffee machines GM displayed in the registered machine list 1811 is selected, by tapping the display of the coffee machine GM (hereinafter, referred to as "second selected machine"), and then tapping the current state icon 1807 again, a status page of the second selected machine is displayed on the display screen 181.

The display screen 181 may simultaneously display the display contents of the status page of the first selected machine and display contents of the status page of the second selected machine. In this way, current states of the two coffee machines GM can be compared. In the registered machine list 1811, not only two but also three or more coffee machines GM can be selected, and the display screen 181 can simultaneously display current states of the three or more coffee machines GM.

In addition, in the offline mode, if the current status icon 1807 is tapped, the display screen 181 also displays the status page of the first selected machine.

FIG. 83 is a diagram showing the display screen 181 on which the status page of the first selected machine in the offline mode is displayed.

In the display screen 181 of the terminal 18 shown in FIG. 83, the lightning bolt-shaped icon 1802 is hatched, and the mode icon 1803 indicates the "offline mode". In the offline mode, the short-range wireless communication with the coffee machine GM cannot be performed, and thus, the terminal 18 cannot obtain the "state information" and the "operation cumulative value" of the first selected machine. Therefore, in the operation state display 1821, a circular frame display 1821a is displayed with double lines, and nothing is displayed inside. In addition, the number-of-times-of-grinding display 1822 displays a bar symbol instead of the number of times, and the various-parameters display 1823 also displays a bar symbol instead of a numerical value.

In FIG. 83, an outline lightning bolt-shaped figure representing connection by the short-range wireless communication is marked with a cross to indicate a non-connection state. The terminal 18 can be connected to the cloud server 19 via the communication network 15 such as the Internet.

A rightmost history icon 1809 in the lower bar 180b displayed on the display screen 181 of the terminal 18 is an icon that causes the display screen 181 to display history information based on the "operation history" and "abnormality history" saved in the storage unit 186 of the terminal 18 (see (A) of FIG. 86). Then, if the history icon 1809 is tapped, a log page of the coffee machine GM already registered on the dedicated application is displayed on the display screen 181.

The log page is displayed on the display screen 181 of the terminal 18 shown in (C) of FIG. 82. (C) of FIG. 82 shows the A type coffee machine GM and the cloud server 19 included in the coffee machine system GMS. The cloud server 19 is connected to the terminal 18 via the communication network 15 such as the Internet. While the log page is displayed on the display screen 181 of the terminal 18, the short-range wireless communication with the coffee machine GM is cut (disconnected). In (C) of FIG. 82, an outline lightning bolt-shaped figure representing the connection by the short-range wireless communication is marked with a cross to indicate the non-connection state. The terminal 18 can be connected to the cloud server 19 via the communication network 15 such as the Internet.

On the log page, a registered machine selection field 1831 is displayed at the top, a log type selection field 1832 is displayed therebelow, and a search period input field 1833 is further displayed therebelow. The storage unit 186 of the terminal 18 stores information of the coffee machine GM for which the pairing is established. The registered machine selection field 1831 is a pull-down menu, and a list of serial numbers of the coffee machines GM stored in the storage unit 186 of the terminal 18 is displayed in the pull-down menu. The log type selection field 1832 is also a pull-down menu, and either one of the "abnormality history" and a "grind history" can be selected. The "abnormality history" that can be selected in the log type selection field 1832 is the above-described "abnormality history" recorded in the storage unit 11b of the coffee machine GM, and is also recorded in the storage unit 186 of the terminal 18 as described with reference to FIG. 81. The "grind history" that can be selected in the log type selection field 1832 is one obtained by adding, to the above-described "operation history" recorded in the storage unit 11b of the coffee machine GM, the product number (number indicating blade type and shape) of the main mill blade (the fixed blade 57b and the rotary blade 58b) and an evaluation and comment to be described later, and is recorded in the storage unit 186 of the terminal 18 and the storage unit of the cloud server 19. The search period input field 1833 is a field for inputting a history period desired to be displayed in a history list display unit 1835 prepared at the bottom of the log page.

An update icon 1836 is displayed between the search period input field 1833 and the history list display unit 1835. When the update icon 1836 is tapped in a state where the selection in the registered machine selection field 1831 and the log type selection field 1832 is completed and the input in the search period input field 1833 is completed, if the history information that satisfies the conditions specified in these three fields has already been stored in the storage unit 186 of the terminal 18, the history information is read out from the storage unit 186 of the terminal 18 and displayed on the history list display unit 1835 in one line per piece. On ther other hand, if the history information that satisfies the conditions specified in these three fields is not stored in the storage unit 186 of the terminal 18, the cloud server 19 is connected via the Internet, and the history information that satisfies the conditions specified in these three fields is acquired from the storage unit of the cloud server 19, and the acquired history information is saved in the storage unit 186 of the terminal 18 and displayed on the history list display unit 1835 in one line per piece.

The terminal 18 shown in (C) of FIG. 82 is in the online mode, but even in the offline mode, the log page is displayed, and if the update icon 1836 is tapped, same as in the online mode, the history information is read from the storage unit 186 of the terminal 18 and is displayed on the history list display unit 1835, or when the history information is not stored in the storage unit 186 of the terminal 18, the cloud server 19 is connected via the Internet, the history information is acquired from the storage unit of the cloud server 19, and the acquired history information is saved in the storage unit 186 of the terminal 18 and displayed on the history list display unit 1835.

A forward icon 1836a and a backward icon 1836b are displayed below the history list display unit 1835. In the history list display unit 1835, older history information is displayed higher. When the forward icon 1836a is tapped once, the history information on a top line disappears, and new history information next to the history information displayed on the bottom line is newly displayed on the bottom line. In addition, when the backward icon 1836b is tapped once, the history information on the bottom line disappears, and history information older than the history information displayed on the top line at present is newly displayed on the top line.

On the log page in (C) of FIG. 82, the "abnormality history" is selected, and in the history list display unit 1835, as the history information of "abnormality history", the year, month, day, and time when an abnormality occurred and the type of abnormality are displayed on each line. By tapping a next page display icon 1835*a* displayed at the right end of each line, an abnormality history detail page (not shown) is displayed, and more detailed information can be obtained.

(A) of FIG. 84 is a diagram showing the display screen 181 on which a log page with the "grind history" selected is displayed.

In the history list display unit 1835 of the log page in (A) of FIG. 84, as the history information of the "grind history", the year, month, day, and time when the grind is performed, the set value of the chaff fan, the main mill interval (particle size of the ground beans), product numbers of the fixed blade and rotary blade of the main mill are displayed on each line. An evaluation field 1835*b* is provided on the right side of the history list display unit. In the grind history on the bottom line of the history list display unit 1835 of the log page in (A) of FIG. 84, the product number of the fixed blade and rotary blade of the main mill is displayed as a bar symbol instead of a number, and is in a non-input state. The evaluation field 1835*b* is blank, and the evaluation has not yet been performed.

By tapping the next page display icon 1835*a* displayed at the right end of each line, a grind history detail page is displayed.

(B) of FIG. 84 is a diagram showing the display screen 181 on which the grind history detail page is displayed.

The grind history detail page shown in (B) of FIG. 84 is a page displayed by tapping the next page display icon 1835*a* on the bottom line in the history list display unit 1835 of the log page shown in (A) of FIG. 84.

The grind history detail page displays the ambient temperature, the ambient humidity, and the main mill motor driving time, in addition to the year, month, day, and time when the grind is performed, the set value of the chaff fan, the main mill interval, product numbers of the fixed blade and rotary blade of the main mill (main mill blade). In addition to the evaluation, a comment is also displayed.

The product number of the main mill blade, evaluation, and comment can be input in this grind history detail page. An input field 1837 for the product number of the main mill blade is a pull-down menu. A plurality of types of product numbers for this main mill blade are registered in advance on the dedicated application.

An input field 1838 for the evaluation is a pull-down menu.

Authority is required to input the product number of the main mill blade, evaluation, and comment. The authority should be given to a person who performs the grind included in the "operation history" when the "operation history" is recorded in the storage unit 11*b* of the coffee machine GM.

For example, a password may be given as the authority. The password may be an index number. An operator of the terminal 18 can know the password when the terminal 18 acquires the "operation history" as described with reference to FIG. 81. The password is required for a person who performs input on the grind history detail page. The person who performs the input performs the input after answering the password that is known when the operation history is acquired. Only when the password matches, pull-down in the pull-down menu is available. The product number of the main mill blade is input by selecting the product number of the main mill blade from the pull-down menu. An evaluation is input by selecting either a circle mark or a cross mark from the pull-down menu. The evaluation here is an evaluation related to the grinding (for example, evaluation related to the ground beans and evaluation related to the coffee machine GM (the pulverizing device 5)). A mark is selected on the grind history detail page shown in (B) of FIG. 84. Input of a comment is performed by inputting a comment on the grind in a comment input field 1839. Input to the comment input field 1839 is permitted only when the password matches. In this example, comments about the taste of coffee beverages extracted from the ground beans are input, but there are cases where comments about an operability of the pulverizing device 5 of the coffee machine GM are input.

In the coffee machine system GMS which includes only the A type coffee machine GM as the coffee machine GM, the A type coffee machine GM is not provided with input means for cost reduction, and items input on the grind history detail page can only be input on the grind history detail page. The information input on the grind history detail page is uploaded to the cloud server 19 via the Internet by tapping an upload icon 1830 provided at the bottom right of the page. The cloud server 19 saves the uploaded information by adding the uploaded information to the storage area of the corresponding "operation history" index. As a result, it is also possible to download information such as the product number of the main mill blade, evaluation, and comments uploaded to the cloud server 19 from the own terminal to the terminal 18 of another person, and the downloaded information can be referred to on the display screen 181 of the terminal 18 of another person.

The input field implemented by the pull-down menu may be an input field performed by direct input, and conversely, the input field performed by the direct input may be an input field implemented by a pull-down menu.

In the coffee machine system GMS of the present embodiment, for example, even when an owner of the terminal 18 is away from a store where the coffee machine GM is disposed, the owner of the terminal 18 can connect to the cloud server 19 via the Internet and refer to the grind history saved in the cloud server 19.

Next, a second setting icon 1808 from the right in the lower bar 180*b* displayed on the display screen 181 of the terminal 18 will be described.

The dedicated application has a notification function. The setting icon 1808 is an icon used when setting the notification function. If the setting icon 1808 is tapped, a notification setting page (not shown) is displayed on the display screen 181 of the terminal 18. On the notification setting page, it is possible to select whether to allow each notification.

(A) of FIG. 85 is a table summarizing a notification timing and a notification content for each notification.

Each notification may be a result notification of the determination process based on the "state information", the "operation cumulative value", the "operation history", and the "abnormality history" obtained from the coffee machine GM, or may be guidance or a call for attention according to the result of the determination process.

A notification of "main body cleaning" is a result of determination by the processing unit 185 (see (A) of FIG. 86) of the terminal 18 of the number of times of grinder operations included in the acquired "operation cumulative value". Every time the grinder operates a predetermined number of times (for example, every 10 times), a notification such as "please clean main body" is issued on the dedicated application. The predetermined number of times may be set on the notification setting page (not shown).

Regarding a notification of "login", when the connection from the terminal 18 to the coffee machine GM by the short-range wireless communication is present as described with reference to FIG. 81, a notification such as "Mr./Ms. A connects to ○○○○○" is made on the dedicated application. ○○○○○ is a serial number attached to each coffee machine GM.

A notification of "abnormality" is based on the abnormal state of the coffee machine GM included in the acquired "abnormality history". The notification of "abnormality" is made on the dedicated application such as "oo abnormality occurs".

A notification of "bean clogging" is a notification in response to a case where the processing unit 185 of the terminal 18 determines that the current value of the top mill motor, which is one of the sensor information included in the acquired "abnormality history", is an abnormal value. In this case, a notification such as "bean clogging occurs" is made on the dedicated application.

A notification of "main mill interval" is a notification in response to a case where the processing unit 185 of the terminal 18 determines that the main mill interval is changed based on a main mill interval value included in the acquired latest "operation history" and the main mill interval value included in the previous "operation history". For example, a notification such as "setting of main mill interval is changed 2-2→3-4" is made on the dedicated application. "2-2" is a scale notation of the manual setting disc dial 695 before the change, and "3-4" is a scale notation of the manual setting disk dial 695 after the change. For example, the display of "3-4" means that the manual setting disc dial 695 is set to a 4th minor scale between a 3rd major scale and a 4th major scale.

A notification of "set value of chaff fan" is a notification in response to a case where the processing unit 185 of the terminal 18 determines that the set value of the chaff fan is changed based on the set value of the chaff fan included in the acquired latest "operation history" and the set value of the chaff fan included in the previous "operation history". For example, a notification such as "set value of chaff fan is changed 1→3" is made on the dedicated application. The display of "1→3" means that the set value is changed from 1 to 3.

In the notifications of "main mill interval" and "set value of chaff fan", the determination may be made by comparing current information included in the "state information" and past information included in the "operation history".

A notification of "blade exchanging" is a notification in response to a case where if the product number of the main mill blade is input on the grind history detail page shown in (B) of FIG. 84, the processing unit 185 of the terminal 18 determines that the main mill blade (fixed blade 57*b* and rotary blade 58*b*) is exchanged based on the product number of the main mill blade included in the acquired "operation history". In this case, a notification such as "blade is exchanged, please adjust origin" is made on the dedicated application.

A notification of "origin adjustment" is a notification in response to a case where the processing unit 185 of the terminal 18 determines that the origin adjustment is performed based on the history of the presence or absence of the origin adjustment of the main mill blade included in the acquired "operation history". In this case, a notification such as "origin adjustment is performed" is made on the dedicated application.

A notification of "blade replacement" is a notification in response to a case where the processing unit 185 of the terminal 18 determines that the replacement of the main mill blades (the fixed blade 57*b* and the rotary blade 58*b*) is required based on the main mill motor bean grinding time included in the acquired "operation cumulative value". For example, when the main mill motor bean grinding time is more than 1000 hours, it is determined that the blade needs to be exchanged. In this case, a notification such as "it is time to exchange blade, please contact maintenance support" is made on the dedicated application. The main mill motor bean grinding time is a value calculated by the processing unit 11*a* of the coffee machine GM based on a difference between the current value of the main mill motor during idling and the current value of the main mill motor during bean grinding from the main mill motor driving time, which includes the time for idling and the time for grinding beans.

A notification of "overhaul" is a notification in response to a case where the processing unit 185 of the terminal 18 determines that maintenance of the entire machine is necessary based on the cumulative energization time included in the acquired "operation cumulative value". In this case, a notification such as "maintenance is necessary, please contact maintenance support" is made on the dedicated application. For example, when the cumulative energization time is more than 36000 hours, it is determined that the maintenance of the entire machine is required.

A notification of "chaff fan motor exchanging" is a notification in response to a case where the processing unit 185 of the terminal 18 determines that the chaff fan motor is necessary to be exchanged based on the chaff fan separation driving time included in the acquired "operation cumulative value". In this case, a notification such as "it is time to exchange chaff fan motor, please contact maintenance support" is made on the dedicated application. A correction value of the PWM value of the chaff fan motor illustrated using FIG. 62 is saved as the "operation history" in advance, and if the processing unit 185 of the terminal 18 determines from this correction value that the correction has been performed to a limit, the notification may be made.

When the various notifications described above are made, the notification icon 1804 resembling a bell, which is displayed at the right end of the upper bar 180*a* displayed on the display screen 181 of the terminal 18, displays the mark 1804*a* indicating that a notification arrives. A notice page is displayed on the display screen 181 of the terminal 18 when the notification icon 1804 displaying the mark 1804*a* is tapped.

(B) of FIG. 85 is a diagram showing the display screen 181 on which the notice page is displayed.

A notice list display unit 1841 is displayed on the notice page shown in (B) of FIG. 85. A type icon is displayed at the left end of the notice list display unit 1841. In the top row, an alert icon 1841*a* is displayed, and a notification of "bean clogging abnormality occurs" is displayed as the notification of "abnormality" together with the date and time when the abnormality is detected. A state of the bean clogging abnormality is an abnormal state, which is transitioned to, when it is detected that the reverse rotation retry counter reaches a predetermined value in step Sg529 shown in FIG. 78.

A warning icon 1841*b* is displayed in a second line from the top of the notice list display unit 1841, and the notification of "bean clogging" is displayed together with the date and time when the bean clogging is detected. The bean clogging may be cleared by the reverse rotation of the top mill motor as described above, but if the bean clogging is not cleared, the above-described bean clogging abnormality occurs.

The warning icon 1841*b* is also displayed in a third row from the top of the notice list display unit 1841, and the notification of "set value of chaff fan" is displayed.

Guidance icons 1841*c* are displayed in the lower two rows of the notice list display unit 1841, both of which display the notification of "login".

A collective deletion icon 1842 that can collectively delete the notifications displayed in the notice list display unit 1841 is displayed at the upper right of the notice list display unit 1841. The notifications displayed in the notice list display unit 1841 can also be deleted individually.

In the above description, "a coffee machine system [for example, the coffee machine system GMS], including: a coffee machine [for example, the coffee machine GM] including a grinder [for example, the pulverizing device 5] configured to grind coffee beans; and a terminal [for example, the terminal 18] having a display unit [for example, the display screen 181] and configured to communicate with the coffee machine, in which the coffee machine stores status information representing a state of the grinder [for example, information including "state information" and "operation cumulative value" ] in advance, the terminal acquires, from the coffee machine, first status information representing a state of the coffee machine at a first timing, and displays a first display based on the first status information [for example, the status page shown in (C) of FIG. 80] on the display unit, and the terminal is configured to acquire, from the coffee machine, second status information representing a state of the coffee machine at a second timing after the first timing, and updates the display on the display unit from the first display to a second display based on the second status information when acquiring the second status information." has been described.

According to this coffee machine system, the state of the coffee machine at different timings such as the first timing and the second timing can be known on the display unit of the terminal.

(A) of FIG. 86 is a diagram showing a configuration of the terminal 18.

The processing unit 185 shown in (A) of FIG. 86 includes, for example, a CPU, and controls the terminal 18 in an integrated manner. The operation of the terminal 18 according to the present embodiment is performed, for example, by the processing unit 185 loading a program stored in the storage unit 186 into the memory 187 and executing the program. The memory 187 is also used as a working memory for the CPU of the processing unit 185. The storage unit 186 stores an operating system (OS) 186*a*, which is a basic control program for operating the terminal 18, various application programs 186*b* including the dedicated applications, data, parameters, and the like. Various databases 186*c* are constructed in the storage unit 186. Examples include a database of the "operation history" recorded with an index, and a database of "abnormality history" recorded with an index different from the index of the operation history.

A communication interface (I/F) 188 is configured according to a medium of a communication network such as the short-range wireless communication or the Internet. The display screen 181 of a touch panel includes a display unit 181*a* and an operation unit 181*b*.

The units 185 to 188 shown in (A) of FIG. 86 are interconnected via a bus 189.

(B) of FIG. 86 is a schematic diagram showing an outline of an application program (dedicated application) dedicated to the coffee machine system GMS installed in the storage unit 186 shown in (A) of FIG. 86.

This dedicated application 1861 includes an acquisition unit 1861*a*, a determination unit 1861*b*, a display control unit 1861*c*, an upload unit 1861*d*, and a download unit 1861*e*.

In the terminal 18 shown in (A) of FIG. 86, "a program for a coffee machine system (the dedicated application shown in (B) of FIG. 86) installed in a terminal 18 including a display unit 181 and configured to communicate with a coffee machine GM including a grinder (the pulverizing device 5) configured to grind coffee beans, in which the terminal is provided with: an acquisition unit 1861*a* configured to acquire first status information representing a state of the coffee machine at a first timing from the coffee machine; and a display control unit 1861*c* configured to cause the display unit to display a first display based on the first status information, and the acquisition unit 1861*a* is configured to acquire, from the coffee machine, second status information representing a state of the coffee machine at a second timing after the first timing, and the display control unit 1861*c* updates the display on the display unit from the first display to a second display based on the second status information when the acquisition unit acquires the second status information." shown in (B) of FIG. 86 is installed.

(C) of FIG. 86 is a flowchart showing a flow of the status information display method executed by the terminal 18 shown in (A) of FIG. 86.

In the terminal 18 shown in (A) of FIG. 86, "a status information display method for causing a display unit to display a status information display based on status information representing a state of a grinder (the pulverizing device 5) configured to grind coffee beans in a coffee machine GM including the grinder, the status information display method including: a first acquisition step St10 of acquiring, from the coffee machine, first status information representing a state of the coffee machine at a first timing; a display step St11 of causing the display unit to display a first display based on the first status information acquired in the first acquisition step; a second acquisition step St12 of acquiring, from the coffee machine, second status information representing a state of the coffee machine at a second timing after the first timing; and an update step St13 of updating the first display displayed on the display unit to a second display based on the second status information acquired in the second acquisition step." shown in (C) of FIG. 86 is executed.

In addition, "the coffee machine system, further including: a plurality of the coffee machines, in which the terminal is configured to display a display based on the status information for each of the plurality of coffee machines [for example, the first selected machine and the second selected machine] on the display unit." has been described.

"The coffee machine system, in which the terminal is configured to acquire status information of another coffee machine from another coffee machine [for example, the type B coffee machine GM shown in the lower right (C) of FIG. 80] among the plurality of coffee machines in a state of displaying, on the display unit, a display based on the status information of one of the plurality of coffee machines [for example, the type A coffee machine GM shown in the upper right of (C) of FIG. 80]." has been described.

In addition, "the coffee machine system, in which the terminal is configured to display, on the display unit, a display based on status information of one or more coffee machines selected from the plurality of coffee machines [for example, the first selected machine and the second selected machine]." has been described.

The display control unit 1861*c* shown in (B) of FIG. 86 may be capable of causing the display unit to display a display based on the status information for each of the plurality of coffee machines.

In addition, the acquisition unit 1861*a* shown in (B) of FIG. 86 may be capable of acquiring the status information of another coffee machine from another coffee machine among the plurality of coffee machines in a state where the display unit displays a display based on the status information of one of the plurality of coffee machines.

The display control unit 1861*c* shown in (B) of FIG. 86 may be capable of causing the display unit to display a display based on the status information of one or more coffee machines selected from the plurality of coffee machines.

The display step St11 shown in (C) of FIG. 86 may be a step capable of causing the display unit to display a display based on the status information for each of the plurality of coffee machines.

The display step St11 shown in (C) of FIG. 86 may be a step capable of causing the display unit to display a display based on the status information of one or more coffee machines selected from the plurality of coffee machines.

In the above description, "a coffee machine system [for example, the coffee machine system GMS], including: a coffee machine [for example, the coffee machine GM] including a grinder [for example, the pulverizing device 5] configured to grind coffee beans; and a terminal [for example, the terminal 18] having a display unit [for example, the display screen 181] and configured to communicate with the coffee machine, in which the coffee machine stores individual device information related to the coffee machine in advance, the individual device information is information including status information representing a state of the grinder [for example, the information including the 'state information' and the 'operation cumulative value'], and history information of the grinder [for example, the information including the 'operation history' and the 'abnormality history'], the terminal acquires the individual device information from the coffee machine, and performs a determination process [for example, the determination process of the number of times of grinding for the notification of 'main body cleaning', the determination process of whether an abnormal state is included in the operating state of the coffee machine GM in the 'state information' for the notification of 'abnormality', the determination process of whether the current value of the top mill motor for the notification of the 'bean clogging' is an abnormal value, the determination process of whether the main mill interval is changed for the notification of 'main mill interval', the determination process of whether the set value of the chaff fan is changed for the notification of 'set value of chaff fan', the determination process of whether the main mill blade is changed for the notification of 'blade exchanging', the determination process of whether the cumulative energization time exceeds a predetermined time for the notification of 'overhaul', the determination process of whether the chaff fan separation driving time exceeds a predetermined time for the notification of 'chaff fan motor exchanging', and the like] based on the acquired individual device information, and the terminal displays the result of the determination process [for example, the notice list display unit 1841 on the notice page shown in (B) of FIG. 85] on the display unit." has been described.

According to this coffee machine system, the terminal performs the determination process and displays the result of the determination process on the display unit. The individual device information about the machine is effectively used.

The determination process may be, for example, a determination process of whether the maintenance of the coffee machine is necessary, a determination process of whether the coffee machine is in an abnormal state (a state in which a failure or an error occurs), or a determination process as to whether the setting of the coffee machine is changed.

In the terminal 18 shown in (A) of FIG. 86, "a program for a coffee machine system (the dedicated application shown in (B) of FIG. 86) installed in a terminal 18 including a display unit 181 and configured to communicate with a coffee machine GM including a grinder (the pulverizing device 5) configured to grind coffee beans, in which the terminal is provided with: an acquisition unit 1861*a* configured to acquire, from the coffee machine individual device, individual device information including status information representing a state of the grinder and history information of the grinder; a determination unit 1861*b* configured to perform a determination process based on the individual device information acquired by the acquisition unit; and a display control unit 1861*c* configured to cause the display unit to display a result of the determination process." shown in (B) of FIG. 86 is installed.

(A) of FIG. 87 is a flowchart showing a flow of an information processing method executed by the terminal 18 shown in (A) of FIG. 86.

In the terminal 18 shown in (A) of FIG. 86, "an information processing method based on individual device information related to a coffee machine GM provided with a grinder (the pulverizing device 5) configured to grind coffee beans, in which the individual device information is information including status information representing a state of the grinder and history information of the grinder, and the information processing method includes: an acquisition step St20 of acquiring the individual device information from the coffee machine; a determination step St21 of performing a determination process based on the individual device information acquired in the acquisition step; and a display step St22 of causing the display unit to display a result of the determination process." shown in (A) of FIG. 87 is executed.

"The coffee machine system, in which the terminal may perform a plurality of types of the determination processes based on the acquired individual device information, and is configured to cause the display unit to display results of the plurality of types of determination processes [for example, the notice list display unit 1841 on the notice page shown in (B) of FIG. 85]." has been described.

"The coffee machine system, in which the terminal is configured to acquire first history information [for example, the previous 'operation history'] of the grinder at a first timing [for example, a timing of the 'operation history' one before the latest 'operation history'], and to acquire second history information [for example, the latest 'operation history'] of the grinder at a second timing [for example, a timing of the latest 'operation history'] after the first timing, and performs a determination process [for example, the determination process for the notification of 'main mill interval', and the determination process for the notification of 'set value of chaff fan'] based on the first history information and the second history information." has been described.

In addition, "the coffee machine system, further including: a cloud server [for example, the cloud server 19] configured to access from the terminal, in which the terminal is configured to upload, among the individual device information acquired from the coffee machine, the information including at least the history information [for example, 'operation cumulative value', 'operation history' difference, and 'abnormality history' difference] to the cloud server, and the cloud server stores the information uploaded from the terminal in advance." has been described.

In addition, "the coffee machine system, further including: a cloud server [for example, the cloud server 19] configured to access from the terminal, in which the terminal is configured to upload, among the individual device information acquired from the coffee machine, the information including at least the history information [for example, 'operation cumulative value', 'operation history' difference, and 'abnormality history' difference] to the cloud server, the cloud server stores the information uploaded from the terminal in advance, and even if the terminal acquires both the first history information [for example, the 'operation history' one before the latest 'operation history'] and the second history information [for example, the latest 'operation history'], when the cloud server has already stored the first history information [for example, has been uploaded by another terminal], the terminal uploads the second history information [for example, difference information] to the cloud server without uploading the first history information." has been described.

"The coffee machine system, in which the terminal uploads, among the individual device information acquired from the coffee machine, the information including at least the history information to the cloud server when not communicating with the coffee machine [for example, see FIG. 81]." has been described.

The determination unit 1861b shown in (B) of FIG. 86 may perform the plurality of types of determination processes based on the acquired individual device information, and the display control unit 1861c shown in (B) of FIG. 86 may be capable of causing the display unit to display results of the plurality of types of determination processes.

In addition, the acquisition unit 1861a shown in (B) of FIG. 86 can acquire the first history information of the grinder at the first timing, and acquire the second history information of the grinder at the second timing after the first timing, and the determination unit 1861b shown in (B) of FIG. 86 may perform the determination process based on the first history information and the second history information.

In addition, the present invention may be a program for a coffee machine system, in which the terminal is provided with an upload unit configured to upload, among the pieces of the individual device information acquired by the acquisition unit, the information including at least the history information to the cloud server.

Even if the acquisition unit acquires both the first history information and the second history information, when the cloud server has already stored the first history information, the upload unit may upload the second history information to the cloud server without uploading the first history information.

In addition, the upload unit may upload, among the individual device information acquired by the acquisition unit, the information including at least the history information to the cloud server when not communicating with the coffee machine.

In addition, the present invention may be the information processing method including an upload step of uploading, among the individual device information acquired by the acquisition step St20 shown in (A) of FIG. 87, the information including at least the history information to the cloud server when not communicating with the coffee machine.

The upload step may be a step executed before the determination step St21, may be a step executed after the determination step St21, may be a step executed before the display step St22, or may be a step executed after the display step St22.

In the upload step, even if both the first history information and the second history information are acquired, when the cloud server has already stored the first history information, the second history information may be uploaded to the cloud server without uploading the first history information.

In addition, the upload step may be a step of uploading, among the individual device information acquired by the acquisition step St20, the information including at least the history information to the cloud server when not communicating with the coffee machine.

In the above description, "a coffee machine system [for example, the coffee machine system GMS], including: a coffee machine [for example, the coffee machine GM] including a grinder [for example, the pulverizing device 5] configured to grind coffee beans; a plurality of terminals [for example, the terminals 18] each having a display unit [for example, the display screen 181] and configured to communicate with the coffee machine; and a cloud server [for example, the cloud server 19] configured to access from the plurality of terminals, in which one of the plurality of terminals acquires individual device information regarding the coffee machine from the coffee machine and displays the acquired individual device information on the display unit, the individual device information is information including status information representing a state of the grinder [for example, the information including the 'state information' and the 'operation cumulative value'], and history information of the grinder [for example, the information including the 'operation history' and the 'abnormality history'], the one terminal is configured to upload, among the individual device information acquired from the coffee machine, the information including at least the history information to the cloud server, the cloud server stores the information uploaded from the one terminal [for example, the 'operation cumulative value', 'operation history' difference, and 'abnormality history' difference], and another terminal [for example, a terminal of another person] other than the one terminal [for example, the own terminal] among the plurality of terminals is configured to download the information which is stored in the cloud server and uploaded from the one terminal, and displays the information downloaded from the cloud server on the display unit of the another terminal [for example the grind history detail page shown in (B) of FIG. 84]." has been described.

According to this coffee machine system, since the one terminal and another terminal can share the same information via the cloud server, the information related to the coffee machine can be effectively used by each of the plurality of terminals.

In the terminal 18 shown in (A) of FIG. 86, "a program for a coffee machine system (the dedicated application shown in (B) of FIG. 86) installed in a terminal 18 including a display unit 181 and configured to communicate with a coffee machine GM including a grinder (the pulverizing device 5) configured to grind coffee beans, in which the terminal is provided with: an acquisition unit 1861a configured to acquire from the coffee machine individual device information including status information representing a state of the grinder and history information of the grinder; an upload unit 1861d configured to upload, among the individual device information acquired by the acquisition unit, the information including at least the history information to the cloud server; a download unit 1861e configured to download information regarding the coffee machine which is stored in the cloud server and uploaded from another terminal; and a display control unit 1861c configured to cause the display unit to display information related to the coffee machine which is downloaded by the download unit and uploaded from another terminal." shown in (B) of FIG. 86 is installed.

The information which is uploaded from another terminal and related to the coffee machine may be information previously uploaded to the cloud server by the terminal, downloaded once by another terminal, and re-uploaded to the cloud server.

An input unit is configured to input additional information to the downloaded information related to the coffee machine, which is downloaded by the download unit and uploaded from another terminal, and the upload unit may upload information obtained by adding the additional information to the download information to the cloud server.

(B) of FIG. 87 is a flowchart showing a flow of an information display method executed by the terminal 18 shown in (A) of FIG. 86.

In the terminal 18 shown in (A) of FIG. 86, "an information display method for causing a display unit to display individual device information related to a coffee machine GM including a grinder (the pulverizing device 5) configured to grind coffee beans, in which the individual device information is information including status information representing a state of the grinder and history information of the grinder, and the information display method includes: an acquisition step St30 of acquiring the individual device information from the coffee machine; an upload step St31 of uploading, among the individual device information acquired by the acquisition unit, the information including at least the history information to the cloud server; a download step St32 of downloading information related to the coffee machine, which is stored in the cloud server and uploaded from another terminal; and a display step St33 of causing the display unit to display the information related to the coffee machine, which is downloaded by the download unit and uploaded from another terminal." shown in (B) of FIG. 87 is executed.

The information which is uploaded from another terminal and related to the coffee machine may be information previously uploaded to the cloud server by the terminal, downloaded once by another terminal, and re-uploaded to the cloud server.

In addition, the information display method further includes an input step St34 of inputting additional information to the download information regarding the coffee machine which is downloaded in the download step and uploaded from another terminal, and a second upload step St35 of uploading the information obtained by adding the additional information to the download information to the cloud server.

"The coffee machine system, in which each of the plurality of terminals is configured to individually communicate with the coffee machine, to acquire first history information [for example, the previous 'operation history'] of the grinder at a first timing [for example, a timing of the 'operation history' one before the latest 'operation history'], and to acquire second history information [for example, the latest 'operation history'] of the grinder at a second timing [for example, a timing of the latest 'operation history'] after the first timing." has been described.

In addition, "the coffee machine system, in which each of the plurality of terminals communicates with the coffee machine at different timings." has been described.

In addition, "the coffee machine system, in which even if each of the plurality of terminals acquires both the first history information [for example, the 'operation history' one before the latest 'operation history'] and the second history information [for example, the latest 'operation history'], when the cloud server has already stored the first history information [for example, have been uploaded by another terminal], the terminal uploads the second history information [for example, difference information] to the cloud server without uploading the first history information, the cloud server stores the uploaded second history information in advance, and among the plurality of terminals, a terminal different from the terminal that uploads the second history information to the cloud server is configured to download the second history information stored in the cloud server." has been described.

In addition, "the coffee machine system, in which when the coffee machine does not communicate with the one terminal for a predetermined period of time [for example, 3 minutes] during the connection with the one terminal [for example, during the connection by short-range wireless communication], the coffee machine disconnects from the one terminal." has been described.

In this way, it is possible to prevent a situation in which communication with another terminal becomes impossible due to a failure of the one terminal.

"The coffee machine system, in which the one terminal is configured to upload, among the individual device information acquired from the coffee machine, grind-related information including at least the history information to the cloud server, the grind-related information is information [for example, information including 'operation history', 'abnormality history', and input information on the grind history detail page] including the additional information [for example, the product number of the main mill blade, evaluation, and comment input on the grind history detail page shown in (B) of FIG. 84] input from the one terminal, the cloud server stores the grind-related information uploaded from the one terminal in advance, and another terminal other than the one terminal among the plurality of terminals is configured to download the grind-related information which is stored in the cloud server and uploaded from the one terminal, and displays the grind-related information downloaded from the cloud server on the display unit of another terminal." has been described.

In addition, the acquisition unit shown in (B) of FIG. 86 may be 1861*a*, and configured to acquire, from the coffee machine, the first history information of the grinder at the first timing, and the second history information of the grinder at the second timing after the first timing.

In addition, even if the acquisition unit 1861*a* acquires both the first history information and the second history information, when the cloud server has already stored the first history information, the upload unit 1861*d* shown in (B) of FIG. 86 may upload the second history information to the cloud server without uploading the first history information.

In addition, the acquisition step St30 shown in (B) of FIG. 87 may be a step of acquiring, from the coffee machine, the first history information of the grinder at the first timing, and the second history information of the grinder at the second timing after the first timing.

In addition, even if both the first history information and the second history information are acquired in the acquisition step St30, when the cloud server has already stored the first history information, the upload step St31 shown in (B) of FIG. 87 may be a step of uploading the second history information to the cloud server without uploading the first history information.

The coffee machine system GMS described above can include the coffee bean grinding machine GM according to the first embodiment in addition to the coffee bean grinding machine GM according to the second embodiment, and can also include the beverage production device 1 shown in FIG. 1 and the like.

The present invention is not limited to the embodiments and examples described above, and the contents thereof can be combined with each other without departing from the spirit of the present invention, and may be partially changed according to an object or the like. The individual terms described in the present specification are merely used for describing the present invention, and it is needless to say that the present invention is not limited to the strict meaning of the terms, and can include equivalents thereof. For example, expressions such as "device" and "portion" may be rephrased as "unit", "module", or the like.

REFERENCE SIGNS LIST 1 beverage production device
2 bean processing device
3 extraction device
4 reservoir device
401 canister accommodation unit
402 hopper unit
403 funnel unit
404 weighing unit
5 pulverizing device
5A first grinder
5AM top mill
57a fixed blade
58a rotary blade
5B second grinder
5BM main mill
57b fixed blade
58b rotary blade
6 separation device
6A aspiration unit
6B forming unit
6C guiding passage
60 aspiration unit
60A chaff fan unit
60A1 chaff fan
60A2 chaff fan motor
60B collection container
60Bo outer case
60Bi inner case
6io opening
691 worm wheel
640 lock lever
641 gear lock portion
691g gear portion
695 manual setting disc dial
696 fine adjustment knob dial
698 lever member
7 fluid supply unit
9 extraction container
11 control device
11a processing unit
12 information display device
17 mobile terminal
GM coffee bean grinding machine
GM10 center casing
GM11 option attachment portion
GM20 bean outlet
GM21 lid unit
GM22 guide passage forming member
GM51 power switch
GM52 reverse rotation button
PF porter filter
PFb basket
H1 hammer mechanism
H10 hammer
H12 holding arm
H121 holding portion
H13 striking arm
H131 striking portion
H14 operation arm
H141 finger rest portion
GM31 chute
GM33 fixed holding member
GM332 rubber cap
150 grind button
151 button LED 151
60D air volume dial
600 mechanical switch unit
610 first mechanical switch
620 second mechanical switch
611, 621 detection ball
612,622 magnet member
613, 623 detection piece
GMS coffee machine system
18 terminal
181 display screen
185 processing unit
186 storage unit
1861 application program dedicated to coffee machine system
19 cloud server

The invention claimed is:

1. A coffee machine, comprising:
a first grinder configured to grind coffee beans;
a fan configured to generate a wind pressure by rotating to separate waste from the ground beans ground by the first grinder;
a fan motor configured to cause the fan to rotate;
a setting unit to select a set value; and
a control unit configured to control rotation of the fan motor according to a PWM value corresponding to the set value selected by the setting unit, wherein
the control unit acquires information related to a rotation speed of the actually rotating fan motor, corrects the PWM value based on the acquired information, and controls the rotation of the fan motor according to the corrected PWM value,
a storage unit configured to update and store the corrected PWM value each time the correction is performed,
the storage unit is configured to save the corrected PWM value updated and stored even if power is cut, and
when the power is applied next time, the control unit controls the rotation of the fan motor according to the corrected PWM value at the time of cutting the power, which is stored in the storage unit.

2. The coffee machine according to claim 1, wherein the control unit acquires the information at a predetermined cycle after the power is applied, and is configured to correct the PWM value each time the information is acquired.

3. The coffee machine according to claim 1,
the setting unit sets one set value selected from a plurality of types of set values as the set value, and
the control unit controls the rotation of the fan motor according to a PWM value corresponding to the one set value set by the setting unit, the control unit corrects the PWM value according to a correction necessary condition prepared for each of the plurality of types of set values, the storage unit updates and stores the corrected PWM value for each of the plurality of types of set values, and when the power is applied next time, the control unit controls the rotation of the fan motor according to, among the corrected PWM values at the time of cutting the power, which are stored in the storage unit, the corrected PWM value corresponding to the one set value selected by the setting unit.

4. The coffee machine according to claim 1, wherein the control unit is configured to control rotation of the fan motor according to a first PWM value corresponding to a first set value in the case that the first set value is selected by the setting unit, the storage unit is configured to update and store a corrected first PWM value each time the correction is performed, the storage unit is configured to save the corrected first PWM value updated and stored even if power is cut, and when the power is applied next time, the control unit controls the rotation of the fan motor according to the corrected first PWM value at the time of cutting the power, which is stored in the storage unit in the case that the first set value is selected by the setting unit.

* * * * *